US008925294B2

(12) United States Patent
Fresco

(10) Patent No.: US 8,925,294 B2
(45) Date of Patent: Jan. 6, 2015

(54) SOLUTE ION COULOMB FORCE ACCELARATION AND ELECTRIC FIELD MONOPOLE PASSIVE VOLTAGE SOURCE

(76) Inventor: Anthony N. Fresco, Melville, NY (US)

( * ) Notice: Subject to any disclaimer, the term of this patent is extended or adjusted under 35 U.S.C. 154(b) by 1057 days.

(21) Appl. No.: 12/733,322

(22) PCT Filed: Aug. 23, 2007

(86) PCT No.: PCT/US2007/076669
§ 371 (c)(1),
(2), (4) Date: Feb. 23, 2010

(87) PCT Pub. No.: WO2008/024927
PCT Pub. Date: Feb. 28, 2008

(65) Prior Publication Data

US 2010/0199632 A1 Aug. 12, 2010

(51) Int. Cl.
*H02N 11/00* (2006.01)

(52) U.S. Cl.
CPC .................................. *H02N 11/002* (2013.01)
USPC ........................................................... 60/202

(58) Field of Classification Search
USPC .......... 429/68, 69; 250/281, 282, 292; 60/202
See application file for complete search history.

(56) References Cited

U.S. PATENT DOCUMENTS

| | | | | |
|---|---|---|---|---|
| 1,605,911 | A * | 11/1926 | Banneitz | 200/52 R |
| 2,765,975 | A | 10/1956 | Lindenblad | |
| 3,944,918 | A * | 3/1976 | Hadermann et al. | 324/94 |
| 4,043,891 | A * | 8/1977 | Alkire et al. | 205/96 |
| 4,323,433 | A * | 4/1982 | Loch | 205/96 |
| 4,834,862 | A | 5/1989 | Breiner et al. | |
| 5,015,906 | A | 5/1991 | Cho et al. | |
| 5,150,759 | A * | 9/1992 | Borchard | 177/210 C |
| 5,811,944 | A | 9/1998 | Sampayan et al. | |
| 5,821,705 | A | 10/1998 | Caporaso et al. | |
| 5,954,937 | A * | 9/1999 | Farmer | 205/687 |
| 5,965,968 | A | 10/1999 | Robert et al. | |
| 5,980,718 | A | 11/1999 | Van Konynenburg et al. | |
| 6,168,882 | B1 * | 1/2001 | Inoue et al. | 429/119 |
| 6,419,538 | B1 | 7/2002 | Diaz | |
| 6,580,598 | B2 * | 6/2003 | Shiue et al. | 361/502 |
| 6,919,562 | B1 * | 7/2005 | Whitehouse et al. | 250/288 |

(Continued)

OTHER PUBLICATIONS

Farmer et al., Capacitive Deionization of NaCI and NaNO3 Solutions with Carbon Aerogel Electrodes, J. Electrochem. Soc., vol. 143, No. 1, Jan. 1996, pp. 159-169.*

(Continued)

*Primary Examiner* — Ehud Gartenberg
*Assistant Examiner* — Lorne Meade
(74) *Attorney, Agent, or Firm* — Anthony N. Fresco

(57) ABSTRACT

At least one electrode assembly is configured to enable like charged ions to convert potential energy of the like charged ions into kinetic energy based on the Coulomb forces therebetween via linear alignment thereof, or enable a first portion of like charged ions to convert potential energy of the first portion of like charged ions to kinetic energy based on interaction with the Coulomb forces of a second portion of like charged ions, or enable a first portion of like charged ions to convert potential energy of a second portion of like charged ions to kinetic energy based on similar interaction. Various electrode assemblies are described and corresponding methods of converting potential energy of like charged ions to kinetic energy. The like charged ions are configured to form a passive electric field voltage source that may have one or more electric field monopoles to enable motion of a mobile assembly.

20 Claims, 72 Drawing Sheets

(56) References Cited

U.S. PATENT DOCUMENTS

| | | | | |
|---|---|---|---|---|
| 2003/0183783 | A1 | 10/2003 | Smith et al. | |
| 2003/0201402 | A1 | 10/2003 | Ye et al. | |
| 2003/0230240 | A1 | 12/2003 | Rostoker et al. | |
| 2004/0129876 | A1 * | 7/2004 | Franzen | 250/288 |
| 2004/0161332 | A1 | 8/2004 | Rabinowitz et al. | |
| 2004/0222369 | A1 * | 11/2004 | Makarov et al. | 250/281 |
| 2005/0258364 | A1 | 11/2005 | Whitehouse et al. | |
| 2006/0016728 | A1 | 1/2006 | Shorts | |
| 2007/0201174 | A1 * | 8/2007 | Hynes et al. | 361/56 |

OTHER PUBLICATIONS

International Search Report PCT/US07/76669 dated Feb. 29, 2008. (4 pages).

Written Opinion of the International Searching Authority PCT/US07/76669 dated Feb. 29, 2008. (18 pages).

PCT/US07/76669 Partial Response to Written Opinion dated Sep. 29, 2008. (111 pages).

* cited by examiner

FIG. 17

TABLE 1 (SEE FIG. 7)

| ELECTRODE/SURFACE | SURFACE POLARITY | IONS ATTRACTED | ELECTRIC FIELD B BETWEEN SURFACES | VOLTAGE SOURCE |
|---|---|---|---|---|
| 113a/S113a | + | 101(-) | E113a-163b | V11 |
| 163b/S163b | - | 102(+) | | |
| 163a/S163a | + | 101(-) | E1163a-133b | |
| 113b/S113b | - | 102(+) | | |
| 114a/S114a | + | 101(-) | E114a-164b | |
| 164b/S164b | - | 102(+) | | |
| 164a/S164a | + | 101(-) | E164a-114b | |
| 114b/S114b | - | 102(+) | | |
| 115a/S115a | + | 101(-) | E115a-165b | |
| 165b/S165b | - | 102(+) | | |
| 165a/S165a | + | 101(-) | E165a-115b | |
| 115b/S115b | - | 102(+) | | |
| 116a/S116a | + | 101(-) | E116a-166b | |
| 166b/S166b | - | 102(+) | | |
| 166a/S166a | + | 101(-) | E166a-116b | |
| 116b/S116b | - | 102(+) | | |

TABLE 2 (SEE FIG. 12)

| ELECTRODE/SURFACE | SURFACE POLARITY | IONS REPELLED | ELECTRIC FIELD B BETWEEN SURFACES | VOLTAGE SOURCE |
|---|---|---|---|---|
| 114a/S114a | + | 102(+) | E114a-113a | V12 |
| 113a/S113a | - | 101(-) | | |
| 164a/S164a | + | 102(+) | E164a-163a | |
| 163a/S163a | - | 101(-) | | |
| 163b/S163b | + | 102(+) | E163b-164b | |
| 164b/S164b | - | 101(-) | | |
| 113b/S113b | + | 102(+) | E113b-114b | |
| 114b/S114b | - | 101(-) | | |
| 116a/S116a | + | 102(+) | E116a-115a | V13 |
| 115a/S115a | - | 101(-) | | |
| 166a/S166a | + | 102(+) | E166a-165a | |
| 165a/S165a | - | 101(-) | | |
| 165b/S165b | + | 102(+) | E165b-166b | |
| 166b/S166b | - | 101(-) | | |
| 115b/S115b | + | 102(+) | E115b-116b | |
| 116b/S116b | - | 101(-) | | |

FIG. 17 (cont.)

TABLE 3 (SEE FIG. 16)

| ELECTRODE/SURFACE | SURFACE POLARITY | IONS REPELLED | ELECTRIC FIELD B BETWEEN SURFACES | VOLTAGE SOURCE |
|---|---|---|---|---|
| 113a/S113a | - | 101(-) | E113b-113a | V12' |
| 113b/S113b | + | 102(+) | | |
| 163a/S163a | - | 101(-) | E163b-163a | |
| 163b/S163b | + | 102(+) | | |
| 115a/S115a | - | 101(-) | E115b-115a | V13' |
| 115b/S115b | + | 102(+) | | |
| 165a/S165a | - | 101(-) | E165b-165a | |
| 165b/S165b | + | 102(+) | | |

FIG. 23

TABLE 4

(SEE FIGS. 18-22)

| FIRST MODE OF OPERATION | | | | | |
|---|---|---|---|---|---|
| VOLTAGE SOURCE | SWITCH POSITION | ELECTRODE/ SURFACE | SURFACE POLARITY | IONS ATTRACTED | ELECTRIC FIELD BETWEEN SURFACES |
| V141 | SW141 CLOSED | 125a/S125a | - | 102(+) | E135a-125a |
| | | 135a/S135a | + | 101(-) | |
| | | 125b/S125b | + | 101(-) | E125b-135b |
| | | 135b/S135b | - | 102(+) | |
| V142a | SW142 OPEN | ------ | ------ | ------ | ------ |
| SECOND MODE OF OPERATION | | | | | |
| V141 | SW141 OPEN | ------ | ------ | ------ | ------ |
| V142 | SW142a CLOSED SW142b POS. 1 SW 142c POS. 1 | 125a/S125a | - | 102(+) | E125b-125a |
| | | 125b/S125b | + | 101(-) | |
| | | 135a/S135a | + | 101(-) | E135a-135b |
| | | 135b/S135b | - | 102(+) | |
| THIRD MODE OF OPERATION | | | | | |
| VOLTAGE SOURCE | SWITCH POSITION | ELECTRODE/ SURFACE | SURFACE POLARITY | IONS REPELLED | ELECTRIC FIELD BETWEEN SURFACES |
| V141 | SW141 OPEN | ------ | ------ | ------ | ------ |
| V142 | SW142a CLOSED SW142b POS. 2 SW 142c POS. 2 | 125a/S125a | + | 102(+) | E125a-125b |
| | | 125b/S125b | - | 101(-) | |
| | | 135a/S135a | - | 101(-) | E135b-135a |
| | | 135b/S135b | + | 102(+) | |

FIG. 28

TABLE 5 (See FIGS. 24-27)

| **First Stage of Operation – Charge Accumulation – See FIGS. 24-26** | | | | | | | |
|---|---|---|---|---|---|---|---|
| **Voltage Source** | **Electrode/ Surface** | **Electrode Surface Polarity** | **Ions Attracted** | **Partition/ Position** | **Partition Surface Polarity** | **Ions Attracted** | **Electric Field Between Surfaces** |
| **V11** | 113a/S113e | + | 101(-) | P113e/ open | neutral | none | $E_{113a-163b}$ |
| | 163b/S163f | - | 102(+) | P163f/ open | neutral | none | |
| | 163a/S163e | + | 101(-) | P113e/ open | neutral | none | $E_{163a-113b}$ |
| | 113b/S113f | - | 102(+) | P113f/ open | neutral | none | |
| | 114a/S114e | Neutral or + or - | None or 101(-) or 102(+) | P114e/ open | neutral | none | $E_{114a-164b}$ |
| | 164b/S164f | Neutral or – or + | None or 102(+) or 101(-) | P164f/ open | neutral | none | |
| | 164a/S164e | Neutral or + or - | None or 101(-) or 102(+) | P114e/ open | neutral | none | $E_{164a-114b}$ |
| | 114b/S114f | Neutral or – or + | None or 102(+) or 101(-) | P114f/ open | neutral | none | |
| **Second Stage of Operation - Discharge or Charge Acceleration –See FIGS. 25-27** | | | | | | | |
| **Voltage Source** | **Electrode/ Surface** | **Electrode Surface Polarity** | **Ions Repelled** | **Partition/ Position** | **Partition Surface Polarity** | **Ions Repelled** | **Electric Field Between Surfaces** |
| **V12 (V12', if present, to partitions only)** | 114a/S114e | + | [102(+)] | P114e/ closed | + | | $E_{114a-113a}$ |
| | 113a/S113e | - | 101(-) | P113e/ closed | - | 101(-) | & $E_{P114e-P113e}$ |
| | 164a/S164e | + | [102(+)] | P164e/ closed | + | | $E_{164a-163a}$ |
| | 163a/S163e | - | 101(-) | P163e/ closed | - | 101(-) | & $E_{P164e-P113e}$ |
| | 113b/S113f | - | [101(-)] | P113f/ closed | - | | $E_{113b-114b}$ |
| | 114b/S114f | + | 102(+) | P114f/ closed | + | 102(+) | & $E_{P113f-P114f}$ |
| | 163b/S163f | - | [101(-)] | P163f/ closed | - | | $E_{163b-164b}$ |
| | 164b/S164f | + | 102(+) | P164f/ closed | + | 102(+) | & $E_{P163f-P114f}$ |
| NOTE: [Parentheses] indicate solute ions 101 or 102 that would be repelled but may not be present at the surface. | | | | | | | |

FIG. 28 (CONT.)

TABLE 6 (See FIGS. 24-27)

| First Stage of Operation – Charge Accumulation- See FIGS. 24-26 | | | | | | | |
|---|---|---|---|---|---|---|---|
| **Voltage Source** | **Electrode/ Surface** | **Electrode Surface Polarity** | **Ions Attracted** | **Partition/ Position** | **Partition Surface Polarity** | **Ions Attracted** | **Electric Field Between Surfaces** |
| **V11'** | 113a/S113e | + | 101(-) | P113e/ open | neutral | none | $E_{113a-163b}$ |
| | 163b/S163f | Neutral (induced –) | 102(+) | P163f/ open | neutral | none | |
| | 163a/S163e | Neutral (induced +) | 101(-) | P113e/ open | neutral | none | $E_{163a-113b}$ |
| | 113b/S113f | - | 102(+) | P113f/ open | neutral | none | |
| | 114a/S114e | Neutral or + or - | None or 101(-) or 102(+) | P114e/ open | neutral | none | $E_{114a-164b}$ |
| | 164b/S164f | Neutral (induced – or +) | None or 102(+) or 101(-) | P164f/ open | neutral | none | |
| | 164a/S164e | Neutral (induced + or -) | None or 101(-) or 102(+) | P114e/ open | neutral | none | $E_{164a-114b}$ |
| | 114b/S114f | Neutral or – or + | None or 102(+) or 101(-) | P114f/ open | neutral | none | |
| **Second Stage of Operation - Discharge or Charge Acceleration – See FIGS. 25-27** | | | | | | | |
| **Voltage Source** | **Electrode/ Surface** | **Electrode Surface Polarity** | **Ions Repelled** | **Partition/ Position** | **Partition Surface Polarity** | **Ions Repelled** | **Electric Field Between Surfaces** |
| **V12 (If V12' is present, V12 is to electrodes only, while V12' is to partitions only)** | 114a/S114e | + | [102(+)] | P114e/ closed | + | | $E_{114a-113a}$ |
| | 113a/S113e | - | 101(-) | P113e/ closed | - | 101(-) | & $E_{P114e-P113e}$ |
| | 164a/S164e | + | [102(+)] | P164e/ closed | + | | $E_{164a-163a}$ |
| | 163a/S163e | - | 101(-) | P163e/ closed | - | 101(-) | & $E_{P164e-P113e}$ |
| | 113b/S113f | - | [101(-)] | P113f/ closed | - | | $E_{113b-114b}$ |
| | 114b/S114f | + | 102(+) | P114f/ closed | + | 102(+) | & $E_{P113f-P114f}$ |
| | 163b/S163f | - | [101(-)] | P163f/ closed | - | | $E_{163b-164b}$ |
| | 164b/S164f | + | 102(+) | P164f/ closed | + | 102(+) | & $E_{P163f-P114f}$ |
| NOTE: [Parentheses] indicate solute ions 101 or 102 that would be repelled but may not be present at the surface. | | | | | | | |

FIG. 35
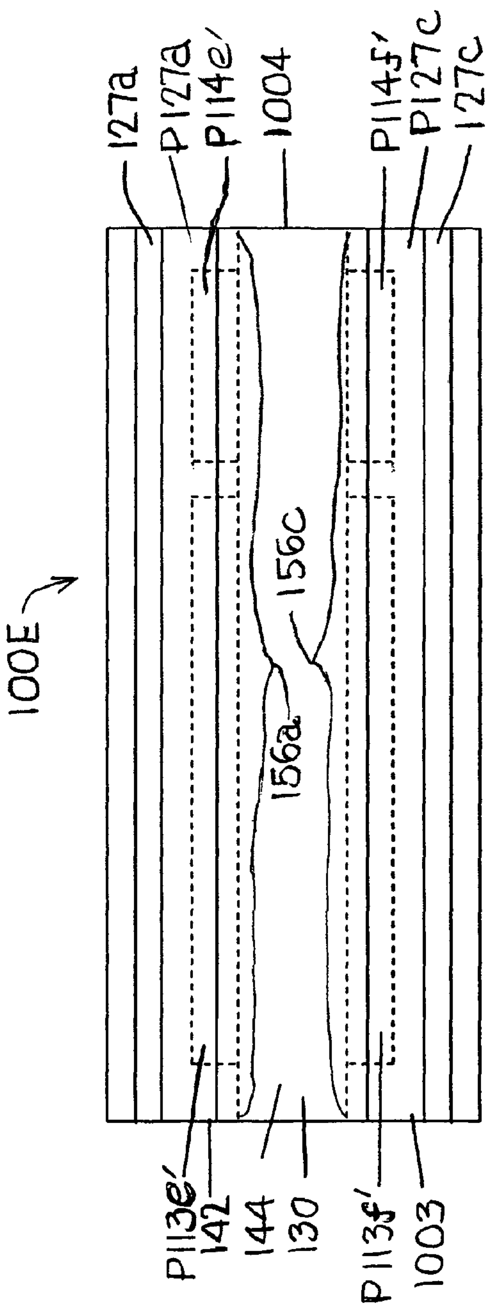
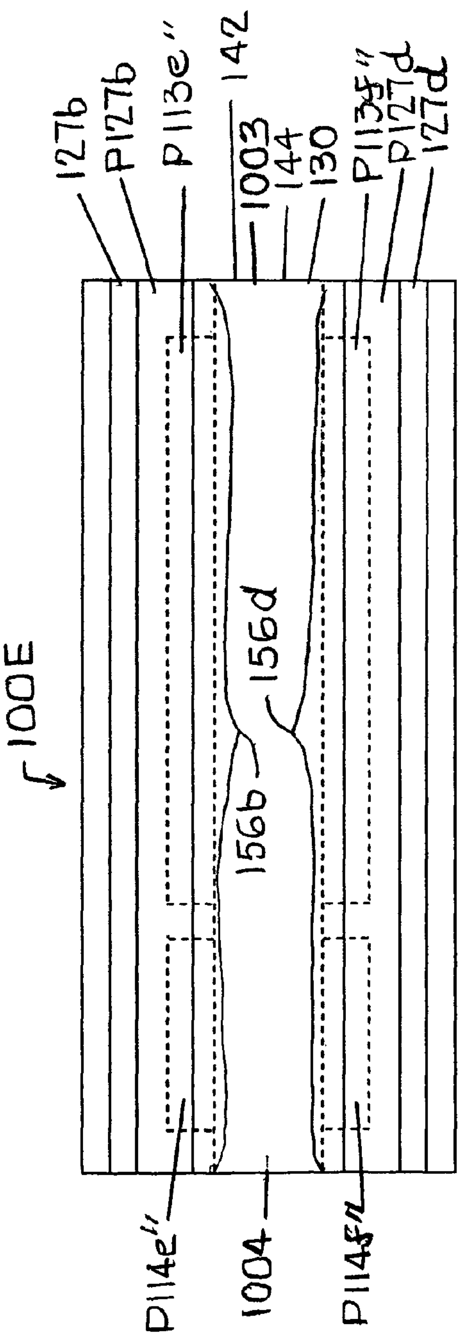
FIG. 36

FIG. 57
TABLE 7 (See FIGS. 54-56)

| First Stage of Operation – Charge Accumulation | | | | |
|---|---|---|---|---|
| **Voltage Source** | **Electrode/Surface** | **Surface Polarity** | **Ions Attracted** | **Electric Field Between Surfaces** |
| V21 | 115e/S115e | + | 101(-) | $E_{115e\text{-}115f}$ |
| | 115f/S115f | - | 102(+) | |
| | 113e/S113e | + | 101(-) | $E_{113e\text{-}113f}$ |
| | 113f/S113f | - | 102(+) | |
| **Second Stage of Operation – Discharge or Charge Acceleration** | | | | |
| **Voltage Source** | **Electrode/Surface** | **Surface Polarity** | **Ions Repelled** | **Electric Field Between Surfaces** |
| V22 | 115e/S115e | - | 101(-) | $E_{116e\text{-}115e}$ |
| | 116e/S116e | + | [102(+)] | |
| | 113e/S113e | - | 101(-) | $E_{114e\text{-}113e}$ |
| | 114e/S114e | + | [102(+)] | |
| | 165e/S165e | - | 101(-) | $E_{166e\text{-}165e}$ |
| | 166e/S166e | + | [102(+)] | |
| | 163e/S163e | - | 101(-) | $E_{164e\text{-}163e}$ |
| | 164e/S164e | + | [102(+)] | |
| | 115f/S115f | + | 102(+) | $E_{115f\text{-}116f}$ |
| | 116f/S116f | - | [101(-)] | |
| | 113f/S113f | + | 102(+) | $E_{113f\text{-}114f}$ |
| | 114f/S114f | - | [101(-)] | |
| | 165f/S165f | + | 102(+) | $E_{165f\text{-}166f}$ |
| | 166f/S166f | - | [101(-)] | |
| | 163f/S163f | + | 102(+) | $E_{163f\text{-}164f}$ |
| | 164f/S164f | - | [101(-)] | |
| | | | | |
| | | | | |

NOTE: [Parentheses] indicate solute ions 101 or 102 that would be repelled but may not be present at the surface.

FIG. 75
TABLE 8 (See FIGS. 70-74)

| First Stage of Operation – Charge Accumulation- See FIGS. 70-72 | | | | |
|---|---|---|---|---|
| **Voltage Source** | **Electrode/Surface** | **Surface Polarity** | **Ions Attracted** | **Electric Field Between Surfaces** |
| V501 | 501/S501 | + | 101(-) | $E_{501-502}$ |
| | 502/S5021 | - | 102(+) | |
| | 503/S503 | + | 101(-) | $E_{502-503}$ |
| | 502/S5022 | - | 102(+) | |
| | 505/S5051 | + | 101(-) | $E_{505-504}$ |
| | 504/S504 | - | 102(+) | |
| | 505/S5052 | + | 101(-) | $E_{505-506}$ |
| | 506/S506 | - | 102(+) | |
| **Second Stage of Operation – Discharge or Charge Acceleration- See FIG. 73** | | | | |
| **Voltage Source** | **Electrode/Surface** | **Surface Polarity** | **Ions Repelled** | **Electric Field Between Surfaces** |
| V502 | 501/S501<br>511/S511 | + | Attraction/ compression | $E_{501-504}$ |
| | 504/S504<br>514/S514 | - | Attraction/ compression | |
| | 502/S5021<br>502/S5022<br>512/S5121<br>512/S5122 | + | 102(+) | $E_{502-505}$ |
| | 505/S5051<br>505/S502<br>515/S5151<br>515/S5152 | - | [101(-)] | |
| | 503/S503<br>513/S513 | + | Attraction/ compression | $E_{503-506}$ |
| | 506/S506<br>516/S516 | - | Attraction/ compression | |
| **Second Stage of Operation – Discharge or Charge Acceleration- See FIG. 74** | | | | |
| V502 | 501/S501<br>511/S511 | - | 101(-) | $E_{504-501}$ |
| | 504/S504<br>514/S514 | + | 102(+) | |
| | 502/S5021<br>502/S5022<br>512/S5121<br>512/S5122 | - | Compression | $E_{505-502}$ |
| | 505/S5051<br>505/S502<br>515/S5151<br>515/S5152 | + | Compression | |
| | 503/S503<br>513/S513 | - | 101(-) | $E_{506-503}$ |
| | 506/S506<br>516/S516 | + | 102(+) | |

SOLUTE ION COULOMB FORCE ACCELARATION AND ELECTRIC FIELD MONOPOLE PASSIVE VOLTAGE SOURCE

CROSS-REFERENCE TO RELATED APPLICATIONS

This application claims the benefit of priority of International Application Serial No. PCT/US2007/076669 filed on Aug. 23, 2007, by A. Fresco, published as WO2008/024927 A2 on Feb. 28, 2008 entitled "SOLUTE ION COULOMB FORCE ACCELERATION AND ELECTRIC FIELD MONOPOLE PASSIVE VOLTAGE SOURCE", the entire contents of which is incorporated by reference herein.

BACKGROUND

There is great interest concerning the impact of and possible causes of global warming. As is well known, global warming is thought to be caused by the "greenhouse" gas effect where gases such as carbon dioxide, which is emitted by the combustion of fossil fuels, delay the radiation into outer space of the corresponding thermal energy released from the combustion of the fossil fuels. One approach that is being seriously considered at this time to reduce the emission of carbon dioxide is to produce hydrogen as a fuel for fuel cells. Hydrogen powered fuel cells are under development for future applications to electric vehicles and for distributed electrical energy sources. However, the currently known methods of producing hydrogen are very energy intensive, with electrolysis of water being the most energy intensive of the known methods.

The predominant scientific opinion at this time is that global warming is occurring and is caused to a significant extent by human activities. At the same time, demand for fossil fuels by rapidly developing nations with large populations such as China and India is increasing the cost of energy and the potential for even further emissions of greenhouse gases.

Many portions of the world, including the United States, are subject to persistent drought conditions. As a result, there has been an increased interest in improving methods of desalination. The oceans have an average worldwide salinity of 35,000 ppm (3.5%), of which about 30,000 ppm (3.0%) are Na+ and Cl− ions in solution.

Sources of saline water are not limited to the oceans. Underground saline aquifers are located in many portions of the western United States where persistent drought conditions are most severe. Brackish water is generally defined as water having a salt concentration of about 1000 to 8000 ppm as compared to drinking water which is generally considered to range from 250 to 1000 ppm. The theoretical minimum energy requirement to convert seawater to fresh water is given by various sources as ranging from 0.050 to 0.065 KJ/mol (kilojoules per mole).

In general, reverse osmosis is the method most commonly used for desalination of both seawater and brackish water. In reverse osmosis, the salt water is pumped to a high pressure through a tubular membrane such that the salt ions remain trapped in the interior portion of the membrane. Another method of desalination is electrodialysis, wherein a potential difference V across a stack of alternately charge selective membranes causes alternating concentrations of brine and fresh water between the membranes. Anolyte and catholyte are produced at the respective anode and cathode. The anolyte and catholyte are sometimes referred to as electrochemically activated water. Electrochemically activated water, containing either an excess of positive ions or an excess of negative ions, is sometimes used as a biological disinfectant.

A method of desalination which has received increasing interest in the past several years is called capacitive deionization (CDI). Salt water enters the space between two electrodes that are maintained at a potential difference V of about 1.2V so that the electrostatic field forces sodium and chlorine ions into the aerogel, where they are retained, and pure water leaves the space between the electrodes. The ions and other charged particles (such as microorganisms) are attracted to and retained by the electrode of opposite charge. During the application of the potential difference V, the negative electrode accumulates electrons, which are negatively charged, on the surface so that the negative electrode attracts positively charged hydrated ions (cations) such as calcium (Ca), magnesium (Mg) and sodium (Na).

Correspondingly, during the application of the potential difference V, the positive electrode, accumulates positively charged "holes" on the surface so that the positively charged electrode attracts hydrated negative ions (anions) such as chloride (Cl) and nitrate ($NO_3$). Due to the polar structure of water as HOH, the term "hydrated ion" refers to the resulting combination of about six to eight polar water molecules which are attracted by the Coulomb forces to a single ion, be it a positively charged ion or a negatively charged ion, resulting in a cluster ion, as shown in FIG. 1. That is, the H+ polar end of each water molecule is attracted to the Cl− ion while the OH− polar end of each water molecule is attracted to the Na+ ion.

Eventually the electrodes become saturated with the hydrated ions and the electrodes must be regenerated. The applied potential V is removed, and since there is no longer any reason for the ions to remain attached to the electrodes, the ions are released and flushed from the system, producing a more concentrated brine stream. Oftentimes, to speed the regeneration time, the polarity of the applied potential is actually reversed rather than being simply removed. In practice, more than 80% of water fed to a CDI process emerges as fresh, deionized potable water, and the remainder is discharged as a concentrated brine solution containing virtually all of the salts in the feed.

Carbon aerogel may be used as the electrode material for CDI because such a material is stable in harsh chemical conditions and possesses a very high specific surface area (about 100-1000 square meters per gram of aerogel). It is the very high specific surface area of the carbon aerogels which has advanced the state of the art of capacitive deionization. However, carbon aerogel is still costly to produce. Alternative materials such as mesoporous carbon are available or being developed.

It is generally recognized at this time that one of the most challenging aspects of desalination and salinity control is management of the brine concentrate by-product. In both coastal and inland regions, the costs and regulatory requirements associated with concentrate management remains a significant problem.

Therefore, due in part to the high cost of carbon aerogel, and at least partly due to the inherent cost of energy which must be input into existing desalination processes, desalination processes still remain limited in their application. The recent increase in energy costs adversely affects the economics of desalination as well as already well-established sectors of the economy, particularly transportation. The main fuel for transportation, gasoline, has an energy content of about 35 MJ (megajoules) per liter. It is against this energy content against which alternative energy technologies such as solar, wind, biomass (e.g., biodiesel and ethanol), hydrogen for fuel cells, as examples, are sometimes compared against.

It is well known that nuclear energy in the form of nuclear fission and nuclear fusion have energy contents on a per mass basis which greatly exceed that of fossil fuels and also that neither form of energy results in the formation of greenhouse gases. Nuclear energy is released due to the difference in mass of the reactants versus the products. In that the mass of the products is less than the mass of the reactants, the difference in mass is converted to energy according to Einstein's equation, $E=mc^2$, where E is the energy in joules, m is the mass in kilograms, and c is the velocity of light in meters/second (about $3.0\times10^8$/meters per second).

Consequently, controlled thermonuclear fusion has been under development for many years. In nuclear fusion, the goal is to overcome the Coulomb forces of repulsion between pairs of like-charged ions, e.g., between pairs of deuterium ions, so that the like-charged ions approach each other closely enough so that the strong force or nuclear force predominates over the Coulomb force of repulsion. At a close enough distance between the like-charged ions, the strong force or nuclear force causes the pair of ions to fuse together to produce a product atom or ion, e.g., helium and other products, that have a total mass which, although heavier than the individual reactant ions, is less than the mass of the pair of reactant ions taken together. The difference in mass of the products is then converted to nuclear energy as described above.

More recently, lasers having intensities as high as $10^{20}$ watts per square centimeter have been used to cause a phenomenon known as a Coulomb explosion. The laser first causes an extreme cluster multielectron ionization and then a cluster Coulomb explosion resulting from the forces of repulsion between like charged nuclei. The Coulomb explosion phenomenon is under investigation as a means of achieving deuterium-deuterium nuclear fusion.

However, to date, there is no commercially available means for controlled nuclear fusion. Nuclear fission reactors, while commercially available and feasible, have been hampered by well-known problems involving long construction times, high capital costs and public perception of safety issues. Other alternative energy sources have yet to achieve a degree of commercial application and economic attractiveness sufficient to offset the continued production of greenhouse gases by the combustion of fossil fuels.

SUMMARY

To advance the state of the art with respect to at least propulsion and transportation systems, the present disclosure relates to at least one electrode assembly configured to at least one of enable at least a portion of like charged ions to convert potential energy of the at least a portion of like charged ions into kinetic energy based on the Coulomb forces therebetween via linear alignment thereof, enable a first portion of like charged ions to convert potential energy of the first portion of like charged ions to kinetic energy based on interaction with the Coulomb forces of a second portion of like charged ions, and enable a first portion of like charged ions to convert potential energy of a second portion of like charged ions to kinetic energy based on interaction with the Coulomb forces of the first portion of like charged ions. One or more electrode assemblies are configured to enable at least a portion of like charged ions to convert potential energy of the portion of like charged ions into kinetic energy based on the Coulomb forces therebetween via linear alignment thereof, and the one or more electrode assemblies include at least a first electrode surface and a second electrode surface configured such that at least one electric field can be established at least partially transversely between the at least a first electrode surface and the second electrode surface to substantially linearly align the at least a portion of like charged ions to convert the potential energy of the at least a portion of like charged ions to kinetic energy.

In one embodiment, at least one of the at least a first electrode surface and a second electrode surface is movable with respect to the other one. One or more electrode assemblies may be configured to enable at least a portion of like charged ions to convert potential energy of the portion of like charged ions into kinetic energy based on the Coulomb forces therebetween via linear alignment thereof, wherein one or more electrode assemblies include at least first, second, third and fourth electrode surfaces configured wherein during a charge accumulation mode of operation, establishing an electric field between the first and second electrode surfaces attracts positive ions to the first electrode surface and negative ions to the second electrode surface and establishing an electric field between the third and fourth electrode surfaces attracts positive ions to the third electrode surface and negative ions to the fourth electrode surface, and wherein the one or more electrode assemblies are configured wherein, following the charge accumulation mode of operation, the first and third electrode surfaces are moved via at least one of translation and rotation into interfacing relationship therebetween and the second and fourth electrode surfaces are moved via at least one of translation and rotation into interfacing relationship therebetween, In one embodiment, following the charge accumulation mode of operation, the at least a portion of like charged ions being enabled to convert potential energy of the portion of like charged ions into kinetic energy based on the Coulomb forces therebetween via linear alignment thereof is effected by establishing at least one electric field at least partially transversely with respect to the first and third electrode surfaces in interfacing relationship therebetween and with respect to the second and fourth electrode surfaces in interfacing relationship therebetween.

The one more electrode assemblies may further include at least one movable partition assembly having a first surface, the first surface of the at least one partition assembly configured such that at least a second electric field can be established at least partially transversely from the first surface of the at least one partition assembly to substantially linearly align the at least a portion of the like charged ions to convert the potential energy of the at least a portion of like charged ions to kinetic energy. A movable electrical insulating layer may be disposed over the at least one movable partition assembly and over at least the first electrode surface.

In one embodiment, the one or more electrode assemblies are configured to enable at least a portion of like charged ions to convert potential energy of the at least a portion of like charged ions into kinetic energy based on the Coulomb forces therebetween via linear alignment thereof, and the one or more electrode assemblies includes at least a pair of first and second electrode surfaces, the first and second electrode surfaces configured such that a first electric field established therebetween attracts negatively charged ions towards the first electrode surface and attracts positively charged ions towards the second electrode surface, and at least one electric field substantially aligning the at least a first portion of the like charged ions is established by reversing polarity of the first electric field to cause the negatively charged ions attracted towards the first electrode surface to be substantially aligned and to accelerate towards the second electrode surface and to cause the positively charged ions attracted towards the second electrode surface to be substantially aligned and to accelerate towards the first electrode surface.

In one embodiment, the one or more electrode assemblies are configured to enable at least a portion of like charged ions to convert potential energy of the portion of like charged ions into kinetic energy based on the Coulomb forces therebetween via linear alignment thereof, and include at least one pair of electrode surfaces configured to enable attraction of the at least a portion of like charged ions thereto via an electric field therebetween, wherein the at least one electrode assembly is configured wherein at least one electric field substantially aligning the at least a portion of like charged ions is established at least partially transversely with respect to the at least one pair of electrode surfaces while one of (a) terminating the electric field established across the at least one pair of electrode surfaces, and (b) reversing direction of the electric field established across the at least one pair of electrode surfaces.

In one embodiment, the one or more electrode assemblies are configured to enable at least a portion of like charged ions to convert potential energy of the at least a portion of like charged ions into kinetic energy based on the Coulomb forces therebetween via linear alignment thereof, and include at least first and second electrode assemblies contained within a beam conduit assembly, wherein the at least first and second electrode assemblies are disposed in interfacing relationship in a series sequential configuration and wherein the at least a portion of like charged ions so aligned comprises a first portion of like charged ions forming a first beam of like charged ions and a second portion of like charged ions so aligned forming a second beam of like charged ions, the first and second beams being ejected from the at least first electrode assembly and injected into the at least a second electrode assembly in the series, the at least first electrode assembly and the at least second electrode assembly in series forming thereby the beam conduit assembly.

In one embodiment, the one or more electrode assemblies are configured to enable at least a portion of like charged ions to convert potential energy of the at least a portion of like charged ions into kinetic energy based on the Coulomb forces therebetween via linear alignment thereof, and the one or more electrode assemblies include at least first and second electrode assemblies and wherein the at least a portion of like charged ions so aligned includes a first portion of like charged ions forming at least a first beam of like charged ions and at least a second portion of like charged ions so aligned forming at least a second beam of like charged ions, wherein the at least first and second electrode assemblies are contained within a beam transport assembly, the beam transport assembly including the at least first and second electrode assemblies configured to inject the at least first beam and the at least second beam into a beam conduit assembly contained within the beam transport assembly, the at least first beam becoming a combined first beam and the at least second beam becoming a combined second beam within the beam conduit assembly. The beam conduit assembly may further include a first beam conduit sub-assembly and at least a second beam conduit sub-assembly, wherein the first beam conduit sub-assembly and the at least second beam conduit sub-assembly sequentially interface each other to form a first common beam conduit configured to transport the combined first beam and a second common beam conduit configured to transport the combined second beam.

In one embodiment, the one or more electrode assemblies are configured to enable a first portion of like charged ions to convert potential energy of the first portion of like charged ions to kinetic energy based on interaction with the Coulomb forces of a second portion of like charged ions, wherein the one or more electrode assemblies include (a) at least one of at least one electrode surface configured to retain at least one of at least a portion of the first portion of like charged ions and at least one at least partially enclosed volume configured to retain at least a portion of the first portion of like charged ions, and (b) at least one of at least one electrode surface configured to retain at least one of at least a portion of the second portion of like charged ions and at least one at least partially enclosed volume configured to retain at least a portion of the second portion of like charged ions, the at least one of the at least one electrode surface configured to retain and the at least one at least partially enclosed volume configured to retain the at least a portion of one of the first and second portions of like charged ions enabling an electric field voltage source emitting an electric field therefrom. The electric field voltage source enabling an electric field to be emitted from the at least one electrode surface and the at least one partially enclosed volume may be enabled by the at least a portion of one of the first and second portions of like charged ions being a passive voltage source comprising at least one of a portion of solute ions and a portion of static charged ions. The electric field voltage source enabling an electric field to be emitted from the at least one electrode surface and the at least one partially enclosed volume may be enabled by an active voltage source.

In one embodiment, at least one of the at least one electrode surface and the at least one at least partially enclosed volume configured to retain the at least a portion of one of the first and second portions of like charged ions enabling an electric field voltage source emitting an electric field therefrom forms at least a portion of at least one mobile assembly, the at least one mobile assembly is configured to move in at least one of at least one direction of rotation and at least one direction of translation within a motive apparatus, wherein the motive apparatus is configured, via the at least one of the electric field voltage sources forming at least a portion of the at least one mobile assembly, to enable the at least a portion of the first portion of like charged ions to convert potential energy of the at least a portion of the first portion of like charged ions to kinetic energy based on interaction with the Coulomb forces of the at least a portion of the second portion of like charged ions, In one embodiment, the one or more electrode assemblies are further include at least one mobile member configured wherein motion of the at least one mobile member selectively confines and exposes at least one of the at least a portion of the first portion of like charged ions and the at least a portion of the second portion of like charged ions. and may be one of an electrically conductive material and an electrically insulating material, wherein motion of the at least one mobile member being an electrically insulating material selectively confines, shields and exposes at least a portion of the electric field emitted from the electric field voltage source formed by the at least one electrode surface and the at least one at least partially enclosed volume retaining the at least a portion of one of the first and second portions of like charged ions.

In one embodiment, the one or more electrode assemblies are configured to define at least one axis of rotation therein, and at least one of at least one electric field voltage source formed by the at least one electrode surface and the at least one at least partially enclosed volume retaining the at least a portion of one of the first and second portions of like charged ions is rotatable around the at least one axis of rotation defined therein to enable a change in at least one of direction, position and orientation of the emitted electric field.

At least one of the first portion of like charged ions and the second portion of like charged ions may be negative solute ions or positive solute ions. The at least one electrode surface configured to retain the at least a portion of one of the first and second portions of like charged ions may be made from an insulating material capable of retaining static charged ions.

In one embodiment, the the one or more electrode assemblies further include a first member rotatable around an axis of rotation, the first member including the at least one of at least one electrode surface configured to retain at least one of at least a portion of the first portion of like charged ions and at least one at least partially enclosed volume configured to retain at least a portion of the first portion of like charged ions, and a second member including the at least one of at least one electrode surface configured to retain at least one of at least a portion of the second portion of like charged ions and at least one at least partially enclosed volume configured to retain at least a portion of the second portion of like charged ions, wherein the first member and the second member are configured to effect rotation of the first member around the axis of rotation via the at least a portion of the first portion of like charged ions converting potential energy of the at least a portion of the first portion of like charged ions to kinetic energy based on interaction with the Coulomb forces of the at least a portion of the second portion of like charged ions.

In one embodiment, the electric field voltage source enabling an electric field to be emitted from the at least one electrode surface and the at least one partially enclosed volume is enabled by the at least a portion of one of the first and second portions of like charged ions being a passive voltage source including at least one of a portion of solute ions and a portion of static charged ions.

In one embodiment, the second member is rotatable around an axis of rotation and the axis of rotation of the first member is parallel to or skewed with respect to the axis of rotation of the second member.

In one embodiment, the one or more electrode assemblies are configured to enable at least a portion of like charged ions to convert potential energy of the at least a portion of like charged ions into kinetic energy based on the Coulomb forces therebetween via linear alignment thereof, and include at least one of at least one electrode surface configured to retain at least one of at least a portion of like charged ions and at least one at least partially enclosed volume configured to retain at least a portion of like charged ions, wherein at least one of the at least one electrode surface and the at least one partially enclosed volume enabling an electric field voltage source emitting an electric field therefrom, the electric field voltage source is an active voltage source and/or a passive voltage source.

In one embodiment, the one or more electrode assemblies further include at least one movable member having an interior space, the movable member having an outer surface and an inner surface forming the interior space, the at least one movable member including at least one electrically conductive segment extending from the inner surface forming the interior space to the outer surface of the at least one movable member. At least one of the at least one electrode surface retaining at least of portion of like charged ions and the at least one at least partially enclosed volume retaining the at least a portion of like charged ions may be disposed within the interior space of the at least one movable member. The at least one electrically conductive segment may have an inner surface at least partially forming the interior space of the at least one movable member and an outer surface at least partially forming the outer surface of the at least one movable member, and the at least one movable member may be configured and arranged wherein the at least one electrically conductive segment can be aligned alternately over the at least one of the at least one electrode surface and the at least one at least partially enclosed volume retaining the at least a portion of like charged ions to enable selectively an electric field emitted via a first electric field voltage source and an electric field emitted via a second electric field voltage source to pass through the inner surface of the at least one electrically conductive segment and to emerge at the outer surface of the at least one electrically conductive segment.

In one embodiment, the at least one electrically conductive segment includes at least first and second electrically conductive segments, and the one or more electrode assemblies further include at least one mobile member configured wherein motion of the at least one mobile member selectively confines and exposes at least a portion of the electric field emerging at the outer surface of the at least first and second electrically conductive segments.

In one embodiment, the one or more electrode assemblies further include a first apparatus configured to form at least one electric field voltage source via at least one of at least one electrode surface configured to retain at least a portion of like charged ions and at least one at least partially enclosed volume configured to retain a portion of like charged ions, a second apparatus configured to form at least one electric field voltage source via at least one of at least one electrode surface configured to retain at least a portion of like charged ions and at least one at least partially enclosed volume configured to retain at least a portion of like charged ions, a first combination apparatus configured to form at least first and second electric field voltage sources disposed within the interior space of the first movable member of the at least one movable member, a second combination apparatus configured to form at least first and second electric field voltage sources disposed within the interior space of a second movable member of the at least one movable member, wherein the at least one movable member of the first combination apparatus and the at least one movable member of the second combination apparatus are configured wherein at least one electrically conductive segment of the first combination apparatus and the at least one electrically conductive segment of the second combination apparatus are configured to interface to attract ions via an electric field of the first electric field voltage source of the first combination apparatus attracting ions to the at least one electrically conductive segment of the first combination apparatus and via an electric field of the first electric field voltage source of the second combination apparatus attracting ions to the at least one electrically conductive segment of the second combination apparatus. In one embodiment, the one or more electrode assemblies may further include a housing having at least one of at least one electrode surface configured to retain at least a portion of like charged ions and at least one at least partially enclosed volume configured to retain at least a portion of like charged ions, the at least one electrode surface and the at least partially enclosed volume enabling an electric field voltage emitting an electric field therefrom, wherein the at least one movable member of the first combination apparatus is configured to move to interface the at least one electrically conductive member of the at least one movable member of the first combination apparatus with the at least one of at least one electrode surface configured to retain at least a portion of like charged ions and at least one at least partially enclosed volume configured to retain at least a portion of like charged ions of the housing. The housing may have at least one of a first electrode surface configured to retain at least a portion of like charged ions and a first at least partially enclosed volume configured to retain at least a portion of like charged ions, at least one of the first electrode surface and the first at least partially enclosed volume enabling an electric field voltage emitting an electric field therefrom, and at least one of a second electrode surface configured to retain at least a portion of like charged ions and a second at least partially enclosed volume configured to retain at least a portion of like charged ions, at least one of the second electrode surface and the second at least partially enclosed volume enabling an electric field voltage emitting an electric field therefrom, wherein the at least one movable member of the first combination apparatus is configured to move to interface the at least one electrically conductive member of the at least one movable member of the first combination apparatus with the at least one of the first electrode surface configured to retain at least a portion of like charged ions and the first at least partially enclosed volume configured to retain at least a portion of like charged ions, and wherein the at least one movable member of the second combination apparatus is configured to move to interface the at least one electrically conductive member of the at least one movable member of the second combination apparatus with the at least one of the second electrode surface configured to retain at least a portion of like charged ions and the second at least partially enclosed volume configured to retain at least a portion of like charged ions. The at least one electrically conductive segment of the at least one movable member of the first combination apparatus having the at least a portion of like charged ions attracted thereto may be disposed over the second electric field voltage source of the first combination apparatus, and the at least one electrically conductive segment of the at least one movable member of the first combination apparatus having the at least a portion of like charged ions attracted thereto may be substantially aligned with the at least one of a first electrode surface configured to retain at least a portion of like charged ions and a first at least partially enclosed volume configured to retain at least a portion of like charged ions to establish an at least partially transverse electric field to convert the potential energy of the at least a portion of like charged ions to kinetic energy based on the Coulomb forces therebetween via linear alignment thereof.

Additionally, the at least one electrically conductive segment of the at least one movable member of the second combination apparatus having the at least a portion of like charged ions attracted thereto may be disposed over the second electric field voltage source of the second combination apparatus, and the at least one electrically conductive segment of the at least one movable member of the second combination apparatus having the at least a portion of like charged ions attracted thereto may be substantially aligned with the at least one of a second electrode surface configured to retain at least a portion of like charged ions and a second at least partially enclosed volume configured to retain at least a portion of like charged ions to establish an at least partially transverse electric field to convert the potential energy of the at least a portion of like charged ions to kinetic energy based on the Coulomb forces therebetween via linear alignment thereof.

In one embodiment, the one or more electrode assemblies are configured to enable a first portion of like charged ions to convert potential energy of a second portion of like charged ions to kinetic energy based on interaction with the Coulomb forces of the first portion of like charged ions, wherein the one or more electrode assemblies include at least one of at least one electrode surface configured to retain at least one of at least a portion of the first portion of like charged ions and at least one at least partially enclosed volume configured to retain at least a portion of the first portion of like charged ions, the first portion of like charged ions retained by the at least one of the at least one electrode surface and the at least one partially enclosed volume enabling an electric field voltage source emitting an electric field therefrom, wherein the at least one of the at least one electrode surface and the at least one at least partially enclosed volume is disposed in communication with a space having at least one surface defined by the at least one of the at least one electrode surface and the at least one at least partially enclosed volume, and wherein the electric field emitted from the first portion of like charged ions interacts with at least a portion of the second portion of like charged ions within the space to convert potential energy of the at least a portion of the second portion of like charged ions into kinetic energy based on the interaction of the Coulomb forces between the first portion of like charged ions and the at least a portion of the second portion of like charged ions within the space. The electric field emitted via the first portion of like charged ions from the at least one of the at least one electrode surface and the at least one at least partially enclosed volume may be formed at least partially transversely with respect to the at least one surface defined by the at least one electrode surface and the at least one at least partially enclosed volume to interact with the at least a portion of the second portion of like charged ions within the space to convert potential energy of the at least a portion of the second portion of like charged ions into kinetic energy based on the Coulomb forces therebetween. In one embodiment, the at least one of the at least one electrode surface and the at least one at least partially enclosed volume include at least one of (a) first and second electrode surfaces, the electric field emitted from the first electrode surface having one polarity and the electric field emitted from the second electrode surface having an opposite polarity, and (b) first and second at least partially enclosed volumes, the electric field emitted from the first at least partially enclosed volume having one polarity and the electric field emitted from the second at least partially enclosed volume having an opposite polarity, wherein the one or more electrode assemblies further include a dielectric material disposed within the space to form a first sub-space and a second sub-space, the first sub-space having a first surface defined by at least one of the first electrode and the first at least partially enclosed volume, and the second sub-space having a second surface defined by at least one of the second electrode and the second at least partially enclosed volume, wherein the dielectric material at least partially electrically separates the first sub-space from the second sub-space to at least partially separate the at least one of the electric field having one polarity from the electric field having an opposite polarity.

In one embodiment, the at least one of the at least one electrode surface and the at least one at least partially enclosed volume include at least one of (a) first and second electrode surfaces, wherein the electric field emitted from the first electrode surface having one polarity and the electric field emitted from the second electrode surface having an opposite polarity to form an at least partially transverse electric field between the first and second electrode surfaces in one of a first direction and a second direction, and (b) first and second at least partially enclosed volumes, the electric field emitted from the first at least partially enclosed volume having one polarity and the electric field emitted from the second at least partially enclosed volume having an opposite polarity to form an at least partially transverse electric field between the first and second at least partially enclosed volumes in one of a first direction and a second direction, wherein the at least one electrode assembly further comprises a dielectric material disposed within the space to form a first sub-space and a second sub-space, the first sub-space having a first surface defined by at least one of the first electrode and the first at least partially enclosed volume, and the second sub-space having a second surface defined by at least one of the second electrode and the second at least partially enclosed volume, the dielectric material at least partially electrically separating the first sub-space from the second sub-space to at least partially separate the at least partially transverse electric field in a first direction from the at least partially transverse electric field in a second direction.

In one embodiment, the least one electrode is configured wherein the at least a portion of the first portion of like charged ions retained by the at least one of at least one electrode surface configured to retain at least one of at least a portion of the first portion of like charged ions and at least one at least partially enclosed volume configured to retain at least a portion of the first portion of like charged ions interacts with the at least a portion of the second portion of like charged ions retained by the at least one of at least one electrode surface configured to retain at least one of at least a portion of the second portion of like charged ions and at least one at least partially enclosed volume configured to retain at least a portion of the second portion of like charged ions to cause motion of the at least one of at least one electrode surface configured to retain at least one of at least a portion of the first portion of like charged ions and at least one at least partially enclosed volume configured to retain at least a portion of the first portion of like charged ions with respect to the at least one of at least one electrode surface configured to retain at least one of at least a portion of the second portion of like charged ions and at least one at least partially enclosed volume configured to retain at least a portion of the second portion of like charged ions.

In one embodiment, the at least one electrode assembly is configured such that the kinetic energy is converted to one of (a) chemical energy; (b) electrical energy; (c) electromagnetic energy; (d) thermal energy; (e) mechanical energy; and (f) nuclear energy. The at least one electrode assembly may be configured wherein the potential energy of at least one portion of the at least a portion of like charged ions is converted into kinetic energy via collision with at least another portion of the at least a portion of like charged ions. The one portion of like charged ions may be of the same charge as the another portion of like charged ions. Alternatively, the one portion of like charged ions are of opposite charge to the another portion of like charged ions. In one embodiment, the at least a portion of like charged ions are solute ions of a solution, wherein the solution is a first solution, and the at least one electrode assembly is configured such that at least a portion of the first solution can be displaced with a second solution having a concentration of solute ions which differs from the concentration of solute ions of the first solution. In addition, the at least one electrode assembly may be configured such that the at least a portion of the first solution can be displaced with a second solution having a species of solute ions differing from the species of solute ions of the first solution.

It can be appreciated that the foregoing embodiments of the present disclosure provide examples of a method of converting potential energy of like charged ions to kinetic energy that includes the step of at least one of enabling at least a portion of like charged ions to convert potential energy of the at least a portion of like charged ions into kinetic energy based on the Coulomb forces therebetween via linear alignment thereof, enabling a first portion of like charged ions to convert potential energy of the first portion of like charged ions to kinetic energy based on interaction with the Coulomb forces of a second portion of like charged ions, and enabling a first portion of like charged ions to convert potential energy of a second portion of like charged ions to kinetic energy based on interaction with the Coulomb forces of the first portion of like charged ions. The method may further include the step of providing at least one electrode assembly configured to at least one of enable at least a portion of like charged ions to convert potential energy of the at least a portion of like charged ions into kinetic energy based on the Coulomb forces therebetween via linear alignment thereof, enable a first portion of like charged ions to convert potential energy of the first portion of like charged ions to kinetic energy based on interaction with the Coulomb forces of a second portion of like charged ions, and enable a first portion of like charged ions to convert potential energy of a second portion of like charged ions to kinetic energy based on interaction with the Coulomb forces of the first portion of like charged ions.

In one embodiment, the at least one electrode assembly is configured to enable at least a portion of like charged ions to convert potential energy of the portion of like charged ions into kinetic energy based on the Coulomb forces therebetween via linear alignment thereof, and wherein the at least one electrode assembly includes at least a first electrode surface and a second electrode surface configured such that at least one electric field can be established at least partially transversely between the at least a first electrode surface and the second electrode surface, the method further includes the steps of: attracting at least a portion of like charged ions to at least the first electrode surface; and establishing at least one electric field at least partially transversely between the at least a first electrode surface and the second electrode surface to substantially linearly align the at least a portion of like charged ions to convert the potential energy of the at least a portion of like charged ions to kinetic energy. The at least a first electrode surface and a second electrode surface may be movable with respect to the other one.

The method may be performed wherein the at least one electrode assembly is configured to enable at least a portion of like charged ions to convert potential energy of the portion of like charged ions into kinetic energy based on the Coulomb forces therebetween via linear alignment thereof, and wherein the at least one electrode assembly comprises at least first, second, third and fourth electrode surfaces, the method further including the steps of: during a charge accumulation mode of operation, establishing an electric field between the first and second electrode surfaces to attract positive ions to the first electrode surface and negative ions to the second electrode surface; establishing an electric field between the third and fourth electrode surfaces to attract positive ions to the third electrode surface and negative ions to the fourth electrode surface; following the charge accumulation mode of operation, moving the first and third electrode surfaces via at least one of translation and rotation into interfacing relationship therebetween; and moving the second and fourth electrode surfaces via at least one of translation and rotation into interfacing relationship therebetween. The method may further be performed wherein, following the charge accumulation mode of operation, to effect the at least a portion of like charged ions enabled to convert potential energy of the at least a portion of like charged ions into kinetic energy based on the Coulomb forces therebetween via linear alignment thereof, the method further includes the steps of establishing at least one electric field at least partially transversely with respect to the first and third electrode surfaces in interfacing relationship therebetween, and establishing at least one electric field at least partially transversely with respect to the second and fourth electrode surfaces in interfacing relationship therebetween.

In one embodiment, the method may be further performed wherein the at least one electrode assembly further includes at least one movable partition assembly having at least a first surface movable to a position interfacing with the at least a first electrode surface, the method further including the steps of: moving the at least a first surface of the movable partition assembly to interface with the at least a first electrode surface; and establishing at least a second electric field at least partially transversely from the first surface of the at least one partition assembly to substantially linearly align the at least a portion of the like charged ions to convert the potential energy of the at least a portion of like charged ions to kinetic energy. The method may be further performed wherein the at least one electrode assembly may further include a movable electrical insulating layer movable to be disposed over the at least one movable partition assembly and over at least the first electrode surface, the method further including the step of: selectively shielding and exposing the at least one movable partition assembly and at least the first electrode surface via movement of the movable electrical insulating layer.

In one embodiment, the method may be performed wherein the at least one electrode assembly is configured to enable at least a portion of like charged ions to convert potential energy of the at least a portion of like charged ions into kinetic energy based on the Coulomb forces therebetween via linear alignment thereof, and wherein the at least one electrode assembly includes at least a pair of first and second electrode surfaces, the method further including the steps of: establishing a first electric field between the first and second electrode surfaces; attracting negatively charged ions towards the first electrode surface; attracting positively charged ions towards the second electrode surface, and establishing at least one electric field substantially aligning the at least a first portion of the like charged ions by reversing polarity of the first electric field to cause the negatively charged ions attracted towards the first electrode surface to be substantially aligned and to accelerate towards the second electrode surface and to cause the positively charged ions attracted towards the second electrode surface to be substantially aligned and to accelerate towards the first electrode surface.

In one embodiment, the method may be performed wherein the at least one electrode assembly is configured to enable at least a portion of like charged ions to convert potential energy of the portion of like charged ions into kinetic energy based on the Coulomb forces therebetween via linear alignment thereof, and wherein the at least one electrode assembly comprises at least one pair of electrode surfaces, the method further including the steps of: attracting the at least a portion of like charged ions to the at least one pair of electrode surfaces by establishing an electric field therebetween, and establishing at least one electric field at least partially transversely with respect to the at least one pair of electrode surfaces to substantially align the at least a portion of like charged ions while one of (a) terminating the electric field established across the at least one pair of electrode surfaces, and (b) reversing direction of the electric field established across the at least one pair of electrode surfaces.

In one embodiment, the method may be performed wherein the at least one electrode assembly is configured to enable at least a portion of like charged ions to convert potential energy of the at least a portion of like charged ions into kinetic energy based on the Coulomb forces therebetween via linear alignment thereof, and wherein the at least one electrode assembly comprises at least first and second electrode assemblies contained within a beam conduit assembly, the method further includes the steps of: disposing in interfacing relationship the at least first and second electrode assemblies in a series sequential configuration and wherein the at least a portion of like charged ions so aligned comprises a first portion of like charged ions forming a first beam of like charged ions and a second portion of like charged ions so aligned forming a second beam of like charged ions, ejecting the first and second beams from the at least first electrode assembly, and injecting the first and second beams into the second electrode assembly in the series, the at least first electrode assembly and the second electrode assembly in series forming thereby the beam conduit assembly.

In one embodiment, the method may be performed wherein the at least one electrode assembly is configured to enable at least a portion of like charged ions to convert potential energy of the at least a portion of like charged ions into kinetic energy based on the Coulomb forces therebetween via linear alignment thereof, wherein the at least one electrode assembly includes at least first and second electrode assemblies, wherein the at least a portion of like charged ions so aligned includes a first portion of like charged ions forming at least a first beam of like charged ions and at least a second portion of like charged ions so aligned forming at least a second beam of like charged ions, wherein the at least first and second electrode assemblies are contained within a beam transport assembly, the beam transport assembly including the at least first and second electrode assemblies, the method further including the step of: injecting the at least first beam and the at least second beam into a beam conduit assembly contained within the beam transport assembly, the at least first beam becoming a combined first beam and the at least second beam becoming a combined second beam within the beam conduit assembly.

In one embodiment, the method may be performed wherein the beam conduit assembly further includes a first beam conduit sub-assembly and at least a second beam conduit sub-assembly, and wherein the first beam conduit sub-assembly and the at least second beam conduit sub-assembly sequentially interface each other to form a first common beam conduit configured to transport the combined first beam and a second common beam conduit configured to transport the combined second beam.

In one embodiment, the method may be performed wherein the at least one electrode assembly is configured to enable a first portion of like charged ions to convert potential energy of the first portion of like charged ions to kinetic energy based on interaction with the Coulomb forces of a second portion of like charged ions, wherein the at least one electrode assembly includes: (a) at least one of at least one electrode surface configured to retain at least one of at least a portion of the first portion of like charged ions and at least one at least partially enclosed volume configured to retain at least a portion of the first portion of like charged ions, and (b) at least one of at least one electrode surface configured to retain at least one of at least a portion of the second portion of like charged ions and at least one at least partially enclosed volume configured to retain at least a portion of the second portion of like charged ions, the method further including the step of: enabling an electric field voltage source emitting an electric field from the at least one of the at least one electrode surface configured to retain and the at least one at least partially enclosed volume configured to retain the at least a portion of one of the first and second portions of like charged ions. The method may be implemented wherein the step of enabling an electric field voltage source emitting an electric field is performed by providing a passive voltage source including at least one of a portion of solute ions and a portion of static charged ions. The method may be performed wherein the step of enabling an electric field voltage source emitting an electric field is performed by activating an active voltage source. In one embodiment, the method may further include the steps of: providing at least a portion of at least one mobile assembly within a motive apparatus, the at least a portion of the at least one mobile assembly formed by at least one of the at least one electrode surface and the at least one at least partially enclosed volume configured to retain the at least a portion of one of the first and second portions of like charged ions enabling an electric field voltage source emitting an electric field therefrom, and moving the at least one mobile assembly in at least one of at least one direction of rotation and at least one direction of translation within the motive apparatus via the at least one of the electric field voltage sources forming at least a portion of the at least one mobile assembly, to enable the at least a portion of the first portion of like charged ions to convert potential energy of the at least a portion of the first portion of like charged ions to kinetic energy based on interaction with the Coulomb forces of the at least a portion of the second portion of like charged ions. In one embodiment, the method may be performed wherein the at least one electrode assembly further includes at least one mobile member configured wherein motion of the at least one mobile member selectively confines and exposes at least one of the at least a portion of the first portion of like charged ions and the at least a portion of the second portion of like charged ions. In one embodiment, the method may be performed wherein the at least one mobile member that selectively confines and exposes at least one of the at least a portion of the first portion of like charged ions and the at least a portion of the second portion of like charged ions is one of an electrically conductive material and an electrically insulating material, wherein motion of the at least one mobile member being an electrically insulating material selectively confines, shields and exposes at least a portion of the electric field emitted from the electric field voltage source formed by the at least one electrode surface and the at least one at least partially enclosed volume retaining the at least a portion of one of the first and second portions of like charged ions. In one embodiment, the method may be performed wherein the at least one electrode assembly is configured to define at least one axis of rotation therein, and wherein at least one of the at least one electric field voltage source formed by the at least one electrode surface and the at least one at least partially enclosed volume retaining the at least a portion of one of the first and second portions of like charged ions is rotatable around the at least one axis of rotation defined therein, the method further including the step of rotating at least one of the at least one electric field voltage source and the at least one partially enclosed volume around the at least one axis of rotation to enable a change in at least one of direction, position and orientation of the emitted electric field. In one embodiment, the method may be performed wherein at least one of the first portion of like charged ions and the second portion of like charged ions are one of negative solute ions and positive solute ions. In one embodiment, the method may be performed wherein the at least one electrode surface configured to retain the at least a portion of one of the first and second portions of like charged ions is made from an insulating material retaining static charged ions. In one embodiment, the method may be performed wherein the at least one electrode assembly further includes a first member rotatable around an axis of rotation, the first member including the at least one of at least one electrode surface configured to retain at least one of at least a portion of the first portion of like charged ions and at least one at least partially enclosed volume configured to retain at least a portion of the first portion of like charged ions, and a second member including the at least one of at least one electrode surface configured to retain at least one of at least a portion of the second portion of like charged ions and at least one at least partially enclosed volume configured to retain at least a portion of the second portion of like charged ions, the method further including the step of effecting rotation of the first member around the axis of rotation via the at least a portion of the first portion of like charged ions converting potential energy of the at least a portion of the first portion of like charged ions to kinetic energy based on interaction with the Coulomb forces of the at least a portion of the second portion of like charged ions.

In one embodiment, the method may be performed wherein the electric field voltage source enabling an electric field to be emitted from the at least one electrode surface and the at least one partially enclosed volume is enabled by the at least a portion of one of the first and second portions of like charged ions being a passive voltage source including at least one of a portion of solute ions and a portion of static charged ions. The method may be also performed wherein the electric field voltage source enabling an electric field to be emitted from the at least one electrode surface and the at least one partially enclosed volume is enabled by an active voltage source.

In one embodiment, the method may be performed wherein the second member is rotatable around an axis of rotation, the method further including the step of effecting rotation of the second member around the axis of rotation of the second member via the at least a portion of the second portion of like charged ions converting potential energy of the at least a portion of the second portion of like charged ions to kinetic energy based on interaction with the Coulomb forces of the at least a portion of the first portion of like charged ions. The method may be performed wherein the axis of rotation of the first member is one of parallel to and skewed with respect to the axis of rotation of the second member.

In one embodiment, the method may be performed wherein the at least one electrode assembly is configured to enable at least a portion of like charged ions to convert potential energy of the at least a portion of like charged ions into kinetic energy based on the Coulomb forces therebetween via linear alignment thereof, and wherein the at least one electrode assembly includes at least one of at least one electrode surface configured to retain at least one of at least a portion of like charged ions and at least one at least partially enclosed volume configured to retain at least a portion of like charged ions, the method further including the step of enabling an electric field voltage source emitting an electric field from at least one of the at least one electrode surface and the at least one partially enclosed volume. In one embodiment, the method may be performed wherein the electric field voltage source enabling an electric field to be emitted from the at least one electrode surface and the at least one partially enclosed volume is at least one of an active voltage source and a passive voltage source. The method may be performed wherein the passive voltage source is at least one of a portion of solute ions and a portion of static charged ions. The method may be performed wherein the at least one electrode assembly further includes at least one mobile member configured wherein motion of the at least one mobile member selectively confines and exposes the at least a portion of like charged ions, the method further including the step of selectively confining and exposing the at least a portion of like charged ions via the at least one mobile member.

In one embodiment, the method may be performed wherein the at least one electrode assembly includes at least one movable member having an interior space, the movable member having an outer surface and an inner surface forming the interior space, the at least one movable member including at least one electrically conductive segment extending from the inner surface forming the interior space to the outer surface of the at least one movable member. In one embodiment, the method may be performed wherein at least one of the at least one electrode surface retaining at least of portion of like charged ions and the at least one at least partially enclosed volume retaining the at least a portion of like charged ions is disposed within the interior space of the at least one movable member. The method may be performed wherein the at least one electrically conductive segment has an inner surface at least partially forming the interior space of the at least one movable member and an outer surface at least partially forming the outer surface of the at least one movable member, and wherein the at least one movable member is configured and arranged wherein the at least one electrically conductive segment can be aligned alternately over the at least one of the at least one electrode surface and the at least one at least partially enclosed volume retaining the at least a portion of like charged ions to enable selectively an electric field emitted via a first electric field voltage source and an electric field emitted via a second electric field voltage source to pass through the inner surface of the at least one electrically conductive segment and to emerge at the outer surface of the at least one electrically conductive segment, the method further including the step of selectively enabling an electric field emitted via a first electric field voltage source and an electric field emitted via a second electric field voltage source to pass through the inner surface of the at least one electrically conductive segment and to emerge at the outer surface of the at least one electrically conductive segment. In one embodiment, the method may be performed wherein the at least one electrically conductive segment includes at least first and second electrically conductive segments, and wherein the at least one electrode assembly further includes at least one mobile member configured wherein motion of the at least one mobile member selectively confines and exposes at least a portion of the electric field emerging at the outer surface of the at least first and second electrically conductive segments. In one embodiment, the method may be performed wherein the at least one electrode assembly further includes a first apparatus configured to form at least one electric field voltage source via at least one of at least one electrode surface configured to retain at least a portion of like charged ions and at least one at least partially enclosed volume configured to retain a portion of like charged ions, a second apparatus configured to form at least one electric field voltage source via at least one of at least one electrode surface configured to retain at least a portion of like charged ions and at least one at least partially enclosed volume configured to retain at least a portion of like charged ions, a first combination apparatus configured to form at least first and second electric field voltage sources disposed within the interior space of the first movable member of the at least one movable member, and a second combination apparatus configured to form at least first and second electric field voltage sources disposed within the interior space of a second movable member of the at least one movable member, wherein the at least one movable member of the first combination apparatus and the at least one movable member of the second combination apparatus are configured wherein at least one electrically conductive segment of the first combination apparatus and the at least one electrically conductive segment of the second combination apparatus are configured to interface to attract ions via an electric field of the first electric field voltage source of the first combination apparatus attracting ions to the at least one electrically conductive segment of the first combination apparatus and via an electric field of the first electric field voltage source of the second combination apparatus attracting ions to the at least one electrically conductive segment of the second combination apparatus, the method further including the steps of attracting ions to the at least one electrically conductive segment of the first combination apparatus, and attracting ions to the at least one electrically conductive segment of the second combination apparatus. In one embodiment, the method may be performed by further including the steps of providing a housing having at least one of at least one electrode surface configured to retain at least a portion of like charged ions and at least one at least partially enclosed volume configured to retain at least a portion of like charged ions, the at least one electrode surface and the at least partially enclosed volume enabling an electric field voltage emitting an electric field therefrom, wherein the at least one movable member of the first combination apparatus is configured to move to interface the at least one electrically conductive member of the at least one movable member of the first combination apparatus with the at least one of at least one electrode surface configured to retain at least a portion of like charged ions and at least one at least partially enclosed volume configured to retain at least a portion of like charged ions of the housing. In one embodiment, the method may be performed wherein the housing has at least one of a first electrode surface configured to retain at least a portion of like charged ions and a first at least partially enclosed volume configured to retain at least a portion of like charged ions, at least one of the first electrode surface and the first at least partially enclosed volume enabling an electric field voltage emitting an electric field therefrom, and at least one of a second electrode surface configured to retain at least a portion of like charged ions and a second at least partially enclosed volume configured to retain at least a portion of like charged ions, at least one of the second electrode surface and the second at least partially enclosed volume enabling an electric field voltage emitting an electric field therefrom, wherein the at least one movable member of the first combination apparatus is configured to move to interface the at least one electrically conductive member of the at least one movable member of the first combination apparatus with the at least one of the first electrode surface configured to retain at least a portion of like charged ions and the first at least partially enclosed volume configured to retain at least a portion of like charged ions, and wherein the at least one movable member of the second combination apparatus is configured to move to interface the at least one electrically conductive member of the at least one movable member of the second combination apparatus with the at least one of the second electrode surface configured to retain at least a portion of like charged ions and the second at least partially enclosed volume configured to retain at least a portion of like charged ions. In one embodiment, the method may be performed by further including the steps of disposing the at least one electrically conductive segment of the at least one movable member of the first combination apparatus having the at least a portion of like charged ions attracted thereto over the second electric field voltage source of the first combination apparatus, and substantially aligning the at least one electrically conductive segment of the at least one movable member of the first combination apparatus having the at least a portion of like charged ions attracted thereto with the at least one of a first electrode surface configured to retain at least a portion of like charged ions and a first at least partially enclosed volume configured to retain at least a portion of like charged ions to establish an at least partially transverse electric field to convert the potential energy of the at least a portion of like charged ions to kinetic energy based on the Coulomb forces therebetween via linear alignment thereof. The method may further include the steps of disposing the at least one electrically conductive segment of the at least one movable member of the second combination apparatus having the at least a portion of like charged ions attracted thereto over the second electric field voltage source of the second combination apparatus, and substantially aligning the at least one electrically conductive segment of the at least one movable member of the second combination apparatus having the at least a portion of like charged ions attracted thereto with the at least one of a second electrode surface configured to retain at least a portion of like charged ions and a second at least partially enclosed volume configured to retain at least a portion of like charged ions to establish an at least partially transverse electric field to convert the potential energy of the at least a portion of like charged ions to kinetic energy based on the Coulomb forces therebetween via linear alignment thereof In one embodiment, the method may be performed wherein the at least one electrode assembly is configured to enable a first portion of like charged ions to convert potential energy of a second portion of like charged ions to kinetic energy based on interaction with the Coulomb forces of the first portion of like charged ions, and wherein the at least one electrode assembly includes at least one of at least one electrode surface configured to retain at least one of at least a portion of the first portion of like charged ions and at least one at least partially enclosed volume configured to retain at least a portion of the first portion of like charged ions, the at least a portion of the first portion of like charged ions retained by the at least one of the at least one electrode surface and the at least one partially enclosed volume enabling an electric field voltage source emitting an electric field therefrom, the method further including the steps of disposing the at least one of the at least one electrode surface and the at least one at least partially enclosed volume in communication with a space having at least one surface defined by the at least one of the at least one electrode surface and the at least one at least partially enclosed volume, and causing interaction of the electric field emitted from the at least a portion of the first portion of like charged ions with at least a portion of the second portion of like charged ions within the space to convert potential energy of the at least a portion of the second portion of like charged ions into kinetic energy based on the Coulomb forces between the at least a portion of the first portion of like charged ions and the at least a portion of the second portion of like charged ions within the space. The method may further include the step of causing the electric field emitted via the at least a portion of the first portion of like charged ions from the at least one of the at least one electrode surface and the at least one at least partially enclosed volume to form at least partially transversely with respect to the at least one surface defined by the at least one electrode surface and the at least one at least partially enclosed volume to interact with the at least a portion of the second portion of like charged ions within the space to convert potential energy of the at least a portion of the second portion of like charged ions into kinetic energy based on the Coulomb forces therebetween. In one embodiment, the method may be performed wherein the at least one of the at least one electrode surface and the at least one at least partially enclosed volume include at least one of: (a) first and second electrode surfaces, the electric field emitted from the first electrode surface having one polarity and the electric field emitted from the second electrode surface having an opposite polarity to form an at least partially transverse electric field between the first and second electrode surfaces in one of a first direction and a second direction, and (b) first and second at least partially enclosed volumes, the electric field emitted from the first at least partially enclosed volume having one polarity and the electric field emitted from the second at least partially enclosed volume having an opposite polarity to form an at least partially transverse electric field between the first and second at least partially enclosed volumes in one of a first direction and a second direction, wherein the at least one electrode assembly further includes a dielectric material disposed within the space to form a first sub-space and a second sub-space, the first sub-space having a first surface defined by at least one of the first electrode and the first at least partially enclosed volume, and the second sub-space having a second surface defined by at least one of the second electrode and the second at least partially enclosed volume, the dielectric material at least partially electrically separating the first sub-space from the second sub-space to at least partially separate the at least partially transverse electric field in a first direction from the at least partially transverse electric field in a second direction.

In one embodiment, the method may be performed wherein the at least a portion of the first portion of like charged ions retained by the at least one of at least one electrode surface configured to retain at least one of at least a portion of the first portion of like charged ions and at least one at least partially enclosed volume configured to retain at least a portion of the first portion of like charged ions interacts with the at least a portion of the second portion of like charged ions retained by the at least one of at least one electrode surface configured to retain at least one of at least a portion of the second portion of like charged ions and at least one at least partially enclosed volume configured to retain at least a portion of the second portion of like charged ions to cause motion of the at least one of at least one electrode surface configured to retain at least one of at least a portion of the first portion of like charged ions and at least one at least partially enclosed volume configured to retain at least a portion of the first portion of like charged ions with respect to the at least one of at least one electrode surface configured to retain at least one of at least a portion of the second portion of like charged ions and at least one at least partially enclosed volume configured to retain at least a portion of the second portion of like charged ions.

In one embodiment, the method may be performed wherein the at least one electrode assembly is configured such that the kinetic energy is converted to one of (a) chemical energy; (b) electrical energy; (c) electromagnetic energy; (d) thermal energy; (e) mechanical energy; and (f) nuclear energy. The method may further include the step of configuring the at least one electrode assembly wherein the potential energy of at least one portion of the at least a portion of like charged ions is converted into kinetic energy via collision with at least another portion of the at least a portion of like charged ions. In one embodiment, the method may be performed wherein the one portion of like charged ions are of the same charge as the another portion of like charged ions. In one embodiment, the method may be performed wherein the one portion of like charged ions are of opposite charge to the another portion of like charged ions.

In one embodiment, the method may be performed wherein the at least a portion of like charged ions are solute ions of a solution, wherein the solution is a first solution, and the at least one electrode assembly is configured such that at least a portion of the first solution can be displaced with a second solution having a concentration of solute ions which differs from the concentration of solute ions of the first solution. In one embodiment, the method may be performed wherein the at least a portion of like charged ions are solute ions of a solution, wherein the solution is a first solution, and the at least one electrode assembly is configured such that the at least a portion of the first solution can be displaced with a second solution having a species of solute ions differing from the species of solute ions of the first solution.

The present disclosure relates also to a method of manufacturing a passive electric field voltage source having at least one electric field monopole, the method including the step of providing at least one of: (a) a housing, the housing configured with at least first and second electrode surfaces therein, the at least first and second electrode surfaces in interfacing relationship therebetween; and at least first and second mobile members disposed with respect to the at least first and second electrode surfaces of the housing respectively wherein motion of the at least first and second mobile members selectively confines and exposes at least a portion of the at least first and second electrode surfaces respectively; and (b) a housing, the housing configured with at least first and second electrode surfaces therein, the at least first and second electrode surfaces in interfacing relationship therebetween, and an apparatus disposed between the at least first and second electrode surfaces of the housing, wherein the apparatus is configured to form a passive electric field voltage source having at least first and second electrode surfaces, the at least first and second electrode surfaces of the apparatus disposed in interfacing relationship with the at least first and second electrode surfaces of the housing respectively, the apparatus having at least first and second mobile members wherein motion of the at least first and second mobile members selectively confines and exposes at least a portion of the at least first and second electrode surfaces of the apparatus respectively. The method including the step of providing the housing, the housing configured with at least first and second electrode surfaces therein, the at least first and second electrode surfaces in interfacing relationship therebetween, and at least first and second mobile members disposed with respect to the at least first and second electrode surfaces of the housing respectively wherein motion of the at least first and second mobile members selectively confines and exposes at least a portion of the at least first and second electrode surfaces respectively, the method further including the steps of: providing an electrically conductive ionic solution exposed to the at least first and second electrode surfaces; exposing at least a portion of the at least first and second electrode surfaces; establishing an electric field in the electrically conductive ionic solution between the at least first and second electrode surfaces; accumulating at least one species of charged ions having a positive charge on the at least first electrode surface and accumulating at least one species of charged ions having a negative charge on the second electrode surface; and confining at least one of the at least one species of excess charged ions on at least one of the at least first and second electrode surfaces by motion of the at least one mobile member to at least partially confine the at least one species of excess charged ions to form a passive electric field voltage source having at least one electric field monopole thereby. The method may be performed wherein the at least first passive electric field voltage source is removably disposed within the housing.

In one embodiment, the method of manufacturing may be performed wherein the method includes the steps of: providing the housing, the housing configured with at least first and second electrode surfaces therein, the at least first and second electrode surfaces in interfacing relationship therebetween, and the apparatus disposed between the at least first and second electrode surfaces of the housing, wherein the apparatus is configured to form a passive electric field voltage source having at least first and second electrode surfaces, the at least first and second electrode surfaces of the apparatus disposed in interfacing relationship with the at least first and second electrode surfaces of the housing respectively, the apparatus having at least first and second mobile members wherein motion of the at least first and second mobile members selectively confines and exposes at least a portion of the at least first and second electrode surfaces of the apparatus respectively; providing an electrically conductive ionic solution exposed to the at least first and second electrode surfaces of the housing and to the at least first and second electrode surfaces of the apparatus; establishing an electric field in the electrically conductive ionic solution between the at least first electrode surfaces of the housing and the apparatus respectively; establishing an electric field in the electrically conductive ionic solution between the second electrode surfaces of the housing and the apparatus respectively; accumulating at least one species of charged ions having a positive charge on the at least first electrode surface of the apparatus and accumulating at least one species of charged ions having a negative charge on the second electrode surface of the apparatus; and confining at least one of the at least one species of excess charged ions on at least one of the at least first and second electrode surfaces of the apparatus by motion of the at least one mobile member to at least partially confine the at least one species of excess charged ions to form a passive electric field voltage source having at least one electric field monopole thereby.

In one embodiment, the method of manufacturing may be performed wherein the method includes the step of providing the housing, the housing configured with at least first and second electrode surfaces therein, the at least first and second electrode surfaces in interfacing relationship therebetween, and the apparatus disposed between the at least first and second electrode surfaces of the housing, wherein the apparatus is configured to form a passive electric field voltage source having at least first and second electrode surfaces, the at least first and second electrode surfaces of the apparatus disposed in interfacing relationship with the at least first and second electrode surfaces of the housing respectively, the apparatus having at least first and second mobile members wherein motion of the at least first and second mobile members selectively confines and exposes at least a portion of the at least first and second electrode surfaces of the apparatus respectively, the method further including the step of providing at least first and second mobile members disposed with respect to the at least first and second electrode surfaces of the housing respectively wherein motion of the at least first and second mobile members selectively confines and exposes at least a portion of the at least first and second electrode surfaces of the housing respectively.

In one embodiment, the method of manufacturing may be performed wherein at least one of the at least first and second mobile members that selectively confine and expose at least a portion of the at least first and second electrode surfaces of one of the housing and the apparatus respectively is made from at least one of an electrically conductive material and an electrically insulating material. In one embodiment, the method may be performed wherein at least one of (a) at least one of the at least first and second electrode surfaces of one of the housing and the apparatus, respectively, and (b) at least one of the at least first and second mobile members that selectively confine and expose at least a portion of the at least first and second electrode surfaces of one of the housing and the apparatus respectively is made from an electrically insulating material having a static charge formed thereupon.

BRIEF DESCRIPTION OF THE DRAWINGS

FIG. 17 illustrates three tables describing the polarity of the various electrode surfaces of the electrode assemblies during various phases of operation;

FIG. 23 illustrates a fourth table describing the polarity of the various electrode surfaces of the electrode assembly of FIG. 22;

FIG. 28 illustrates fifth and sixth tables describing the polarity of various electrodes during operation of the electrode assembly of FIGS. 24-27;

FIG. 35 illustrates the partition of FIG. 31 disposed in the electrode assembly in a first mode of operation;

FIG. 36 illustrates the partition of FIG. 32 disposed in the electrode assembly in a first mode of operation;

FIG. 57 shows a seventh table describing the polarity of various electrodes during operation of the electrode assembly of FIGS. 54-56;

FIG. 75 shows an eighth table describing the polarity of various electrodes during operation of the electrode assembly of FIGS. 54-56;

DETAILED DESCRIPTION

Figure 1:
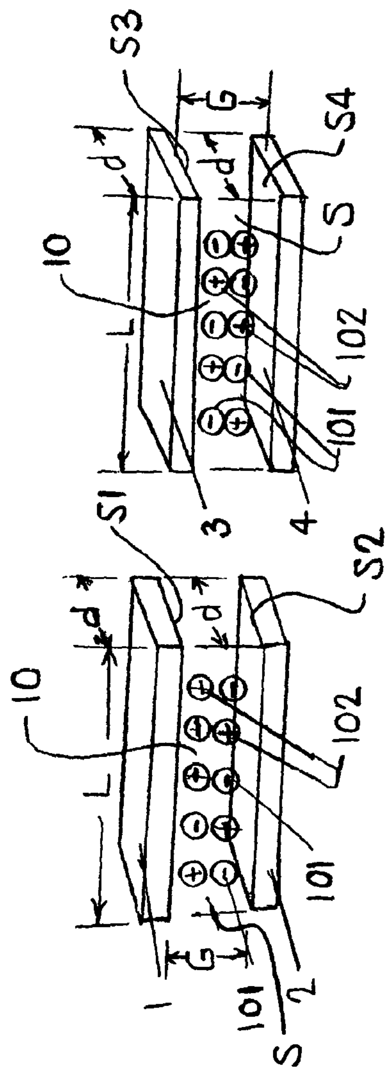
FIG. 1 illustrates a first pair of plate electrodes to generally describe the principles of the present disclosure.

The present disclosure will be understood more fully from the detailed description given below and from the accompanying drawings of particular embodiments of the disclosure which, however, should not be taken to limit the disclosure to a specific embodiment but are for explanatory purposes.

Numerous specific details may be set forth herein to provide a thorough understanding of a number of possible embodiments to implement electrode surface ion acceleration incorporating the present disclosure. It will be understood by one of ordinary skill in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments disclosed herein are not necessarily limited in this context.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In addition, the usage of terminology such as "upper", "lower", "up", "down" "forward", "front", "rearward", "rear", or other similar terminology indicative of direction or orientation, where and if applicable, is only performed for the sake of convenience of description with respect to the figures and does not necessarily imply that the embodiments are limited to those directions and/or orientations.

Turning now to the details of the present disclosure, the embodiments of the present disclosure can best be generally understood by consideration of the well known fact that salts such as NaCl readily dissolve in water with very little energy input, i.e., about 6.5 kJ/mole. This is attributed to the high dielectric constant for water of 75-81. The structure of the water molecule as a polar molecule enables the water molecules to easily penetrate between the Na+ and Cl− ions in the NaCl crystal. This penetration of the polar water molecules between the Na+ and Cl− ions shields the Coulomb potential between the Na+ and Cl− by a factor of about 75 so that the NaCl crystals readily dissolve in water.

In contrast, the enthalpy of formation of NaCl is about −410.9 kJ/mol. Although the Na+ and Cl− ions in seawater are considered to have originated separately almost entirely from different sources and virtually none have originated from solid sodium chloride which has dissolved, the fact remains that the oceans are a vast source of Na+ and Cl− ions which are segregated by transport to the surfaces of electrodes either in capacitive deionization, electrolysis, or electrodialysis of salt water.

Figure 2:
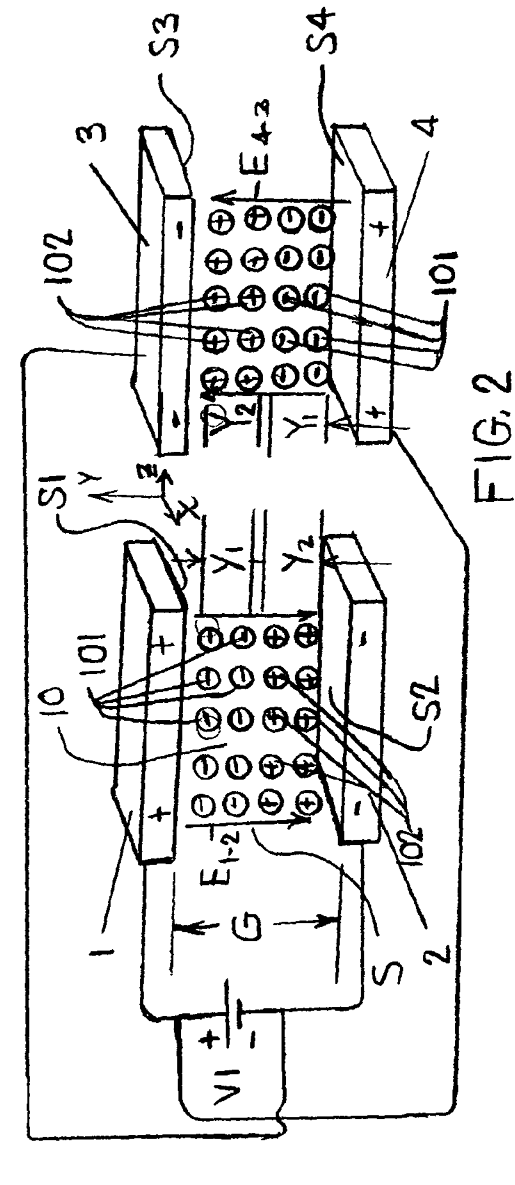
FIG. 2 illustrates the pair of plate electrodes of FIG. 1 with a voltage source to attract ions to generally explain the principles of the present disclosure.

More particularly, FIGS. 1 and 2 illustrate a first pair of plate electrodes 1 and 2 which are described to generally explain the principles of the present disclosure. Electrode 1 has an inner surface S1 and electrode 2 has an inner surface S2. The electrodes 1 and 2 are configured so that surfaces S1 and S2 are in opposing parallel relationship to one another and separated by a gap G, thereby forming a volume of space S between the electrode surfaces S1 and S2. Electrodes 1 and 2 each have a length L and a width D.

Similarly, a second pair of plate electrodes 3 and 4 have an inner surface S3 and an inner surface S4, respectively. The electrodes 3 and 4 are configured so that surfaces S3 and S4 are in opposing parallel relationship to one another and also separated by the gap G, thereby forming a volume of space S between the electrodes. Electrodes 3 and 4 each have a length L and a width D. Furthermore, electrodes 1 and 3 and electrodes 2 and 4 are aligned so that surfaces S1 and S3 and surfaces S2 and S4 are substantially co-planar to each other.

Initially, a solution 10 of negatively charge solute ions 101 and positively charged solute ions 102 in a solvent is disposed in the volume of space S between the electrode plates 1 and 2. When in solution in the absence of an external electric field, the positive and negative solute ions 101 and 102 are oriented equidistant from each other in the lowest energy state. The charged ions 101 and 102 are therefore electrically balanced so the net electric field from the solution 100 is essentially zero.

The positive or negative charge exhibited by the solute ions represents a radial electric field which emanates from the solute ions. The radial electric field is responsible for the forces of repulsion between the like charged ions and the forces of attraction between the oppositely charged ions. Such forces resulting from the electric field emanating from the solute ions represents potential energy available from the solute ions. Such forces are responsible for the solute ions remaining uniformly in suspension in the solvent without either settling to the bottom of the solution due to gravity or rising to the top of the solution due to buoyancy. Otherwise, since the oceans have been in existence for millions of years, at least stratified layers of salts would be observable in the oceans.

It is well known in physics that the forces of electromagnetism are orders of magnitude greater than the force of gravity. For example, sodium chloride has a molecular weight of approximately 58.5 grams/mol while water has a molecular weight of 18 grams/mol. Despite the fact that the sodium chloride is more than three times as heavy on a mol basis as water, no settlement or rising of the sodium chloride in the solution is observed under ambient conditions.

Therefore, the objective of the proposed method is to use electric fields to direct the ions which have already been segregated by the CDI process or by repetitive pulsing towards the electrode surface or by routine accumulation during electrolysis or electrodialysis, including conditions of concentration polarization, into a favorable condition such that the ions self accelerate due to the repulsive forces between like charged ions as governed by Coulomb's law. Such an effect takes advantage of the fact that the radial electric field emanating from the like charged solute ions represents potential energy which becomes available for conversion to kinetic energy when the proper conditions are artificially caused to occur.

As a result, the large energy input that is required to separate a solid salt crystal into individual ions has been circumvented by nature by the polar water molecules which have penetrated between the NaCl crystal to form a solution of Na+ and Cl− ions.

When a positive terminal of a voltage source V1 is coupled to electrode 1 and a negative terminal of voltage source V1 is coupled to electrode 2, an orthogonal electric field $E_{1-2}$ is established from electrode 1 to electrode 2. As a result, the negative solute ions 101 migrate towards the surface S1 of positive electrode 1 while the positive solute ions 102 migrate towards the surface S2 negative electrode 2. Similarly, when a positive terminal of voltage source V1 is coupled to electrode 4 and a negative terminal of voltage source V1 is coupled to electrode 3, an orthogonal electric field $E_{4-3}$ is established from electrode 4 to electrode 3. As a result, the negative solute ions 101 migrate towards the surface S4 of positive electrode 4 while the positive solute ions 102 migrate towards the surface S3 of electrode 3.

Depending on the magnitude and pulse rate of application of the electric fields $E_{1-2}$ and $E_{4-3}$, the negative ions 101 accumulate at surfaces S1 and S4 in a rectangular layer having a depth y1 while the positive ions 102 accumulate at surfaces S2 and S3 in a rectangular layer having a depth y2.

Figure 3:
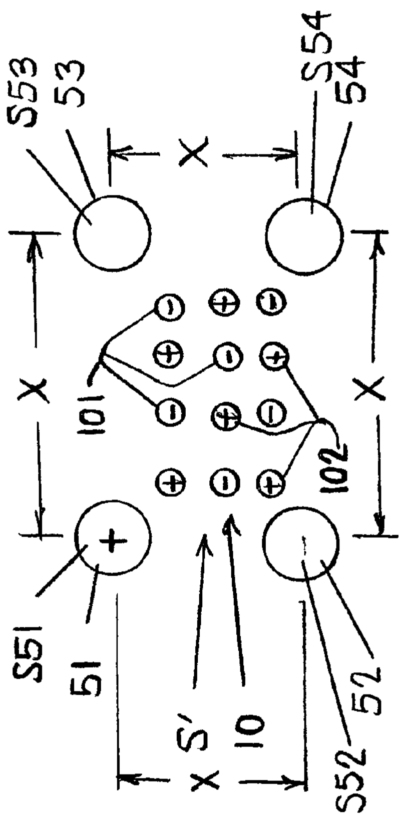
FIG. 3 illustrates first pair and second pairs of spherically shaped electrodes having outer surfaces that are separated at a distance.
Figure 4:
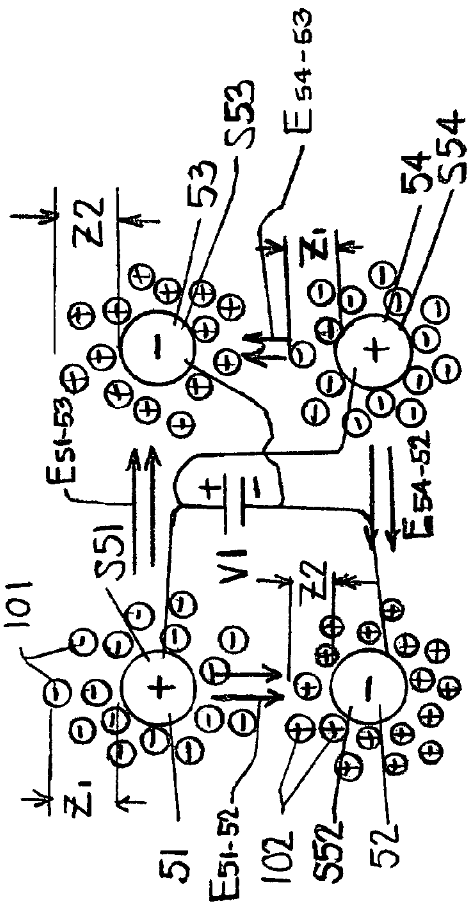
FIG. 4 illustrates the first and second pairs of spherically shaped electrodes of FIG. 3 including a voltage source to attract ions thereto.

Turning now to FIGS. 3 and 4, there is illustrated a first pair of spherically shaped electrodes 51 and 52 having outer surfaces S51 and S52, respectively, which are separated at the closest point of proximity by a distance x. Similarly, a second pair of spherically shaped electrodes 53 and 54, having outer surfaces S53 and S54, are separated at the closest point of proximity by distance x.

The electrodes 51 and 53 are also separated by a distance x while the electrodes 52 and 54 are also separated by distance x at the closest point of proximity. Thereby, a rectangle is formed by imaginary lines drawn from electrodes 51 to 52, 52 to 54, 54 to 53, and 53 to 51.

Again, the solution 10 is disposed in a volume of space S' between the four spherical electrodes 51, 52, 53 and 54. In the absence of an external electric field, the positive and negative solute ions 101 and 102 are oriented equidistantly from each other in the lowest energy state. When a positive terminal of voltage source V1 is connected to electrode 51 and a negative terminal of voltage source V1 is connected to electrode 52, an electric field $E_{51-52}$ is established from electrode 51 to electrode 52. Similarly, when a positive terminal of voltage source V1 is coupled to electrode 54 and a negative terminal of voltage source V1 is coupled to electrode 53, an orthogonal electric field $E_{54-53}$ is established from electrode 54 to electrode 53. An electric field $E_{51-53}$ is also established from electrode 51 to 53, while an electric field $E_{54-52}$ is also established from electrode 54 to 52.

As a result, the negative solute ions 101 migrate towards the surface S51 of positive electrode 51 while the positive solute ions 102 migrate towards the surface S52 negative electrode 52. In addition, the negative solute ions 101 migrate towards the surface S54 of positive electrode 54 while the positive solute ions 102 migrate towards the surface S53 of electrode 53.

Depending on the magnitude and pulse rate of application of the electric fields $E_{51-53}$ and $E_{54-52}$, the negative ions 101 accumulate at surfaces S51 and S54 in a generally spherical layer having a depth z1 while the positive ions 102 accumulate at surfaces S52 and S53 in a spherical layer having a depth z2.

For the purposes of illustration of the basic concept of the present disclosure, assume that the rectangular layers having depths y1 and y2 in the case of the electrode plates 1, 2, 3 and 4 of FIGS. 1 and 2 each contain a mole of hydrated solute ions.

As is well known according to Avogadro's number, a mole contains approximately $6.02\times10^{23}$ ions. If the hydrated ions are assumed to have a diameter of about 3 Å or $3\times10^{-10}$ meters, and each ion is separated by a distance of about $10^{-9}$ meters, then there are about $10^{9}$ ions per meter.

The self acceleration referred to is based on Coulomb's law where $$F_r=(kq_1q_2)/(\in r^2) \tag{1}$$

where, $F_r$=force of repulsion of like charged ions (or force of attraction of oppositely charged ions), in Newtons, N, $k=9\times10^{9}$ Nm²/coul², $q_1$ and $q_2=1.6\times10^{-19}$ coul/electron, $\in$=dielectric constant for water=78-81 (81 will be assumed here for conservatism and simplicity), and r=the initial distance between the charged ions, in meters.

The value to be used for r is dependent on the distance between the ions as they emerge from the surface of the electrode during the electrode regeneration process to a position where the ions can move laterally.

Seawater is assumed to be solution of 3.5% NaCl or 35 grams/liter. Since there are 1000 liters in 1 m³, the number of ion pairs N/m={(35/58 mols/liter)×(6×10²³ ion pairs/mol)×10³ liters/m³}^{1/3}=1.5×10⁹ ion pairs/m or r=6.7×10⁻¹⁰ m/ion pair. Since the distance r is actually only between like charged ions at the electrode surface, it is assumed for simplicity herein that the distance $r=2\times6.7\times10^{-10}$ m/ion pair$=1.33\times10^{-9}$ m/ion pair.

It should be noted that each ion is actually hydrated, i.e, each ion is structured as a cluster of about six polar water molecules surrounding each Na+ and Cl− ion. The mass of a sodium cluster ion is then {23+6(18)}grams/mol=131 grams/mol×(1 mol/6×10²³ ions)=2.2×10⁻²² grams or 2.2×10⁻²⁵ kg. The mass of a chlorine cluster ion is then {35+6(18)}=143 grams/mol×(1 mol/6×10²³ ions)=2.4×10⁻²² grams or 2.4×10⁻²⁵ kg.

Solving Eq. (1) assuming $r=1.33\times10^{-9}$ m/ion pair, we obtain $$F_r=(9\times10^{9}\ \mathrm{Nm^2/coul^2})(1.6\times10^{-19}\ \mathrm{coul/electron})(1.6\times10^{-19}\ \mathrm{coul/electron})/\{81(1.33\times10^{-9}\ \mathrm{m/ion})^2\}=$$

$$F_r=1.6\times10^{-12}\ \mathrm{Newtons}$$

Referring to FIG. 2, it can be seen that the ions 101 and 102 can be organized by the directions of of the electric fields $E_{1-2}$ and $E_{4-3}$ into a linear configuration based on a three-dimensional set of coordinates x, y, z. Assume z is the linear direction, x is a lateral direction and y is a vertical direction. Therefore, for a length L of 1 m, there are $1/r=(1.5/2)\times10^{9}$ ions/m$=7.5\times10^{8}$ ions. Consequently, the total initial force $F_z$ can be approximated by the following equation:

$$F_z=F_r\times1/r \tag{2}$$

or $F_z=1.6\times10^{-12}$ Newtons/ion$\times7.5\times10^{8}$ ions$=1.2\times10^{-3}$ Newtons.

Stokes' law is commonly used to provide a rough estimate of the terminal velocity of a sphere moving in water. The cluster ions can be assumed to be spheres for the current purposes. Stokes' law is given by the following equation:

$$R=6\pi\mu r_i v \quad (3)$$

where

R=the resisting force, in Newtons;

μ=the viscosity of water, which is 1 centipoise at 20° C. Since 1 poise=0.1 N-sec/$m^2$, the viscosity $\mu=10^{-3}$ N-sec/$m^2$;

$r_i$=the radius of the sphere, in meters, i.e. $5\times10^{-10}$ m; and v=terminal velocity of the sphere, in m/sec.

Solving for v:

$$v=R/6\pi\mu r_i \quad (4)$$

The resisting force R is equal and opposite to the initial linear force $F_z=1.2\times10^{-3}$ Newtons, so the terminal velocity v is then:

$$v=1.2\times10^{-3}\ \text{Newtons}/\{6\pi(10^{-3}\ \text{N-sec/m}^2)(5\times10^{-10}\ \text{m})\}=1.3\times10^{8}\ \text{m/sec.}$$

Obviously, this calculation is only an approximation and it is unlikely that such velocities can actually be obtained in reality, since even at much more ordinary velocities, there is significant deviation from Stokes' law. However, the kinetic energy of a mole of 58 grams of NaCl ions which are accelerated to such a velocity may be calculated as follows:

$$\begin{aligned} K.E. &= 1/2\ mv^2 \quad (5)\\ &= 0.5(0.058\ \text{kg})\times(1.3\times10^{8}\ \text{m/sec})^2\\ &= 4.9\times10^{14}\ \text{Joules}\\ &= 4.9\times10^{8}\ \text{MJ/mol} \end{aligned}$$

This is in contrast to the energy of solvation or hydration of NaCl of approximately 6.5 KJ/mol. Thus it appears that the potential energy available from the alignment of the solute ions, and which may be at least partially convertible to kinetic energy, greatly exceeds the energy of solvation or hydration. However, the conversion to kinetic energy may be carried out with the solute ions remaining entirely in the solution.

If the kinetic energy is applied to a propulsion system, the specific impulse of the propulsion system is given by $$I=F/(\Delta m/\Delta t) \quad (6)$$

where F=thrust force in kg and Δm/Δt=the fuel consumption in kg/sec.

If it is assumed that $7.5\times10^8$ ions in a row travel a distance of 1 meter at an average velocity of ½($1.3\times10^8$ m/sec)=$6.5\times10^7$ m/sec, then Δm/Δt=($7.5\times10^8$ ions/$6\times10^{23}$ ions) (0.058 kg)/(1 sec/$6.5\times10^7$)=$4.7\times10^{-9}$ kg/sec.

Then I=($1.2\times10^{-3}$ Newtons/9.8 Newtons/kg)/($4.7\times10^{-9}$ kg/sec)=$2.6\times10^4$ seconds.

If d=1 meter, then the number of rows of ions in a square meter ($m^2$) is $7.5\times10^8$, so the total force F=($1.2\times10^{-3}$ Newtons/row) ($7.5\times10^8$ rows)=$9.0\times10^5$ Newtons.

Therefore, although the foregoing calculations are only rough approximations of the potential energy available from the embodiments of the present disclosure, the results provide some indication of the magnitude of the potential energy available from an alignment of like charged solute ions in a solution.

In the field of physical chemistry, there are two effects which relate to the acceleration of solute ions due to externally applied electric fields. These two effects are noted as supporting the theory of ionic atmospheres, i.e., the theory that for example each Na+ and Cl− ion is surrounded by and attracts an atmosphere of several polar water molecules which are dragged through the solution by the motion of the ions in an electric field. This is referred to as the Debye-Huckel-Onsager theory.

The first of the two effects which support this theory is the Debye-Falkenhagen effect which is observed when conductivities are studied at high a-c frequencies, of the order of $3\times10^6$ cycles/second. As the frequency of the electric field is increased, a point is eventually reached at which the ionic atmosphere can no longer follow the rapidly changing field. At this point, the ions move virtually independently of one another as the influence of the ionic atmospheres becomes relatively insignificant. Therefore, at sufficiently high frequencies, the conductivity of the solution is expected to increase and such an effect has been observed.

The second effect which supports the ionic atmosphere model is the Wien effect. The conductivity has been found to increase at sufficiently high field strengths, on the order of $10^5$ volts/cm. At such large electric field strengths, the velocities of the ions become so high that the ionic atmospheres are separated from the ions, and the ions move independently.

From the foregoing, it can be appreciated that the acceleration of the ions in the solution is only caused by the external energy supplied by the orthogonal electric field between the electrode plates.

It is of interest also to calculate the acceleration a of the charged ions assuming they are in a vacuum. In such a case, based on F=ma, then the acceleration is given by the following equation:

$$a=F/m \quad (7)$$

or a=$1.2\times10^{-3}$ Newtons/$2.4\times10^{-25}$ kg=$5\times10^{21}$ m/$sec^2$ where m=$2.4\times10^{-25}$ kg for the heavier Cl− ion.

This is an enormous acceleration force and would represent an increase in velocity per second which far exceeds the speed of light. According to the currently understood laws of physics, if such accelerations could be achieved, the mass of the ion would increase as additional force is added once the speed of light has been attained.

For example, if the velocities achieved are in the range of $10^5$ m/sec, the kinetic energy ½ $mv^2$=$5\times10^9$ J/kg. Such an energy yield may be compared to gasoline which has an energy content of approximately 35 MJ/liter or roughly ($3.5\times10^7$ J/liter)×(1 liter/0.8 kg)=$4.4\times10^7$ J/kg.

Referring to FIGS. 1 and 2, if a mole of ions 101 or 102 were attracted to an imaginary electrode surface S1, S2, S3 or S4 having a width d equal to the diameter of one of the hydrated ions, so that each ion in the mole of ions is stretched out in a single row or column to form a straight line, the resulting length L of the imaginary electrode would be as follows:

$$\begin{aligned} L &= 6\times10^{23}\ \text{ions}/(7.5\times10^{8}\ \text{ions/meter})\\ &= 0.8\times10^{15}\ \text{meters}\\ &= 8\times10^{14}\ \text{meters.} \end{aligned}$$

Since the speed of light is $3\times10^8$ meters/second, the distance of a light-year LY is $$LY=(3\times10^{8}\ \text{meters/second})\times(3.6\times10^{3}\ \text{seconds/hour})\times(8.76\times10^{3}\ \text{hours/year})=9.4\times10^{15}\ \text{meters.}$$

So the length L of the imaginary electrode is about 8% of a light-year.

The total initial force $F_z$ can be approximated by the following equation:

$$F_z=F_r\times 1/r \qquad (8)$$

or $F_z=1.6\times10^{-12}$ Newtons/ion$\times7.5\times10^{8}$ ions/meter$\times8\times10^{14}$ meters$=1.6\times10^{-12}$ Newtons/ion$\times6\times10^{23}$ ions$=9.6\times10^{11}$ Newtons.

If this force $F_z$ is assumed to act on the ions 101 or 102 at the ends of the electrodes land 3 or 2 and 4, respectively, the terminal velocity v based on Stokes' Law is then:

$$v=9.6\times10^{11}\text{ Newtons}/\{6\pi(10^{-3}\text{ N-sec/m}^2)(5\times10^{-10}\text{ m})\}=10.4\times10^{22}\text{ m/sec.}$$

Obviously, this velocity far exceeds the speed of light, which is the upper bound according to the currently understood laws of physics. However, for the sake of comparison, if the ions are formed in a cube having a volume of 1 $m^3$, there are then $(7.5\times10^8$ ions/meter$)^3=421.9\times10^{24}$ ions/$m^3$.

If the same mole of ions is formed around one of the spherical electrodes, the mole of ions would occupy a sphere having a volume $V'=4/3\pi^3=6\times10^{23}$ ions/$(421.9\times10^{24}$ ions/$m^3)$.

Therefore, solving for r, we obtain $r=6.98\times10^{-2}$ m or r=approximately 7 cm=0.07 meters or 2×0.07=0.14 meters So the maximum force of repulsion from the mole of ions is $$\begin{aligned}F_z &= 1.6\times10^{-12}\text{ Newtons/ion}\times7.5\times\\ &\quad 10^{8}\text{ ions/meter}\times14\times10^{-2}\text{ meters}\\ &= 1.68\times10^{-4}\text{ Newtons.}\end{aligned}$$

This is in sharp contrast to the force of $9.6\times10^{11}$ Newtons which would occur for the hypothetical case wherein the mole of ions is distributed as single ions stretched out in a chain over the distance of $8\times10^{14}$ meters.

The conclusion being advanced herein is that the potential energy of the ions is measured by the kinetic energy to which the ions can be propelled as the ions initially distributed and balanced in a solution may be directly related to the final end state of the ions. When properly oriented, the ions may "self accelerate" via the Coulomb forces of repulsion in the presence of an electric field such that the ions return to a lower energy state.

Figure 5:
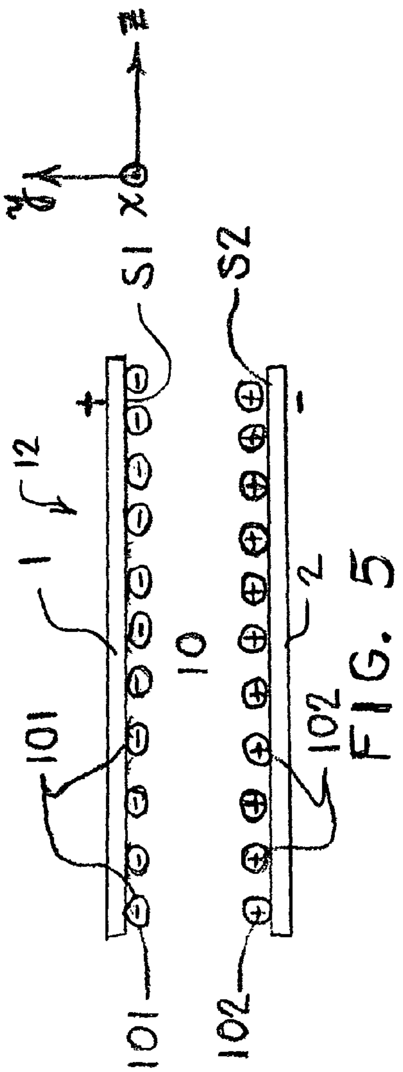
FIG. 5 illustrates an electrode assembly which includes a pair of electrodes having ideal surfaces to which solute ions are attracted.

FIG. 5 illustrates an electrode assembly 12 which includes a pair of electrodes having ideal surfaces to which solute ions are attracted. More particularly, electrodes 1 and 2 each have ideal surface S1 and S2, respectively, which is perfectly smooth. When an electrical potential is applied across electrodes 1 and 2 such that electrode 1 is made positive and electrode 2 is made negative, negative solute ions 101 are attracted to surface S1 and positive solute ions 102 are attracted to surface S2. Since the surfaces S1 and S2 are perfectly smooth, the surfaces S1 and S2 do not intervene or interfere between the solute ions 101 and 102. Therefore, the solute ions 101 and 102 are in perfect alignment with one another such that the Coulomb forces in the z direction due to the like charges are unimpeded.

Figure 6:
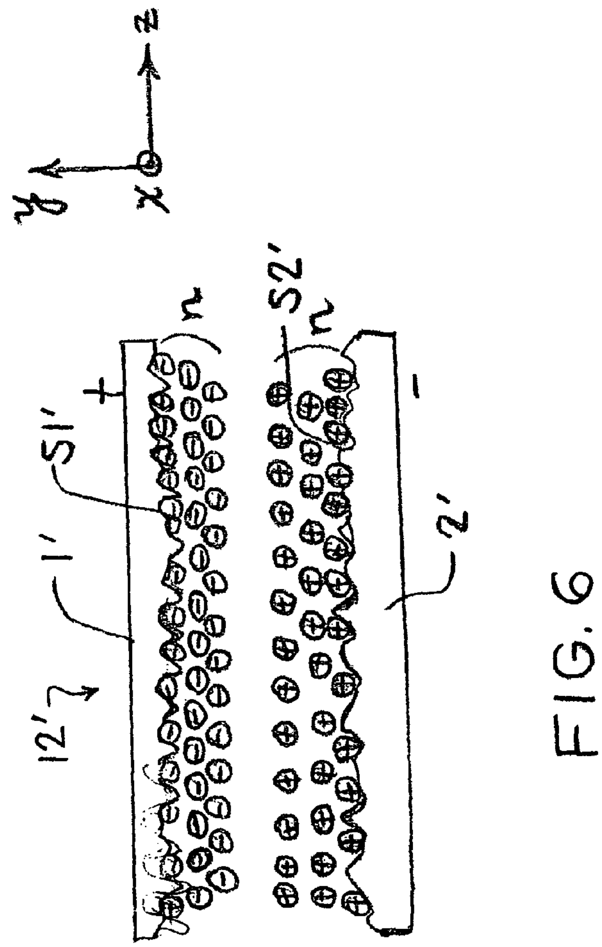
FIG. 6 illustrates an electrode assembly which includes a pair of electrodes having simplified real surfaces to which solute ions are attracted.

In contrast, FIG. 6 illustrates an electrode assembly 12' which includes a pair of electrodes having simplified real surfaces to which solute ions are attracted. More particularly, electrodes 1' and 2' each have a simplified real surface S1' and S2', respectively, which is not perfectly smooth but rather is jagged with peaks and valleys or crevices. When an electrical potential is applied across electrodes 1' and 2' such that electrode 1' is made positive and electrode 2' is made negative, again negative solute ions 101 are attracted to surface S1' and positive solute ions 102 are attracted to surface S2'. However, since the surfaces S1' and S2' are not perfectly smooth, the surfaces S1' and S2' do intervene or interfere between the solute ions 101 and 102. Therefore, the solute ions 101 and 102 at the surfaces S1' and S2' are not in perfect alignment with one another and the Coulomb forces in the z direction due to the like charges are impeded.

Since in practice, it is necessary to contend with real surfaces such as S1' and S2', the embodiments of the present disclosure relate to electrode assemblies which are configured and operated to cause alignment of the Coulomb forces in the z direction for real surfaces as represented by simplified surfaces S1' and S2'.

FIG. 6 also illustrates a layer of solute ions 101 and 102 each having a nominal thickness n is formed at the surfaces S1' and S2'. By forming a series of layers with a thickness n, at least a portion of the solute ions 101 and 102 in the respective layers may be aligned in the z-direction so as to be caused to self accelerate in that direction. In addition, the ions in the intermediate layers are shielded from the Coulomb forces of attraction of any oppositely charged ions which may be in proximity.

One method of forming such a series of layers with a thickness n is by providing electrodes having a high surface area material, e.g., a material having a surface area of about 100-1000 $m^2$/gm or greater, to attract solute ions to the surfaces of such electrodes during a capacitive deionization process in a configuration which, during an electrode discharge phase of operation, enables the like charged solute ions 101 and 102 to be compressed in the y-direction by repulsion from like-charged electric fields emanating from both the positive y and the negative y-directions in the x-z plane simultaneously. Compression of the solute ions 101 and 102 in the y-direction causes the solute ions 101 and 102 to substantially align and therefore expand in the z-direction.

Another method of forming a series of layers with a thickness n is by applying an electric field in the y-direction, orthogonal to the electrode surfaces, either once, particularly at, but not necessarily equal to, a voltage sufficient to cause the previously described Wien effect wherein the solute ions 101 and 102 are stripped of their hydrated ions, or by repeated pulsing multiple times.

Still another method of forming such a series of layers may be implemented by providing an electrode assembly which includes a dielectric assembly that enables the solute ions 101 and 102 to be compressed in the y-direction by repulsion from like-charged electric fields emanating from both the positive y and the negative y-directions simultaneously. Compression of the solute ions 101 and 102 in the y-direction causes the solute ions 101 and 102 to substantially align and therefore expand transversely in the z-direction. The dielectric assembly performs a function similar to a dielectric between two parallel electrode plates of a capacitor. The dielectric assembly includes additional electrode surfaces which allow acceleration of the solute ions 101 and 102 transversely in the z-direction.

The foregoing embodiments may be applied singly or in combination and are described in detail below. In addition, as defined herein, an electrode assembly is an apparatus or an assembly having at least one surface that is configured to enable at least a portion of like charged ions or an at least partially confined volume that is configured to enable at least a portion of like charged ions to convert potential energy of the at least a portion of like charged ions into kinetic energy based on the Coulomb forces between the like charged ions via linear alignment of the at least a portion of like charged ions. As also defined herein, an electrode assembly is an apparatus or an assembly that is configured to retain at least a portion of like charged ions or an apparatus or an assembly that is configured to enable a first portion of like charged ions to convert potential energy of the first portion of like charged ions to kinetic energy based on interaction with the Coulomb forces of a second portion of like charged ions. Alternatively, an electrode assembly is an apparatus or an assembly that is configured to retain at least a portion of like charged ions or an apparatus or an assembly that is configured to enable a first portion of like charged ions to convert potential energy of a second portion of like charged ions to kinetic energy based on interaction with the Coulomb forces of the first portion of like charged ions.

As defined herein, an electrode surface is a surface of a member made from a material capable of attracting ions via an electric field or of retaining ions produced by static electricity such as by friction, by an applied voltage or by another suitable method. Thus, in the case of attracting ions via an electric field, the material may be either an electrically conductive material, e.g., a non-metallic material such as, but not limited to, carbon, carbon aerogel or carbon nanofoam, mesoporous carbon or other suitable material, or a metallic material such as, but not limited to, copper, bronze, brass, iron, stainless steel, nickel, platinum, palladium, silver, gold or other suitable material, and, in the case of retaining ions produced by static electricity, an electrically insulating material such as, but not limited to, rubber, rubberized fabric, paper, silica aerogel or other suitable material.

As defined herein, an electric field established transversely or substantially transversely to an electrode surface refers to an electric field having lines of force that are quasi parallel to the surface as opposed to an electric field having lines of force that are substantially orthogonal to the electrode surface.

Linear alignment is defined herein as alignment of like charged ions, e.g., solute ions in a solution, in a substantially linear manner sufficient to cause motion, e.g., kinetic energy, of the like charged ions in at least one of the two directions substantially defined by the linear alignment. The potential energy of the ions represented by the radiating electric field is converted into kinetic energy either by the forces of repulsion between the like charged ions or by the forces of attraction to another portion of linearly aligned like charged ions having the opposite charge.

As defined herein, like charged ions may refer to "wet" ions such as solute ions in a solution or "dry" ions such as static charged ions produced by static electricity or from an ionizing potential source.

An active voltage source is defined herein as a voltage source in which a potential difference or voltage, or electric field is produced via a forced action such as connection to terminals of a power supply. The power supply may include a battery, a fuel cell, a capacitor, an inductance coil, an electrical generator producing either direct current or alternating current, a radiofrequency generator, connection to a power grid or other suitable mechanism for forcing a potential difference or voltage, or electric field. An active voltage source enables an electrode surface or an at least partially enclosed volume retaining like charged ions on the electrode surface or in the at least partially enclosed volume to become an electric field voltage source emitting an electric field from the electrode surface or from the at least partially enclosed volume.

A passive voltage source is defined herein as a voltage source formed by an accumulation of charged ions, e.g., retained on an electrode surface configured to retain at least a portion of like charged ions or confined within an at least partially enclosed volume configured to retain at least a portion of like charged ions wherein the accumulation of like charged ions enables an electric field voltage source emitting an electric field from the electrode surface or from the at least partially enclosed volume.

As defined herein, retaining at least a portion of like charged ions refers to forcing polarization of an electrode surface or an at least partially enclosed volume via an active voltage source, attracting ions to a surface or inserting ions to an at least partially enclosed volume to form a passive voltage source or confining ions attracted to an electrode surface via a partition electrode to enable an electric field voltage source emitting an electric field from the electrode surface or from the at least partially enclosed volume. The electric field voltage source emitting an electric field becomes a passive voltage source, or electric field monopole, not requiring external energy to emit an electric field. When retained like charged ions of a first electric field monople interact with retained like charged ions of a second electric field monopole, the retained like charged ions exert a force on the electrode surfaces in the case wherein the retained like charged ions of the first and second electric field monopoles repel each other or, alternatively, the retained like charged ions exert a force on the at least partially enclosed volumes in the case where the retained like charged ions of the first and second electric field monopoles attract each other.

Figure 7:
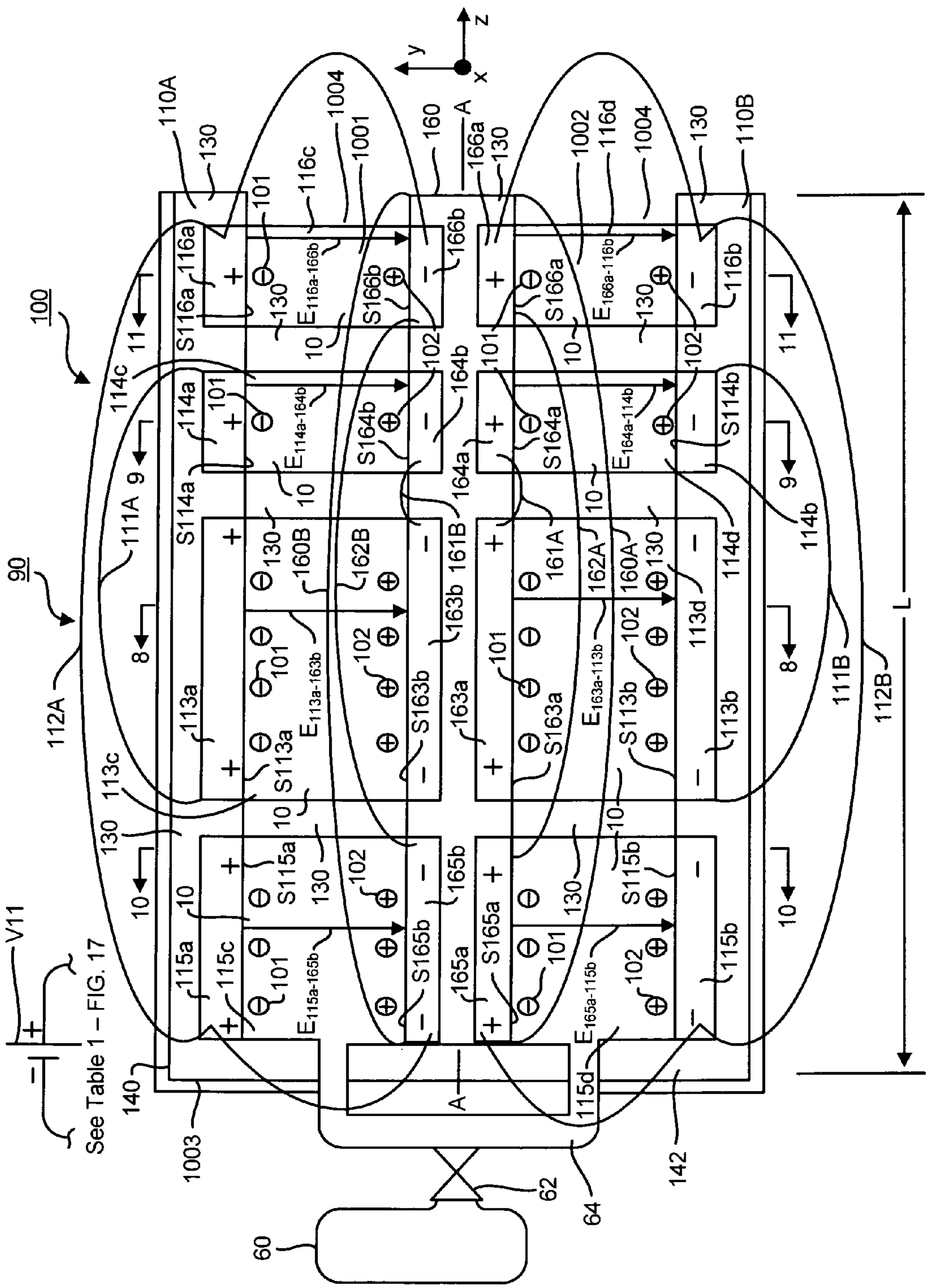
FIG. 7 illustrates one embodiment of the present disclosure of an electrochemical system that includes an electrode assembly having a rotatable electrode which is particularly suitable for electrodes having a high surface area material.
Figure 8:
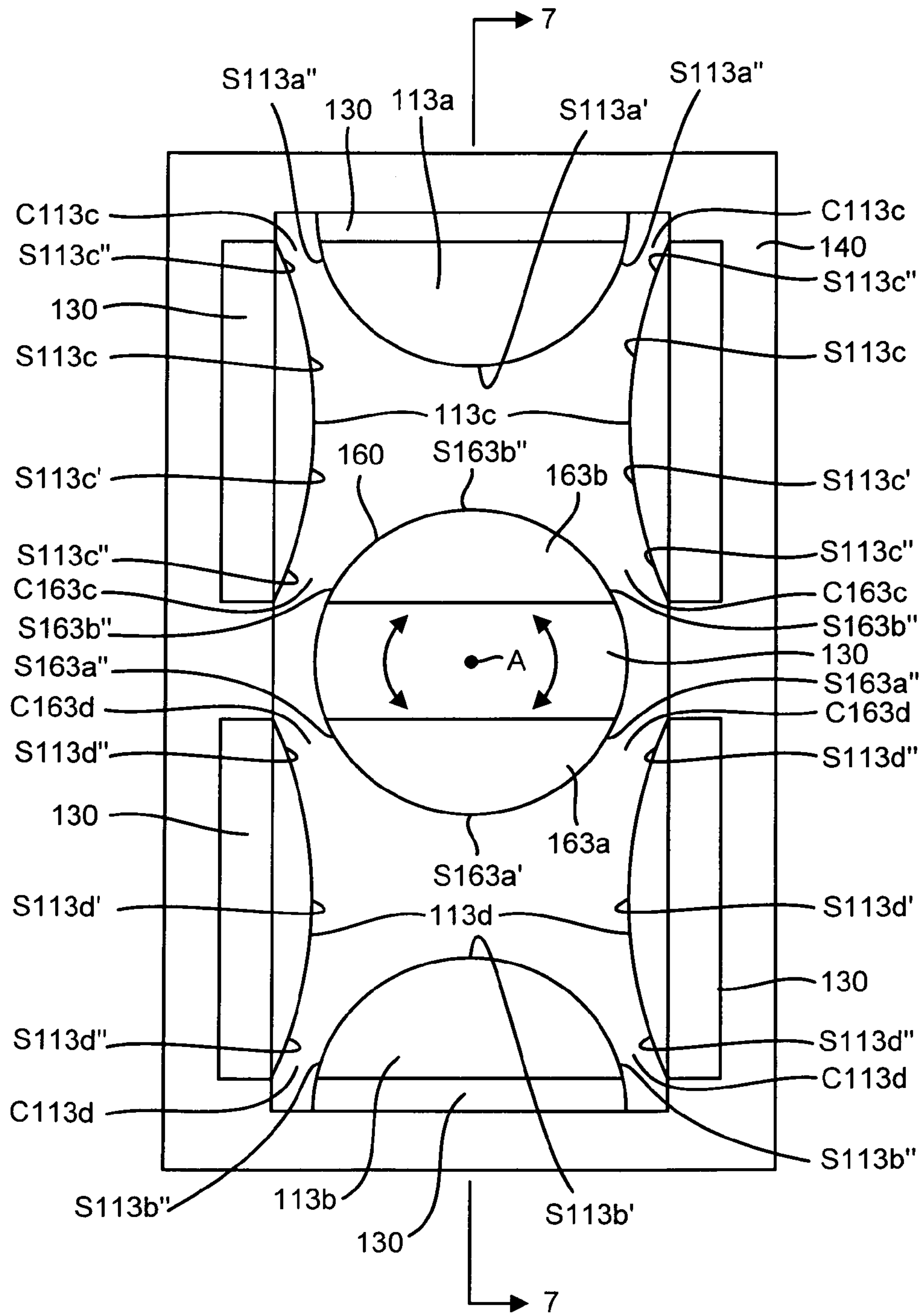
FIG. 8 illustrates a cross-sectional view of the electrode assembly of FIG. 7.

Turning now to the details of the present disclosure, FIGS. 7-11 illustrate one embodiment of the present disclosure of an electrochemical system 90 that includes an electrode assembly 100 which is particularly suitable for electrodes having a high surface area material, e.g., a material having a surface area in the range of about 100 to1000 $m^2$/gm or greater, to attract solute ions to the surfaces of the electrodes during a charge accumulation process such as capacitive deionization. In FIG. 7, the electrode assembly 100 includes a housing 140 in which a stationary first electrode 110A and a stationary second electrode 110B are configured in a substantially parallel arrangement. The housing 140 and the electrode assembly 100 each have front end 1003 which is proximate to, and in fluidic communication with, through a valve 62, a solution supply tank 60 and a rear end 1004. The housing 140 includes a rigid wall 142 at the front end 1003. A movable rotatable electrode or electrode assembly 160, typically having a substantially cylindrical configuration, is disposed in parallel configuration between the first stationary electrode 110A and the second stationary electrode 110B so as to form a first volume 1001 between electrode 110A and electrode assembly 160 and to form a second volume 1002 between electrode 110B and electrode assembly 160. The electrode 160 is movable by rotation around an axis A-A formed along its longitudinal centerline. The solution supply tank 60 fluidically communicates with the first volume 1001 and the second volume 1002 through the valve 62 and a common supply conduit or pipe 64. The supply conduit or pipe 64 provides fluidic communication between the first volume 1001 and the second volume 1002.

The first electrode 110A and the second electrode 110B, respectively, each include a dielectric material 130 as a base. The dielectric material 130 may be made from various suitable materials, e.g., a plastic such as polyvinylchloride or polyethylene; rubber, ceramic, or silica aerogel (Cabot Corporation, Boston, Mass., USA), among others. In one embodiment, the first electrode 110A includes a first pair 111A of adjacent inner electrodes 113*a* and 114*a* each having typically a curved surface S113*a* and S114*a* and which are substantially co-planar and embedded in the dielectric material 130 so as to be electrically insulated from one another, electrode 113*a* being a major electrode and electrode 114*a* being a minor electrode based on differences in surface area therebetween. More particularly, the surface area of the surface S113*a* of major electrode 113*a* may be greater than the surface area of the surface S114*a* of minor electrode 114*a*. In one embodiment, the surface area of the major electrode 113*a* is substantially equal to the surface area of the minor electrode 114*a*.

Similarly, the second electrode 110B includes a first pair 111B of adjacent inner electrodes 113*b* and 114*b* each having typically a curved surface S113*b* and S114*b* and which are substantially co-planar and embedded in the dielectric material 1300 130 so as to be electrically insulated from one another. Electrode 113*b* is a major electrode and electrode 114*b* is a minor electrode based on differences in surface area therebetween. More particularly, the surface area of the surface S113*b* of major electrode 113*b* may be greater than the surface area of the surface S114*b* of minor electrode 114*b*. In one embodiment, the surface area of the major electrode 113*b* is substantially equal to the surface area of the minor electrode 114*b*.

In one embodiment of the first electrode 110A and second electrode 110B, depending on the overall length L of the electrode assembly 100, the first pair 111A, 111B of adjacent inner electrodes 113*a*, 113*b* and 114*a*, 114*b* are embedded in dielectric material 130 between at least a second pair 112A, 112B of outer electrodes 115*a*, 115*b* and 116*a*, 116*b*, respectively. Electrodes 115*a*, 115*b* are major electrodes and electrodes 116*a*, 116*b* are minor electrodes based on differences in surface area therebetween. More particularly, the surface area of the surface S115*a* of major electrode 115*a* may be greater than the surface area of the surface S116*a* of minor electrode 116*a*, while the surface area of the surface S115*b* of major electrode 115*b* may be greater than the surface area of the surface S116*b* of minor electrode 116*b*. In one embodiment, the surface area of the surface S115*a* of major electrode 115*a* may be substantially equal to the surface area of the surface S116*a* of the minor electrode 116*a*, while the surface area of the surface S115*b* of major electrode 115*b* may be substantially equal to the surface area of the surface S116*b* of the minor electrode 116*b*.

Outer electrodes 115*a*, 115*b* and 116*a*, 116*b* each have typically a curved cross-sectional surface S115*a*, S115*b* and S116*a*, S116*b* and are substantially co-planar and embedded in the dielectric material 130 so as to be electrically insulated from each other and also from the first pair 111A, 111B of adjacent inner electrodes 113*a*, 113*b* and 114*a*, 114*b*, respectively. From front end 1003, the first electrode 110A, 110B includes the outer electrode 115*a*, 115*b* separated by dielectric material 130 from inner electrode 113*a*, 113*b*, respectively. Inner electrode 113*a*, 113*b* is separated from inner electrode 114*a*, 114*b* by dielectric material 130. In turn, outer electrode 116*a*, 116*b* extends to rear end 1004 and is separated from inner electrode 114*a*, 114*b*, respectively, by dielectric material 130.

The electrode assembly 100 is configured so that, when in contact with electrically conductive solution 10, electrical continuity is enabled between surfaces S113*a* and S114*a*, between surfaces S115*a* and S116*a*, between surfaces S113*b* and S114*b*, and between surfaces S115*b* and S116*b*.

Movable rotatable electrode 160 is essentially an amalgamation of first electrode 110A and second electrode 110B separated by common dielectric material 130. More particularly, rotatable electrode 160 includes a first electrode 160A and a second electrode 160B which each include common dielectric material 130 as a base. In one embodiment, the first electrode 160A includes a first pair 161A of adjacent inner electrodes 163*a* and 164*a* each having typically a curved surface S163*a* and S164*a* and which are substantially co-planar and embedded in the dielectric material 130 so as to be electrically insulated from one another. Electrode 163*a* is a major electrode and electrode 164*a* is a minor electrode based on differences in surface area therebetween. More particularly, the surface area of the surface S163*a* of major electrode 163*a* may be greater than the surface area of the surface S164*a* of minor electrode 164*a*. In one embodiment, the surface area of the surface S163*a* of major electrode 163*a* may be substantially equal to the surface area of the surface S164*a* of minor electrode 164*a*.

Similarly, the second electrode 160B includes a first pair 162B of adjacent inner electrodes 163*b* and 164*b* each having typically a curved surface S163*b* and S164*b* and which are substantially co-planar and embedded in the dielectric material 130 so as to be electrically insulated from one another. Electrode 163*b* is a major electrode and electrode 164*b* is a minor electrode based on differences in surface area therebetween. More particularly, the surface area of the surface S163*b* of major electrode 163*b* may be greater than the surface area of the surface S164*b* of minor electrode 164*b*. In one embodiment, the surface area of the surface S163*b* of major electrode 163*b* may be substantially equal to the surface area of the surface S164*b* of minor electrode 164*b*.

In one embodiment of the first and second electrodes 160A, 160B, the first pair 161A, 161B of adjacent inner electrodes 163*a*, 163*b* and 164*a*, 164*b* are embedded in dielectric material 130 between at least a second pair 162A, 162B of outer electrodes 165*a*, 165*b* and 166*a*, 166*b*, respectively. Outer electrodes 165*a*, 165*b* and 166*a*, 166*b* each have typically a curved surface S165*a*, S165*b* and S166*a*, S165*b* and are substantially co-planar and embedded in the dielectric material 130 so as to be electrically insulated from each other and also from the first pair 161A, 161B of adjacent inner electrodes 163*a*, 163*b* and 164*a*, 164*b*, respectively. From front end 1003, the first and second electrodes 160A, 160B include the outer electrode 165*a*, 165*b*, separated from inner electrode 164*a*, 164*b* respectively, by dielectric material 130. In turn, outer electrode 166*a*, 166*b* extends to rear end 1004 and is separated from inner electrode 164*a*, 164*b*, respectively by dielectric material 130. Electrodes 165*a*, 165*b* are major electrodes with respect to electrodes 166*a*, 166*b* which are minor electrodes, based on differences in surface area therebetween. More particularly, the surface area of the surfaces S165*a*, S165*b* of major electrodes 165*a*, 165*b* may be greater than the surface area of the surfaces S164*a*, S164*b* of minor electrodes 164*a*, 164*b*, respectively. In one embodiment, the surface area of the surfaces S165*a*, S165*b* of major electrodes 165*a*, 165*b* may be substantially equal to the surface area of the surfaces S164*a*, S164*b* of minor electrodes 164*a*, 164*b*, respectively.

The electrode assembly 100 is configured so that when in contact with electrically conductive solution 10, electrical continuity is enabled between surfaces S163*a* and S164*a*, between surfaces S165*a* and S166*a*, between surfaces S163*b* and S164*b*, and between surfaces S165*b* and S166*b*.

Those skilled in the art will recognize that, as illustrated in FIGS. 8-11, the electrode surfaces S113*a*, S113*b*, S114*a*, S114*b*, S163*a*, S163*b*, S164*a*, S164*b*, and also S115*a*, S115*b*, S116*a*, S116*b*, S165*a*, S165*b* and S166*a*, S166*b* as opposed to being circular, may be substantially flat or non-circular, as illustrated by electrode surfaces such as S113*e*, S113*f*, S114*e*, S114*f*, S163*e*, S163*f*, S164*e*, S164*f*, and also S115*e*, S115*f*, S116*e*, S116*f*, S165*e*, S165*f*, S166*e*, S166*f*. The embodiments are not limited in this context.

In one embodiment, the electrode assembly 100 further includes at least sets 113*c*, 113*d*, and 114*c*, 114*d*, of auxiliary electrodes, and may include at least sets 115*c*, 115*d*, and 116*c*, 116*d* of auxiliary electrodes, each set of auxiliary electrodes having surfaces S113*c*, S113*d*, S114*c*, S114*d*, and S115*c*, S115*d* and S116*c*, S116*d*, respectively. Auxiliary electrode sets 115*c*, 115*d*, 113*c* and 113*d* are major electrodes with respect to electrode sets 114*c*, 114*d*, 116*c*, and 116*d*, which are minor electrodes, based on differences in surface area therebetween, respectively, or in one embodiment, the surface areas of surfaces S113*c*, S113*d* of sets 113*c*, 113*d*, respectively, may be substantially equal to the surface areas of surfaces and S114*c*, S114*d* of sets 114*c*, 114*d*, respectively. Similarly, in one embodiment, the surface areas of surfaces S115*c*, S115*d* of sets 115*c*, 115*d*, respectively, may be substantially equal to the surface areas of surfaces and S116*c*, S116*d* of sets 116*c*, 116*d*, respectively. The sets 113*c*, 113*d* and when applicable 115*c*, 115*d* 113*c*, 113*d*, of auxiliary electrodes may be extended to join transversely across the front end 1003.

Figure 9:
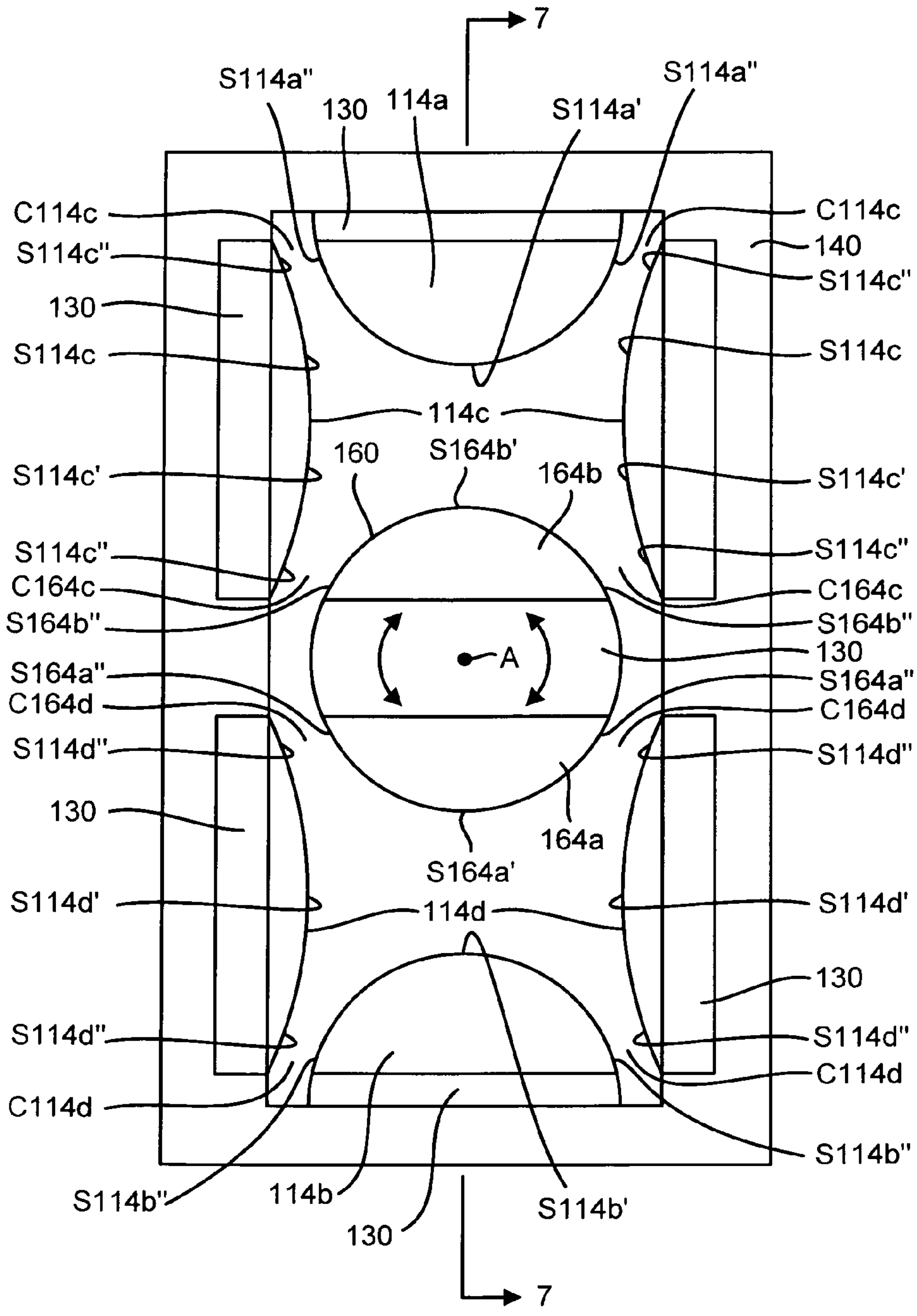
FIG. 9 illustrates another cross-sectional view of the electrode assembly of FIG. 7.
Figure 10:
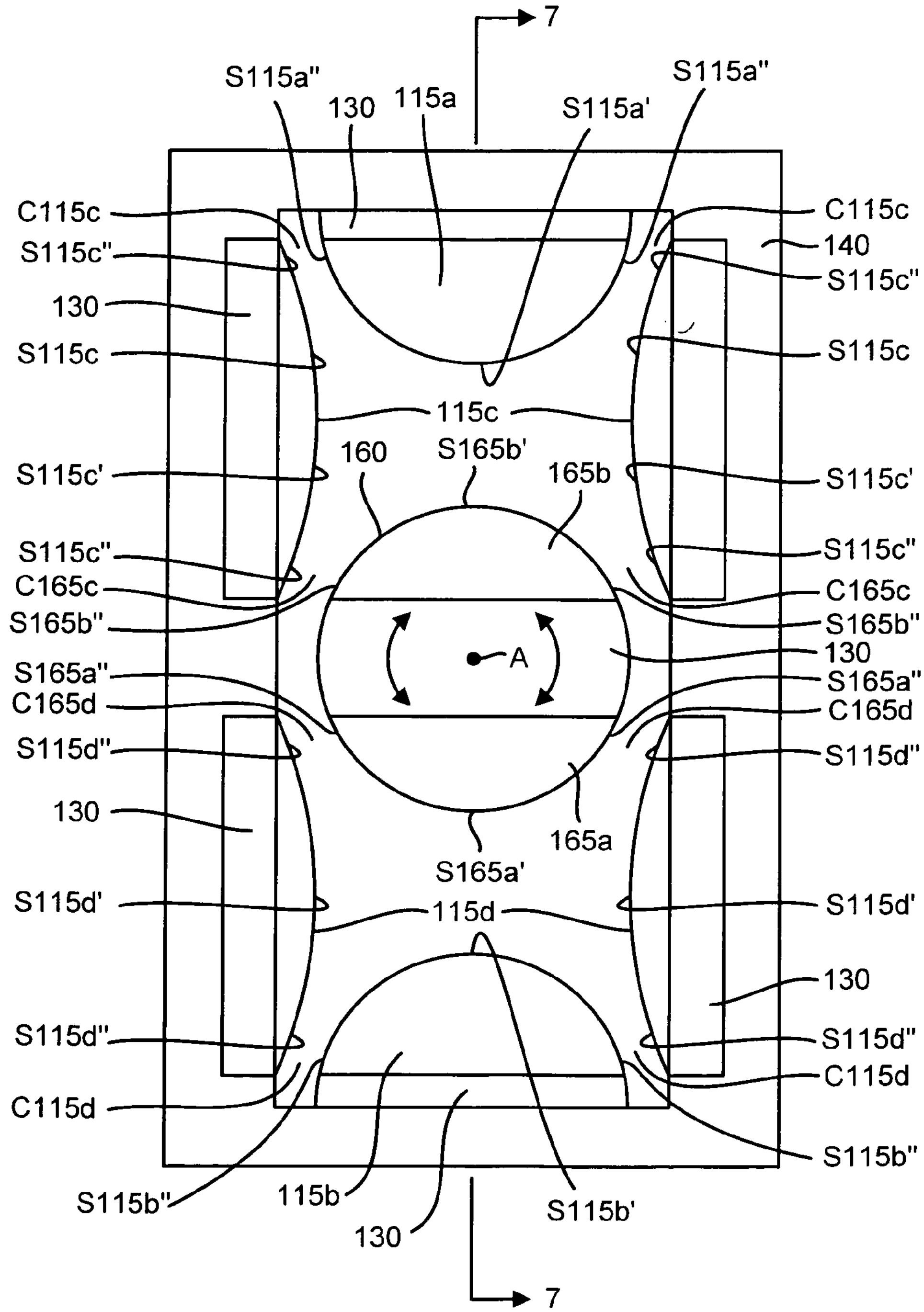
FIG. 10 illustrates yet another cross-sectional view of the electrode assembly of FIG. 7.
Figure 11:
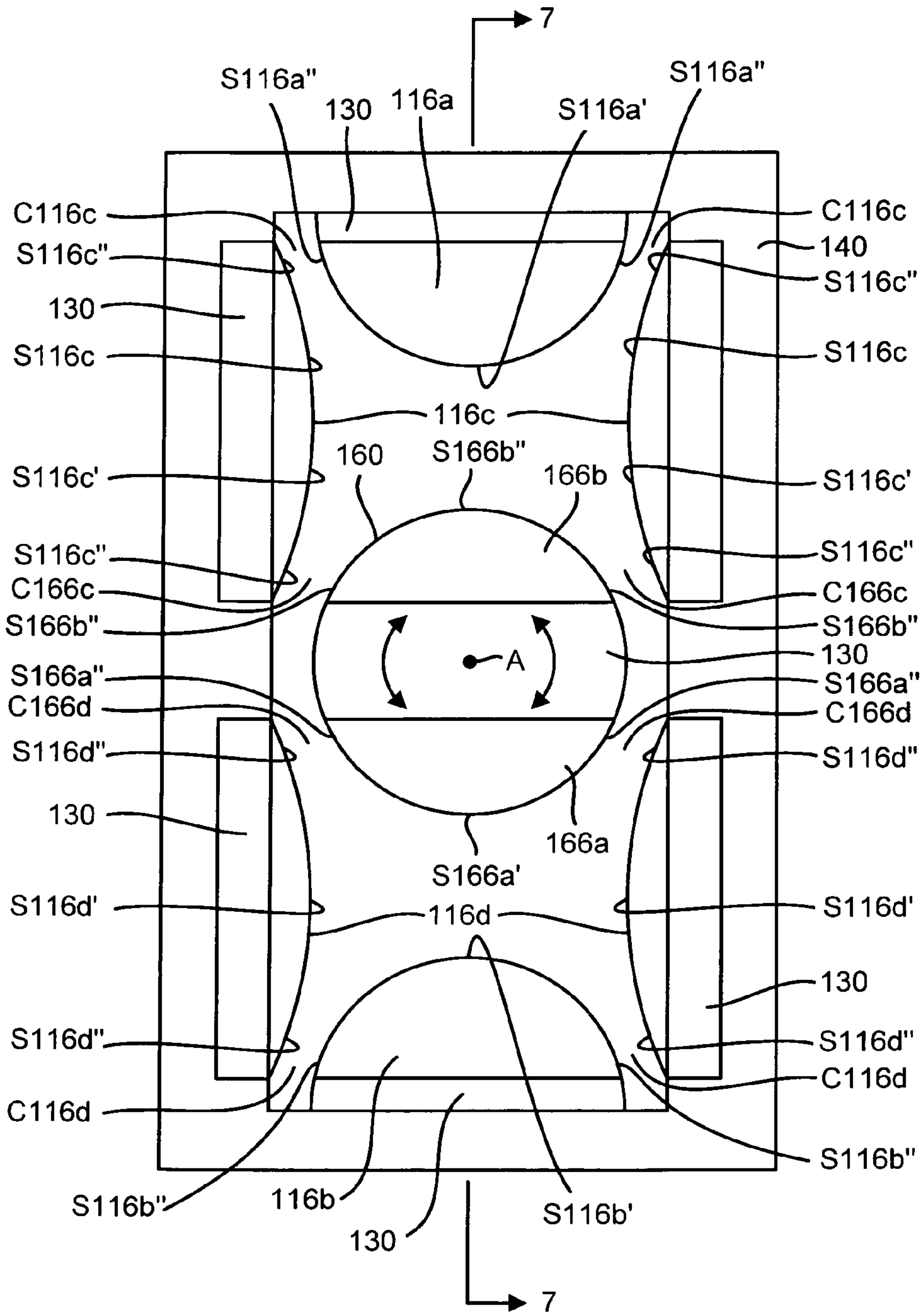
FIG. 11 illustrates still another cross-sectional view of the electrode assembly of FIG. 7.

The surfaces S113*c*, S113*d* are illustrated in FIGS. 8-11 with a curved cross section, but are not limited thereto. Referring to FIGS. 9-11, one of ordinary skill in the art will recognize that surfaces S115*c*, S115*d*, S114*c*, S114*d*, S116*c* and S116*d* may also have typically, but are not limited to, a curved cross section.

The auxiliary electrode sets 113*c*, 113*d* are disposed in the housing 140 such that apogees S113*c*', S113*d*' of surfaces S113*c*, S113*d* are in interfacing relationship with each other and substantially orthogonal to the points of closest contact S113*a*' and S163*b*' of surfaces S113*a* and S163*b*, and to the points of closest contact S163*a*' and S113*b*' of surfaces S163*a* and S113*b*, respectively. Peripheral edges S113*a*", S113*b*" of surfaces S113*a*, S113*b* are in close proximity to and substantially interface peripheral edge surfaces S113*c*", S113*d*" of surfaces S113*c*, S113*d* to form corner regions C113*c*, C113*d*, respectively. Similarly, peripheral edges S113*a*", S113*b*" of surfaces S113*a*, S113*b* are in close proximity to and substantially interface peripheral edge surfaces S163*b*", S163*a*" to form corner regions C163*c*, C163*d*, respectively.

Referring to FIGS. 9, 10 and 11, one of ordinary skill in the art will recognize that corner regions C115*c*, C115*d*, C165*c*, C165*d*, C114*c*, C114*d*, C164*c*, C164*d*, C116*c*, C116*d* and C166*c*, C166*d*, respectively, are formed in the same manner. More particularly, corner regions C115, C114, C116 are formed between peripheral edge surfaces S115*a*" and S115*c*", S114*a*" and S114*c*", and S116*a*" and S116*c*", respectively, and between peripheral edge surfaces S115*b*" and S115*c*", S114*b*" and S114*c*", and S116*b*" and S116*c*", respectively.

Similarly, corner regions C165, C164 and C166 are formed between peripheral edge surfaces S115*c*" and S165*b*", S114*c*" and S164*b*", and S116*c*" and S166*b*", and between peripheral edge surfaces S115*d*" and S165*a*", S114*d*" and S164*a*", and S116*d*" and S166*a*", respectively.

In the configuration illustrated in FIG. 7, the rotatable electrode 160 is disposed in the electrode assembly 100 for the initial phase of operation which is to attract solute ions 101 and 102 to the various oppositely charged surfaces. More particularly, the electrode surfaces S113*a* and S163*b*, S114*a* and S164*b*, S163*a* and S113*b*, S164*a* and S114*b*, S115*a* and S165*b*, S116*a* and S166*b*, S165*a* and S115*b*, S166*b* and S116*a* are in interfacing relationship with each other, respectively.

Referring to FIGS. 7-11 and FIG. 17—TABLE 1, in the initial phase of charge accumulation or attraction operation, a positive terminal of a voltage source V11 is coupled to electrodes 113*a*, 114*a*, 115*a* and 116*a* and to electrodes 163*a*, 164*a*, 165*a* and 166*a*, while a negative terminal of voltage source V11 is coupled to electrodes 113*b*, 114*b*, 115*b* and 116*b* and to electrodes 163*b*, 164*b*, 165*b* and 166*b*. Therefore, substantially orthogonal electric fields $E_{115a\text{-}165b}$; $E_{165a\text{-}115b}$; $E_{113a\text{-}163b}$; $E_{163a\text{-}113b}$; $E_{114a\text{-}164b}$; $E_{164a\text{-}114b}$; and $E_{116a\text{-}166b}$; $E_{166a\text{-}116b}$ are formed between curved surfaces S115*a* and S165*b*; S165*a* and S115*b*; S113*a* and S163*b*; S163*a* and S113*b*; S114*a* and S164*b*; S164*a* and S114*b*; S116*a* and S166*b*; S166*a* and S116*b*, respectively (or between flat or non-circular surfaces S115*e* and S115*f*; S165*e* and S165*f*; S113*e* and S113*f*; S163*e* and S163*f*; S114*e* and S114*f*; S116*e* and S116*f*; S166*e* and S166*f*, respectively). Those skilled in the art will recognize how and understand that for the purposes of simplicity, the terminology for the electric fields E formed at the curved surfaces S115*a* and S165*b*; S165*a* and S115*b*; S113*a* and S163*b*; S163*a* and S113*b*; S114*a* and S164*b*; S164*a* and S114*b*; S116*a* and S166*b*; S166*a* and S116*b*, or at the flat on non-circular surfaces S115*e* and S115*f*; S165*e* and S165*f*; S113*e* and S113*f*; S163*e* and S163*f*; S114*e* and S114*f*; S116*e* and S116*f*; S166*e* and S166*f* are referred to herein solely with respect to the curved surfaces S115*a* and S165*b*; S165*a* and S115*b*; S113*a* and S163*b*; S163*a* and S113*b*; S114*a* and S164*b*; S164*a* and S114*b*; S116*a* and S166*b*; S166*a* and S116*b*, but are applicable as well to the flat or non-circular surfaces S115*e* and S115*f*; S165*e* and S165*f*; S113*e* and S113*f*; S163*e* and S163*f*; S114*e* and S114*f*; S116*e* and S116*f*; S166*e* and S166*f*.

The electrodes 113*a*, 113*b*, 163*a*, 163*b*, 114*a*, 114*b*, 164*a*, 164*b*, 115*a*, 115*b*, 165*a*, 165*b*, 116*a*, 116*b*, 166*a*, 166*b* may be made from a high surface area material such as carbon aerogel or carbon nanofoam (MarketTech International, Port Townsend, Wash., USA) or mesoporous carbon (TDA Research, Inc., Wheatbridge, Colo., USA). The voltage supplied by voltage source V11 may range from 1.2 to 1.7 volts so that the voltage is less than or equal to the barrier voltage above which electrolysis would occur. Consequently, negative ions 101 are attracted to surfaces S113*a*, S114*a*, S115*a* and S116*a* (or S113*e*, S114*e*, S115*e* and S116*e*) and to surfaces S163*a*, S164*a*, S165*a* and S166*a* (or S163*e*, S164*e*, S165*e* and S166*e*), while positive ions 102 are attracted to surfaces S113*b*, S114*b*, S115*b* and S116*b* (or S113*f*, S114*f*, S115*f* and S116*f*) and to surfaces S163*b*, S164*b*, S165*b* and S166*b* (or S163*f*, S164*f*, S165*f* and S166*f*), without electrolysis occurring.

In one embodiment, as illustrated in FIGS. 8-11, the electrode assembly 100 includes the sets 115*c*, 115*d*, 113*c*, 113*d*, 114*c*, 114*d*, 116*c*, and 116*d* of auxiliary electrodes, having surfaces S115*c*, S115*d*, S113*c*, S113*d*, S114*c*, S114*d*, S116*c*, and S116*d*, respectively. During the charge accumulation or attraction operation, the sets 115*c*, 115*d*, 113*c*, 113*d*, 114*c*, 114*d*, 116*c*, and 116*d* of auxiliary electrodes are passive.

Figure 12:
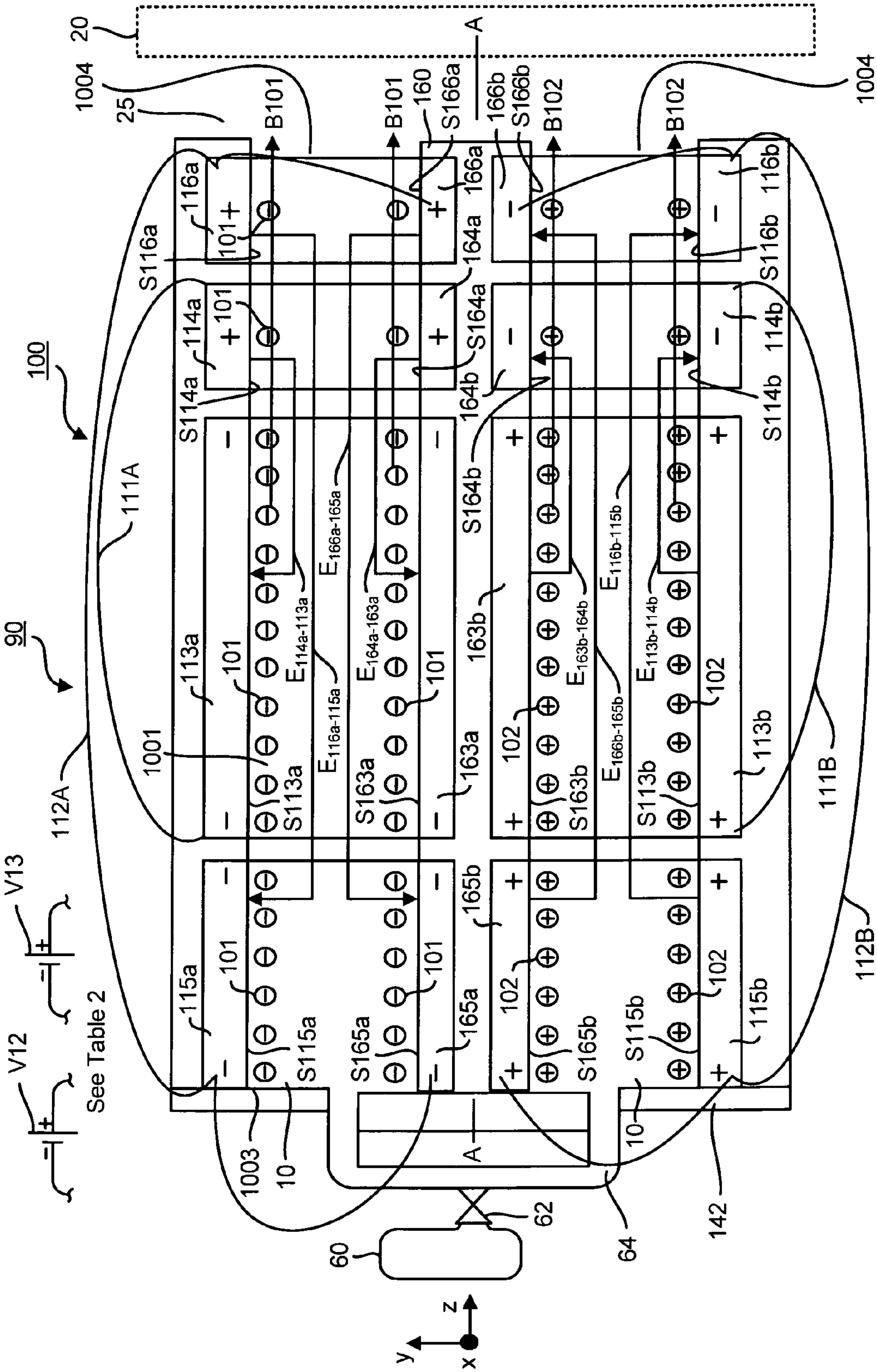
FIG. 12 illustrates the electrochemical system of FIG. 7 in a phase of operation following rotation of the rotatable electrode.

The accumulated charge of solute ions 101 and 102 may be held indefinitely as long as there is sufficient voltage available from voltage source V11. As illustrated in FIG. 12, in a second and typically intermediate phase of surface rotation operation, the movable rotatable electrode 160 may be rotated typically approximately 180 degrees around the axis A-A so that surfaces S113*a* and S163*a*; S114*a* and S164*a*; S115*a* and S165*a*; and S116*a* and S166*a*, respectively, (or surfaces S113*e* and S163*e*; S114*e* and S164*e*; S115*e* and S165*e*; and S116*e* and S165*e*, respectively) are in interfacing relationship with each other. Therefore, each of the surfaces S113*a* and S163*a*; S114*a* and S164*a*; S115*a* and SS165*a*; and S116*a* and S166*a* (or surfaces S113*e* and S163*e*; S114*e* and S164*e*; S115*e* and S165*e*; and S116*e* and S165*e*, respectively) have accumulated negatively charged ions 101 and are now in interfacing relationship, respectively, with each other.

Correspondingly, surfaces S113*b* and S163*b*; S114*b* and S164*b*; S115*b* and S165*b*; and S116*b* and S166*b*, respectively (or surfaces S113*f* and S163*f*; S114*f* and S164*f*; S115*f* and S165*f*; and S116*f* and S166*f*, respectively) are also in interfacing relationship with each other. Therefore, each of the surfaces S113*b* and S163*b*; S114*b* and S164*b*; S115*b* and S165*b*; and S116*b* and S166*b* have accumulated positively charged ions 102 and are now also in interfacing relationship with each other. The rotation occurs while the surfaces 163*a*, 164*a*, 165*a*, 166*a*, 163*b*, 164*b*, 165*b* and 166*b* are covered by the solution 10.

Since the material of the electrode surfaces S113*a*, S113*b*, S163*a*, S163*b* S114*a*, S114*b*, S164*a*, S164*b*, S115*a*, S115*b*, S165*a*, S165*b*, S116*a*, S116*b*, S166*a* and S166*b* (or surfaces S113*e*, S113*f*, S163*e*, S163*f*, S114*e*, S114*f*, S164*e*, S164*f*, S115*e*, S115*f*, S165*e*, S165*f*, S116*e*, S116*f*, S166*e* and S166*f*) has a high surface area, the discharge time to release the accumulated ions ranges from several minutes to hours, so that the rotation of the movable electrode 160 may be performed without a significant discharge of accumulated ions 101 and 102 during the rotation.

Since the surfaces S165*a* and S165*b*; S163*a* and S163*b*; S164*a* and S164*b*; and S166*a* and S166*b*, respectively (or surfaces S165*e* and S165*f*; S163*e* and S163*f*; S164*e* and S164*f*; and S166*e* and S166*f*, respectively) are symmetrically disposed on the movable electrode 160, the corner regions C165, C163, C164 and C166 are formed now between peripheral edge surfaces S115*c*" and S165*a*", S114*c*" and S164*a*", and S116*c*" and S166*a*", and between peripheral edge surfaces S115*d*" and S165*b*", S114*d*" and S164*b*", and S116*d*" and S166*b*", respectively.

Following the second or intermediate mode of operation of electrode rotation, the process enters into a discharge and ion acceleration mode of operation. Referring to FIG. 12 and FIG. 17—TABLE 2, a negative terminal of a second voltage source V12 is coupled to electrodes 113*a* and 163*a* and to 114*b* and 164*b*. Similarly, a positive terminal of second voltage source V12 is coupled to electrodes 113*b* and 163*b* and to 114*a* and 164*a*. Voltage source V12 applies sufficient potential to form substantially transverse electric fields $E_{114a-113a}$ and $E_{164a-163a}$ between electrode surfaces S114*a* and S113*a* and between electrode surfaces S164*a* and S163*a*, respectively (or between surfaces S114*e* and S113*e* and between electrode surfaces S164*e* and S163*e*, respectively). The substantially transverse electric fields $E_{114a-113a}$ and $E_{164a-163a}$ are substantially parallel to electrode surfaces S114*a* and S113*a* and to electrode surfaces S164*a* and S163*a*, respectively (or to electrode surfaces S114*a* and S113*a* and to electrode surfaces S164*a* and S163*a*, respectively).

Similarly, substantially transverse electric fields $E_{113b-114b}$ and $E_{163b-164b}$ are formed between electrode surfaces S113*b* and S114*b* and between electrode surfaces S163*b* and S164*b*, respectively (or between electrode surfaces S113*f* and S114*f* and between electrode surfaces S163*f* and S164*f*, respectively). The substantially transverse electric fields $E_{113b-114b}$ and $E_{163b-164b}$ are substantially parallel to electrode surfaces S113*b* and S114*b* and to electrode surfaces S163*b* and S164*b*, respectively (or to electrode surfaces S113*f* and S114*f* and to electrode surfaces S163*f* and S164*f*, respectively).

In one embodiment, a negative terminal of a third voltage source V13 is coupled to electrodes 115*a* and 165*a* and to 116*b* and 166*b*. Similarly, a positive terminal of third voltage source V13 is coupled to electrodes 115*b* and 165*b* and to 116*a* and 166*a*. Again, voltage source V13 applies sufficient potential to form substantially transverse electric fields $E_{116a-115a}$ and $E_{166a-165a}$ between electrode surfaces S116*a* and S115*a* and between electrode surfaces S166*a* and S165*a*, respectively (or between electrode surfaces S116*e* and S115*e* and between electrode surfaces S166*e* and S165*e*, respectively). Similarly, substantially transverse electric fields $E_{115b-116b}$ and $E_{165b-166b}$ are formed between electrode surfaces S115*b* and S116*b* and between S165*b* and S166*b*, respectively (or between electrode surfaces S115*b* and S116*b* and between S165*b* and S166*b*, respectively).

During the discharge and ion acceleration mode of operation, the previously passive sets 115*c*, 115*d*, 113*c*, 113*d*, 114*c*, 114*d*, 116*c*, and 116*d* of auxiliary electrodes may now be activated in an analogous manner by coupling a negative terminal of voltage source V12 to electrode sets 113*c* and 114*d* and a negative terminal of voltage source V13 to sets 115*c* and 116*d*.

Similarly, a positive terminal of voltage source V12 is coupled to electrode sets 113*d* and 114*c* and a positive terminal of voltage source V13 is coupled to 115*d* and 116*c*. Again, voltage sources V12 and V13 again apply sufficient potential to form substantially transverse electric fields $E_{114c-113c}$ and $E_{116c-115c}$ between electrode surfaces S114*c* and S113*c* and between S116*c* and S115*c*, respectively. The substantially transverse electric fields $E_{114c-113c}$ and $E_{116c-115c}$ are substantially parallel to the electrode surfaces S114*c* and S113*c* and to electrode surfaces S116*c* and S115*c*, respectively. Similarly, substantially transverse electric fields $E_{113d-114d}$ and $E_{115d-116d}$ are formed between electrode surfaces S113*d* and S114*d* and between S115*d* and S116*d*, respectively. The substantially transverse electric fields $E_{113d-114d}$ and $E_{115d-116d}$ are substantially parallel to the electrode surfaces S113*d* and S114*d* and to the electrode surfaces S115*d* and S116*d*, respectively.

As a result, the negatively charged solute ions 101 which have accumulated at the surfaces S113*a* and S163*a*; S114*a* and S164*a*; S115*a* and S165*a*; and S116*a* and S166*a* (or the surfaces S113*e* and S163*e*; S114*e* and S164*e*; S115*e* and S165*e*; and S116*e* and S166*e*) are now repelled from major electrode surfaces S113*a* and S163*a* and S115*a* and S165*a* (or from major electrode surfaces S113*e* and S163*e* and S115*e* and S165*e*) and directed towards minor electrode surfaces S114*a* and S164*a* and S116*a* and S166*a*, respectively (or towards minor electrode surfaces S114*e* and S164*e* and S116*e* and S166*e*, respectively), and simultaneously are compressed in the y-direction by the substantially transverse and parallel electric fields $E_{116a-115a}$ and $E_{166a-165a}$. In addition, the substantially transverse and parallel electric fields $E_{114c-113c}$ and $E_{116c-115c}$ minimize lateral dispersion in the x-direction of the negative solute ions 101 to the corner regions C113*c* and C163*c*, and C115*c* and C165*c*.

Therefore, the negatively charged solute ions 101 may be gradually repelled from the major electrode surfaces S113*a* and S163*a*, and S115*a* and S165*a* (or from the major electrode surfaces S113*e* and S163*e*, and S115*e* and S165*e*), and are caused to be guided by the electric fields $E_{116a-115a}$ and $E_{166a-165a}$, and $E_{114c-113c}$ and $E_{116c-115c}$, to decrease the substantially linearly aligned Coulomb forces of repulsion between the negatively charged ions 101 by accelerating as a charged ion beam B101 in a trajectory primarily in the z-direction towards the minor electrode surfaces S114*a* and S164*a*, and S116*a* and S166*a*, respectively, (or towards the minor electrode surfaces S114*e* and S164*e*, and S116*e* and S166*e*, respectively) which are positively charged.

Correspondingly, the positively charged solute ions 102 which have accumulated at the surfaces S113*b* and S163*b*; S114*b* and S164*b*; S115*b* and S165*b*; and S116*b* and S166*b* (or at the surfaces S113*f* and S163*f*; S114*f* and S164*f*; S115*f* and S165*f*; and S116*f* and S166*f*) are now repelled from major electrode surfaces S113*b* and S163*b* and S115*b* and S165*b* (or from major electrode surfaces S113*f* and S163*f* and S115*f* and S165*f*) and directed towards minor electrode surfaces S114*b* and S164*b* and S116*b* and S166*b*, respectively (or towards minor electrode surfaces S114*f* and S164*f* and S116*f* and S166*f*, respectively), and simultaneously are compressed in the y-direction by the substantially transverse and parallel electric fields $E_{115b-116b}$ and $E_{165b-166b}$. In addition, the substantially transverse and parallel electric fields $E_{113d-114d}$ and $E_{115d-116d}$ minimize lateral dispersion in the x-direction of the positive solute ions 102 to the corner regions C113*d* and C163*d*, and C115*d* and C165*d*.

Therefore, the positively charged solute ions 102 may be gradually repelled from the major electrode surfaces S113*b* and S163*b*, and S115*b* and S165*b* (or from the major electrode surfaces S113*f* and S163*f*, and S115*f* and S165*f*), and are caused to be guided by the electric fields $E_{115b-116b}$ and $E_{165b-166b}$, and $E_{113d-114d}$ and $E_{115d-116d}$, to decrease the substantially linearly aligned Coulomb forces of repulsion between the positively charged ions 102 by accelerating as a charged ion beam B102 in a trajectory primarily transversely in the z-direction towards the minor electrode surfaces S114*b* and S164*b*, and S116*b* and S166*b* (or towards the minor electrode surfaces S114*f* and S164*f*, and S116*f* and S166*f*) which are negatively charged.

To compensate for the greater distance between electrode surfaces S115*a* and S116*a*; S165*a* and S166*a*; S165*b* and S166*b*; and S115*b* and S116*b* (or between electrode surfaces S115*e* and S116*e*; S165*e* and S166*e*; S165*f* and S166*f*; and S115*f* and S116*f*), the potential of voltage source V13 is greater than the potential of voltage source V12.

The beams B101 and B102 may be directed downstream to a region 25 outside of the electrode assembly 100 to impact a target 20.

Figure 13:
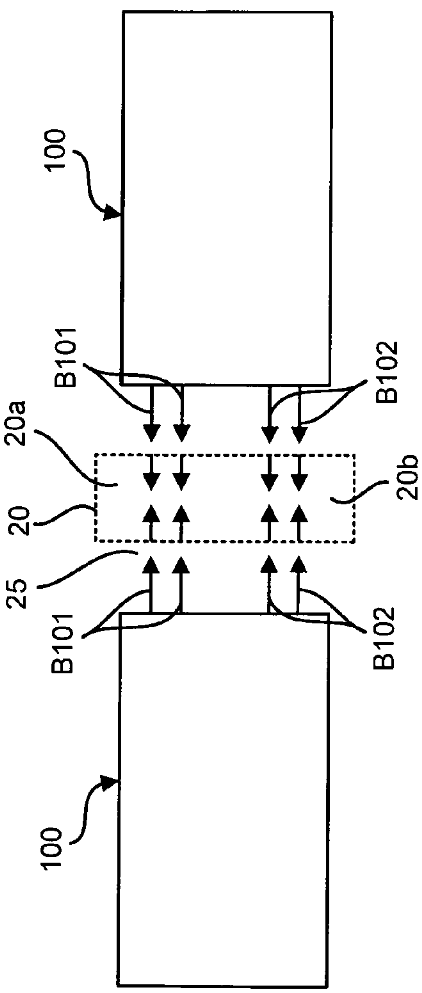
FIG. 13 illustrates two or more of the electrode assemblies according to the present disclosure that are positioned in a mirror image opposing configuration.

In one embodiment, as illustrated in FIG. 13, two or more of the electrode assemblies 100 are positioned in a mirror image opposing configuration so that multiple beams B101 intersect target 20 generally at a first portion 20*a* while multiple beams B102 intersect target 20 generally at a second portion 20*b*. The target 20 may be omitted and the multiple beams B101 may be caused to intersect each other, as may multiple beams B102 be caused to intersect each other, also.

Figure 14:
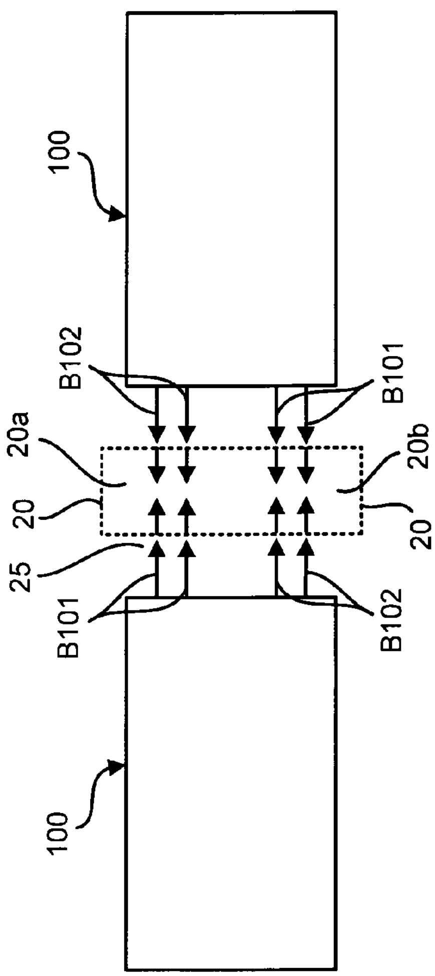
FIG. 14 illustrates two or more of the electrode assemblies according to the present disclosure that are positioned in an inverse opposing configuration.

In one embodiment, as illustrated in FIG. 14, two or more of the electrode assemblies 100 are positioned in an inverse opposing configuration so that beams B101 and B102 each intersect target 20 generally at first portion 20*a* while multiple beams B102 and B101 each intersect target 20 generally at a second portion 20*b*. The target 20 may be omitted and the multiple beams B101 and B102 may be caused to intersect each other.

Figure 15:
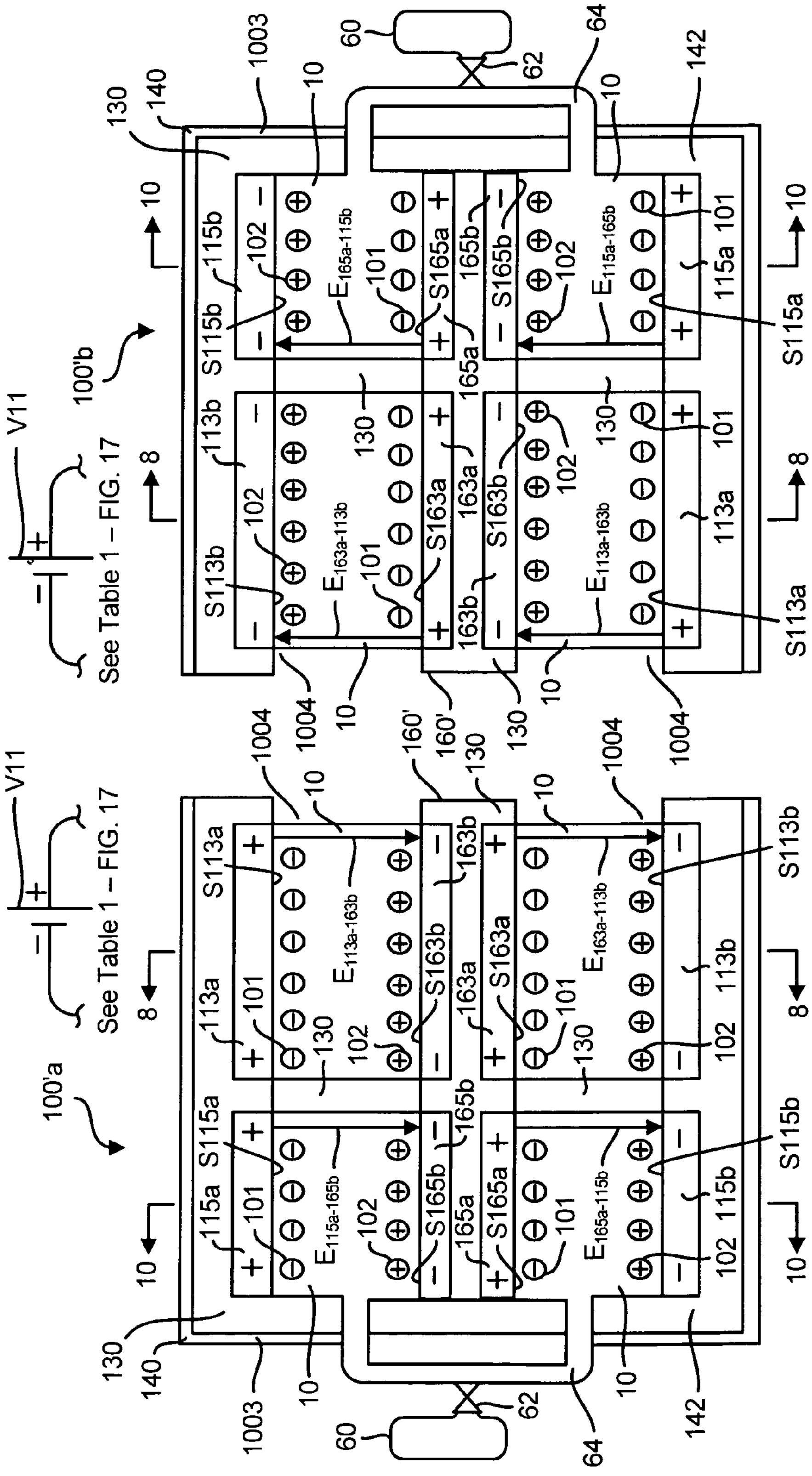
FIG. 15 illustrates one embodiment of an electrochemical system according to the present disclosure having electrode assemblies that are positioned in an inverse opposing configuration.

In one embodiment, as illustrated in FIG. 15, the electrode assembly 100' is a modification of electrode assembly 100. More particularly, and as also illustrated in previous cross-sectional views 8 and 10, electrode assembly 100' differs from electrode assembly 100 in that the minor primary electrodes 114*a*, 114*b*, 164*a*, 164*b* and 116*a*, 116*b*, 166*a*, 166*b* are omitted leaving only major primary electrodes 113*a*, 113*b*, 163*a*, 163*b* and 115*a*, 115*b*, 165*a*, 165*b*.

Similarly, the minor auxiliary electrodes 114*c*, 114*d* and 116*c*, 116*d* are omitted leaving only the major auxiliary electrodes 113*c*, 113*d* and 115*c*, 115*d*. Electrode assembly 100' also includes a movable rotatable electrode 160' which differs, therefore, from rotatable electrode 160 in that the minor electrodes 163*a*, 163*b* and 165*a*, 165*b* are omitted.

First electrode assembly 100'*a* is identical to second electrode assembly 100'*b*. Second electrode assembly 100'*b* is positioned in an inverse opposing position with respect to first electrode assembly 100'*a*. During the first or charge accumulation phase of operation and during the second or intermediate phase of operation of electrode rotation, the electrode assembly 100' is operated in the same manner as electrode assembly 100 with the exception of the omission of the electrodes mentioned above. See FIG. 17, TABLE 1 for first voltage source V11.

Figure 16:
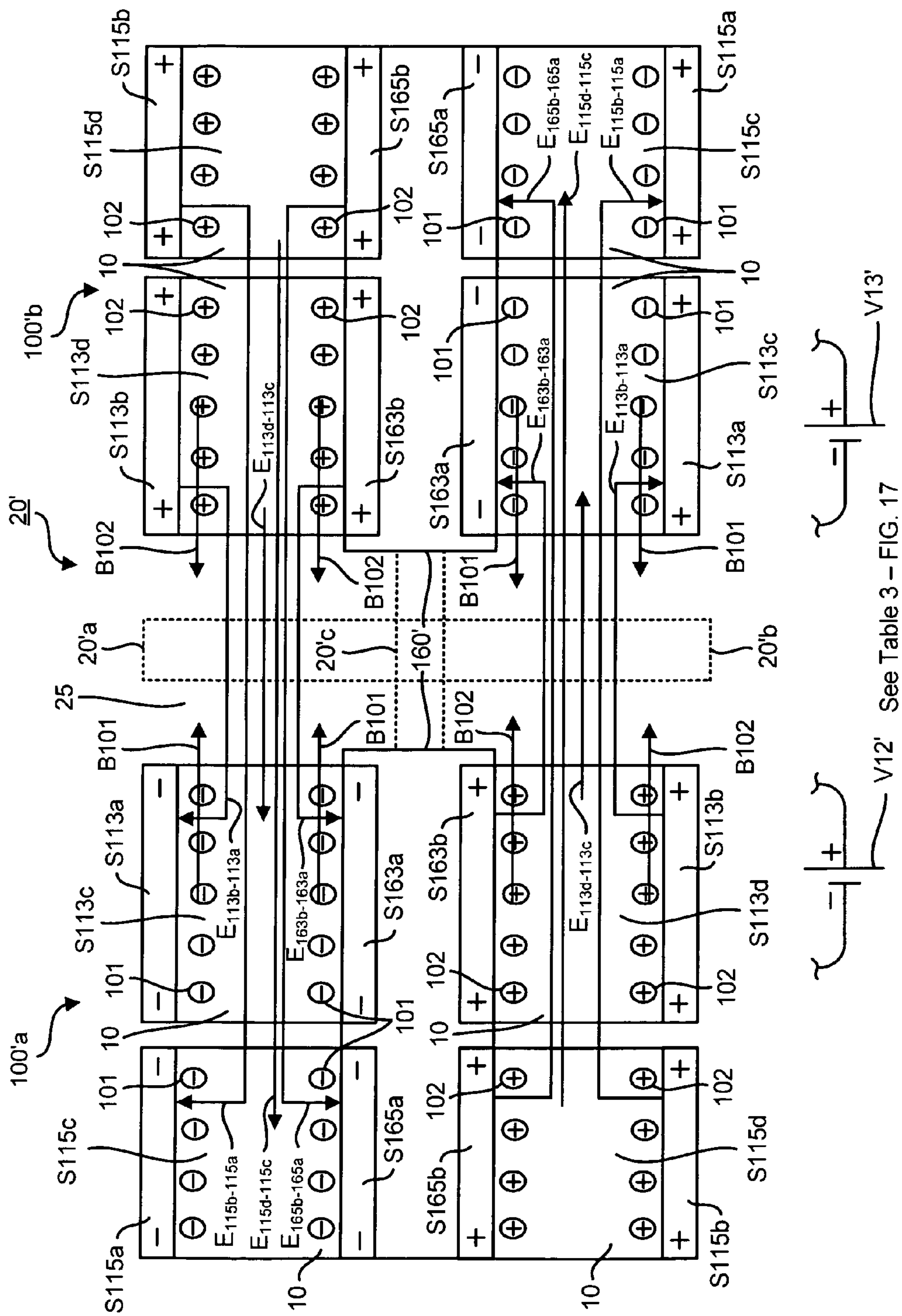
FIG. 16 illustrates a simplified version of the electrode assemblies of FIG. 15 during a discharge and ion acceleration phase of operation.

FIG. 16 is a simplified version of electrode assemblies 100'*a* and 100'*b* during the discharge and ion acceleration phase of operation. More particularly, for simplicity, only the electrode surfaces S113*a*, S113*b*, S115*a* and S115*b* (or electrode surfaces S113*e*, S113*f*, S115*e* and S115*f*) are shown together with the movable rotatable electrodes 160' and their electrode surfaces S163*a*, S163*b*, S165*a* and S165*b* (or electrode surfaces S163*e*, S163*f*, S165*e* and S165*f*). A negative terminal of second voltage source V12' is coupled to electrodes 113*a* and 163*a* of electrode assembly 100'*a* and also to electrodes 113*a* and 163*a* of electrode assembly 100'*b*. In one embodiment, a negative terminal of third voltage source V13' is coupled to electrodes 115*a* and 165*a* of electrode assembly 100'*a* and also to electrodes 115*a* and 165*a* of electrode assembly 100'*b*. Those skilled in the art will recognize and understand that also for simplicity, the substantially flat or non-circular electrode surfaces S113*e* and 5113*f*; S115*e* andS115*f*; S163*e* and 5163*f*; and S165*e* and S165*f* may be represented by the electrode surfaces S113*a* and S113*b*; S115*a* and S115*b*; S163*a* and S163*b*; and S165*a* and S165*b*, respectively, so that the substantially flat or non-circular electrode surfaces S113*e* and S113*f*; S115*e* andS115*f*; S163*e* and S163*f*; and S165*e* and S165*f* are not explicitly shown in FIG. 16 but are referred to herein in parentheses.

Similarly, a positive terminal of second voltage source V12' is coupled to electrodes 113*b* and 163*b* of electrode assembly 100'*a* and also to electrodes 113*b* and 163*b* of electrode assembly 100'*b*. In one embodiment, a positive terminal of third voltage source V13' is coupled to electrodes 115*b* and 165*b* of electrode assembly 100'*a* and also to electrodes 115*b* and 165*b* of electrode assembly 100'*b*.

As a result, referring to FIG. 17, TABLE 3, first and second electrode assemblies 100'*a* and 100'*b* are cross-connected. Thereby, substantially transverse electric fields $E_{113b-113a}$ and $E_{163b-163a}$ are formed between electrode surfaces S113*b* and S113*a* and between electrode surfaces 5163*b* and S163*a*, respectively (or between electrode surfaces S113*f* and S113*e* and between electrode surfaces S163*b* and S163*a*, respectively). The substantially transverse electric fields $E_{113b-113a}$ and $E_{163b-165a}$ are substantially parallel to electrode surfaces S113*b* and S113*a* and to electrode surfaces S163*b* and S163*a*, respectively (or to electrode surfaces S113*f* and S113*e* and to electrode surfaces S163*f* and S163*e*, respectively).

Similarly, substantially transverse electric fields $E_{115b-115a}$ and $E_{165b-165a}$ are formed between electrode surfaces S115*b* and S115*a* and between electrode surfaces S165*b* and S165*a*, respectively (or between electrode surfaces S115*f* and S115*e* and between electrode surfaces S165*f* and S165*e*, respectively). The substantially transverse electric fields $E_{115b-115a}$ and $E_{165b-165a}$ are substantially parallel to electrode surfaces S115*b* and S115*a* and to electrode surfaces S165*b* and S165*a*, respectively (or to electrode surfaces S115*f* and S115*e* and to electrode surfaces S165*f* and S165*e*, respectively).

During the discharge and ion acceleration mode of operation, the previously passive sets 113*c*, 113*d* and 115*c*, 115*d* of auxiliary electrodes may now be activated in an analogous manner by coupling a negative terminal of voltage source V12' to electrode sets 113*c* and a negative terminal of voltage source V13' to 115*c*. Similarly, a positive terminal of voltage source V12' is coupled to electrode set 113$d$ and a positive terminal of voltage source V13' is couple to electrode set 115$d$.

Voltage sources V12' and V13' provide a potential sufficient to form substantially transverse electric fields $E_{113d\text{-}113e}$ and $E_{115a\text{-}115c}$ between electrode surface S113$d$ of electrode assembly 100'$a$ and electrode surface S113$c$ of electrode assembly 100'$b$ and between electrode surface S115$d$ of electrode assembly 100'$a$ and electrode surface S115$c$ of electrode assembly 100'$b$, respectively. The substantially transverse electric fields $E_{113d\text{-}113c}$ and $E_{115a\text{-}115c}$ are substantially parallel to the electrode surfaces S113$d$ and S113$c$ and to electrode surfaces S115$d$ and S115$c$, respectively.

As a result, the negatively charged solute ions 101 which have accumulated at the surfaces S113$a$ and S163$a$, and surfaces S115$a$ and S165$a$ (or the surfaces S113$e$ and S163$e$, and S115$e$ and S165$e$), of electrode assemblies 100'$a$ and 100'$b$ are now repelled from electrode surfaces S113$a$ and S163$a$ and S115$a$ and S165$a$ (or the surfaces S113$e$ and S163$e$, and S115$e$ and S165$e$) of both electrode assembly 100'$a$ and electrode assembly 100'$b$ and directed towards electrode surfaces S113$b$ and S163$b$, and electrode surfaces S115$b$ and S165$b$, respectively (or towards electrode surfaces S113$b$ and S163$b$, and electrode surfaces S115$b$ and S165$b$, respectively), of both electrode assembly 100'$a$ and electrode assembly 100'$b$, and simultaneously are compressed in the y-direction by the substantially transverse and parallel electric fields $E_{115b\text{-}115a}$, $E_{113b\text{-}113a}$, $E_{163b\text{-}165a}$, and $E_{165b\text{-}165a}$ cross-connecting electrode assemblies 100'$a$ and 100'$b$. In addition, the substantially transverse and parallel electric fields $E_{113d\text{-}113c}$, and $E_{115d\text{-}115c}$ minimize lateral dispersion in the x-direction of the negative solute ions 101 to the corner regions C113$c$ and C163$c$, and C115$c$ and C165$c$.

Therefore, the negatively charged solute ions 101 may be gradually repelled from the electrode surfaces S113$a$ and S163$a$, and electrode surfaces S115$a$ and S165$a$ (or from the electrode surfaces S113$e$ and S163$e$, and electrode surfaces S115$e$ and S165$e$), and are caused to be guided by the electric fields $E_{115b\text{-}115a}$ and $E_{165b\text{-}165a}$ cross-connecting the first and second electrode assemblies 100'$a$ and 100'$b$ to decrease the substantially linearly aligned Coulomb forces of repulsion between the negatively charged ions 101 by accelerating as a charged ion beam B101 in a trajectory primarily in the z-direction towards the electrode surfaces S113$b$ and S163$b$; and S115$b$ and S165$b$, respectively (or towards the electrode surfaces S113$b$ and S163$b$; and S115$b$ and S165$b$, respectively), which are positively charged.

Correspondingly, the positively charged solute ions 102 which have accumulated at the surfaces S113$b$ and S163$b$, and surfaces S115$b$ and S165$b$ (or at the surfaces S113$f$ and S163$f$, and surfaces S115$f$ and S165$f$) are now repelled from electrode surfaces S113$b$ and S163$b$ and S115$b$ and S165$b$ (or from electrode surfaces S113$f$ and S163$f$ and S115$f$ and S165$f$) of both electrode assembly 100'$a$ and electrode assembly 100'$b$ and directed towards electrode surfaces S113$a$ and S163$a$ and S115$a$ and S165$a$, respectively (or towards electrode surfaces S113$e$ and S163$e$ and S115$e$ and S165$e$, respectively), of both electrode assembly 100'$a$ and electrode assembly 100'$b$ and simultaneously are compressed in the y-direction by the substantially transverse and parallel electric fields $E_{115b\text{-}115a}$ and $E_{165b\text{-}165a}$. In addition, the substantially transverse and parallel electric fields $E_{113d\text{-}113c}$ and $E_{115d\text{-}115c}$ minimize lateral dispersion in the x-direction of the positive solute ions 102 to the corner regions C113$d$ and C163$d$, and C115$d$ and C165$d$.

Therefore, the positively charged solute ions 102 may be gradually repelled from the major electrode surfaces S113$b$ and S163$b$, and S115$b$ and S165$b$ (or major electrode surfaces S113$f$ and S163$f$, and S115$f$ and S165$f$), and are caused to be guided by the electric fields $E_{115b\text{-}115a}$ and $E_{165b\text{-}165a}$, cross-connecting first and second electrode assemblies 100'$a$ and 100'$b$, to decrease the substantially linearly aligned Coulomb forces of repulsion between the positively charged ions 102 by accelerating as a charged ion beam B102 in a trajectory primarily in the z-direction towards the electrode surfaces S113$b$ and S163$b$, and S115$b$ and S165$b$ (or towards the electrode surfaces S113$f$ and S163$f$, and S115$f$ and S165$f$) which are negatively charged.

A target 20' may be disposed in the region 25 between the electrode assemblies 100'$a$ and 100'$b$. The target 20' may include first and second electrically conductive portions 20'$a$ and 20'$b$ which are separated by an electrically insulating portion 20'$c$. The electrically insulating portion 20'$c$ is disposed to provide electrical separation between the electrode surfaces S115$a$, S165$a$, S113$a$, S163$a$ (or between the electrode surfaces S115$e$, S165$e$, S113$e$, S163$e$), S115$c$, S113$c$ of electrode assembly 100'$a$, surfaces S115$b$, S165$b$, S113$b$, S163$b$ (or surfaces S115$f$, S165$f$, S113$f$, S163$f$), S115$d$, S113$d$ of electrode assembly 100'$b$; and surfaces S115$b$, S165$b$, S113$b$, S163$b$ (or surfaces S115$f$, S165$f$, S113$f$, S163$f$), S115$d$, S113$d$ of electrode assembly 100'$a$, surfaces S115$a$, S165$a$, S113$a$, S163$a$ (or surfaces S115$e$, S165$e$, S113$e$, S163$e$), S115$c$, S113$c$ of electrode assembly 100'$b$.

Those skilled in the art will recognize that additional sets of electrodes analogous to 115$a$, 165$a$, 165$b$, 115$b$, 115$c$, 115$d$ and 116$a$, 166$a$, 166$b$, 116$b$, 116$c$, 116$d$ may be incorporated into electrode assembly 100'. The embodiments are not limited in this context.

FIGS. 18-21 illustrate one embodiment of the present disclosure of an electrode assembly 100C which is also particularly suitable for an electrode assembly utilizing high surface area materials such as, for example but not limited to, carbon aerogel or carbon nanofoam or mesoporous carbon previously mentioned. More particularly, electrode assembly 100C is disposed in a cylindrical vessel 11 having a centerline axis of rotation D-D. The cylindrical vessel 11 is configured to have a cylindrical wall 14 and a closed end portion or base portion 16 which is in contact with or contiguous with the cylindrical wall 14. The electrode assembly 100C may include substantially flat planar primarily semi-circular disc-like first and second lower electrodes 125$a$ and 125$b$ which are encased in an insulating dielectric material 130 so as to expose substantially flat surfaces S125$a$ and S125$b$.

In a first configuration of the electrode assembly 100C, the first and second lower electrodes 125$a$ and 125$b$ are disposed on the base portion 184 within the cylindrical vessel 11 such that the exposed flat surfaces S125$a$ and S125$b$ are substantially co-planar. A portion of the dielectric material 130 which is opposite to the exposed flat surfaces S125$a$ and S125$b$ may be interposed between the first and second lower electrodes 125$a$ and 125$b$ and the base portion 16.

The electrode assembly 100C also includes substantially flat planar primarily semi-circular disc-like first and second upper electrodes 135$a$ and 135$b$ which are also encased in insulating dielectric material 130 so as to expose substantially flat surfaces S135$a$ and S135$b$. Initially, the first upper electrode 135$a$ is disposed within the cylindrical vessel 11 such that the surface S135$a$ is substantially parallel to and opposing surface S125$a$ of the first lower electrode 125$a$. Similarly, the second upper electrode 135$b$ is disposed within the cylindrical vessel 11 such that the surface S135$b$ is substantially parallel to and opposing surface S125$b$ of the second lower electrode 125$b$. The cylindrical solution is filled with solution 10 to a level sufficient to cover the first and second upper electrode surfaces S135*a* and S135*b*.

Figure 18:
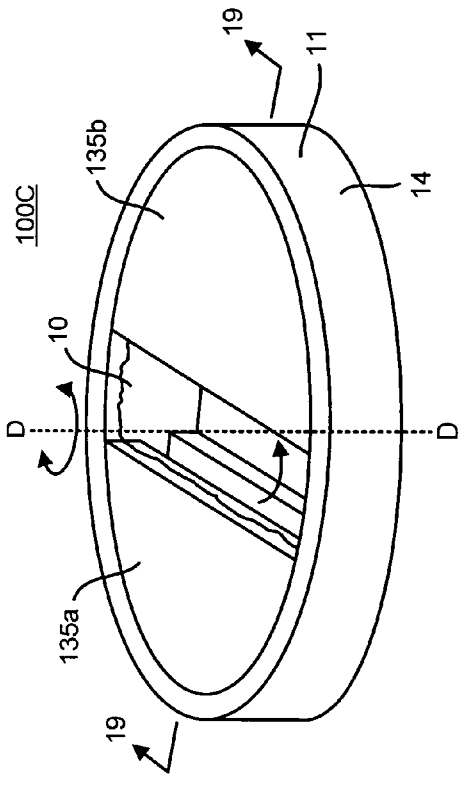
FIG. 18 illustrates a perspective view of an electrode assembly according to the present disclosure that is disposed in a vessel configured to enable rotation of at least a portion of the electrode assembly.
Figure 20:
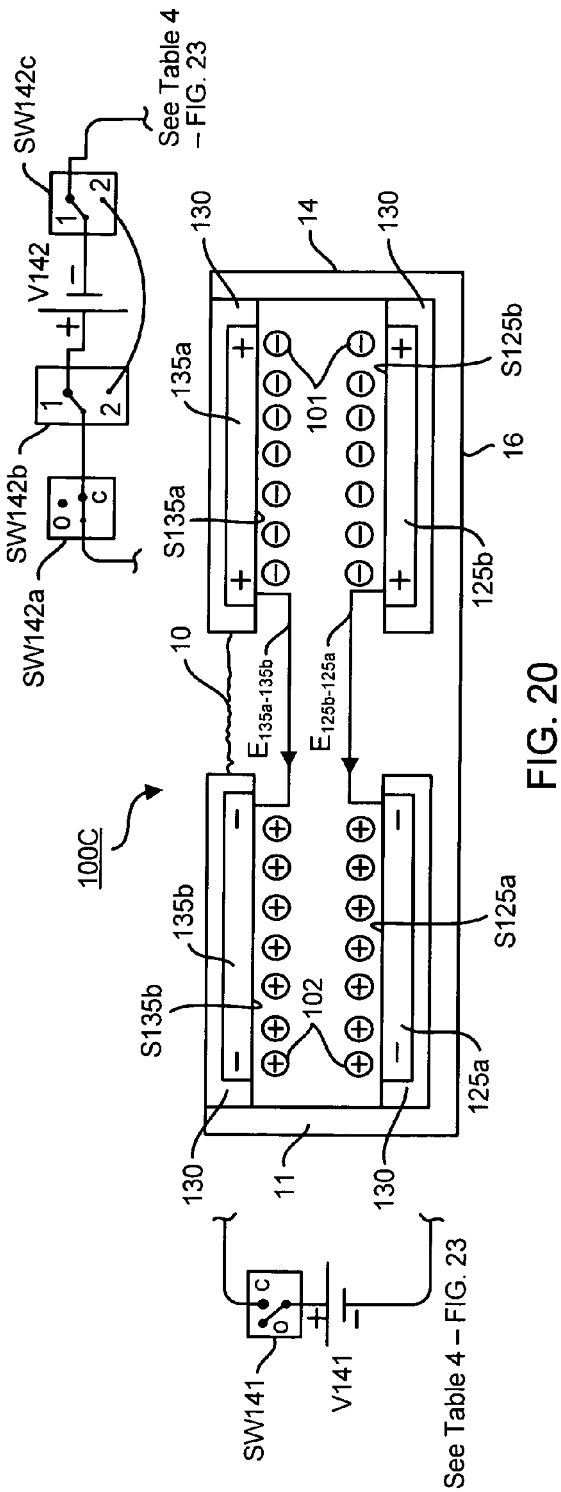
FIG. 20 illustrates a cross-sectional view of the electrode assembly and vessel of FIG. 18 in a second mode of operation.

As best illustrated in FIGS. 18 and 20, in a second configuration of the electrode assembly 100C, the first and second disc-like lower electrodes 125*a* and 125*b*, respectively, are maintained stationary while the first and second disc-like upper electrodes 135*a* and 135*b* are rotated simultaneously around the axis of rotation D-D either counterclockwise as shown or clockwise within the cylindrical vessel 11 such that the surface S135*a* of the first upper electrode 135*a* is now opposing surface S125*b* of the second lower electrode 125*b* while the surface S135*b* of the second upper electrode 135*b* is now opposing surface S125*a* of the first lower electrode 125*a*. Therefore, the first and second lower electrodes 125*a* and 125*b* are stationary while the first and second upper electrodes 135*a* and 135*b*, respectively, are mobile or rotatable around the axis of rotation D-D.

Figure 19:
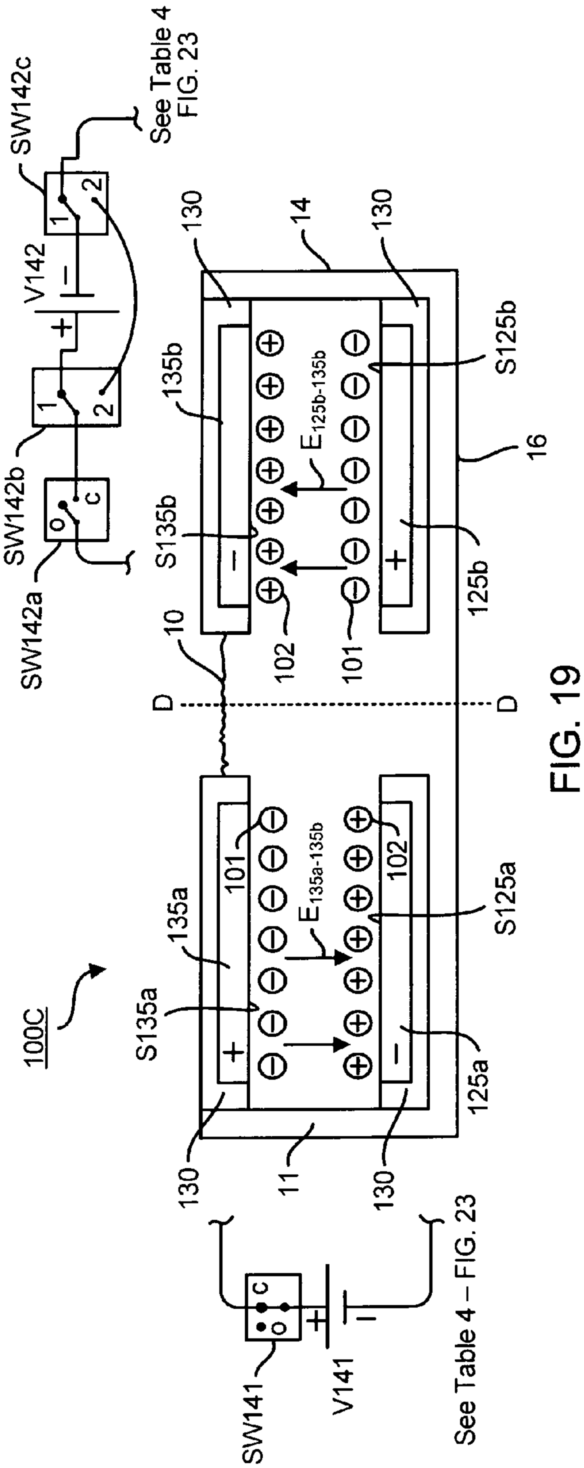
FIG. 19 illustrates a cross-sectional view of the electrode assembly and vessel of FIG. 18 in a first mode of operation.

Referring to FIG. 19 and FIG. 23—TABLE 4, in a first mode of operation, a positive terminal of a first voltage source V141 is coupled through an initially closed switch SW 141 to first upper electrode 135*a* and to second lower electrode 125*b*. A negative terminal of first voltage source V141 is coupled to first lower electrode 125*a* and to second upper electrode 135*b*. Therefore, substantially orthogonal electric fields $E_{135a-125a}$ and $E_{125b-135b}$ are formed between surfaces S135*a* and S125*a* and between S125*b* and S135*b*, respectively.

The electrodes 125*a*, 125*b*, 135*a*, 135*b* may be made from high surface area materials such as, but not limited to, the carbon aerogel or carbon nanofoam or mesoporous carbon materials previously mentioned. The voltage supplied by first voltage source V 141 may range from about 1.2 to about 1.7 volts so that the voltage is less than or equal to the barrier voltage above which electrolysis would occur. Consequently, negative ions 101 are attracted to surfaces S135*a* and S125*b* while positive ions 102 are attracted to surfaces S125*a* and S135*b*, without electrolysis occurring.

Referring to FIG. 20 and FIG. 23—TABLE 4, in a second mode of operation, prior to rotation of the first and second upper electrodes 135*a* and 135*b*, a positive terminal of a second voltage source V142 is coupled, through an initially open switch SW142*a* and through a two-way switch SW142*b* in a first position (POS.1), to first upper electrode 135*a* and to second lower electrode 125*b*. A negative terminal of second voltage source V142 is coupled, through a two-way switch SW142*c* in a first position (POS.1), to first lower electrode 125*a* and to second upper electrode 135*b*. Switches SW142*b* and SW142*c* are configured to enable reversal of polarity to the electrodes 125*a*, 125*b*, 135*a* and 135*b* when switches SW142*b* and SW142*c* are transferred to their second position (POS. 2).

Switch SW141 is then opened and switch SW142*a* is then closed, thereby providing voltage from second voltage source V142, while first and second upper electrodes 135*a* and 135*b* are rotated around axis D-D to the second configuration of electrode assembly 100C, as illustrated in FIG. 20, such that the surface S135*a* of the first upper electrode 135*a* is now opposing surface S125*b* of the second lower electrode 125*b* while the surface S135*b* of the second upper electrode 135*b* is now opposing surface S125*a* of the first lower electrode 125*a*.

Voltage source V142 applies sufficient potential to form substantially transverse electric fields $E_{135a-135b}$ and $E_{125b-125a}$ between electrode surfaces S135*a* and S135*b* and between S125*b* and S125*a*, respectively. The substantially transverse electric fields $E_{135a-135b}$ and $E_{125b-125a}$ are substantially parallel to the electrode surfaces S135*a* and S135*b* and to electrode surfaces S125*b* and S125*a*, respectively.

Since the polarity of the electrode surfaces S125*a*, S125*b*, S135*a* and S135*b* is unchanged from the first mode of operation, the solute ions 101 and 102 remain substantially attracted to their respective electrode surfaces S125*b* and S135*a*, and S125*a* and S135*b*. When utilizing a high surface area material such as carbon aerogel or carbon nanofoam or mesoporous carbon, since the discharge time of the solute ions 101 and 102 from the electrode surfaces S125*a*, S125*b*, S135*a* and S135*b* is comparatively long, in the matter of minutes if not hours, in some instances the rotation of the first and second upper electrodes 135*a* and 135*b* may be accomplished without first closing switch SW142*a*.

Figure 21:
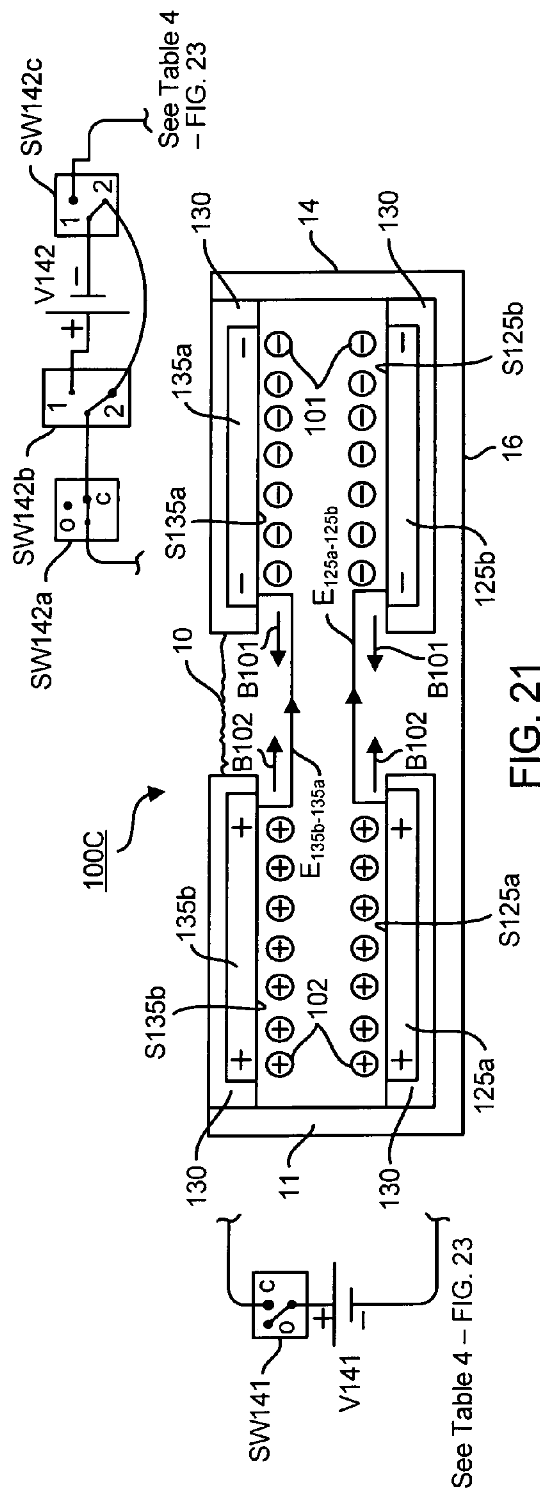
FIG. 21 illustrates a cross-sectional view of the electrode assembly and vessel of FIG. 18 in a third mode of operation.

Referring to FIG. 21 and FIG. 23—TABLE 4, in the third mode of operation, the switches SW142*b* and SW142*c* are transferred to their second position (POS. 2) to enable reversal of polarity of the particular electrodes 125*a*, 125*b*, 135*a* and 135*b*. More particularly, substantially transverse electric fields $E_{135b-135a}$ and $E_{125b-125a}$ are formed between electrode surfaces S135*a* and S135*b* and between S125*b* and S125*a*, respectively. The substantially transverse electric fields $E_{135a-135b}$ and $E_{125b-125a}$ are substantially parallel to the electrode surfaces S135*a* and S135*b* and to electrode surfaces S125*b* and S125*a*, respectively. Since the polarity of the electrode surfaces S125*a* and S135*b* has now reversed from negative to positive, the positive solute ions 102 are now repelled from electrode surfaces S125*a* and S135*b* and compressed in the y-direction by the substantially transverse and parallel electric fields $E_{135b-135a}$ and $E_{125b-125a}$ cross-connecting electrode surfaces S135*a* and S135*b* and S125*b* and S125*a*, respectively.

Simultaneously, since the polarity of the electrode surfaces S125*b* and S135*a* has now reversed from positive to negative, the negative solute ions 101 are now repelled from electrode surfaces S125*b* and S135*a* and compressed in the y-direction by the substantially transverse and parallel electric fields $E_{135b-135a}$ and $E_{125b-125a}$ cross-connecting electrode surfaces S135*a* and S135*b* and S125*b* and S125*a*, respectively.

Therefore, the negatively charged solute ions 101 may be gradually repelled from the electrode surfaces S125*b* and S135*a*, and are caused to be guided by the electric fields $E_{135b-135a}$ and $E_{125b-125a}$ to decrease the substantially linearly aligned Coulomb forces of repulsion between the negatively charged ions 101 by accelerating as a charged ion beam B101 in a trajectory primarily in the z-direction towards the electrode surfaces S125*a* and S135*b* which are positively charged.

Correspondingly, the positively charged solute ions 102 are now repelled from electrode surfaces S125*a* and S135*b*, and are caused to be guided by the electric fields $E_{135b-135a}$ and $E_{125b-125a}$ to decrease the substantially linearly aligned Coulomb forces of repulsion between the positively charged ions 102 by accelerating as a charged ion beam B102 in a trajectory primarily in the z-direction towards the electrode surfaces S125*b* and S135*a* which are negatively charged.

It is envisioned that, thereby, the beams B101 and B102 provide kinetic energy which exceeds the amount of energy input to the process for charge accumulation and charge discharge and creation of the transverse electric fields.

Figure 22:
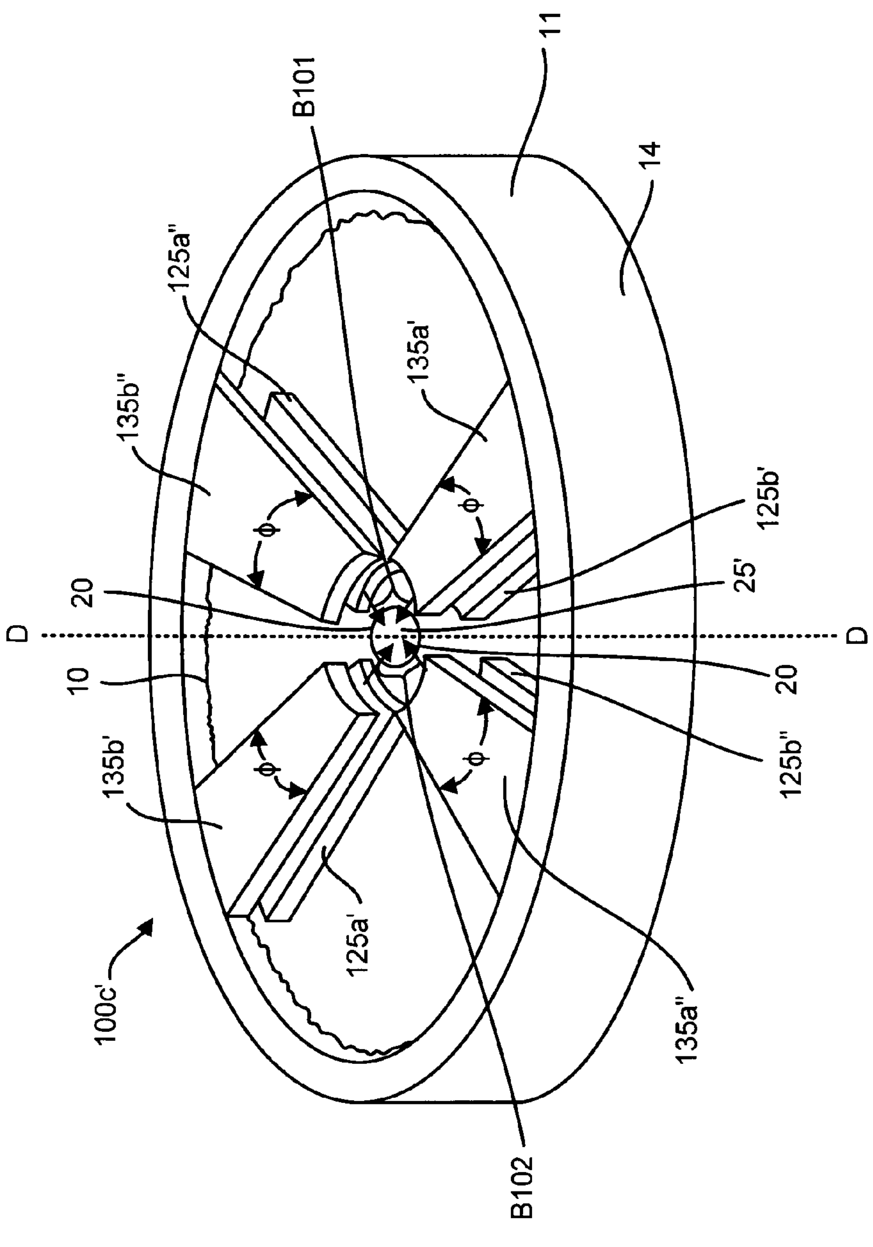
FIG. 22 illustrates a perspective view of an alternate embodiment of the electrode assembly of FIG. 18.

Referring to FIG. 22, in a variation of the embodiment of electrode assembly 100C, electrode assembly 100C' is substantially identical to electrode assembly 100C with the exception that electrode assembly 100C' is subdivided into a multiplicity of sets of first and second upper and lower electrodes. More particularly, electrode assembly 100C' includes at least a first set of stationary first and second lower electrodes 125*a*' and 125*b*' and of first and second upper electrodes 135*a*' and 135*b*' which are substantially parallel to the first and second lower electrodes 125*a*' and 125*b*', respectively. The first and second upper electrodes 135*a*' and 135*b*' are also rotatable around the axis of rotation D-D while the first and second lower electrodes 125*a*' and 125*b*' are stationary, respectively.

The electrode assembly 100C' may also include a second set of stationary first and second lower electrodes 125*a*" and 125*b*" and of movable rotatable first and second upper electrodes 135*a*" and 135*b*", respectively. Each of the electrodes 125*a*', 125*b*', 125*a*", 125*b*", 135*a*', 135*b*', 135*a*" and 135*b*" spans an angle ϕ which is less than 180 degrees, and also each is illustrated in the third mode of operation, following rotation of approximately 180 degrees around axis D-D. For simplicity, the voltage supplies have been omitted but the configuration and operation of electrode assembly 100C' is essentially identical to the electrode assembly 100C, with the exception that the spanning of the angle ϕ allows the beams B101 and B102 to generally intersect in a central cylindrical region 25' between the at least first and second sets of electrodes 125*a*', 125*b*', 125*a*", 125*b*", 135*a*', 135*b*', 135*a*" and 135*b*" to impact target 20.

Referring to FIGS. 24-27, and also to FIGS. 8-11, there is disclosed a variation of the electrode assembly 100 previously discussed with respect to FIGS. 7-14. Electrode assembly 100D includes again the first and second stationary major electrodes 113*a* and 113*b* and the stationary minor electrodes 114*a* and 114*b*, respectively, disposed in a housing 140' that may be made from dielectric material 130. In addition, electrode assembly 100D also includes a movable rotatable electrode 160" which includes at least the first and second major electrodes 163*a* and 163*b* and the first and second minor electrodes 164*a* and 164*b*, respectively. Those of ordinary skill in the art will recognize that, and understand how, the electrode assembly 100D may also include at least the third and fourth stationary major electrodes 115*a* and 115*b* and the stationary minor electrodes 116 and 116*b*, respectively. However, for the sake of simplicity, the third and fourth stationary major electrodes 115*a* and 115*b* and the stationary minor electrodes 116 and 116*b*, respectively, are omitted from FIGS. 24-27 and from the following discussion.

More particularly, when the electrodes 113*a*, 113*b*, 114*a*, 114*b*, 163*a*, 163*b*, 164*a* and 164*b* are provided with the substantially flat or non-circular surfaces such as S113*e*, S113*f*, S114*e*, S114*f*, S163*e*, S163*f*, S164*e* and S164*f*, respectively, the electrodes 113*a*, 113*b*, 114*a*, 114*b*, 163*a*, 163*b*, 164*a* and 164*b* include corresponding movable partitions P113*e*, P113*f*, P114*e*, P114*f*, P163*e*, P163*f*, P164*e* and P164*f*, respectively, that are disposed in partition assemblies that may be formed in an E-shaped configuration and as a portion of a cylinder wall. More particularly, with respect to major and minor stationary electrodes 113*a* and 114*a*, respectively, first and second mirror image partition assemblies P27*a*' and P27*a*", respectively, each are formed of dielectric material 130 in an E-shape configuration curved arcuately as a portion of a cylinder wall and in which are disposed in the major and minor open portions of the E-shape the major movable partition P113*e* and the minor movable partition P114*e*, respectively. The dielectric material 130 extends around the edges of the major partitions P113*e* and the minor partitions P114*e* except for lengthwise major edges 53*e* and lengthwise minor edges 54*e*, respectively. The lengthwise major edges 53*e* and lengthwise minor edges 54*e* and edge 130*e* of the dielectric material 130 therebetween form overall interior edges 56*a*' and 56*a*" of the first and second partition assemblies P27*a*' and P27*a*", respectively.

Similarly, with respect to major and minor stationary electrodes 113*f* and 114*f*, respectively, first and second mirror image partition assemblies P27*b*' and P27*b*", respectively, each are formed of dielectric material 130 also in an E-shape configuration curved arcuately as a portion of a cylinder wall and in which are disposed in the major and minor open portions of the E-shape the major movable partition P113*f* and the minor movable partition P114*f*, respectively. The dielectric material 130 extends around the edges of the major partitions P113*f* and the minor partitions P114*f* except for lengthwise major edges 53*f* and lengthwise minor edges 54*f*, respectively. The lengthwise major edges 53*f* and lengthwise minor edges 54*f* and edge 130*f* of the dielectric material 130 therebetween form overall interior edges 56*b*' and 56*b*" of the first and second partition assemblies P27*b*' and P27*b*", respectively.

With respect to rotatable electrode 160" and major and minor electrodes 163*b* and 164*b*, respectively, first and second mirror image partition assemblies P28*b*' and P28*b*", respectively, each are formed of dielectric material 130 also in an E-shape configuration curved arcuately as a portion of a cylinder wall and in which are disposed in the major and minor open portions of the E-shape the major movable partition P163*f* and the minor movable partition P164*f*, respectively. The dielectric material 130 extends around the edges of the major partitions P163*f* and the minor partitions P164*f* except for lengthwise major edges 63*f* and lengthwise minor edges 64*f*, respectively. The lengthwise major edges 63*f* and lengthwise minor edges 64*f* and edge 130*f* of the dielectric material 130 therebetween form overall interior edges 66*b*' and 66*b*" of the first and second partition assemblies P28*b*' and P28*b*", respectively.

Also with respect to rotatable electrode 160" and major and minor electrodes 163*a* and 164*a*, respectively, first and second mirror image partition assemblies P28*b*' and P28*b*", respectively, each are formed of dielectric material 130 also in an E-shape configuration curved arcuately as a portion of a cylinder wall and in which are disposed in the major and minor open portions of the E-shape the major movable partition P163*f* and the minor movable partition P164*f*, respectively. The dielectric material 130 extends around the edges of the major partitions P163*f* and the minor partitions P164*f* except for lengthwise major edges 63*f* and lengthwise minor edges 64*f*, respectively. The lengthwise major edges 63*f* and lengthwise minor edges 64*f* and edge 130*f* of the dielectric material 130 therebetween form overall interior edges 66*b*' and 66*b*" of the first and second partition assemblies P28*b*' and P28*b*", respectively.

The first and second movable partition assemblies P27*a*' and P27*a*" are disposed within the housing 140' and with respect to the stationary electrodes 113*a* and 114*a* to extend along the peripheral edge surfaces S113*a*" and S114*a*" of the electrodes 113*a* and 114*a*, respectively, and such that the overall interior edges 56*a*' and 56*a*" are disposed to align the major partition P113*e* with the major electrode 113*a* and to align the minor partition P114*e* with the minor electrode 114*a*. In one embodiment, the movable partitions P113*e* and P114*e* are configured so as not to be in direct contact with the electrodes 113*a* and 114*a* or their surfaces S113*e* and S114*e*, respectively Similarly, the first and second movable partition assemblies P27*b*' and P27*b*" are disposed within the housing 140' and with respect to the stationary electrodes 113*b* and 114*b* to extend along the peripheral edge surfaces S113*b*" and S114*b*" of the electrodes 113*b* and 114*b*, respectively, and such that the overall interior edges 56*b*' and 56*b*" are disposed to align the major partition P113*f* with the major electrode 113*b* and to align the minor partition P114*f* with the minor electrode 114*b*.

In one embodiment, the movable partitions P113*f* and P114*f* are configured so as not to be in direct contact with the electrodes 113*b* and 114*b* or their surfaces S113*f* and S114*f*, respectively The first and second movable partition assemblies P28*b*' and P28*b*" are disposed within the rotatable electrode 160" to extend along the peripheral edge surfaces S163*b*" and S164*b*" of the electrodes 163*b* and 164*b*, respectively, and such that the overall interior edges 66*b*' and 66*b*" are disposed to align the major partition P163*f* with the major electrode 163*b* and to align the minor partition P164*f* with the minor electrode 164*b*. In one embodiment, the movable partitions P163*f* and P164*f* are configured so as not to be in direct contact with the electrodes 163*b* and 164*b* or their surfaces S163*f* and S164*f*, respectively Similarly, the first and second movable partition assemblies P28*a*' and P28*b*" are disposed within the rotatable electrode 160" to extend along the peripheral edge surfaces S163*b*" and S164*b*" of the electrodes 163*b* and 164*b*, respectively, and such that the overall interior edges 66*b*' and 66*b*" are disposed to align the major partition P163*f* with the major electrode 163*b* and to align the minor partition P164*f* with the minor electrode 164*b*. In one embodiment, the movable partitions P163*f* and P164*f* are configured so as not to be in direct contact with the electrodes 163*b* and 164*b* or their surfaces S163*f* and S164*f*, respectively Although the electrode surfaces S113*e*, S113*f*, S163*e*, S163*f*, S114*e*, S114*f*, S164*e*, and S164*f* of electrode assembly 100D may be made from electrically conductive materials which are characterized by a high surface area, e.g., by a surface area of 100 square meters per gram or greater as discussed above for materials such as carbon aerogel or carbon nanofoam and mesoporous carbon, electrode assembly 100D is also particularly suitable for charge accumulation by repetitive pulsing while the electrode surfaces S113*e*, S113*f*, S163*e*, S163*f*, S114*e*, S114*f*, S164*e*, and S164*f* are made from electrically conductive materials which are not characterized by a high surface area. More particularly, in one embodiment, the electrode surfaces S113*e*, S113*f*, S163*e*, S163*f*, S114*e*, S114*f*, S164*e*, and S164*f* may be made from corrosion resistant metals or metal alloys such as gold, silver, platinum, bronze, brass, stainless steel or other similar material. Similarly, the partitions P113*e*, P113*f*, P163*e*, P163*f*, P114*e*, P114*f*, P164*e* and P164*f* are electrically conductive and may be made from the same materials as the corresponding electrode surfaces S113*e*, S113*f*, S163*e*, S163*f*, S114*e*, S114*f*, S164*e*, and S164*f*, as just mentioned.

Referring to FIG. 28, TABLE 5 for voltage source V11, and to FIGS. 24-27, during the charge accumulation mode of operation, the first partition assemblies P27*a*', P28*b*', P28*a*' and P27*b*' and the second partition assemblies P27*a*", P28*b*", P28*a*" and P27*b*" are in a retracted, i.e., open (as indicated by the "O" in parentheses in FIGS. 25-26, and subsequently hereafter), position and are configured to substantially expose the flat or non-circular surfaces S113*e*, S114*e*, S163*f*, S164*f*, S163*e*, S164*e*, S113*f* and S114*f*, respectively, to allow the formation of the substantially orthogonal electric fields $E_{113a\text{-}163b}$, $E_{163a\text{-}113b}$, $E_{114a\text{-}164b}$, $E_{164a\text{-}114b}$ between the electrodes 113*a* and 163*b*; 163*a* and 113*b*; 114*a* and 164*b*; and 164*a* and 114*b*, respectively. During the charge accumulation mode of operation, the voltage source V11 may apply the electric fields $E_{113a\text{-}163b}$, $E_{163a\text{-}113b}$, $E_{114a\text{-}164b}$, $E_{164b\text{-}114b}$ either in a single pulse or in repetitive pulses with a voltage ranging from 1 volt below the barrier voltage to a voltage sufficient to cause the Wien effect of shedding the ionic atmospheres around the solute ions. Therefore, referring to FIG. 6, multiple layers "n" of charged solute ions 101 and 102 are attracted to the respective electrode surfaces as disclosed in FIG. 28, TABLE 5.

Figure 25:
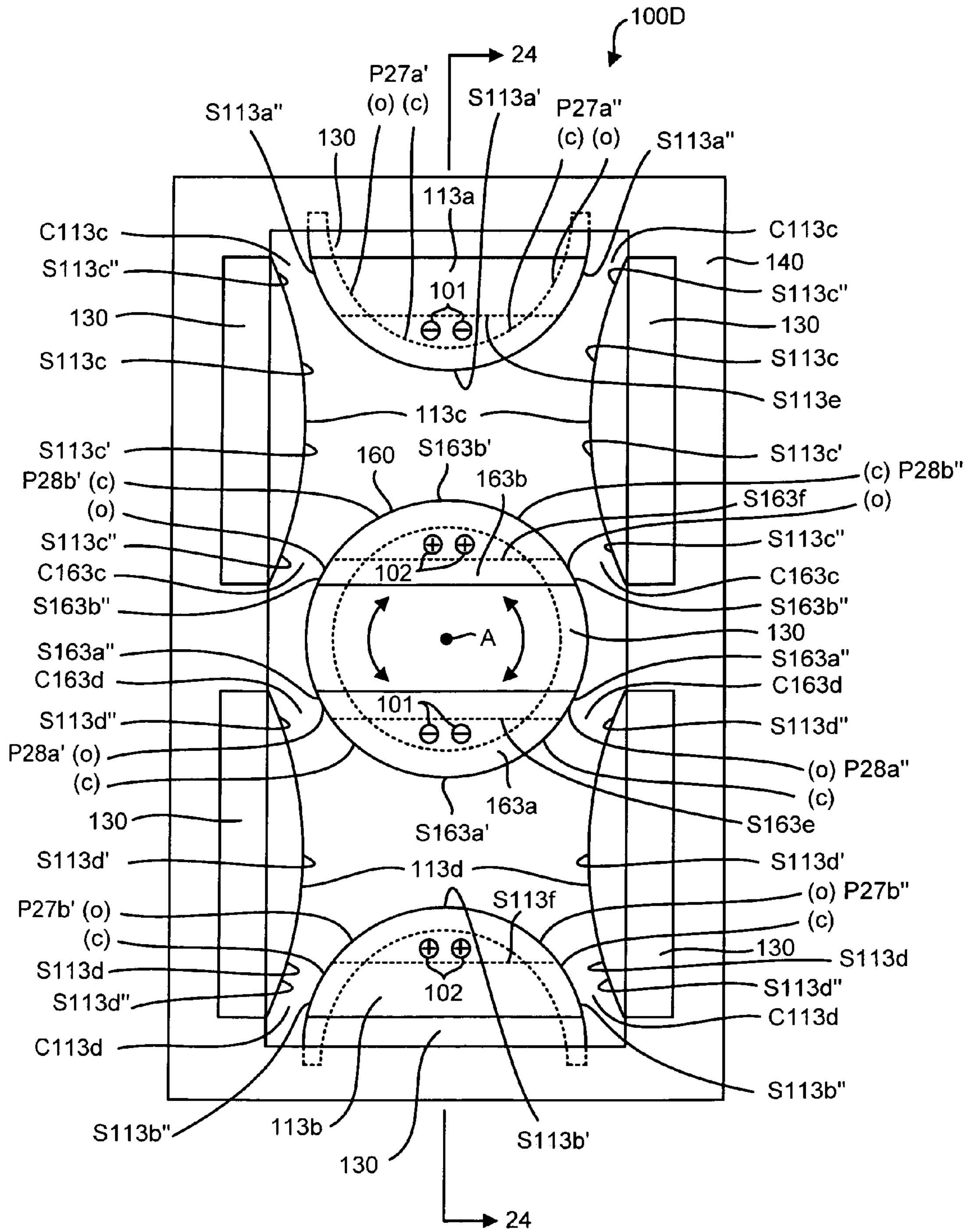
FIG. 25 illustrates a cross-sectional view of the electrode assembly of FIG. 24.
Figure 26:
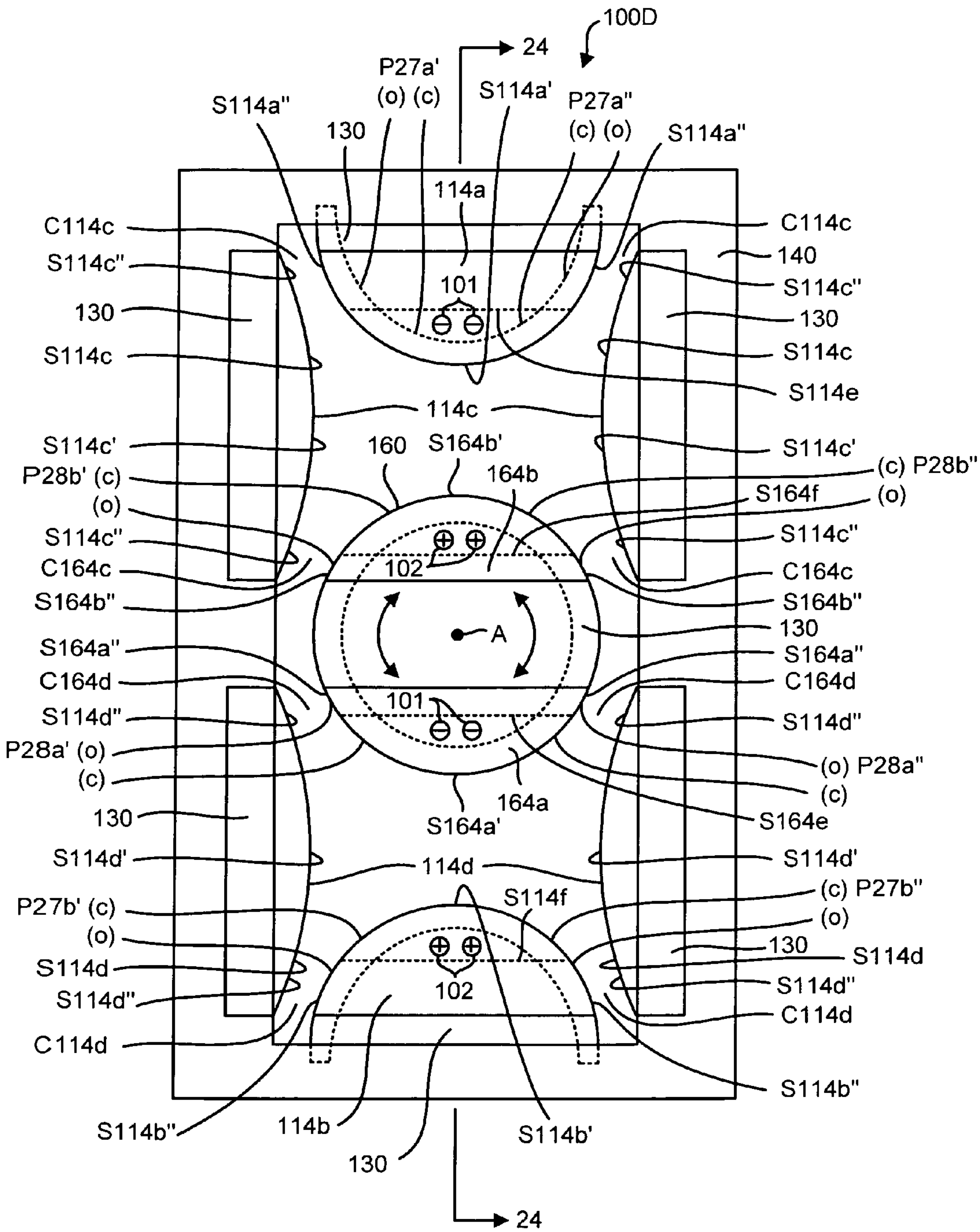
FIG. 26 illustrates another cross-sectional view of the electrode assembly of FIG. 24.

Referring to FIGS. 25-26, following the charge accumulation, the overall interior edges 56*a*' and 56*a*" of the first and second partition assemblies P27*a*' and P27*a*", respectively, are extended to meet at a position substantially equivalent to the apogees S113*a*' and S114*a*', i.e., to a closed position (as indicated by the letter "C" in parentheses in FIGS. 25-26, and subsequently hereafter), overall interior edges 66*b*' and 66*b*" of the first and second partition assemblies P28*b*' and P28*b*", respectively are extended to meet at a position substantially equivalent to the apogees S163*b*' and S164*b*', i.e., to a closed position, overall interior edges 66*a*' and 66*a*" of the first and second partition assemblies P28*a*' and P28*a*", respectively, are extended to meet at a position substantially equivalent to the apogees S163*a*' and S164*a*', i.e., to a closed position, and overall interior edges 56*b*' and 56*b*" of the first and second partition assemblies P27*b*' and P27*b*", respectively, are extended to a position substantially equivalent to the apogees S113*b*' and S114*b*', respectively, thereby substantially isolating the solute ions 101 and 102 at the respective electrode surfaces to which they have been attracted.

Referring to FIGS. 24-27, once the solute ions 101 and 102 are isolated, the movable rotatable electrode 160" may now be rotated substantially 180 degrees around the centerline longitudinal axis of rotation A-A in the same manner as previously described without adverse fluid shear effects that would disperse the accumulated solute ions 101 and 102. Prior to the rotation, in a manner analogous to the charge accumulation mode of operation of FIG. 7, a positive terminal of voltage source V11 is now coupled to electrode surface S113*e*, to partition P163*f*, to electrode surface S163*e*, and to partition P113*f*. A negative terminal of voltage source V11 is now coupled to partition P113*e*, to electrode surface S163*f*, to partition S163*e*, and to electrode surface S113*f*.

During the rotation, the voltage from voltage source V11 is maintained to the electrode surfaces and partitions as described above, and with the partition assemblies P27*a*', P27*a*", P28*b*', P28*b*", P28*a*', P28*a*", P27*b*' and P27*b*" extended, i.e., closed, to isolate and cover the solute ions 101 and 102, the adverse effects of fluid shear in dispersing the solute ions 101 and 102 at the electrode surfaces S113*e*, S113*f*, S114*e*, S114*f*, S163*e*, S163*f*, S164*e* and S164*f* is significantly reduced, until as illustrated analogously in FIG. 11, the negative solute ions 101 are disposed in the first volume 1001 and the positive solute ions 102 are disposed in the second volume 1002 (analogous to electrode assembly 100).

Following the rotation, voltage from voltage source V11 may be terminated when it is desired to enter into the charge acceleration mode of operation. The charge acceleration mode of operation is essentially identical to that previously described for electrode assembly 100 as shown in FIG. 17—TABLE 3.

Figure 27:
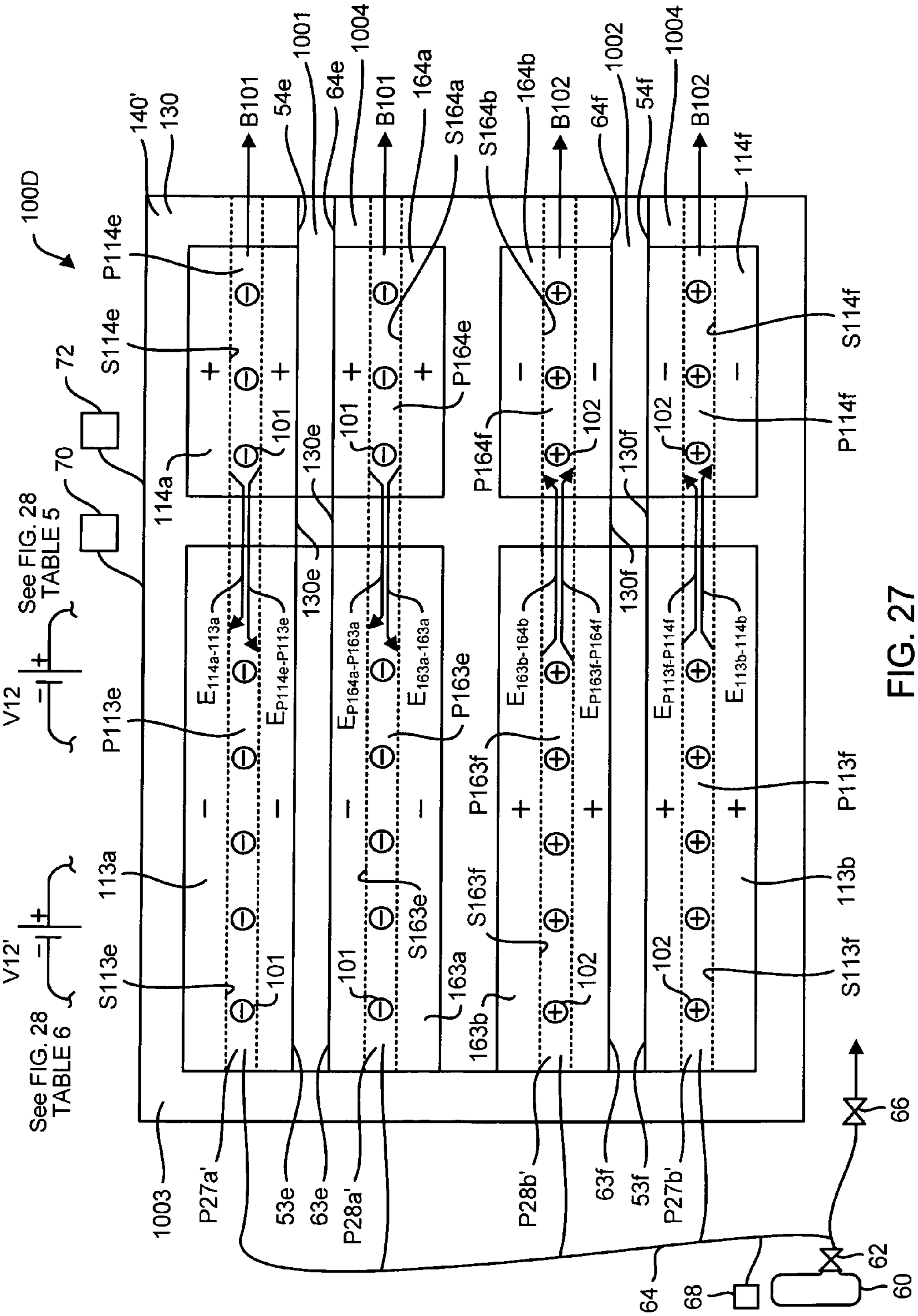
FIG. 27 illustrates the electrode assembly of FIG. 24 in a second mode of operation.

In one embodiment, referring to FIG. 27 and FIG. 28—TABLE 5 during the charge acceleration mode of operation, voltage from voltage source V12 is provided to the partitions P113*e*, P113*f*, P114*e*, P114*f*, P163*e*, P163*f*, P164*e* and P164*f* at the same polarity as is applied to the corresponding electrode surfaces S113*e*, S113*f*, S114*e*, S114*f*, S163*e*, S163*f*, S164*e* and S164*f*, respectively. Therefore, electric field $E_{P114e\text{-}P113e}$ is formed between partitions P114*e* and P113*e*, in addition to electric field $E_{114a\text{-}113a}$ is being formed between surfaces S114*e* and S113*e*.

Similarly, electric field $E_{P164e\text{-}P163e}$ is formed between partitions P164*e* and P163*e*, in addition to electric field $E_{164a\text{-}163a}$ being formed between surfaces S164*e* and S163*e*.

Electric field $E_{P163f-P164f}$ is formed between partitions P163*f* and P164*f*, in addition to electric field $E_{163b-164b}$ being formed between surfaces S163*f* and S164*f*. Finally, electric field $E_{P113f-P114f}$ is formed between partitions P113*f* and P114*f*, in addition to electric field $E_{113b-114b}$ being formed between surfaces S113*f* and S114*f*.

As a result, the negatively charged solute ions 101 which have accumulated at the surfaces S113*e* and S163*e*; and S114*e* and S164*e*, and are substantially isolated by the partitions P113*e* and P163*e*; and P114*e* and P164*e*, respectively, are now repelled from major electrode surfaces S113*e* and S163*e* and from major partitions P113*e* and P163*e*, and directed towards minor electrode surfaces S114*e* and S164*e* and towards minor partitions P114*e* and P164*e*, respectively, and simultaneously are compressed in the y-direction by the substantially transverse and parallel electric fields $E_{114a-113a}$ and $E_{164a-163a}$, so that the partitions P113*e* and P163*e*; and P114*e* and P164*e* now contribute to the capability of compressing the solute ions 101. In addition, the substantially transverse and parallel electric field $E_{114c-113c}$ is no longer necessary to minimize lateral dispersion in the x-direction of the negative solute ions 101 to the corner regions C113*c* and C163*c*.

Therefore, the negatively charged solute ions 101 may be repelled from the major electrode surfaces S113*e* and S163*e* and from the partitions P113*e* and P163*e* and are caused to be guided by the electric fields $E_{114a-113a}$ and $E_{P114e-P113e}$ and $E_{164a-163a}$ and $E_{P164e-P163e}$, respectively, to decrease the substantially linearly aligned Coulomb forces of repulsion between the negatively charged ions 101 by accelerating as a charged ion beam B101 in a trajectory primarily in the z-direction towards the minor electrode surfaces S114*e* and S164*e* and the partitions P114*e* and P164*e*, respectively, which are positively charged.

Correspondingly, the positively charged solute ions 102 which have accumulated at the surfaces S113*f* and S163*f*; S114*f* and S164*f* are now repelled from major electrode surfaces S113*f* and S163*f* and from major partitions P113*f* and P163*f* and directed towards minor electrode surfaces S114*f* and S164*f* and towards minor partitions P114*f* and P164*f*, respectively, and simultaneously are compressed in the y-direction by the substantially transverse and parallel electric fields $E_{113b-114b}$ and $E_{P113f-P114f}$ and $E_{163b-164b}$ and $E_{P163f-P164f}$. Again, the substantially transverse and parallel electric field $E_{113d-114d}$ is no longer necessary to minimize lateral dispersion in the x-direction of the positive solute ions 102 to the corner regions C113*d* and C163*d*.

Therefore, the positively charged solute ions 102 may be repelled from the major electrode surfaces S113*f* and S163*f* and major partitions P113*f* and P163*f*, and are caused to be guided by the electric fields $E_{113b-114b}$ and $E_{P113f-P114f}$ and $E_{163b-164b}$ and $E_{P163f-P164f}$, respectively, to decrease the substantially linearly aligned Coulomb forces of repulsion between the positively charged ions 102 by accelerating as a charged ion beam B102 in a trajectory primarily transversely in the z-direction towards the minor electrode surfaces S114*f* and S164*f* and the partitions P114*f* and P164*f*, respectively, which are negatively charged.

In one embodiment, during the charge acceleration mode, those skilled in the art will recognize that, and understand how, another voltage source V12' that is independent of voltage source V12, and that provides a voltage level output that differs from the voltage level output of voltage source V12, may be provided to power the partitions P113, P113*f*, P163*e*, P163*f*, P114*e*, P114*f*, P164*e* and P164*f* independently while voltage source V12 provides power to the electrodes 113*a*, 113*b*, 163*a*, 163*b*, 114*a*, 114*b*, 164*a* and 164*b*, with voltage source V12' being electrically coupled to the respective partitions in a manner analogous to the manner in which voltage source V12 is coupled to the respective electrodes. The provision of independent voltage source V12' enables separate control, positioning and adjustment of the substantially transverse and parallel electric fields originating from the electrodes and the partitions in the formation of the beams B101 and B102.

In one embodiment, following the charge accumulation mode and the rotation of the electrode 160" but prior to the charge acceleration mode, the partition assemblies P27*a*', P27*a*" and P28*a*', P28*a*" may be reopened to expose the negative solute ions 101 at the electrode surface S113*e* to the negative solute ions 101 at the electrode surface S163*e* during the charge acceleration phase in a similar manner as occurring during the charge acceleration phase of electrode assembly 100 as described for FIG. 12 above.

Similarly, also following the charge accumulation mode and the rotation of the electrode 160" but prior to the charge acceleration mode, the partition assemblies P27*b*', P27*b*" and P28*b*', P28*b*" may be reopened to expose the positive solute ions 102 at the electrode surface S114*f* to the positive solute 102 at the electrode surface S164*f* during the charge acceleration phase of electrode assembly 100 as also described for FIG. 12 above.

Those of ordinary skill in the art will recognize that, and understand how, prior to, or during, the reopening of the partition assemblies P27*a*', P27*a*", P28*a*', P28*a*", P27*b*', P27*b*", P28*b*' and P28*b*", the solution 10 may be drained from the interior regions 1001 and 1002 of the electrode assembly 100D via a drain valve 66 connected to the common supply conduit or pipe 64 after which time the electrode assembly 100D is maintained under a vacuum by a vacuum source 68 and the electrode assembly 100D subjected to a vibration source 70 during the charge acceleration mode of operation, in conjunction with the coupling to the voltage source V12, and alternatively also to voltage source V12', to dislodge the solute ions 101 and 102 from the particular electrode surfaces to which the solute ions 101 and 102 had been attracted so that the acceleration of the solute ions 101 and 102 may be performed under at least a partial vacuum condition.

Those of ordinary skill in the art will recognize that, and understand how, prior to, or during, the reopening of the partition assemblies P27*a*', P27*a*", P28*a*', P28*a*", P27*b*', P27*b*", P28*b*' and P28*b*", the solution 10 may be substantially vaporized or boiled off from the interior regions 1001 and 1002 of the electrode assembly 100D by the addition of heat from a heat source 72 so that the acceleration of the solute ions 101 and 102 may be performed substantially in a gaseous environment.

Those of ordinary skill in the art will recognize that, and understand how, in one embodiment, the electrode surfaces S113*e*, S114*e*, S163*e*, S164*e*, S113*f*, S114*f*, S163*f* and S164*f* may have a concave rather than flat or convex cross-section. The embodiments are not limited in this context.

As illustrated in FIG. 28, TABLE 5, during the charge accumulation mode of operation, in one embodiment, the voltage source V11 may be disconnected from the minor electrodes 114*a*, 164*b*, 164*a* and 114*b* such that the polarity of the electrode surfaces S114*e*, S164*f*, S164*e*, and S114*f* is neutral. In one embodiment, the voltage source V11 is electrically coupled to the minor electrodes 114*a*, 164*b*, 164*a* and 114*b* such that the polarity of the electrode surfaces S114*e*, S164*f*, S164*e* and S114*f* are the same polarity as the polarity of the major electrode surfaces S113*e*, S163*f*, S163*e* and S113*f* so that oppositely charged solute ions 101 or 102 are attracted simultaneously to both the major electrode surfaces S113*e*, S163*f*, S163*e* and S113*f* and their corresponding minor electrode surfaces S114*e*, S164*f*, S164*e* and S114*f*, respectively. In one embodiment, the voltage source V11 is electrically coupled to the minor electrodes 114*a*, 164*b*, 164*a* and 114*b* such that the polarity of the electrode surfaces S114*e*, S164*f*, S164*e* and S114*f* are the opposite polarity as the polarity of the major electrode surfaces S113*e*, S163*f*, S163*e* and S113*f* so that oppositely charged solute ions 101 or 102 are attracted to the major electrode surfaces S113*e*, S163*f*, S163*e* and S113*f* while oppositely charged solute ions 102 or 101 are attracted conversely to the corresponding minor electrode surfaces S114*e*, S164*f*, S164*e* and S114*f*, respectively. The embodiments are not limited in this context.

Regardless of the polarity of the minor electrodes 114*a*, 164*a*, 164*b* and 114*b* during the charge accumulation mode of operation, during the charge accumulation mode of operation, due to the imposition of the respective substantially transverse and parallel electric fields from the major electrodes 113*a*, 163*a*, 163*b*, 113*b* to the minor electrodes 114*a*, 164*a*, 164*b* and 114*b* during the discharge and charge acceleration mode of operation, and also due to the imposition of the respective substantially transverse and parallel electric fields from the major partitions P113*e*, P163*e*, P163*f*, 113*f* to the minor partitions P114*e*, P164*e*, P164*f* and P114*f* during the discharge and charge acceleration mode of operation, electrolysis may occur at the minor electrodes 114*a*, 164*a*, 164*b* and 114*b* and at the minor partitions P114*e*, P164*e*, P164*f* and P114*f*. In one embodiment, the minor electrodes 114*a*, 164*a*, 164*b* and 114*b* and the minor partitions P114*e*, P164*e*, P164*f* and P114*f* are made from a comparatively inexpensive sacrificial material such as stainless steel or bronze while the major electrodes 113*a*, 163*a*, 163*b*, 113*b* and the major partitions P113*e*, P163*e*, P163*f*, 113*f* may be made from either a higher grade material such as the high surface area materials described above or another one of the corrosion resistant materials described above, or else from the same sacrificial material such as stainless steel or bronze. The embodiments are not limited in this context.

In addition, in a manner analogous to the surface areas of the surfaces S113*e*, S163*e*, S163*f* and S113*f* of the major electrodes 113*a*, 163*a*, 163*b*, 113*b*, respectively, as compared to the surface areas of the surfaces S114*e*, S164*e*, S164*f* and S114*f* of the minor electrodes 114*a*, 164*a*, 164*b* and 114*b* described above, the surface areas of the major partitions P113*e*, P163*e*, P163*f* and P113*f* may be greater than or substantially equal to the surface areas of the minor partitions P114*e*, P164*e*, P164*f* and P114*f*. The embodiments are not limited in this context.

Those of ordinary skill in the art will recognize that with the introduction into electrode assembly 100 (see FIGS. 7-12) of partition assemblies P27*a*', P27*a*", P28*b*', P28*b*", P28*a*', P28*a*", P27*b*' and P27*b*" to form electrode assembly 100D, the rotatable electrode 160" need not even be rotated and rotatable electrode 160" may remain stationary during the operation of the electrode assembly 100D, except for the opening and closing of the partition assemblies P28*a*', P28*a*", P28*b*' and P28*b*".

Figure 24:
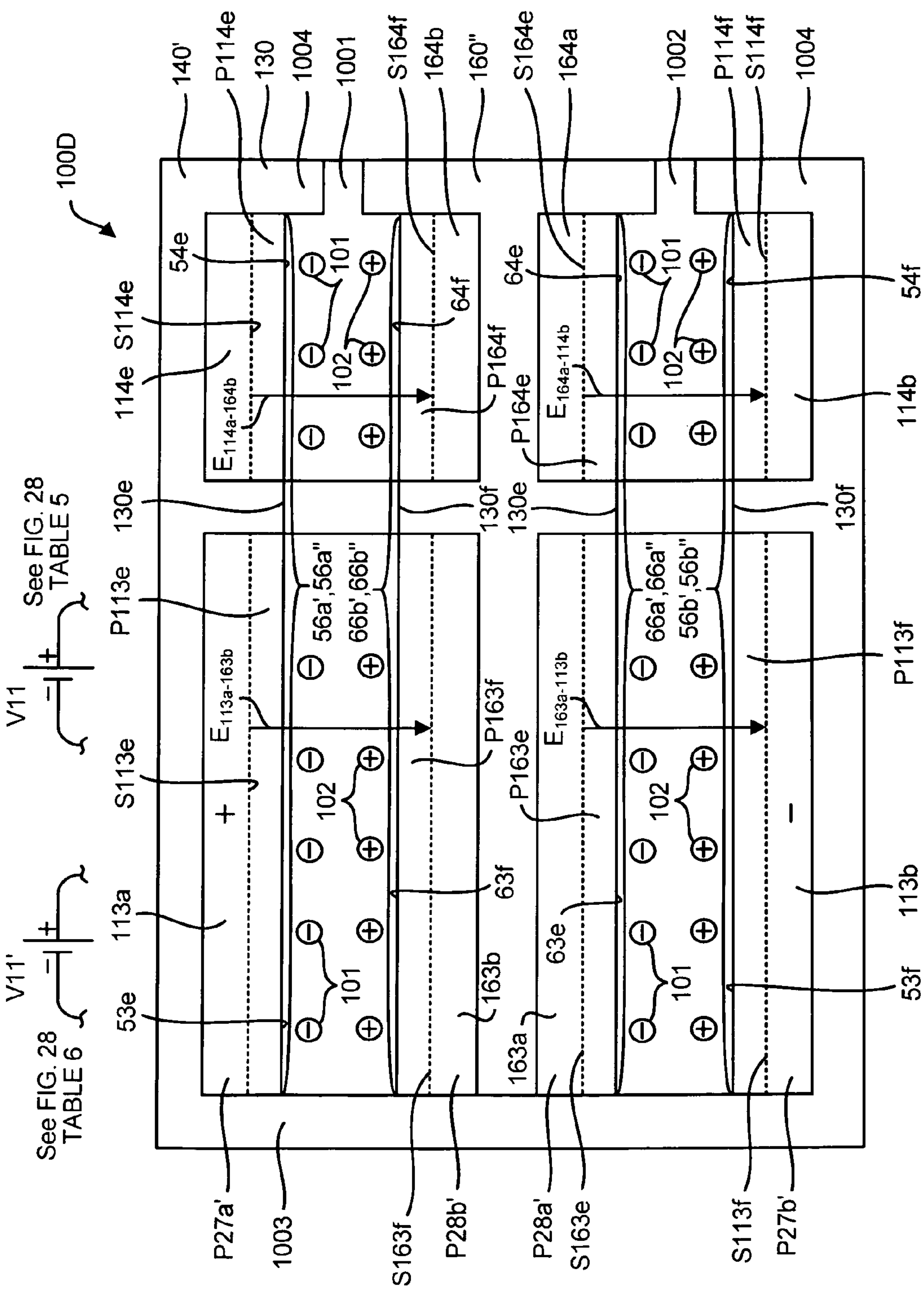
FIG. 24 illustrates one embodiment of an electrode assembly according to the present disclosure that includes a rotatable electrode having movable partitions and in a first mode of operation.

In one embodiment taking advantage of the electrode 160" remaining stationary, referring to FIGS. 7, 12, and 24-28, as particularly illustrated in FIG. 24, the voltage source V11 is replaced by a voltage source V11' that is electrically coupled to the electrode assembly 100D in the manner illustrated in FIG. 28, TABLE 6. More particularly, during the charge accumulation mode of operation, with each of the partition assemblies 27*a*', 27*a*", 28*b*', 28*b*", 28*a*', 28*a*", 27*b*' and 27*b*" in the retracted or open position, only the major stationary electrodes 113*a* and 113*b* are electrically coupled to the voltage source V11' such that the dielectric material 130 of the electrode 160" causes the electrode 160" to function as a dielectric assembly and the electrode assembly 100D to behave as a capacitor such that although the major and minor electrodes 163*b*, 163*a* and 164*b*, 164*a*, respectively, and their corresponding surfaces S163*f*, S163*e* and S164*f*, S164*e*, respectively, are not electrically coupled to the voltage source V11, a polarity of a charge opposite to the charge of the interfacing major stationary electrodes 113*e* and 113*f* is induced in the surfaces S163*f* and S163*e* of the electrodes 163*b* and 163*a*, respectively, so that the charged solute ions 102 and 101 may be attracted to the surfaces S163*f* and S163*e*, respectively, during the charge accumulation mode. The voltage potential of voltage source V11' is greater than the voltage potential of voltage source V11 so that a greater number of solute ions 101 and 102 may be attracted to the electrode surfaces S113*e*, S163*f*, S163*e* and S113*f* during the charge accumulation mode of operation.

During the discharge and charge acceleration mode of operation, the partition assemblies P27*a*', P27*a*", P28*b*', P28*b*", P28*a*', P28*a*", P27*b*' and P27*b*" may be extended, i.e., closed and, referring also to FIG. 28, TABLE 6, the electrode assembly 100D operated in the same manner as previously described via electrical coupling of the voltage source V12 in common to the electrodes and partitions of the partition assemblies or electrical coupling of the voltage source V12 independently to the electrodes and electrical coupling of the voltage source V12' independently to the partitions of the partition assemblies.

Since the rotatable electrode 160" is now causing the electrode assembly 100D to function as a capacitor, the dielectric material 130 in the rotatable electrode 160" should be of a material having a comparable surface area as the material used for the electrodes 113*a*, 114*a*, 163*a*, 164*a*, 163*b*, 164*b*, 113*b* and 114*b*. For example, if the electrodes 113*a*, 114*a*, 163*a*, 164*a*, 163*b*, 164*b*, 113*b* and 114*b* made from the carbon aerogel material previously mentioned, then the dielectric material of the rotatable electrode 160" should be made from a material such as silica aerogel which has a comparable surface area of about 500 to 1000 square meters per gram.

Referring to FIGS. 29-38, there is disclosed a variation of the electrode assembly 100D. More particularly, electrode assembly 100E includes a housing 144 made from a dielectric or electrically insulating material, e.g., dielectric material 130, and, in one embodiment, having a generally rectangular cross-section as shown forming first and second opposing walls 121*a* and 121*b*, respectively, and third and fourth opposing walls 121*c* and 121*d*, respectively. Substantially flat surface electrodes 113*e* and 113*f* are illustrated embedded in first and second opposing walls 121*a* and 121*b*, respectively, of housing 144 such that corresponding surfaces S113*e* and S113*f*, respectively, are in interfacing relationship with each other via an interior space or volume 1005 of the housing 144, formed by the walls 121*a*, 121*b*, 121*c* and 121*d*, in which is disposed the electrically conductive solution 10, while electrodes 114*e* and 114*f* are similarly embedded in first and second opposing walls 121*a* and 121*b*, respectively, of housing 144 such that corresponding surfaces S114*e* and S114*f*, respectively, are also in interfacing relationship with each other via the interior region 1005 in which the electrically conductive solution 10 is also disposed. The electrodes 114*e* and 114*f* and the surfaces S114*e* and S114*f* are identified in FIGS. 29-34 by component mark numbers in parentheses. The housing 144 forms a boundary around the interior region 1005 to form first interior corner 126*a* at the interior intersection of the first and third walls 121*a* and 121*c*, respectively, and second interior corner 126*b* at the interior intersection of first and fourth walls 121*a* and 121*d*, respectively, and to form third interior corner 126*c* at the interior intersection of second and third walls 121*b* and 121*c*, respectively, and to form fourth interior corner 126*d* at the intersection of second and fourth walls 121*b* and 121*d*, respectively. The surfaces S113*e* (S114*e*) and S113*f* (S114*f*) of the electrodes 113*e* (114*e*) and 113*f* (114*f*), respectively, are disposed in the housing 144 such that the dielectric material 130 separates the respective lengthwise edges of the surfaces S113*e* (S114*e*) and S113*f* (S114*f*) from the corners 126*a*, 126*b* and 126*c*, 126*d* by a gap g. Also, the electrodes 113*e* (114*e*) and 113*f* (114*f*), respectively, are disposed in the housing 144 such that the surfaces S114*e* and S114*f* of the minor partitions 114*e* and 114*f*, respectively, are closest to end opening 1006 of the housing 144 while the surfaces S113*e* and S113*f* of the major electrodes are closest to the rigid wall 142 at the end of housing 144 opposite to the end opening 1006.

The third wall 121*c* includes a first partition guide housing 127*a* that may extend from the exterior of housing 144 and intersects the first corner 126*a* of the housing 144 at a shallow angle $\gamma$ to form an aperture 128*a* in the third wall 121*c* immediately adjacent to the interior surface of the first wall 121*a*. The fourth wall 121*d* includes a second partition guide housing 127*b* that may extend from the exterior of housing 144 and intersects the second corner 126*b* of the housing 144 at the shallow angle $\gamma$ to form an aperture 128*b* in the fourth wall 121*d* immediately adjacent to the interior surface of the first wall 121*a*.

The third wall 121*c* includes also a third partition guide housing 127*c* that may extend from the exterior of housing 144 and intersects the third corner 126*c* of the housing 144 at a shallow angle $\gamma$ to form an aperture 128*c* in the third wall 121*c* immediately adjacent to the interior surface of the second wall 121*b*. The fourth wall 121*d* includes also a fourth partition guide housing 127*d* that may extend from the exterior of housing 144 and intersects the fourth corner 126*c* of the housing 144 at the shallow angle $\gamma$ to form an aperture 128*d* in the fourth wall 121*d* immediately adjacent to the interior surface of the second wall 121*b*.

Figure 31:
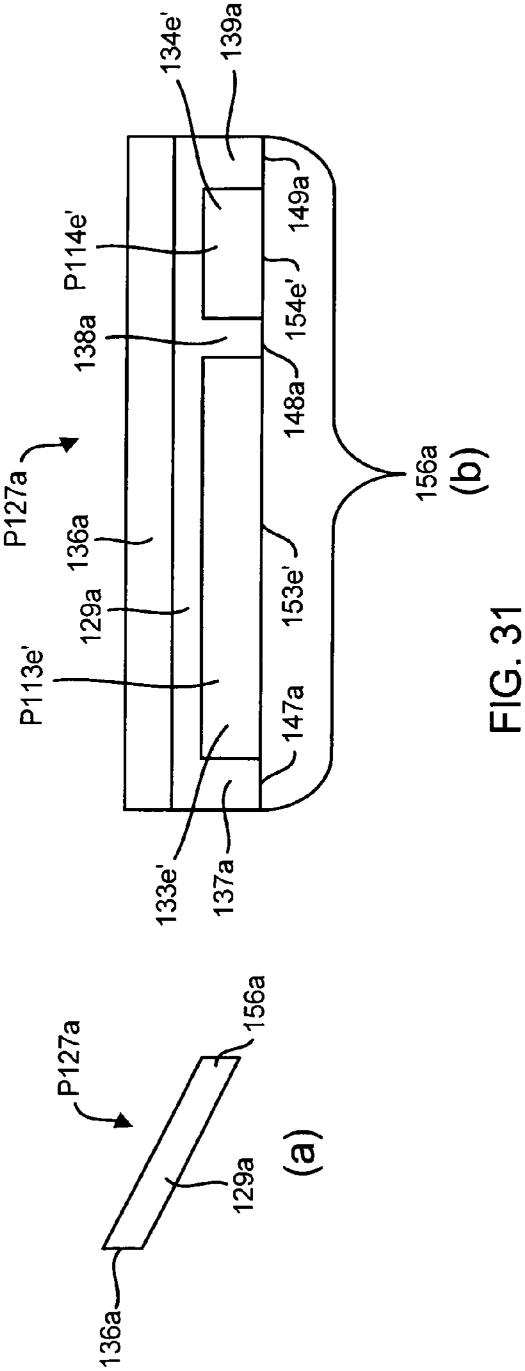
FIG. 31 illustrates one of the partitions of FIGS. 29-30 from one side of the electrode assembly.
Figure 32:
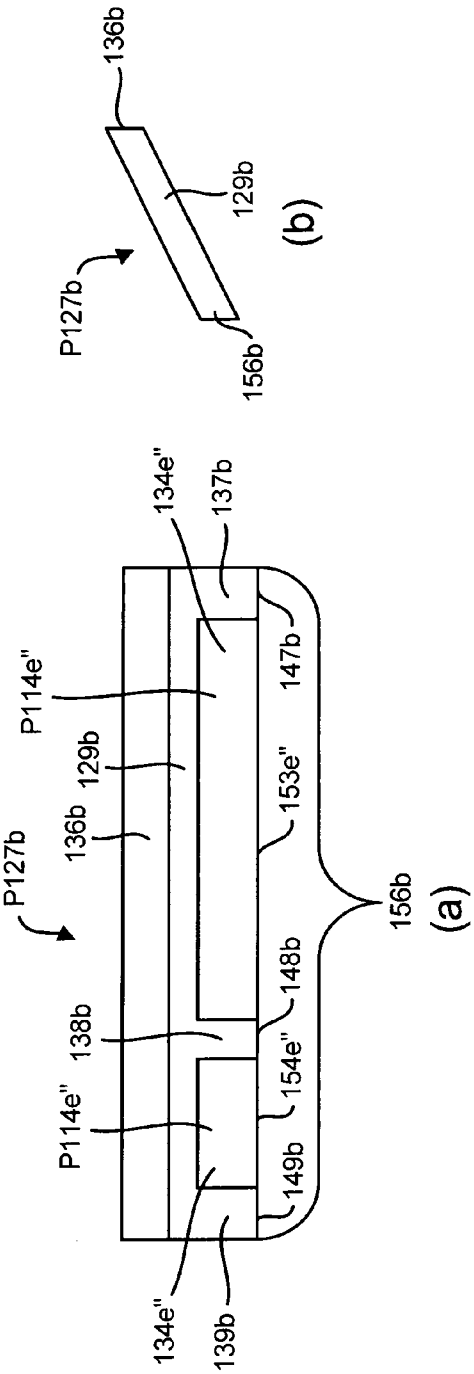
FIG. 32 illustrates one of the partitions of FIGS. 29-30 from another side of the electrode assembly.

FIGS. 31(*a*), (*b*) and 32(*a*), (*b*) illustrate first and second mirror image substantially planar partition assemblies P127*a* and P127*b*, respectively, that each includes a generally E-shaped member 129*a* and 129*b*, respectively, of dielectric material 130 that forms a major rectangularly-shaped open area 133*e*' and 133*e*" and a minor rectangularly-shaped open area 134*e*' and 134*e*", respectively, of the E-shape. The first and second E-shaped members 129*a* and 129*b* each include a generally elongated base member 136*a* and 136*b*, respectively, from which extend generally orthogonally a first extension 137*a* and 137*b*, a second extension 138*a* and 138*b*, and a third extension 139*a* and 139*b* to form the E-shape. The first extensions 137*a* and 137*b* extend to form edges 147*a* and 147*b*, and the second extensions 138*a* and 138*b* extend to form edges 148*a* and 148*b* so as to form the major open areas 133*e*' and 133*e*", respectively, therebetween, and the third extensions 139*a* and 139*b* extend to form edges 149*a* and 149*b*, respectively so as to form the minor open areas 134*e*' and 134*e*" with respect to the second extensions 138*a* and 138*b*, respectively.

Each of the partition assemblies P127*a*, P127*b* includes a corresponding major substantially planar rectangularly-shaped electrically conductive partition P113*e*', P113*e*" and a corresponding minor substantially planar rectangularly-shaped electrically conductive partition P114*e*', P114*e*", respectively. The major partitions P113*e*' and P113*e*" are inserted into the corresponding major open areas 133*e*' and 133*e*", respectively, while the minor partitions P114*e*' and P114*e*" are inserted into the corresponding minor open areas such that the major and minor partitions P113*e*', P113*e*" and P114*e*', P114*e*", respectively, are separated by dielectric material 130 therebetween, and such that the dielectric material 130 extends around the edges of the major partitions P113*e*', P113*e*" and the minor partitions P114*e*', P114*e*" except for lengthwise major edges 153*e*', 153*e*" and lengthwise minor edges 154*e*', 154*e*", respectively. The lengthwise major edge 153*e*', 153*e*" is aligned with the edge 147*a*, 147*b* of the first extension 137*a*, 137*b* and with the edge 148*a*, 148*b* of the second extension 138*a*, 138*b* of the generally E-shaped dielectric member 129*a*, 129*b*, respectively. The lengthwise minor edge 154*e*', 154*e*" is aligned with the edge 148*a*, 148*b* of the second extension 138*a*, 138*b* and with edge 149*a*, 149*b* of the third extension 139*a*, 139*b* of the generally E-shaped dielectric member 129*a*, 129*b*, respectively. The alignment of the lengthwise major edge 153*e*', 153*e*" with the edge 147*a*, 147*b* of the first extension 137*a*, 137*b* and with the edge 148*a*, 148*b* of the second extension 138*a*, 138*b* and the alignment of the lengthwise minor edge 154*e*', 154*e*" with the edge 148*a*, 148*b* of the second extension 138*a*, 138*b* and with edge 149*a*, 149*b* of the third extension 139*a*, 139*b* forms overall interior edges 156*a* and 156*b* of the first and second partitions P127*a* and P127*b*, respectively.

Figure 33:
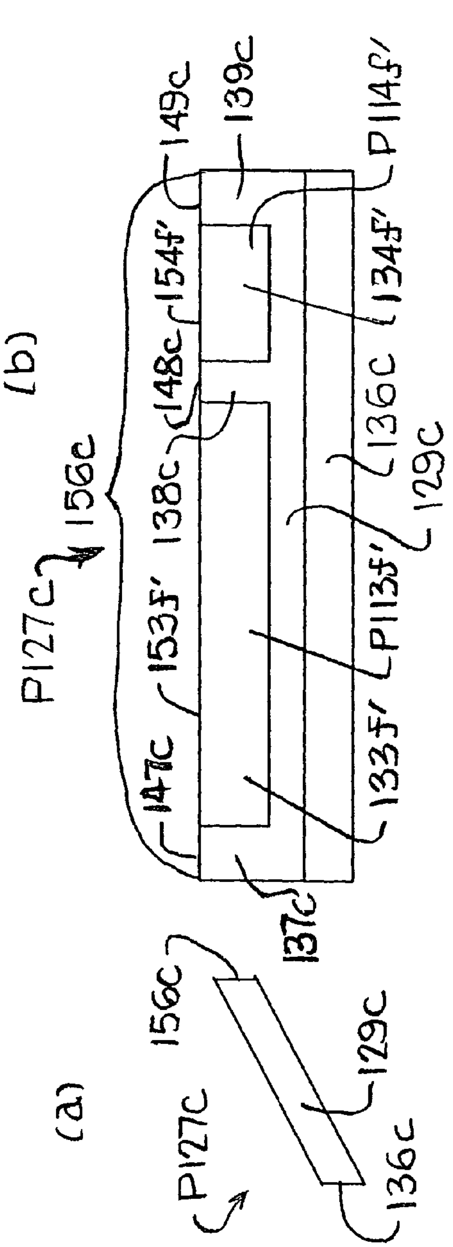
FIG. 33 illustrates one of the partitions of FIGS. 29-30 from the same side of the electrode assembly as with respect to FIG. 31.
Figure 34:
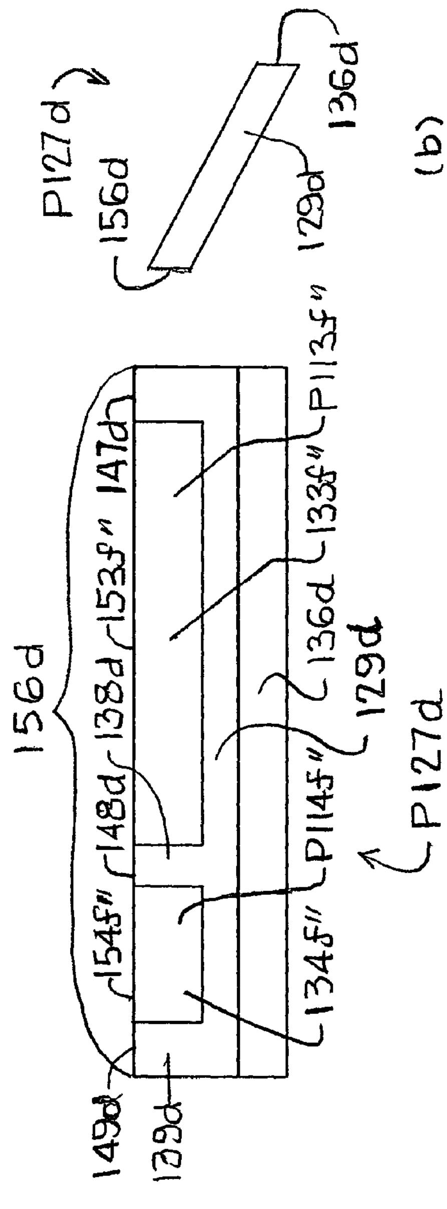
FIG. 34 illustrates another of the partitions of FIGS. 29-30 from the same side of the electrode assembly as with respect to FIG. 32.
Figure 37:
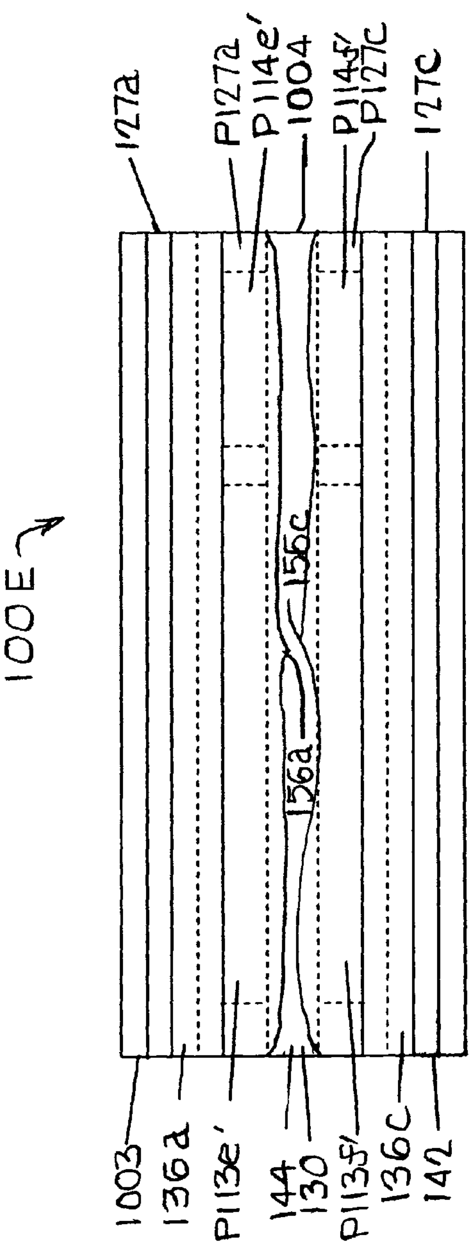
FIG. 37 illustrates the partition of FIG. 31 disposed in the electrode assembly in a second mode of operation.
Figure 38:
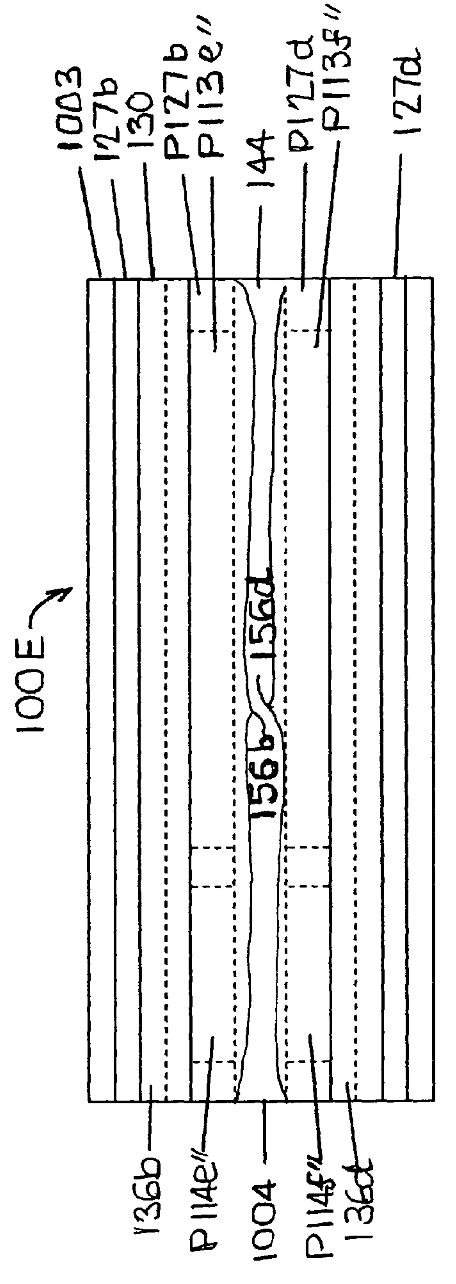
FIG. 38 illustrates the partition of FIG. 32 disposed in the electrode assembly in a second mode of operation.

Similarly, FIGS. 33(*a*), (*b*) and 34(*a*), (*b*) illustrate third and fourth mirror image substantially planar partition assemblies P127*c* and P127*d*, respectively, that each includes a generally E-shaped member 129*c* and 129*d*, respectively, of dielectric material 130 that forms a major rectangularly-shaped open area 133*f*' and 133*f*" and a minor rectangularly-shaped open area 134*f*' and 134*f*", respectively, of the E-shape. The third and fourth E-shaped members 129*c* and 129*d* each include a generally elongated base member 136*c* and 136*d*, respectively, from which extend generally orthogonally a first extension 137*c* and 137*d*, a second extension 138*c* and 138*d*, and a third extension 139*c* and 139*d* to form the E-shape. The first extensions 137*c* and 137*d* extend to form edges 147*d* and 147*d*, and the second extensions 138*c* and 138*d* extend to form edges 148*c* and 148*d* so as to form the major open areas 133*f*' and 133*f*", respectively, therebetween, and the third extensions 139*c* and 139*d* extend to form edges 149*c* and 149*d*, respectively so as to form the minor open areas 134*f*' and 134*f*" with respect to the second extensions 138*c* and 138*d*, respectively.

Each of the partition assemblies P127*c*, P127*d* includes a corresponding major substantially planar rectangularly-shaped electrically conductive partition P113*f*', P113*f*" and a corresponding minor substantially planar rectangularly-shaped electrically conductive partition P114*f*', P114*f*", respectively. The major partitions P113*f*' and P113*f*" are inserted into the corresponding major open areas 133*f*' and 133*f*", respectively, while the minor partitions P114*f*' and P114*f*" are inserted into the corresponding minor open areas such that the major and minor partitions P113*f*', P113*f*" and P114*f*', P114*f*", respectively, are separated by dielectric material 130 therebetween, and such that the dielectric material 130 extends around the edges of the major partitions P113*f*', P113*f*" and the minor partitions P114*f*', P114*f*" except for lengthwise major edges 153*f*', 153*f*" and lengthwise minor edges 154*f*', 154*f*", respectively. The lengthwise major edge 153*f*', 153*f*" is aligned with the edge 147*d*, 147*d* of the first extension 137*c*, 137*d* and with the edge 148*c*, 148*d* of the second extension 138*c*, 138*d* of the generally E-shaped dielectric member 129*c*, 129*d*, respectively. The lengthwise minor edge 154*f*', 154*fe*" is aligned with the edge 148*c*, 148*d* of the second extension 138*c*, 138*d* and with edge 149*c*, 149*d* of the third extension 139*c*, 139*d* of the generally E-shaped dielectric member 129$c$, 129$d$, respectively. The alignment of the lengthwise major edge 153$f'$, 153$f''$ with the edge 147$c$, 147$d$ of the first extension 137$c$, 137$d$ and with the edge 148$c$, 148$d$ of the second extension 138$c$, 138$d$ and the alignment of the lengthwise minor edge 154$f'$, 154$f''$ with the edge 148$c$, 148$d$ of the second extension 138$c$, 138$d$ and with edge 149$c$, 149$d$ of the third extension 139$c$, 139$d$ forms overall interior edges 156$c$ and 156$d$ of the third and fourth partitions P127$c$ and P127$d$, respectively.

During the charge accumulation mode of operation of the electrode assembly 100E, the first and second partition assemblies P127$a$ and P127$b$ are disposed in the first and second partition guide housings 127$a$ and 127$b$, respectively, in a retracted position so that the interior edges 156$a$ and 156$b$ generally align with the apertures 128$a$ and 128$b$ of the first and second partition assemblies P127$a$ and P127$b$, respectively, so as to leave exposed the surfaces S113$e$ and S114$e$ of the major and minor electrodes 113$e$ and 114$e$, respectively. The first and second partition assemblies P127$a$ and P127$b$ are also disposed in the first and second partition guide housings 127$a$ and 127$b$ such that the first and second electrically conductive minor partitions P114$e'$ and P114$e''$, respectively, are disposed in the housing 144 such that the first and second minor partitions P114$e'$ and P114$e''$, respectively, are closest to end opening 1006 of the housing 144 while the first and second electrically conductive major partitions P113$e'$ and P113$e''$, respectively, are closest to the rigid wall 142 at the end of housing 144 opposite to the end opening 1006.

Similarly, again during the charge accumulation mode of operation of the electrode assembly 100E, the third and fourth partition assemblies P127$c$ and P127$d$ are disposed in the third and fourth partition guide housings 127$c$ and 127$d$, respectively, in a retracted position so that the interior edges 156$c$ and 156$d$ generally align with the apertures 128$c$ and 128$d$ of the third and fourth partition assemblies P127$c$ and P127$d$, respectively, so as to leave exposed the surfaces S113$f$ and S114$f$ of the major and minor electrodes 113$f$ and 114$f$, respectively. The third and fourth partition assemblies P127$c$ and P127$d$ are also disposed in the third and fourth partition guide housings 127$c$ and 127$d$, respectively, such that the third and fourth electrically conductive minor partitions P114$f'$ and P114$f''$, respectively, are disposed in the housing 144 such that the third and fourth minor partitions P114$f'$ and P114$f''$, respectively, are closest to end opening 1006 of the housing 144 while the third and fourth electrically conductive major partitions P113$f'$ and P113$f''$, respectively, are closest to the rigid wall 142 at the end of housing 144 opposite to the end opening 1006.

The first and second partition assemblies P127$a$ and P127$b$ are thus configured such that first and second major partitions P113$e'$ and P113$e''$ are analogous to major partition P113$e$, while first and second minor partitions P114$e'$ and P114$e''$ are analogous to minor partition P114$e$, previously described with respect to electrode assembly 100D and FIGS. 24-28.

Similarly, the third and fourth partition assemblies P127$c$ and P127$d$ are thus configured such that third and fourth major partitions P113$f'$ and P113$f''$ are analogous to major partition P113$f$, while third and fourth minor partitions P114$f'$ and P114$f''$ are analogous to minor partition P114$f$, also previously described with respect to electrode assembly 100D and FIGS. 24-28.

Therefore, those skilled in the art will recognize that, and understand how, the operation of the electrode assembly 100E via voltage sources V11 and V12 to form beams B101 and B102 is essentially identical to the operation of the electrode assembly 100D described above with respect to voltage sources V11 and V12 to form beams B101 and B102 and will not be described specifically herein, except for the following.

Figure 30:
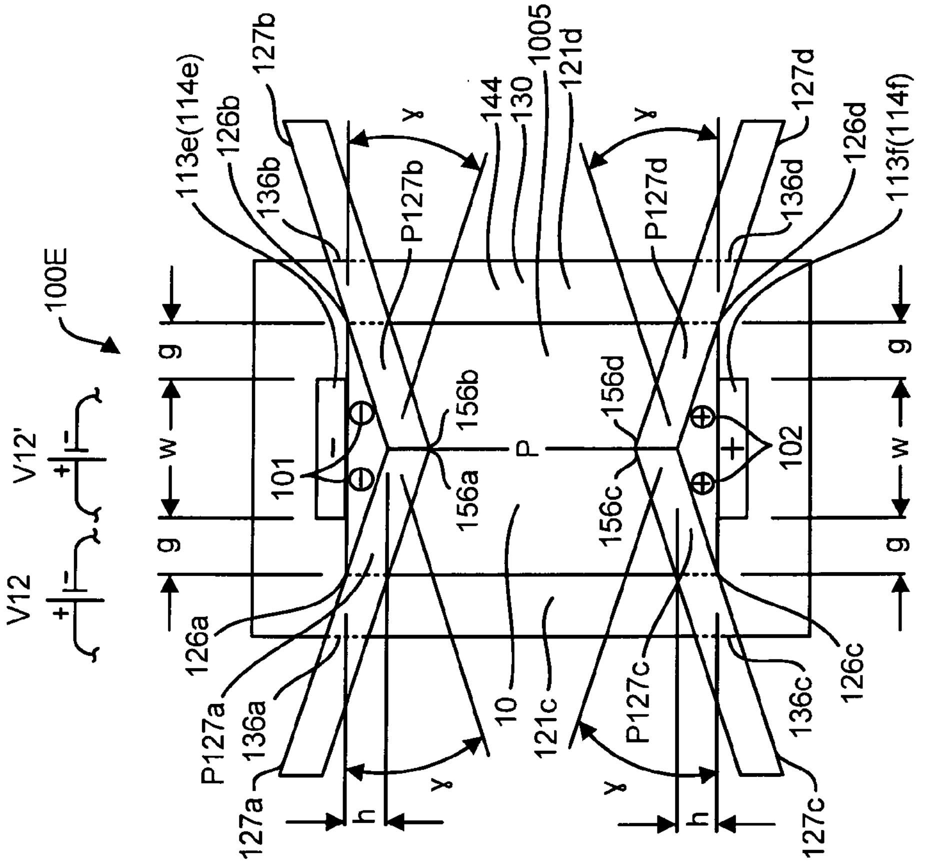
FIG. 30 illustrates a cross-sectional view of the electrode assembly and partitions of FIG. 29 in a second mode of operation.
Figure 29:
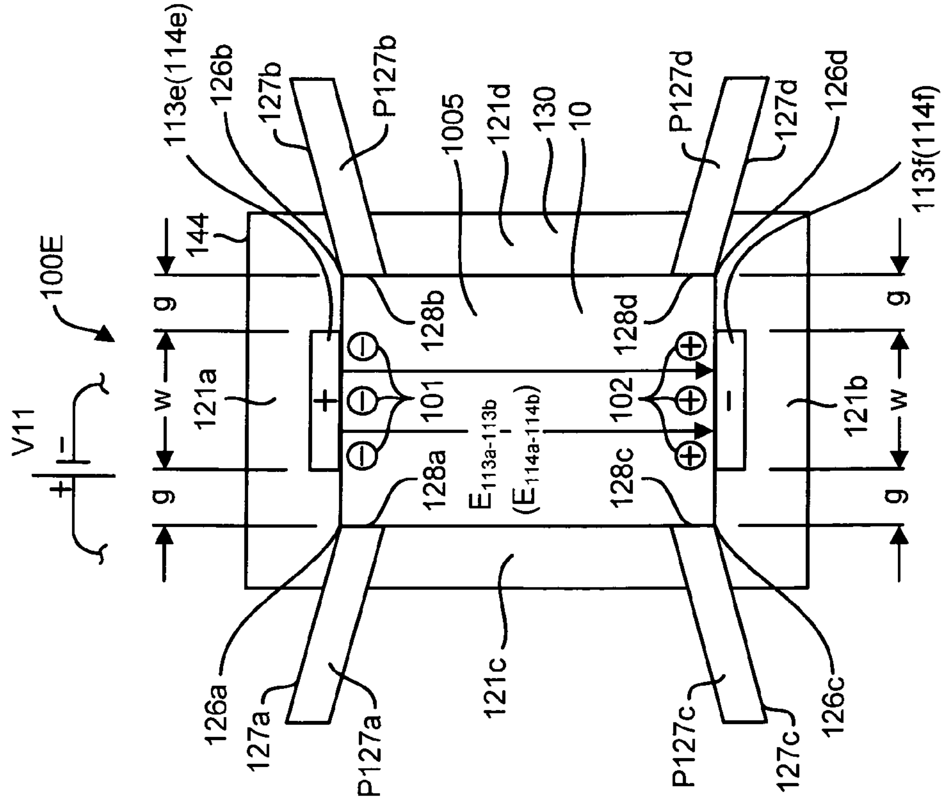
FIG. 29 illustrates a cross-sectional view of one embodiment of an electrode assembly according to the present disclosure having substantially flat partitions that are configured to be disposed over the electrode surfaces of the electrode assembly to isolate solute ions in a first mode of operation.

After the charge accumulation mode of operation, referring to FIG. 30, the first and second partition assemblies P127$a$ and P127$b$ are moved through the first and second partition guide housings 127$a$ and 127$b$ towards the interior region 1005 of the housing 144 until the interior edges 156$a$ and 156$b$ of the first and second partition assemblies P127$a$ and P127$b$, respectively, converge to touch each other, while similarly, the third and fourth partition assemblies P127$c$ and P127$d$ are moved through the third and fourth partition guide housings 127$c$ and 127$d$ towards the interior region 1005 of the housing 144 until the interior edges 156$c$ and 156$d$ of the third and fourth partition assemblies P127$c$ and P127$d$, respectively, converge at line or point P to touch each other at a height h away from the electrode surfaces S113$e$, S114$e$ and S113$f$, S114$f$ such that the electrode surfaces S113$e$ and S114$e$ form a triangular configuration with respect to the first and second partition assemblies P127$a$ and P127$b$, respectively, while the electrode surfaces S113$f$ and S114$f$ form a triangular configuration with respect to the third and fourth partition assemblies P127$c$ and P127$d$, respectively. The height h of line or point P is determined by the magnitude of the angle $\gamma$ and the magnitude of the gap g in addition to width w of the electrodes 113$e$, 114$e$ and 113$f$, 114$f$ and their respective surfaces S113$e$, S114$e$ and S113$f$, S114$f$. The height h of line or point P may have a dimension of about 1 to 2 millimeters (mm) In one embodiment, the gap g may be zero so that there is direct contact between the electrodes 113$e$, 114$e$ and respective first and second major partitions P113$e'$ and P113$e''$ and first and second minor partitions P114$e'$ and P114$e''$.

The partition assemblies P127$a$, P127$b$, P127$c$ and P127$d$ may be moved into position by various suitable methods. For example, referring to FIGS. 29-30, a fluid, e.g., the solution 10 (not shown), may be injected into, or extracted from, the partition guide housings 127$a$, 127$b$, 127$c$ and 127$d$ to push into, or pull from, respectively, the interior region 1005. In one embodiment, referring to FIG. 30, the edges 156$a$ and 156$b$ of the first and second partition assemblies P127$a$ and P127$b$, respectively are tapered to be substantially flush with one another upon converging to touch each other. Similarly, the edges 156$c$ and 156$d$ of the third and fourth partition assemblies P127$c$ and P127$d$, respectively, are also tapered to be substantially flush with one another upon converging to touch each other.

In the same manner as described above with respect to electrode assembly 100D, those skilled in the art will recognize that, and understand how, an independent voltage source V12' may be provided to power the respective partitions independently from the corresponding respective electrodes that may be powered by voltage source V12 to again enable separate control, positioning and adjustment of the substantially transverse and parallel electric fields originating from the electrodes and the partitions in the formation of the beams B101 and B102.

Figure 39:
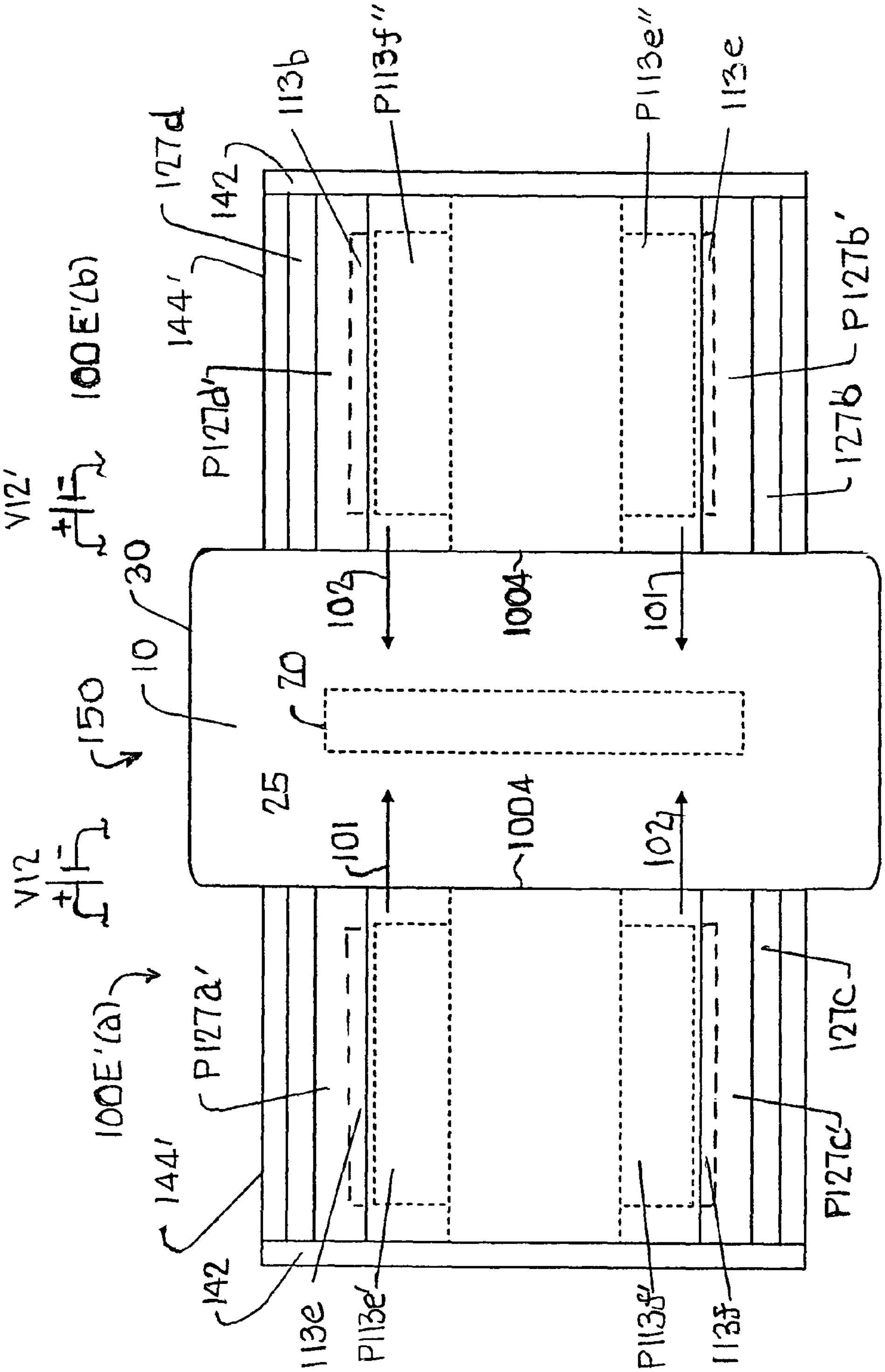
FIG. 39 illustrates an alternate embodiment of the electrode assembly of FIGS. 29-38 that is disposed in an inverse tandem arrangement with respect to an identical electrode assembly.

Referring to FIG. 39, there is illustrated a cross-sectional view of first electrode assembly 100E'(a) that is a variation of electrode assembly 100E, in which the minor electrodes 114$e$ and 114$f$ are eliminated from the housing 144 to form housing 144' and the corresponding minor partitions P114$e'$, P114$e''$ are eliminated from the first and second partition assemblies P127$a$ and P127$b$ to form first and second partition assemblies P127$a'$ and P127$b'$, respectively, and the corresponding minor partitions P114$f'$, P114$f''$ are eliminated from the third and fourth partition assemblies P127$c$ and P127$d$ to form third and fourth partition assemblies P127$c'$ and P127$d'$, respectively, in a manner analogous to the electrode assemblies 100'*a* or 100'*b* described above with respect to FIGS. 15 and 16. Second electrode assembly 100E'(b) is identical to the first electrode assembly 100E'(a) but may be oriented as a tandem electrode assembly in a mirror image, or an inverse mirror image, configuration with respect to the first electrode assembly 100E'(a) such that the open ends 1004 of the first and second electrode assemblies 100E'(a) and 100E'(b), respectively, are in interfacing relationship with one another. During the charge acceleration mode illustrated in FIG. 39, the remaining electrodes 113*e* and corresponding partitions P113*e*' and P113*e*" of electrode assembly 100E'(a) are electrically cross-connected to the remaining electrodes 113*f* and corresponding partitions P113*f*' and P113*f*" of electrode assembly 100E'(b), while the remaining electrodes 113*f* and corresponding partitions P113*f*' and P113*f*" of electrode assembly 100E'(a) are electrically cross-connected to the remaining electrodes 113*e* and corresponding partitions P113*e*' and P113*e*" of electrode assembly 100E'(b), in a manner similar to the electrode assemblies 100 illustrated above in FIG. 13, and with the electrodes and partitions either being connected in common via a common power supply such as voltage source V12 or the electrodes being connected independently of the partitions via the voltage source V12 while the partitions are connected independently of the electrodes via the second voltage source V12'. The consequent electrical cross-connection of the electrode assemblies 100E'(a) and 100E'(b) causes the beams B101 and B102 to be directed towards the interfacing open ends 1004, such that the beams B101 and B102 may intersect each other or impact target 20. As illustrated by way of example, the electrode assemblies 100E'(a) and 100E'(b) may be in fluidic communication, via open ends 1004, with a central vessel 30 such that a system 150 made from the configuration of electrode assemblies 100E'(a) and 100E'(b) and the central vessel 30 may be pressurized. Pressurization of the system 150 may be useful for heat removal, particularly where the solvent in the solution 10 is vaporized.

Figure 41:
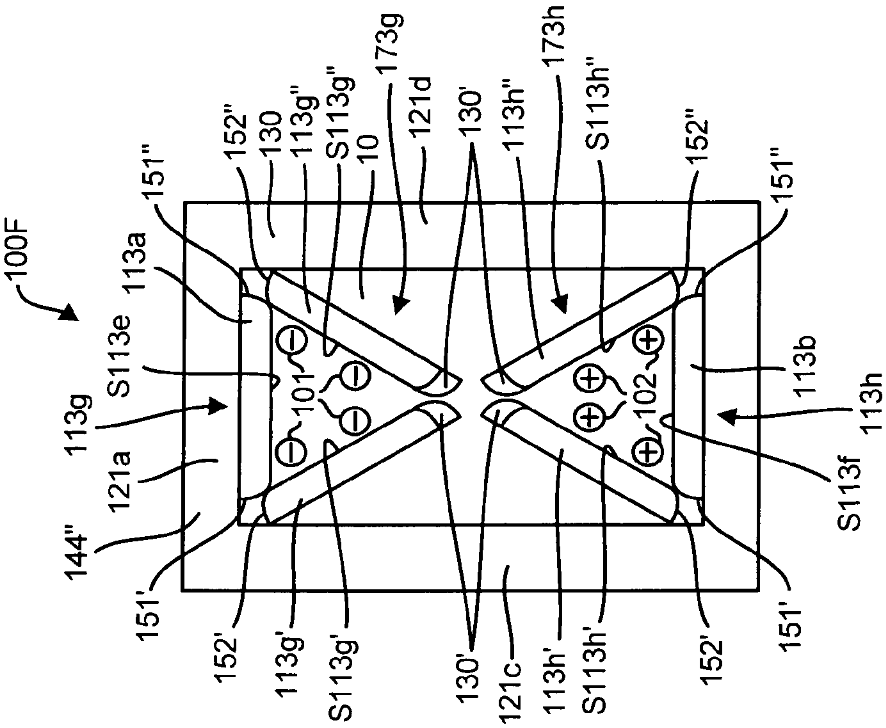
FIG. 41 illustrates the electrode assembly of FIG. 40 showing the partitions in a second mode of operation.
Figure 40:
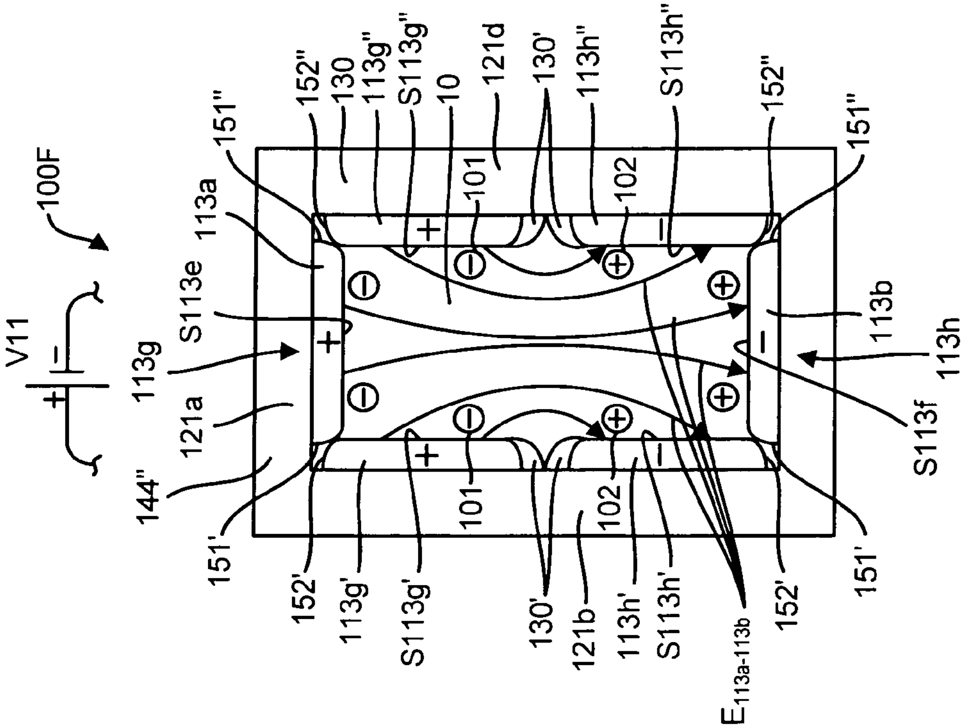
FIG. 40 illustrates a cross-sectional view of an alternate embodiment of the electrode assembly of FIGS. 29-38 having partitions disposed within the interior of a housing of the electrode assembly in a first mode of operation.

FIGS. 40-41 illustrate an alternate embodiment of the electrode assembly 100E and 100E'. More particularly, referring to FIG. 40, electrode assembly 100F includes a housing 144" which may have a generally rectangular cross-section as described previously with respect to housing 144 (see FIGS. 29-38) and which may be formed by first and second interfacing walls 121*a* and 121*b*, respectively, and third and fourth intersecting walls 121*c* and 121*d*, respectively. In one embodiment, the electrode assembly 100F includes first and second combination partition and electrode sub-assemblies 113*g* and 113*h*, respectively.

The first combination subassembly 113*g* includes the substantially planar major electrode 113*a* having substantially planar surface S113*e* formed with first and second opposite edges lateral edges 151' and 151" having a rounded contour. The first combination subassembly 113*g* also includes a first substantially planar partition electrode 113*g*' having a substantially planar surface S113*g*' also formed with a first lateral edge 152' having a rounded contour and with a second lateral edge 130' made from dielectric material 130 and also having a rounded contour. The first lateral edge 151' of the electrode 113*a* and the lateral edge 152' of the partition electrode 113*g*' are disposed within the housing 144" adjacent to one another to enable rotation of the surface S113*g*' of the partition electrode 113*g*' with respect to the surface S113*e* of the electrode 113*a* by rolling contact on the contoured surfaces of the lateral edges 151' and 152'.

The first combination subassembly 113*g* further includes a second substantially planar partition electrode 113*g*" having a substantially planar surface S113*g*" also formed with a first lateral edge 152" having a rounded contour and a second lateral edge 130" made from dielectric material 130 and also having a rounded contour. The second lateral edge 151" of the electrode 113*a* and the lateral edge 152" of the partition electrode 113*g*" are disposed within the housing 144" adjacent to one another to enable rotation of the surface S113*g*" of the partition electrode 113*g*" with respect to the surface S113*e* of the electrode 113*a* by rolling contact on the contoured surfaces of the lateral edges 151" and 152".

Thereby, first partition electrode 113*g*' and the second partition electrode 113*g*" may each be rotated around the electrode 113*e* with respect to the surface S113*e* to result in the electrode surface S113*e*, the surface S113*g*' of the first partition electrode 113*g*', and the surface S113*g*" of the second partition electrode 113*g*" being juxtaposed with respect to each other to form a first elongate member 173*g* having a triangular cross-section as illustrated in FIG. 41.

Similarly, the second combination subassembly 113*h* includes the substantially planar major electrode 113*b* having substantially planar surface S113*f* formed with first and second opposite edges lateral edges 151' and 151" having a rounded contour. The second combination subassembly 113*h* also includes a third substantially planar partition electrode 113*h*' having a substantially planar surface S113*h*' also formed with a first lateral edge 152' having a rounded contour and with a second lateral edge 130' made from dielectric material 130 and also having a rounded contour. The first lateral edge 151' of the electrode 113*b* and the lateral edge 152' of the partition electrode 113*h*' are disposed within the housing 144" adjacent to one another to enable rotation of the surface S113*h*' of the partition electrode 113*h*' with respect to the surface S113*f* of the electrode 113*b* by rolling contact on the contoured surfaces of the lateral edges 151' and 152'.

The second combination subassembly 113*h* further includes a fourth substantially planar partition electrode 113*h*" having a substantially planar surface S113*h*" also formed with a first lateral edge 152" having a rounded contour and a second lateral edge 130' made from dielectric material 130 and also having a rounded contour. The second lateral edge 151" of the electrode 113*b* and the lateral edge 152" of the partition electrode 113*h*" are disposed within the housing 144" adjacent to one another to enable rotation of the surface S113*h*" of the partition electrode 113*h*" with respect to the surface S113*f* of the electrode 113*b* by rolling contact on the contoured surfaces of the lateral edges 151" and 152".

Thereby, third partition electrode 113*h*' and the fourth partition electrode 113*h*" may each be rotated around the electrode 113*b* with respect to the surface S113*f* to result in the electrode surface S113*e*, the surface S113*h*' of the third partition electrode 113*h*', and the surface S113*h*" of the fourth partition electrode 113*h*" being juxtaposed with respect to each other to form a second elongate member 173*h* having a triangular cross-section as illustrated in FIG. 41.

In one embodiment as illustrated in FIG. 40, the first combination sub-assembly 113*g* and the second combination sub-assembly 113*h* are disposed within the housing 144" such that the surface S113*e* of the first electrode 113*a* and the surface S113*f* of the second electrode 113*b* are in interfacing relationship with each other and such that, during the charge accumulation mode of operation, the surfaces S113*g*' and S113*g*" are in interfacing relationship with each other and substantially perpendicular to the surface S113*e* of the first electrode 113*a* while the surfaces S113*h*' and S113*h*" are in interfacing relationship with each other and substantially perpendicular to the surface S113*f* of the second electrode 113*b*, the combination sub-assemblies 113*g* and 113*h* forming opposing substantially C-shaped configurations with respect to each other, that are separated by portions of the dielectric material 130 disposed as the freely movable contoured lateral edges 130' of the first, second, third and fourth partition electrodes 113*g*', 113*g*", 113*h*' and 113*h*", respectively, to inhibit or prevent direct electrical contact between the first and second combination sub-assemblies 113*g* and 113*h*, respectively.

Referring to FIG. 40, during the charge accumulation mode of operation, two electrode assemblies 100F may be arranged in an inverse opposing configuration (not shown) as described above with respect to electrode assemblies 100E'(a) and 100E'(b). Electric field $E_{113a-113b}$ may be established between the first and second combination sub-assemblies 113*g* and 113*h* via voltage source V11 such that negative solute ions 101 are attracted to the surfaces S113*g*', S113*e*, and S113*g*" while positive solute ions 102 are attracted to the surfaces S113*h*', S113*f*, and S113*h*". In one embodiment, the electrodes are made from a high surface area material as described above.

Following the charge accumulation mode of operation, the first and second partition electrodes 113*g*' and 113*g*", respectively, are rotated around the surface S113*e* of the first combination subassembly 113*g* of both of the two inversely opposing electrode assemblies 100F to form the first elongate members 173*g* having a triangular cross-section as illustrated in FIG. 41. Similarly, the third and fourth partition electrodes 113*h*' and 113*h*", respectively, are rotated around the surface S113*f* of the second combination subassembly 113*h* of both of the two inversely opposing electrode assemblies 100F to form the second elongate members 173*h* having a triangular cross-section as illustrated in FIG. 42.

In a similar manner as explained and illustrated with respect to electrode assembly 100E' in FIG. 39, the first elongate member 173*g* of the first opposing electrode assembly 100F and the second elongate member 173*h* of the second opposing electrode assembly 100F may be electrically cross-connected to establish substantially transverse electric fields therebetween which repel from the three surfaces S113*g*', S113*e*, S113*g*" to compress and align the negative solute ions 101 and which repel from the three surfaces S113*h*', S113*f*, S113*h*" to compress and align the positive solute ions 102 to form the beams B101 and B102, respectively, to again cause the beams B101 and B102 to be directed towards the interfacing open ends 1004, such that the beams B101 and B102 may intersect each other or impact target 20.

Figure 42:
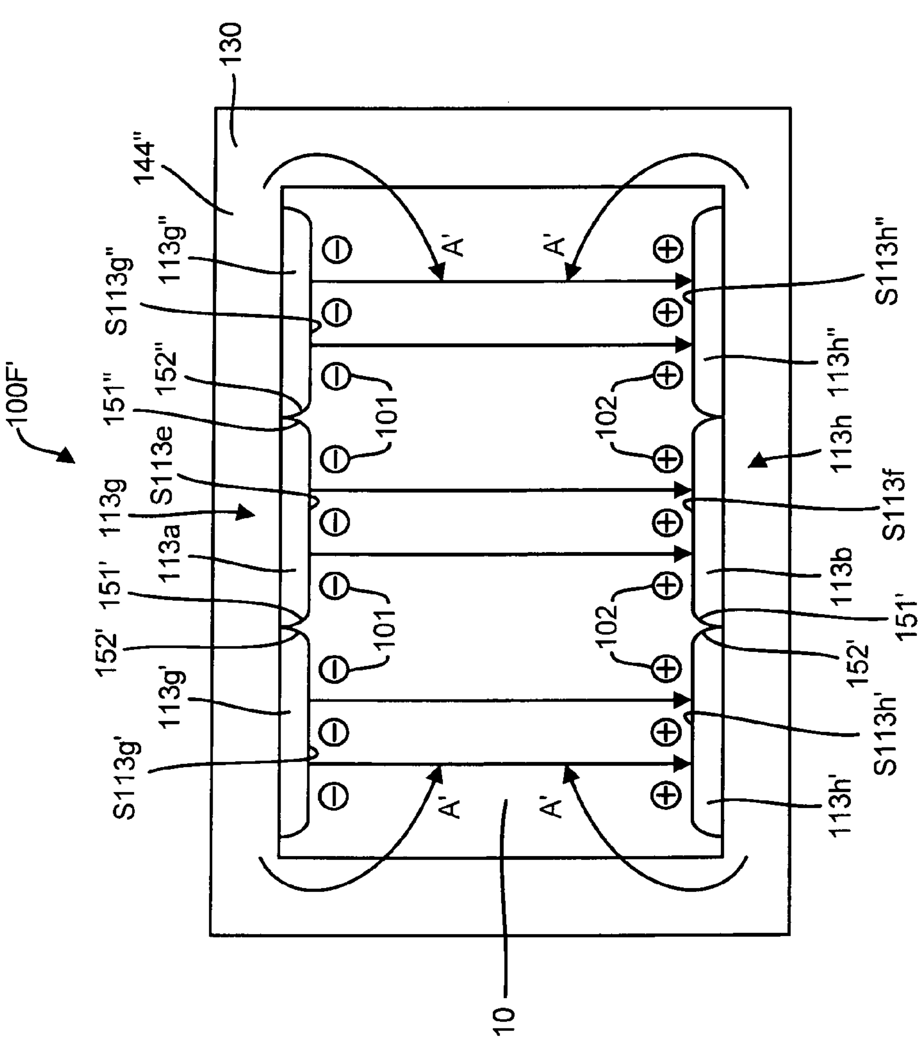
FIG. 42 is a cross-sectional view of an alternate embodiment of the electrode assembly of FIGS. 40-41 in a first mode of operation.

Referring to FIG. 42, there is illustrated an alternate embodiment of the electrode assembly 100F of FIGS. 40-41. More particularly, electrode assembly 100F' is identical to electrode assembly 100F with the exception that electrode assembly 100F' includes housing 144'" that is configured such that the first combination partition and electrode subassembly 113*g* and the second combination partition and electrode subassembly 113*h* are disposed entirely in the first wall 121*a* and second wall 121*b* and in a substantially flat configuration such that the surfaces S113*g*', S113*e*, S113*g*" disposed in first wall 121*a* are in corresponding interfacing relationship with the surfaces S113*h*', S113*f*, S113*h*", respectively, disposed in the second wall 121*b*. Therefore, during the charge accumulation mode of operation, the general uniformity of the electric field $E_{113a-113b}$ established between the first and second combination sub-assemblies 113*g* and 113*h* via voltage source V11 as compared to electric field $E_{113a-113b}$ formed by electrode assembly 100F effects a more uniform distribution of negative solute ions 101 being attracted to the surfaces S113*g*', S113*e*, and S113*g*" and a more uniform distribution of positive solute ions 102 being attracted to the surfaces S113*h*', S113*f*, and S113*h*".

In a similar manner as with respect to electrode assembly 100F as illustrated in FIG. 41, following the charge accumulation mode of operation, the first and second partition electrodes 113*g*' and 113*g*", respectively, are rotated in the direction shown by arrows A' around the surface S113*e* of the first combination subassembly 113*g* of both of two inversely opposing electrode assemblies 100F' to form the first elongate members 173*g* having a triangular cross-section as illustrated in FIG. 41. Similarly, the third and fourth partition electrodes 113*h*' and 113*h*", respectively, are rotated around the surface S113*f* of the second combination subassembly 113*h* of both of the two inversely opposing electrode assemblies 100F' to form the second elongate members 173*h* having a triangular cross-section as illustrated in FIG. 41.

Again, in a similar manner as explained and illustrated with respect to electrode assembly 100E' in FIG. 39 and with respect to electrode assembly 100F, the first elongate member 173*g* of the first opposing electrode assembly 100F' (not shown) and the second elongate member 173*h* of the second opposing electrode assembly 100F' (not shown) may be electrically cross-connected to establish substantially transverse electric fields therebetween which repel from the three surfaces S113*g*', S113*e*, S113*g*" to compress and align the negative solute ions 101 and which repel from the three surfaces S113*h*', S113*f*, S113*h*" to compress and align the positive solute ions 102 to form the beams B101 and B102, respectively, to again cause the beams B101 and B102 to be directed towards the interfacing open ends 1004, such that the beams B101 and B102 may intersect each other or impact target 20.

Referring now to FIGS. 43-50, there is disclosed a variation of the embodiment of electrode assembly 100C' of an electrode assembly that also includes partitions that may isolate the solute ions 101 and 102 following the charge accumulation mode of operation. More particularly, referring to FIGS. 43-45, electrode and partition assembly 100G is similar to electrode assembly 100C' in that electrode assembly 100G also includes at least a first set of stationary first and second lower electrodes 145*a* and 145*b*, respectively, each mounted in dielectric material 130 and of first and second upper electrodes 155*a* and 155*b*, respectively, also each mounted in dielectric material 130, and which are substantially parallel to the first and second lower electrodes 145*a* and 145*b*, respectively. A surface S145*a* of electrode 145*a* is disposed in interfacing relationship with a surface S155*a* of electrode 155*a*, while a surface S145*b* of electrode 145*b* is disposed in interfacing relationship with a surface S155*b* of electrode 155*b*. However, the first and second upper electrodes 155*a* and 155*b*, respectively, need not be rotatable around the axis of rotation D-D but may remain stationary as the first and second lower electrodes 145*a* and 145*b*, respectively, remain stationary. In a similar manner as discussed above with respect to electrode assembly 100D, the electrodes 145*a*, 145*b*, 155*a* and 155*b* include movable partitions P145*a*, P145*b*, P155*a* and P155*b*, the partitions having inner surfaces P145*c*, P145*d*, P155*c* and P155*d*, respectively. The movable partitions P145*a*, P145*b*, P155*a* and P155*b* may again be shaped as a portion of a cylinder wall and extend along the longitudinal axis of each electrode 145*a*, 145*b*, 155*a* and 155*b* along the peripheral edge surfaces S145*a*', S145*b*', S155*a*' and S155*b*' of the electrodes 145*a*, 145*b*, 155*a* and 155*b*, respectively. In one embodiment, the movable partitions P145*a*, P145*b*, P155*a* and P155*b* are configured so as not to be in direct electrical contact with the electrodes 145*a*, 145*b*, 155*a* and 155*b* or their surfaces S145*a*, S145*b*, S155*a* and S155*b*.

The partitions P145*a*, P145*b*, P155*a* and P155*b* are made from an electrically conductive material. In one embodiment, the partitions P145*a*, P145*b*, P155*a* and P155*b* may be made from the same material as the electrodes 145*a*, 145*b*, 155*a* and 155*b*, e.g., a high surface area material or a corrosion-resistant material as described above.

During the charge accumulation mode of operation, movable partitions P145*a*, P145*b*, P155*a* and P155*b* remain in an open position exposing the interfacing surfaces S145*a*, S145*b*, S155*a* and S155*b*, respectively. Those of ordinary skill in the art will recognize that, and understand how, referring to FIG. 44, during the charge accumulation mode via a first voltage source V17, negative solute ions 101 may be attracted to the surface S155*a* of electrode S155*a* and to the surface S145*b* of electrode S145*b* while positive solute ions 102 may be attracted to the surfaces S155*b* of electrode S155*b* and to the surface S145*a* of electrode 145*a*. In a similar manner to the period following the charge accumulation mode of operation of electrode assembly 100C', following the charge accumulation mode of operation of electrode assembly 100E, the partitions P145*a* and P155*b* may be moved in the direction shown by arrow Z to closed positions 45 and 55 to substantially isolate the positive solute ions 102 at or in proximity to the surfaces S145*a* and S155*b*, respectively, while the partitions P145*b* and P155*a* may be moved in the direction shown by arrow Z' to closed positions 45 and 55 to substantially isolate the negative solute ions 101 at or in proximity to the surfaces S145*b* and S155*a*, respectively.

Figure 46:
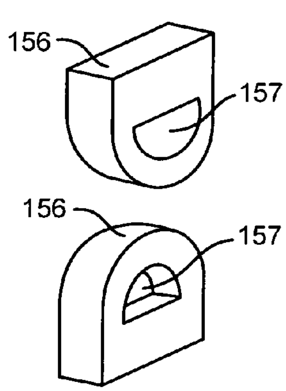
FIG. 46 is a perspective view of an insulating end cap for the electrodes and partitions of FIGS. 43-45.
Figure 47:
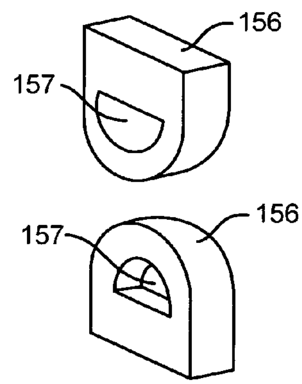
FIG. 47 is another perspective view of an insulating end cap for the electrodes and partitions of FIGS. 43-45.

Referring to FIGS. 46 and 47, to inhibit or prevent undesired electric fields from preferentially forming between the ends of the electrodes and partitions rather than forming transversely between the electrode surfaces S145*a* and S145*b* and between the electrode surfaces S155*b* and S155*a*, and between the partition surfaces P145*c* and P145*d* and between the partition surfaces P155*c* and P155*d*, electrode and partition end caps 156 may be disposed at the interfacing ends of the electrodes 145*a*, 145*b*, 155*a* and 155*b*. The electrode and partition end caps 156 each include an aperture 157 that is configured to cover the ends of both the electrodes 145*a*, 145*b*, 155*a* and 155*b* and the partitions P145*a*, P145*b*, P155*a* and P155*b*, respectively, when the partitions P145*a*, P145*b*, P155*a* and P155*b* are in the fully closed positions 45 and 55 (see FIG. 45) while at the same time permitting the beams B101 and B102 to pass through the particular aperture 157. The end caps 156 may be made from the same or similar material as provided for dielectric material 130. Alternatively, the end caps 156 may be integrally formed with the dielectric material 130.

Figure 48:
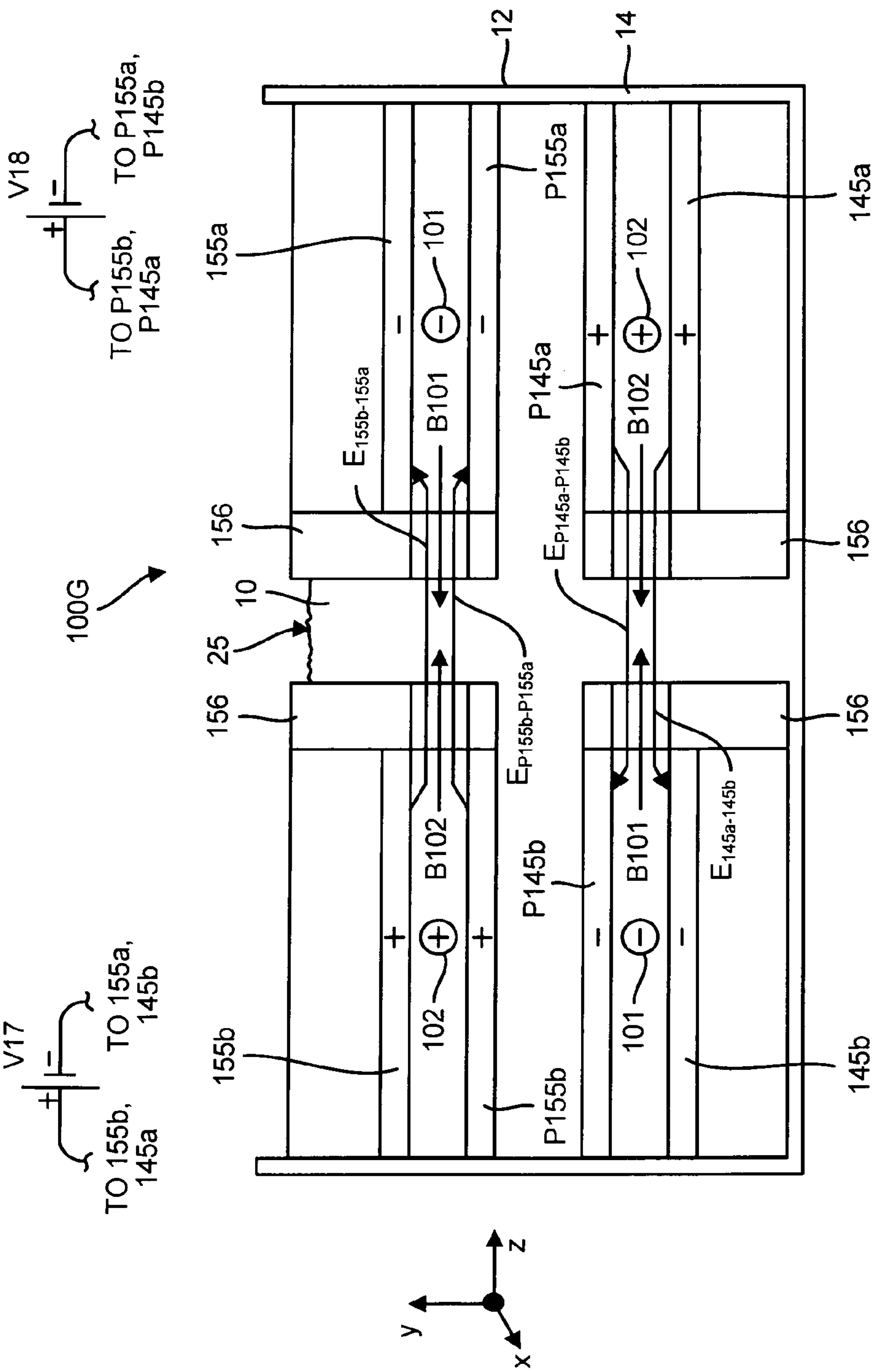
FIG. 48 is a cross-sectional view of the electrode assembly of FIGS. 43-47 during a discharge and charge acceleration mode of operation.

Referring now to FIG. 48, following the closure of the partitions P145*a*, P145*b*, P155*a* and P155*b*, the first voltage source V17 may be realigned (or another voltage source, not shown, may be provided) to couple a positive terminal of the voltage source V17 to the electrodes 145*a* and 155*b* and a negative terminal of the voltage source V17 to the electrodes 145*b* and 155*a* to establish a cross-connecting, substantially transverse electrical field $E_{145a\text{-}145b}$ between electrode surfaces S145*a* and S145*b* and to establish a cross-connecting, substantially transverse electrical field $E_{155b\text{-}155a}$ between electrode surfaces S155*b* and S155*a*. Similarly, a second voltage source V18 may be provided to couple a positive terminal of the voltage source V18 to the partitions P145*a* and P155*b* and a negative terminal of the voltage source V18 to the partitions P145*b* and P155*a* to establish a cross-connecting, substantially transverse electrical field $E_{P145a\text{-}P145b}$ between partition surfaces P145*c* and P145*d* and to establish a cross-connecting, substantially transverse electrical field $E_{P155b\text{-}P155a}$ between partition surfaces P155*d* and P155*c*.

Referring again to FIGS. 43-45 and to FIG. 48, the establishment of the electric fields $E_{145a\text{-}145b}$ between electrode surfaces S145*a* and S145*b* and $E_{155b\text{-}155a}$ between electrode surfaces S155*b* and S155*a* and of the electric fields $E_{P145a\text{-}P145b}$ between partition surfaces P145*c* and P145*d* and $E_{P155b\text{-}P155a}$ between partition surfaces P155*d* and P155*c* causes the negatively charged solute ions 101 which have accumulated at the electrode surfaces S145*b* and S155*a* to now be repelled from electrode surfaces S145*b* and S155*a* and directed towards counterpart electrode surfaces S145*a* and S155*b*, respectively, and simultaneously are compressed and caused to be guided in the y-direction by the substantially transverse and parallel electric fields $E_{145a\text{-}145b}$ and $E_{P145a\text{-}P145b}$ and by the substantially transverse and parallel electric fields $E_{155b\text{-}155a}$ and $E_{P155b\text{-}P155a}$ and decrease the substantially linearly aligned Coulomb forces of repulsion between the negatively charged ions 101 by accelerating as a charged ion beam B101 in a trajectory primarily in the z-direction towards the counterpart electrode and partition surfaces S145*a*, S155*b* and P145*c*, P155*d*, respectively.

The establishment of the electric fields $E_{145a\text{-}145b}$ between electrode surfaces S145*a* and S145*b* and $E_{155b\text{-}155a}$ between electrode surfaces S155*b* and S155*a* and of the electric fields $E_{P145a\text{-}P145b}$ between partition surfaces P145*c* and P145*d* and $E_{P155b\text{-}P155a}$ between partition surfaces P155*d* and P155*c* causes the positively charged solute ions 102 which have accumulated at the electrode surfaces S145*a* and S155*b* to now be repelled from electrode surfaces S145*a* and S155*b* and directed towards counterpart electrode surfaces S145*b* and S155*a*, respectively, and simultaneously are compressed and caused to be guided in the y-direction by the substantially transverse and parallel electric fields $E_{145a\text{-}145b}$ and $E_{P145a\text{-}P145b}$ and by the substantially transverse and parallel electric fields $E_{155b\text{-}155a}$ and $E_{P155b\text{-}P155a}$ and decrease the substantially linearly aligned Coulomb forces of repulsion between the positively charged ions 102 by accelerating as a charged ion beam B102 in a trajectory primarily in the z-direction towards the counterpart electrode and partition surfaces S145*b*, S155*a* and P145*d*, P155*c*. respectively.

Figure 49:
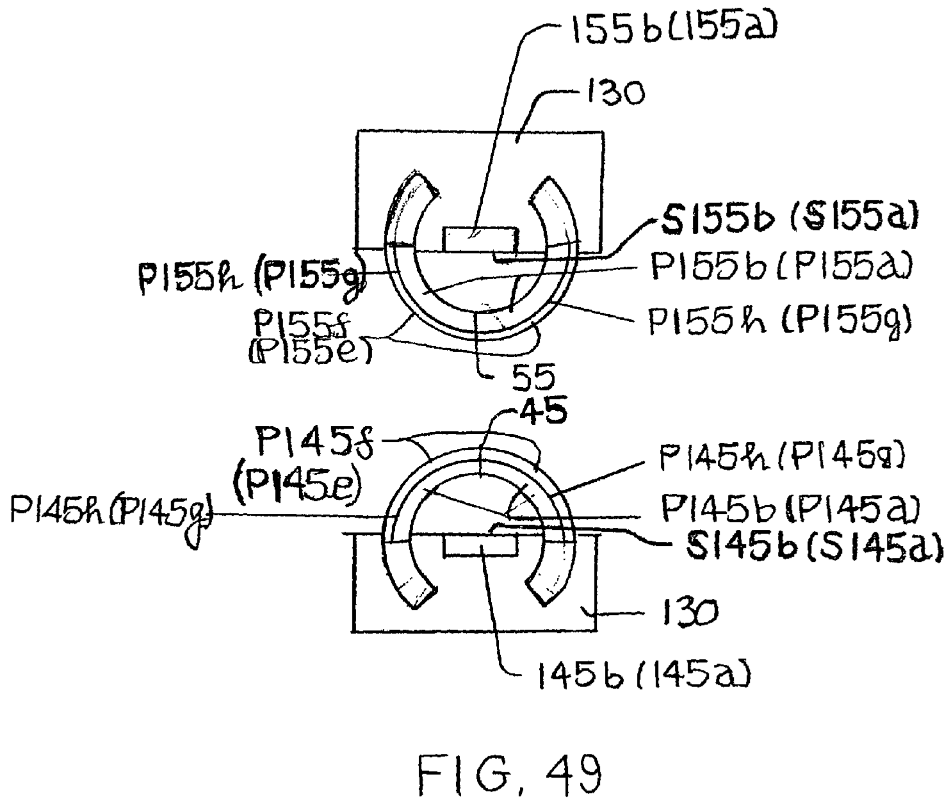
FIG. 49 is a cross-sectional view of the electrodes of FIGS. 44-45 illustrating movable insulating layers disposed over the outer surfaces of the partitions following closure of the partitions.

In one embodiment, referring to FIG. 49, the electrode sets 145*a* and 145*b* and 155*a* and 155*b* may be configured such that following the closure of the partitions P145*a*, P145*b*, P155*a* and P155*b*, but prior to entering into the discharge or charge repulsion and acceleration mode of operation, insulating layers P145*e* and P145*f* may be disposed around outer surfaces P145*g* and P145*h* of partitions P145*a* and P145*b*, respectively, while insulating layers P155*e* and P155*f* may be disposed around outer surfaces P155*g* and P155*h* of partitions P155*a* and P155*b*, respectively. The outer surfaces P145*g* and P145*h* generally interface with outer surfaces P155*g* and P155*h*, respectively.

The partitions P145*a*, P145*b*, P155*a* and P155*b* may be moved into position by various suitable methods. For example, referring to FIG. 45, a fluid (not shown) may be injected or extracted from compartments 158 formed in the dielectric material 130 to push or pull the partition. The partitions P145*a*, P145*b*, P155*a* and P155*b* are made from an electrically conductive material. In one embodiment, the partitions P145*a*, P145*b*, P155*a* and P155*b* may be made from the same material as the electrodes 145*a*, 145*b*, 155*a* and 155*b*, e.g., a high surface area material or a corrosion-resistant material as described above.

The establishment of the electric fields to accelerate the positive solute ions 102 in a direction substantially transverse to and substantially along the longitudinal axis of the surfaces S145*a* and S155*b*, and by coupling the electrode 145*b* and partition P145*b* and the electrode 155*a* and partition P155*a* to accelerate the negative solute ions 101 in a direction substantially transverse to and substantially along the longitudinal axis of the surfaces S145*b* and S155*a*, such that the negative and positive solute ions 101 and 102 may form beams B101 and B102, respectively, that may be directed to the region 25 to impact the target 20 (see also FIG. 12). The combined coupling of the partitions and their respective associated electrode to the same polarity terminals of the independent voltage sources V17 and V18 enables independent voltage levels to the electrodes and to the partitions to enhance control over the formation of the beams B101 and B102 serves to enhance both the separation and linear alignment of the solute ions 101 and 102 to yield at least an energy conversion if not a net energy gain.

Those of ordinary skill in the art will recognize that, and understand how, in one embodiment, the upper set of electrodes 155*a* and 155*b* and their respective partitions P155*a* and P155*b* may be rotated around the axis D following the charge accumulation mode and closure of the partitions P155*a* and P155*b* in a similar manner as described above with respect to the partitions P113*e*, P163*e*, P163*f*, P113*f*, P114*e*, P164*e*, P164*f*, and P114*f* of electrode assembly 100D and FIGS. 24-28. In one embodiment, the electrodes 155*a* and 155*b* are aligned over the electrodes 145*b* and 145*a*, respectively.

Figure 50:
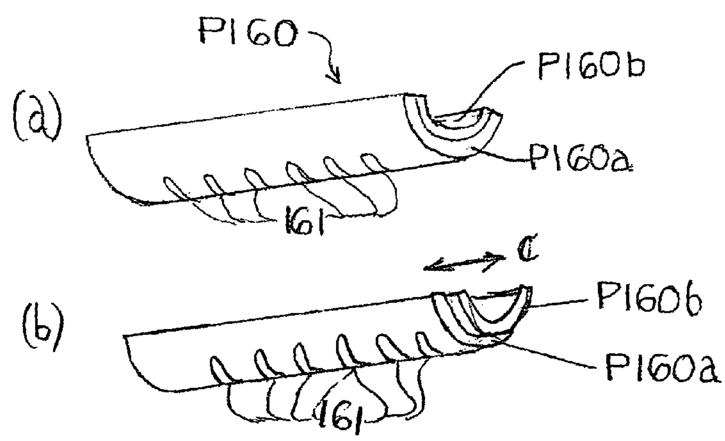
FIG. 50 illustrates an alternate embodiment of the partitions of FIGS. 44-45 having a plurality of slots or apertures.

In one embodiment, referring to FIG. 50, a partition P160 may be configured of two concentric cylindrical outer and inner portions P160*a* and P160*b*, respectively, that each include a plurality of slots or apertures 161 that are aligned with respect to each other when the outer and inner portions P160*a* and P160*b* are aligned longitudinally as shown in FIG. 50, position (a). Either the outer portion P160*a* or the inner portion P160*b* may be fixedly disposed over a respective electrode 145*a*, 145*b*, 155*a* or 155*b* in the same manner as when the partitions P145*a*, P145*b*, P155*a* and P155*b* are in the closed position (see FIG. 45). During the charge accumulation mode of operation, the outer and inner portions P160*a* and P160*b* may be aligned longitudinally as shown in FIG. 50, position (a), so that the solute ions 101 and 102 may pass through the plurality of slots or apertures 161 to be attracted by the particular electrode surfaces S145*a*, S145*b*, S155*a* and S155*b*. Once charge accumulation has been achieved to a desired level, the other of the outer or the inner portion P160*a* or P160*b* may then be slidably moved in the longitudinal direction as shown in FIG. 50, position (b), by the arrow C, to seal the plurality of apertures 161 during the discharge and charge acceleration mode of operation when at least the inner partition portion P160*b* may be electrically coupled to voltage source V18 as explained above with respect to the partitions P145*a*, P145*b*, P155*a* and P155*b* (see FIG. 45) to effect the generation of the beams B101 and B102. The embodiments are not limited in this context.

Figure 43:
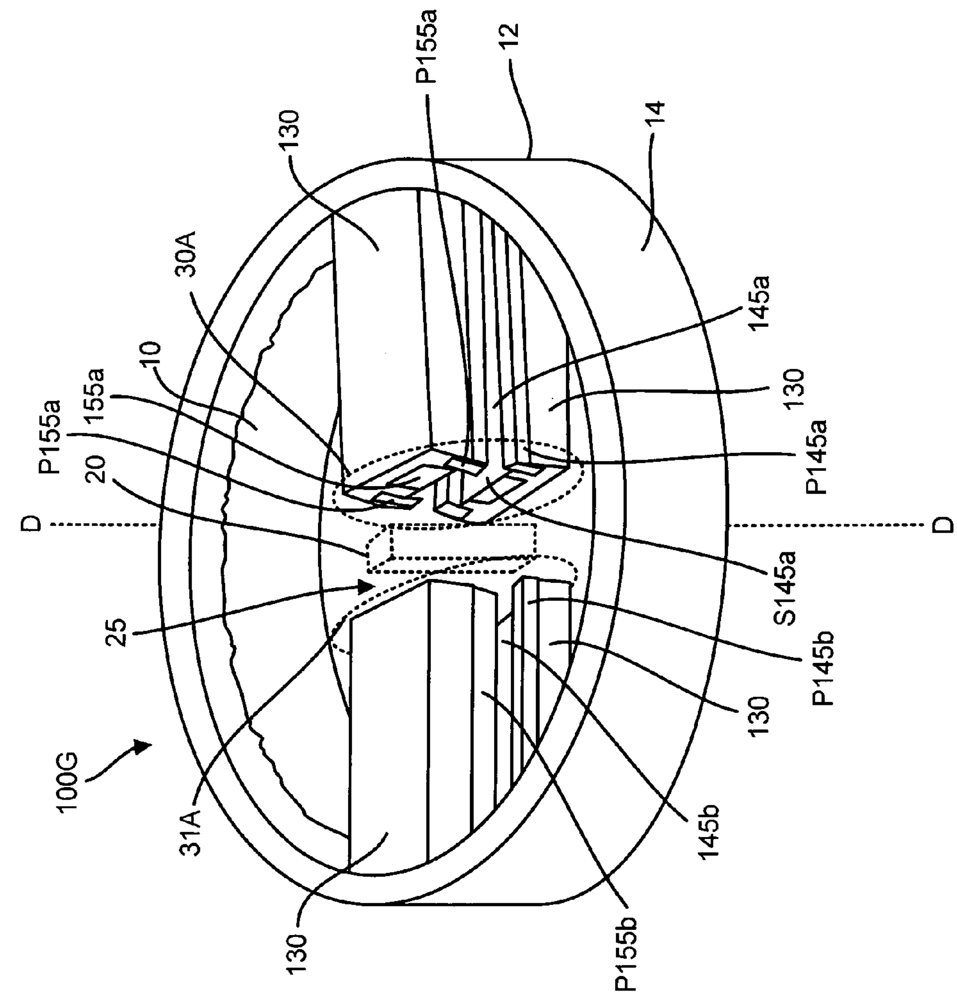
FIG. 43 is a perspective view of an alternate embodiment of the electrode assembly of FIG. 22 that includes partitions to isolate solute ions following a charge accumulation mode of operation.
Figure 44:
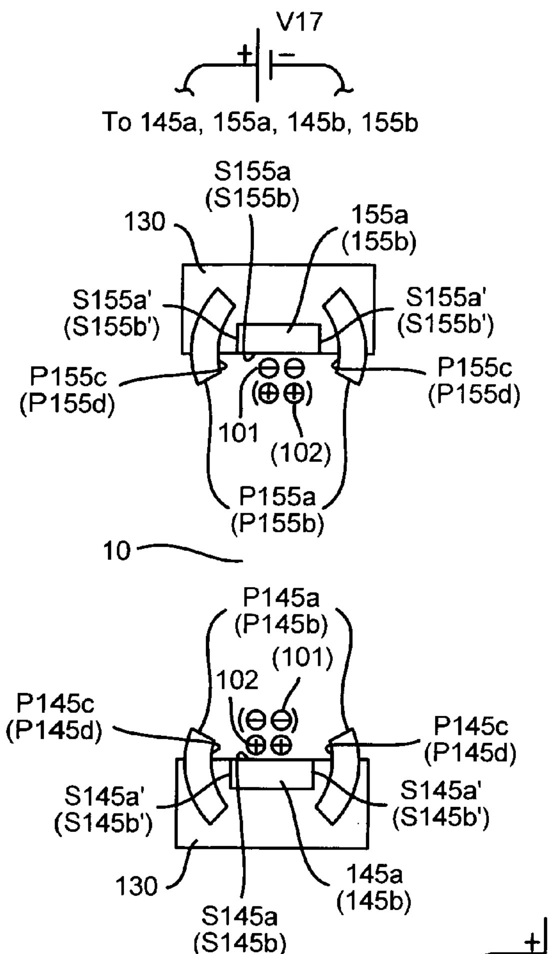
FIG. 44 is a cross-sectional view of the electrodes and partitions of FIG. 43 in a first mode of operation of charge accumulation.
Figure 45:
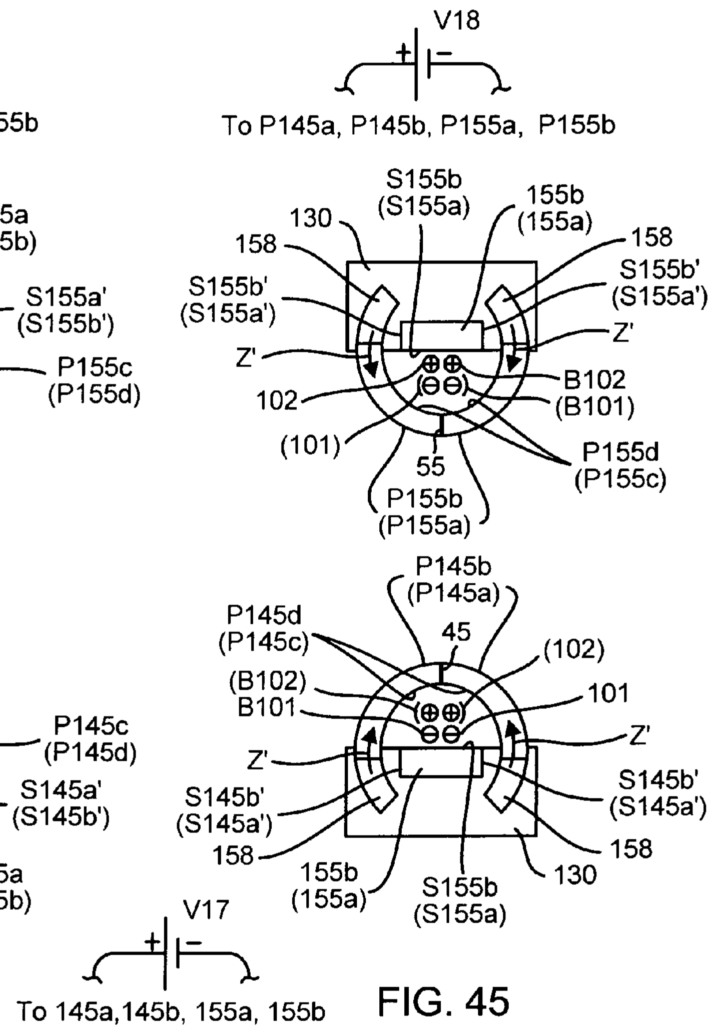
FIG. 45 is a cross-sectional view of the electrodes and partitions of FIG. 43 in a second mode of operation of charge accumulation in a configuration to isolate the solute ions.
Figure 51:
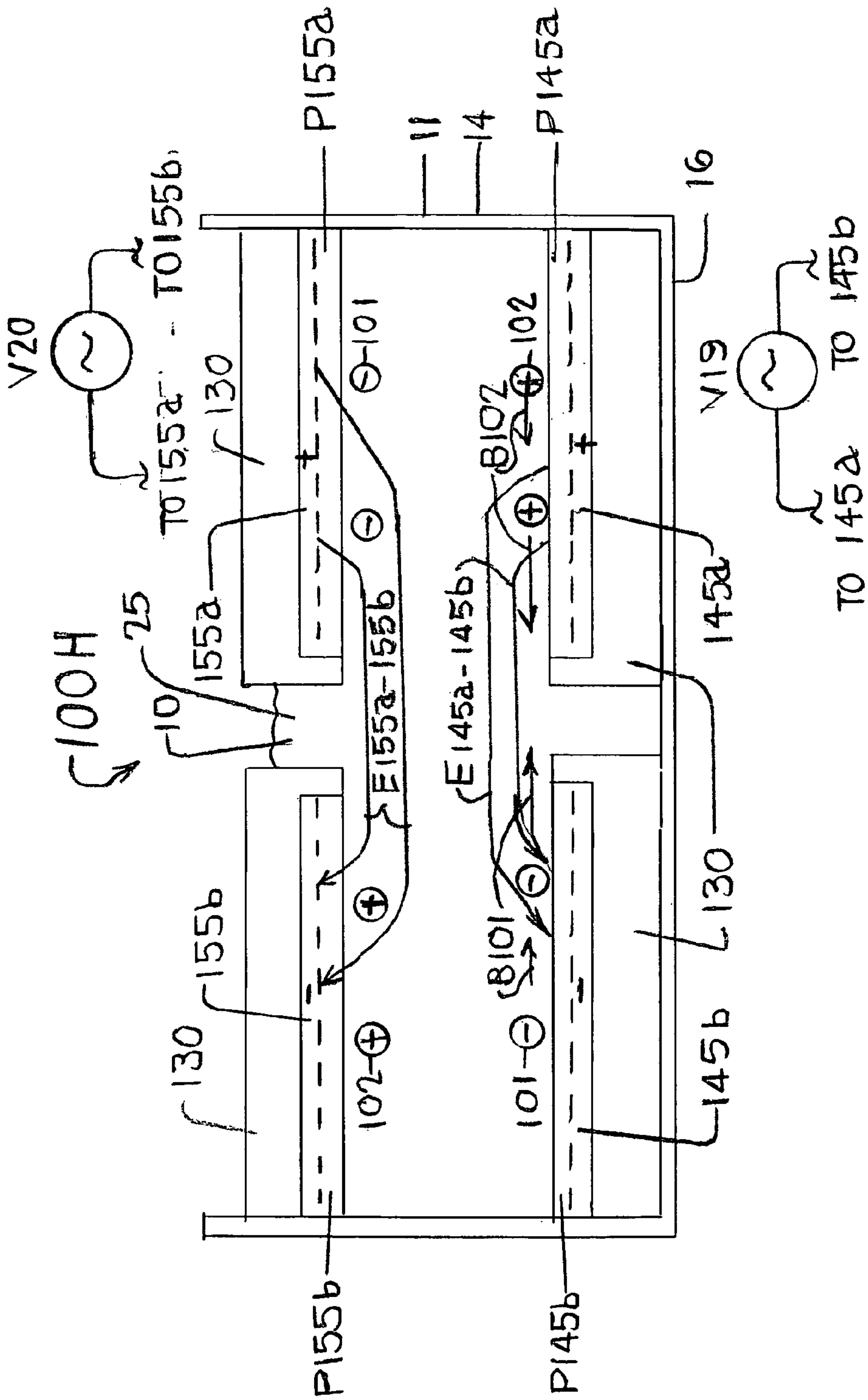
FIG. 51 illustrates an alternate embodiment of the electrode assemblies of FIGS. 43-48 having a first alternating power source during a half-cycle of discharge and charge acceleration mode of operation.
Figure 52:
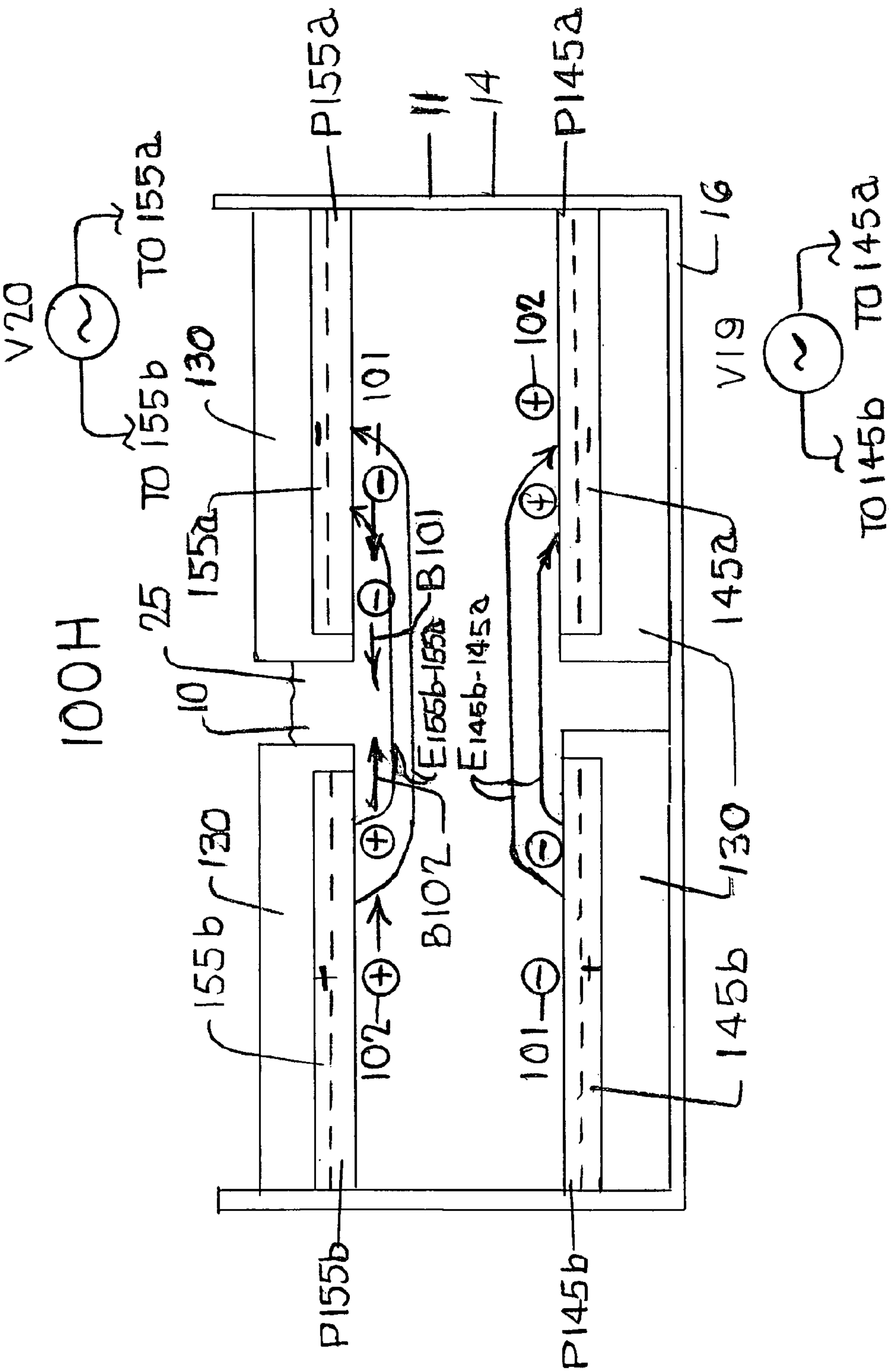
FIG. 52 illustrates the electrode assembly of FIG. 51 having a second alternating power source during another half-cycle of discharge and charge acceleration mode of operation.
Figure 53:
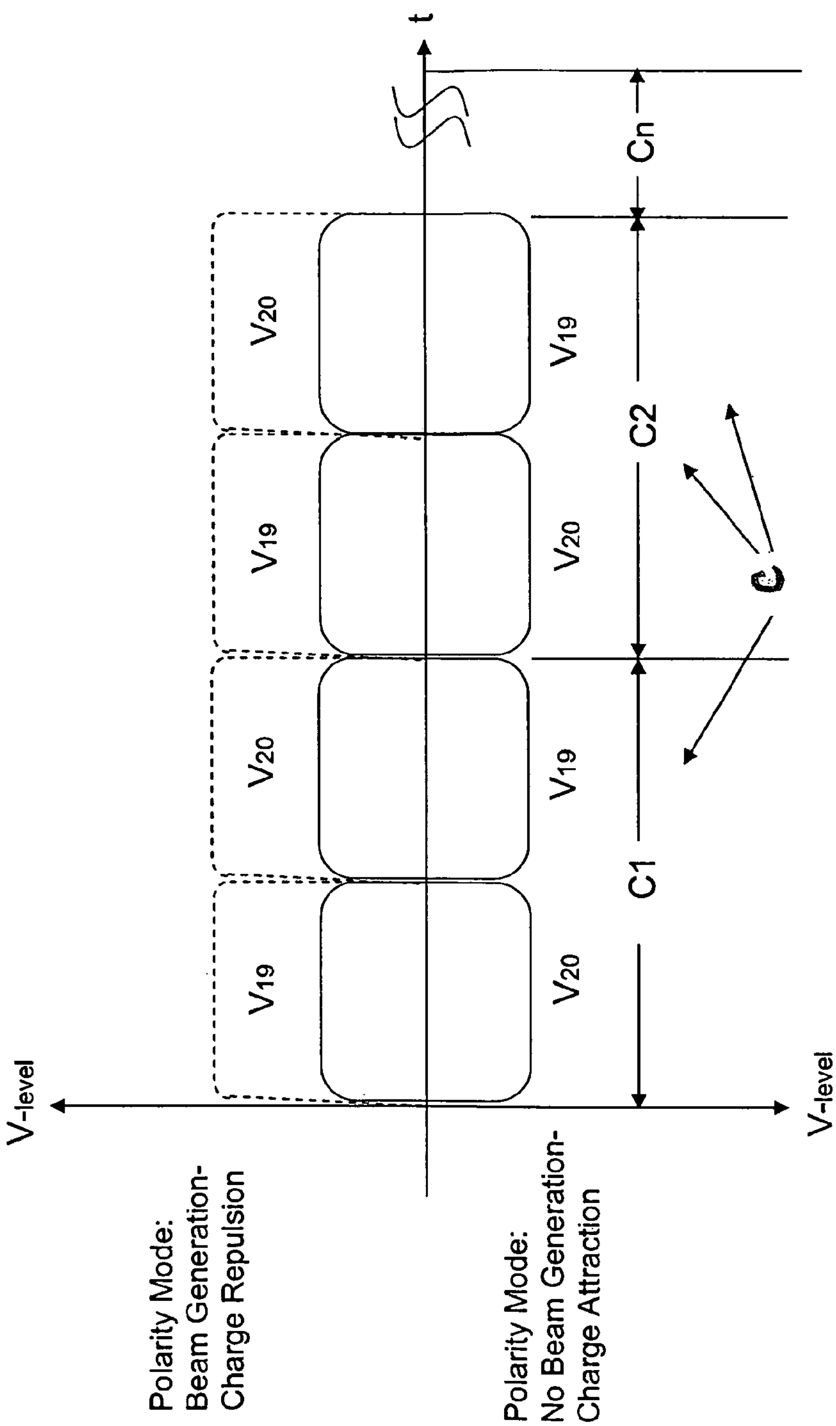
FIG. 53 is a graphical representation of the alternating power operation of the electrode assembly of FIGS. 51-52.

Referring to FIGS. 51-53, in one embodiment, there is illustrated an electrode assembly 100H that is similar to electrode assembly 100G of FIGS. 43-50, in that electrode assembly 100H includes the set of lower electrodes 145*a* and 145*b* and the set of upper electrode 155*a* and 155*b*, each electrode embedded in dielectric material 130 and having an exposed surface S145a, S145b, S155a and S155b, respectively and configured in vessel 11 such that surface 145*a* is disposed in interfacing relationship with surface S155a and surface S145b is disposed in interfacing relationship with surface S155b. Electrode assembly 100H differs from electrode assembly 100G in that electrode assembly 100H may include the partitions P145a, P145b, P155a and P155b in their open position only, as illustrated in FIG. 43. As illustrated in FIGS. 51-52, electrode assembly 100H is illustrated following a charge accumulation mode of operation.

In that those of ordinary skill in the art will recognize that, and understand how, the charge accumulation mode of operation is effected, only the discharge or charge repulsion and acceleration mode of operation is illustrated. More particularly, FIG. 51 illustrates a first phase of the charge repulsion and acceleration mode of operation while FIG. 52 illustrates a second phase of the charge repulsion and acceleration mode of operation. Following the charge accumulation mode of operation, negative solute ions 101 have been attracted to the surfaces S145*b* and S155*a* of electrodes 145*b* and 155*a*, respectively, while positive solute ions 102 have been attracted to the surfaces S145*a* and S155*b* of electrodes 145*a* and 155*b*, respectively.

Referring to FIG. 51, during the first phase of charge repulsion and acceleration, a positive terminal of a first voltage source V19 is electrically coupled to the electrode 145*a* while a negative terminal of the first voltage source V19 is electrically coupled to the electrode 145*b*, resulting in a substantially transverse electric field $E_{145a\text{-}145b}$ extending from surface S145*a* to surface S145*b*. At the same time, a positive terminal of a second voltage source V20 is electrically coupled to the electrode 155*a* while a negative terminal of the second voltage source V20 is electrically coupled to the electrode 155*b*, resulting in a substantially transverse electric field $E_{155a\text{-}155b}$ extending from surface S155*a* to surface S155*b*.

Since negative ions 101 have been attracted to the surface S155*a* of electrode 155*a* while positive ions 102 have been attracted to the surface S155*b* of electrode 155*b*, the resulting polarity of the electrodes 155*a* and 155*b* and the direction of the electric field $E_{155a\text{-}155b}$ causes the negative ions 101 to remain attracted to the surface S155*a* of electrode 155*a* while the positive ions 102 remain attracted to the surface S155*b* of electrode 155*b*. However, since negative solute ions 101 have been attracted to the surface S145*b* of electrode 145*b*, while positive solute ions 102 have been attracted to the surface S145*a* electrode 145*a*, the resulting polarity of the electrodes 145*a* and 145*b* and the direction of the electric field $E_{145a\text{-}145b}$ causes the negative ions 101 to be repelled from the surface S145*b* of electrode 145*b* and accelerated toward the surface S145*a* of electrode 145*a*, and the positive ions 102 to be repelled from the surface S145*a* of electrode 145*a* and accelerated toward the surface S145*b* of electrode 145*b*. During the first phase of the acceleration mode of operation, the direction and polarity of the electric field $E_{155a\text{-}155b}$ tends to compress and align the negative ions 101 and the positive ions 102 at the opposing interfacing surfaces S145*a* and S145*b*, thereby enhancing the acceleration of the negative ions 101 as a beam B101 originating from the surface S145*b* and of the acceleration of the positive ions 102 as a beam B102 originating from the surface S145*a* of electrode 145*a*.

Referring to FIG. 52, during the second phase of charge repulsion and acceleration, a positive terminal of the first voltage source V19 is electrically coupled to the electrode 145*b* while a negative terminal of the first voltage source V19 is electrically coupled to the electrode 145*a*, resulting in a substantially transverse electric field $E_{145b\text{-}145a}$ extending from surface S145*b* to surface S145*a*. At the same time, a positive terminal of the second voltage source V20 is electrically coupled to the electrode 155*b* while a negative terminal of the second voltage source V20 is electrically coupled to the electrode 155*a*, resulting in a substantially transverse electric field $E_{155b\text{-}155a}$ extending from surface S155*b* to surface S155*a*.

Since negative ions 101 have been attracted to the surface S145*b* of electrode 145*a* while positive ions 102 have been attracted to the surface S145*a* of electrode 145*a*, the resulting polarity of the electrodes 145*a* and 145*b* and the direction of the electric field $E_{145b\text{-}145a}$ causes the negative ions 101 to remain attracted to the surface S145*b* of electrode 145*b* while the positive ions 102 remain attracted to the surface S145*a* of electrode 145*a*. However, since negative solute ions 101 have been attracted to the surface S155*a* of electrode 155*a*, while positive solute ions 102 have been attracted to the surface S155*b* electrode 155*b*, the resulting polarity of the electrodes 155*a* and 155*b* and the direction of the electric field $E_{155b\text{-}155a}$ causes the negative ions 101 to be repelled from the surface S155*a* of electrode 155*a* and accelerated toward the surface S155*b* of electrode 155*b*, and the positive ions 102 to be repelled from the surface S155*b* of electrode 155*b* and accelerated toward the surface S155*a* of electrode 155*a*. During the second phase of the acceleration mode of operation, the direction and polarity of the electric field $E_{145b\text{-}145a}$ tends to compress and align the negative ions 101 and the positive ions 102 at the opposing interfacing surfaces S155*a* and S155*b*, thereby enhancing the acceleration of the negative ions 101 as a beam B101 originating from the surface S155*a* and of the acceleration of the positive ions 102 as a beam B102 originating from the surface S155*b* of electrode 155*b*.

Referring to FIG. 53, there is illustrated a graphical representation of the cycling operation of the first and second voltage sources V19 and V20, respectively, as a function of time "t" during the first and second phases of charge repulsion and acceleration discussed above with respect to FIGS. 51 and 52. The polarity modes of the first and second voltage sources V19 and V20, respectively, alternate from a "NO BEAM GENERATION-CHARGE ATTRACTION MODE", as indicated by the portion of the graph below the horizontal time axis, to a "BEAM GENERATION-CHARGE REPULSION MODE", as indicated by the portion of the graph above the horizontal time axis. The polarity mode and voltage level V of the first voltage source V19 is indicated by the solid line while the polarity mode and voltage level of the second voltage source V20 is indicated by the dashed line. An operating cycle C is defined for each of the voltage sources V19 and V20 as completion of the voltage source of both the "NO BEAM GENERATION-CHARGE ATTRACTION MODE" and the "BEAM GENERATION-CHARGE REPULSION MODE", in either order. Two operating cycles C1 and C2 are illustrated with "n" operating cycles represented by Cn possible. The voltage level V in the "BEAM GENERATION-CHARGE REPULSION MODE" may differ from the voltage level V in the "NO BEAM GENERATION-CHARGE ATTRACTION MODE" for each of the voltage sources V19 and V20. Therefore, while the voltage sources V19 and V20 may be considered to be alternating current (AC) sources, the voltage sources V19 and V20 may be characterized as yielding asymmetrical voltage outputs when the voltage outputs are characterized by the curves designated as "(b)". Symmetrical voltage outputs of the voltage sources V19 and V20 are characterized by the curves designated as "(a)". Thus, the alternating current characteristics of the voltage sources V19 and V20 enable at least a degree of beam compression and alignment by the electric fields described above without mechanical motion of the electrodes or the partitions.

In one embodiment, referring to FIGS. 54-57, there is disclosed an electrode assembly 200A having a housing 170 having a first section 171 and a second section 172, wherein the second section 172 is offset from the first section 171. In a similar manner to electrode assembly 100 illustrated in FIG. 7, the first section 171 of the housing assembly 170 includes at least the stationary electrode pairs of major inner electrodes 113*a* and 113*b* (or flat or non-circular electrodes 113*e* and 113*f* as illustrated) and may include major outer electrodes 115*a* and 115*b* (or flat or non-circular electrodes 115*e* and 115*f* as illustrated), and at least minor inner electrodes 114*a* and 114*b* (or flat or non-circular electrodes 114*e* and 114*f* as illustrated) and may include outer minor electrodes 116*a* and 116*b* (or flat or non-circular electrodes 116*e* and 116*f* as illustrated) which may be disposed in a substantially parallel configuration. However, instead of the rotatable electrode 160 being disposed in the first section 171, a translatably movable set of electrodes 175 is disposed in the second portion 172 of the housing 170 and configured to be extended into and retracted from a region 173 between the interfacing surfaces S115*e* and S115*f*, S113*e* and S113*f*, S114*e* and S114*f*, and S116*e* and S116*f*. The movable set of electrodes 175 may include the major electrodes 165*e* and 165*f* and corresponding surfaces S165*e* and S165*f*, 163*e* and 163*f* and corresponding surfaces S163*e* and S163*f*, respectively, and the minor electrodes 164*e* and 164*f* and corresponding surfaces S164*e* and S164*f*, 166*e* and 166*f* and corresponding surfaces S166*e* and S166*f*, respectively, and movable dielectric material 130 disposed between the major electrodes 115*e* and 115*f*, and 113*e* and 113*f*, and between the minor electrodes 114*e* and 114*f*, and 116*e* and 116*f*. As discussed in more detail below, the major electrodes 165*e* and 165*f* and corresponding surfaces S165*e* and S165*f*, 163*e* and 163*f* and corresponding surfaces S163*e* and S163*f*, respectively, and the minor electrodes 164*e* and 164*f* and corresponding surfaces S164*e* and S164*f*, 166*e* and 166*f* and corresponding surfaces S166*e* and S166*f*, respectively, act as partitions to isolate the solute ions 101 and 102 at the respective electrode surfaces.

Figure 54:
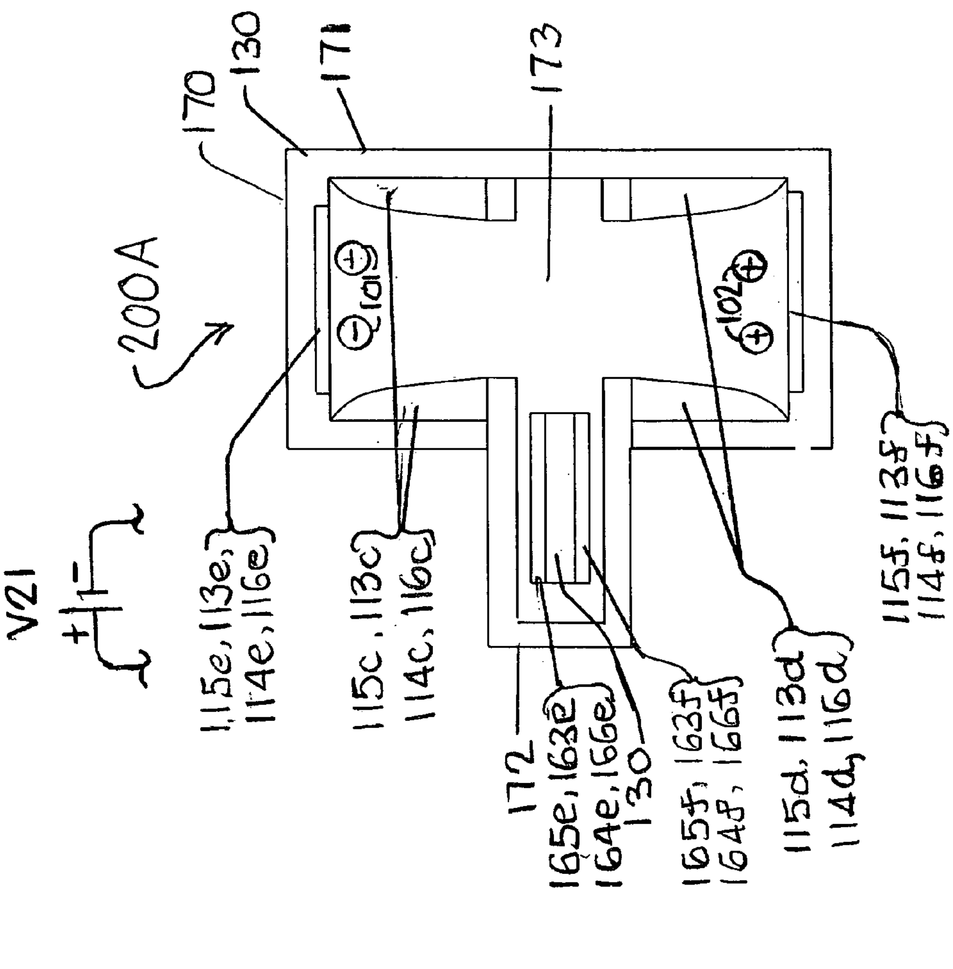
FIG. 54 illustrates a cross-sectional view of one embodiment of an electrode assembly according to the present disclosure having an offset flat partition and insulating layer assembly that is offset from the housing in a first mode of operation.

Referring to FIG. 54 and FIG. 57, TABLE 7, during the initial charge accumulation mode of operation, a positive terminal of voltage source V21 is electrically coupled to at least the major electrodes 115*e* and 113*e* while a negative terminal of voltage source V21 is electrically coupled to the major electrodes 115*f* and 113*f* to create or establish substantially orthogonal electric fields $E_{115e\text{-}115f}$ and $E_{116e\text{-}116f}$ between the surfaces S115*e* and S115*f*, and S113*e* and S113*f*, respectively. The movable set of electrodes 175 is retracted from the region 173 and negative ions 101 are attracted to surfaces S115*e* and S116*e*, while positive ions 102 are attracted to surfaces S115*f* and S116*f*. In a similar manner as described above with respect to voltage source V11, the voltage source V14 may apply the electric fields $E_{115e\text{-}115f}$ and $E_{116e\text{-}116f}$ as single continuous fields when the electrode surfaces S115*e* and S115*f*, and S113*e* and S113*f* are formed from high surface area materials or as a single pulse or repetitive pulses to form multiple layers "n" of charged solute ions 101 and 102 that are attracted to the respective electrode surfaces as disclosed in FIG. 57, TABLE 7.

Figure 55:
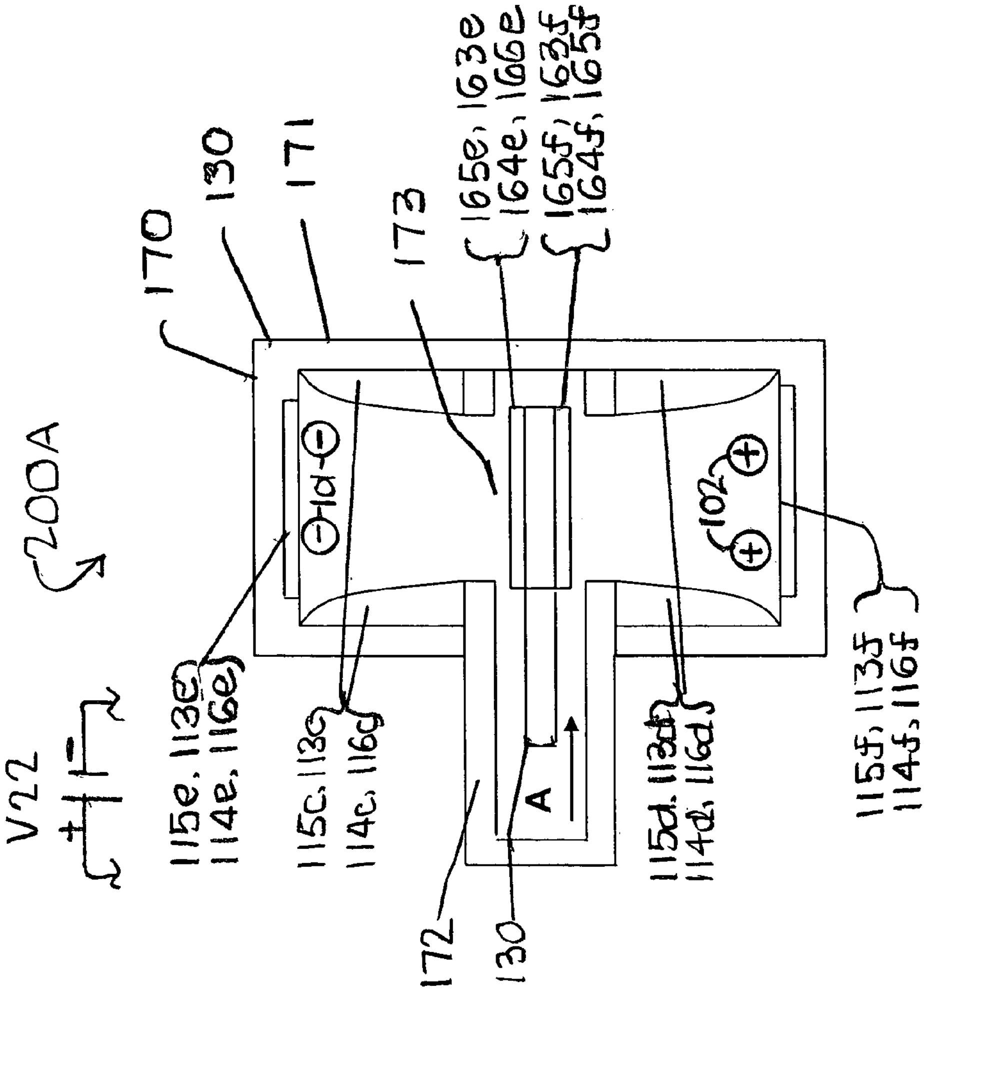
FIG. 55 illustrates a cross-sectional view of the electrode assembly of FIG. 54 having the flat partition and insulating layer assembly wherein the partitions are inserted into housing in a second mode of operation.
Figure 56:
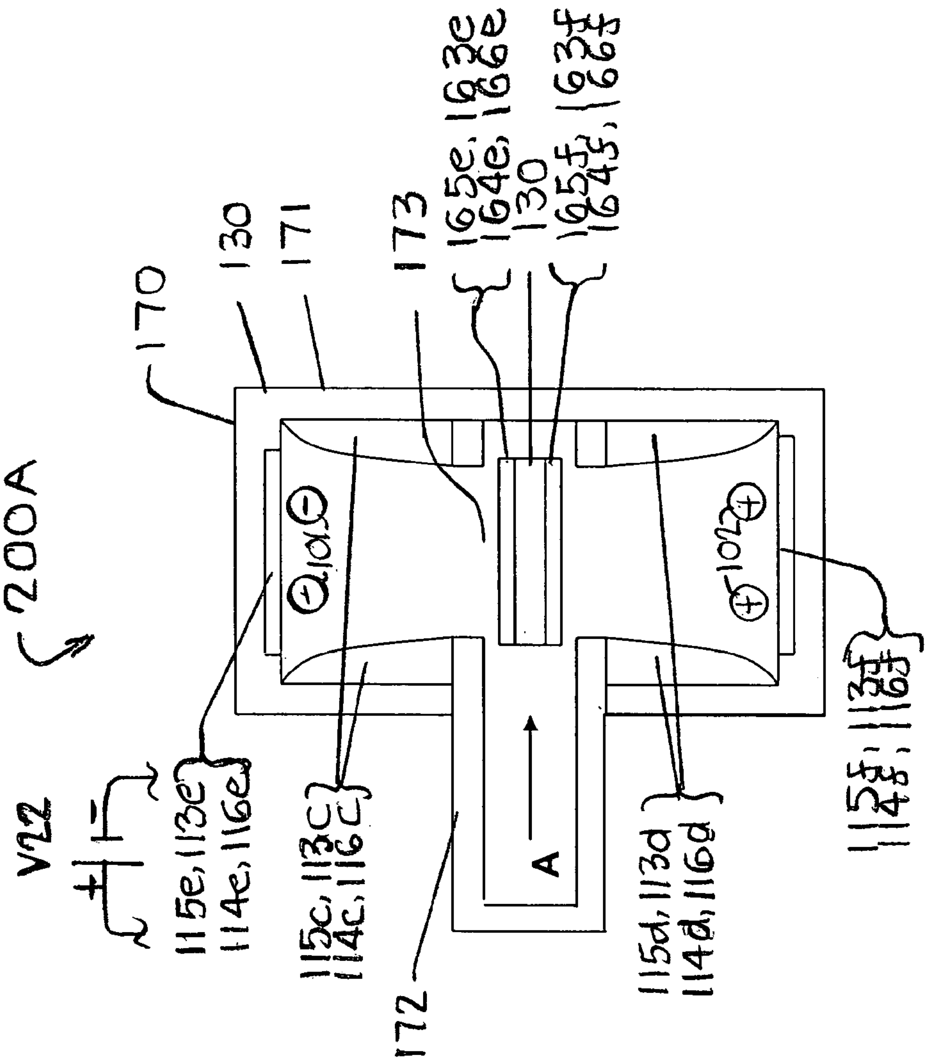
FIG. 56 illustrates a cross-sectional view of the electrode assembly of FIG. 54 having the flat partition and insulating layer assembly wherein the insulating layer is inserted into housing in a third mode of operation.

Following the charge accumulation, referring to FIGS. 55 and 56, as indicated by arrow A, the movable set of electrodes 175 is extended into the region 173 between the interfacing surfaces S115*e* and S115*f*, S113*e* and S113*f*, S114*e* and S114*f*, and S116*e* and S116*f*, respectively. During the extension into region 173, the electrodes 165*e*, 165*f*, 163*e*, 163*f*, 164*e*, 164*f*, 166*e* and 166*f* may be passive and unactivated such that the electric fields $E_{115e\text{-}115f}$ and $E_{116e\text{-}116f}$ pass through the electrodes 165*e* and 165*f* and through the electrodes 166*e* and 166*f*, respectively. In one embodiment, the dielectric material 130 may be extended and inserted between the electrodes 165*e*, 163*e*, 164*e*, 166*e* and 165*f*, 163*f*, 164*f*, 166*f*.

Following the extension into region 173, the solute ions 101 and 102 are substantially isolated and the charge repulsion and acceleration mode may be initiated.

More particularly, referring to FIG. 57—TABLE 7 and to FIG. 55 and/or FIG. 56, a negative terminal of a voltage source V22 is now coupled to electrode 115*e* and to electrode 116*f*, while a positive terminal of voltage source V22 is now coupled to electrode 115*f* and to electrode 116*e* to form sufficient potential to form substantially transverse electric fields $E_{116e-115e}$ and $E_{115f-116f}$, between surfaces S116*e* and S115*e* and between surfaces S115*f* and S116*f*, respectively. Similarly, a negative terminal of voltage source V22 is now coupled to electrode 165*e* and to electrode 166*f*, while a positive terminal of voltage source V15 is now coupled to electrode 165*f* and to electrode 166*e* to form sufficient potential to form substantially transverse electric fields $E_{166e-165e}$ and $E_{165f-166f}$, between surfaces S166*e* and S165*e* and between surfaces S165*f* and S166*f*, respectively. In a similar manner to the configuration of voltage sources V12 and V13 illustrated in FIG. 12, those skilled in the art will recognize that, and understand how, another voltage source (not shown) in addition to voltage source V22 may be coupled separately to outer electrodes 115*e*, 165*e*, 165*f*, 115*f*, 116*e*, 166*e*, 166*f* and 116*f* to apply a different and in one embodiment a greater voltage potential than the voltage potential applied by voltage source V22 to inner electrodes 113*e*, 163*e*, 113*f*, 163*f*, 114*e*, 164*e*, 164*f* and 114*f*.

During the charge repulsion (or discharge) and ion acceleration mode of operation, in a similar manner to electrode assembly 100, the substantially transverse electric fields $E_{116e-115e}$, $E_{114e-113e}$, $E_{166e-165e}$, and $E_{164e-163e}$ substantially repel and substantially compress the negative solute ions 101 in the first section 171 of housing 170 to decrease the substantially linearly aligned Coulomb forces of repulsion between the negatively charged ions 101 by accelerating as a charged ion beam B101 (see FIG. 12). Similarly, the substantially transverse electric fields $E_{115f-116f}$, $E_{113f-114f}$, $E_{165f-166f}$, and $E_{163f-164f}$ substantially repel and substantially compress the positive solute ions 102 in the first section 171 of housing 170 to decrease the substantially linearly aligned Coulomb forces of repulsion between the positively charged ions 102 by accelerating as a charged ion beam B102 (see FIG. 12).

In a similar manner as explained previously with respect to electrode assembly 100, during the discharge and ion acceleration mode of operation of electrode assembly 200A, those of ordinary skill in the art will recognize that, and understand how, previously passive sets 115*c*, 115*d*, 113*c*, 113*d*, 114*c*, 114*d*, 116*c*, and 116*d* of auxiliary electrodes may now be activated to assist in the ion acceleration mode in an analogous manner by appropriate coupling to the negative and positive terminals of voltage source V22.

Those of ordinary skill in the art will recognize that, and understand how, the electrode assembly 200A may be operated with the translatably movable electrode set 175, including the dielectric material 130 between the between the electrodes 165*e*, 163*e*, 164*e*, 166*e* and 165*f*, 163*f*, 164*f*, 166*f*, inserted into the region 173 between the set of major inner electrodes 113*e* and 113*f* and between the set of major outer electrodes 115*e* and 115*f*, and between the set of minor inner electrodes 114*e* and 114*f* and between the set of minor outer electrodes 116*e* and 116*f* during both the charge accumulation or attraction mode of operation as well as during the discharge or repulsion and acceleration mode of operation. In one embodiment, the electrodes may be each made from a high surface area material such as for example, but not limited to, carbon aerogel, while the dielectric material 130 is made from a material having a comparable high surface area, such as for example, but not limited to, silica aerogel. As compared to the voltage potential of voltage source V12 of electrode assembly 100 of FIG. 12, the voltage potential of voltage source V22 is greater than the voltage potential of voltage source V12 to enhance the accumulation of solute ions 101 and 102 at the set of major inner electrodes 113*e* and 113*f* and the set of major outer electrodes 115*e* and 115*f*, and at the set of minor inner electrodes 114*e* and 114*f* and at the set of minor outer electrodes 116*e* and 116*f*.

Figure 58:
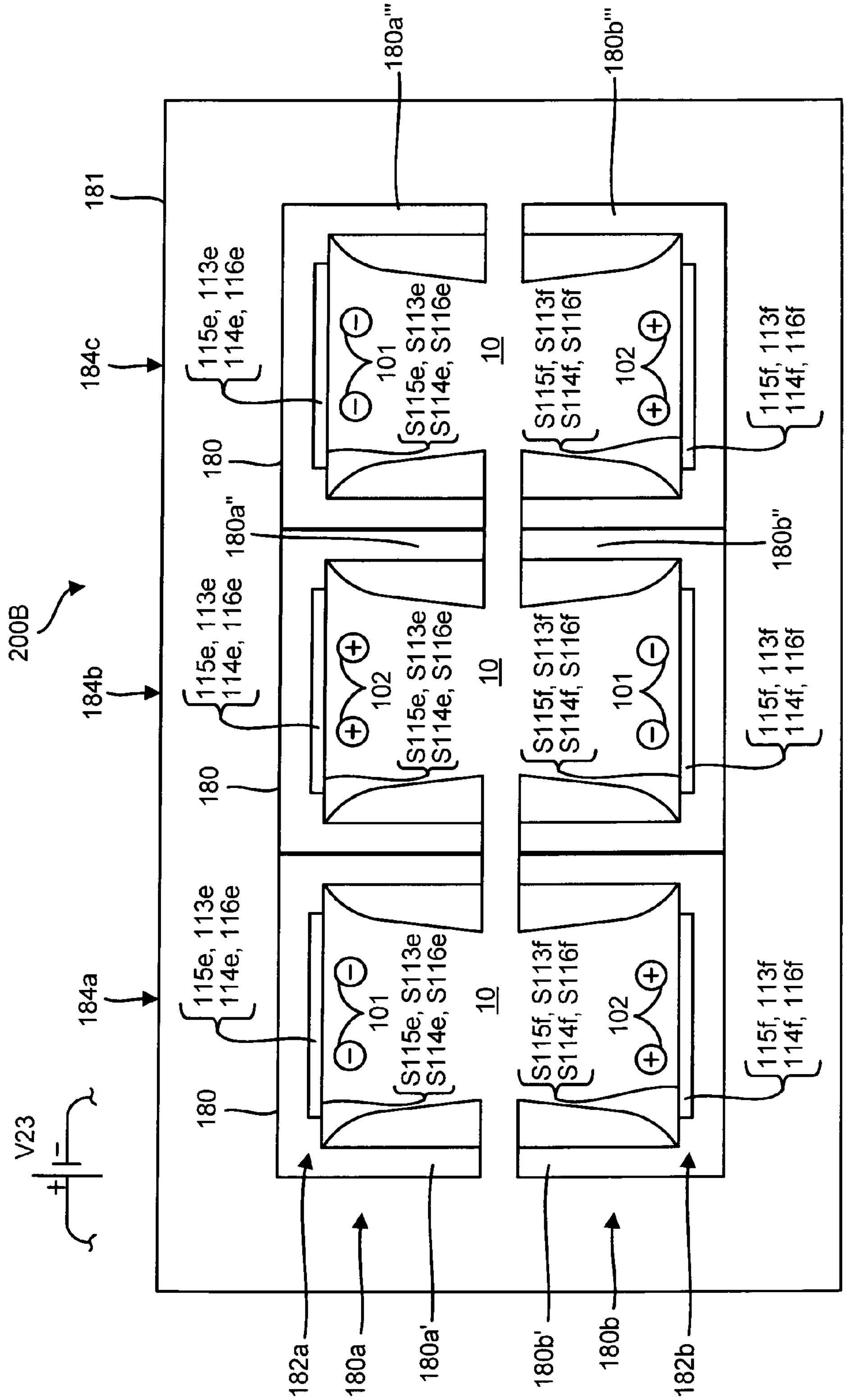
FIG. 58 illustrates one embodiment of an electrode assembly according to the present disclosure having a housing that includes multiple portions of the housing that are translatably movable to isolate the solute ions in a first mode of operation.
Figure 59:
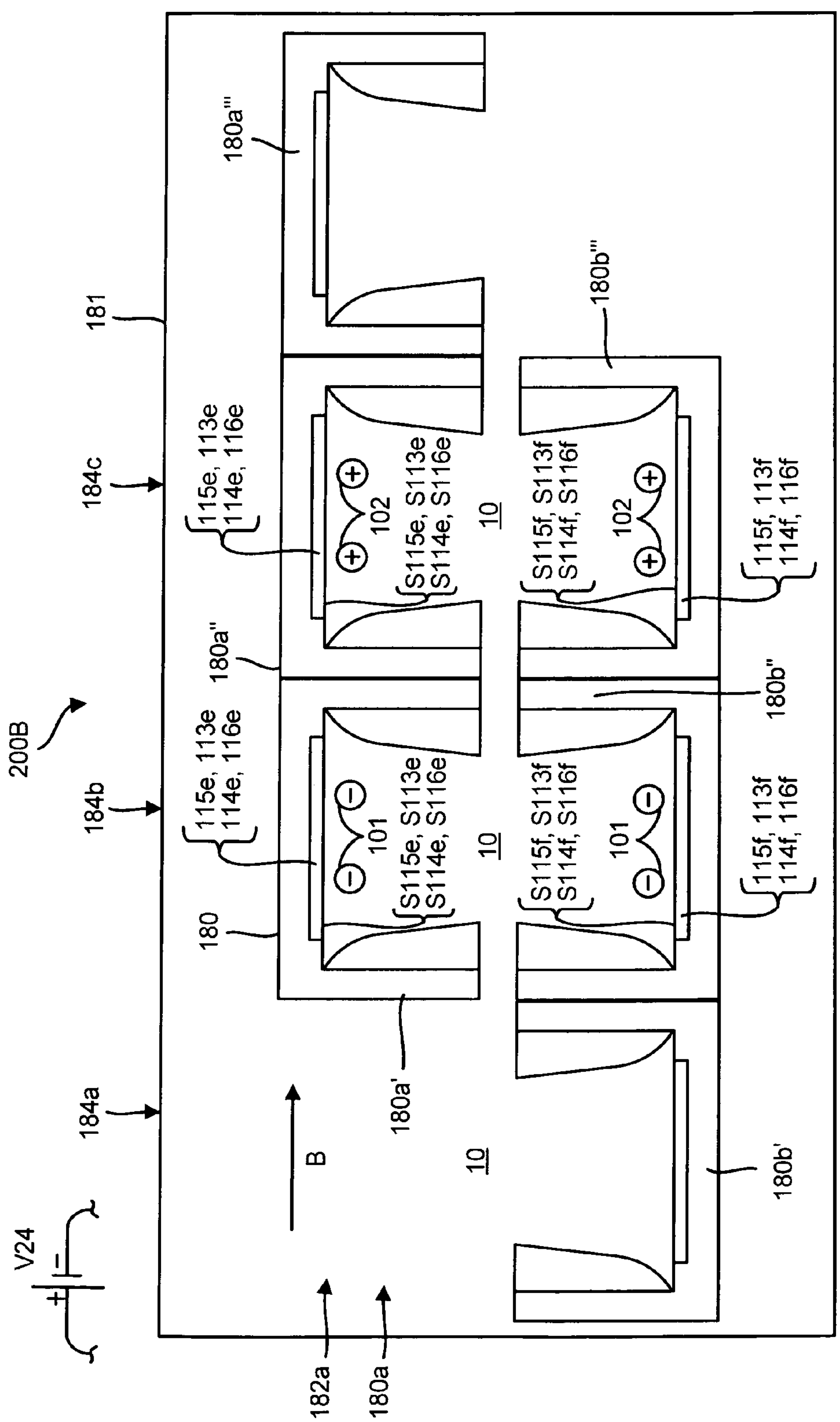
FIG. 59 illustrates the electrode assembly of FIG. 58 wherein the multiple portions of the housing have been translatably moved to isolate the solute ions in a second mode of operation.

In one embodiment, referring to FIGS. 58 and 59, there is disclosed an electrode assembly 200B that differs from the electrode assemblies, e.g., electrode assembly 200A, described above in that a housing 181 of the electrode assembly 200B includes therewithin multiple portions that are translatably movable to effect the isolation of the solute ions. More particularly, outer housing 181 of electrode assembly 200B includes a plurality of housings 180, each housing 180 configured to have a plurality of first and second housing portions 180*a* and 180*b*, respectively, such that at least the sets of major inner electrodes 113*e* and 113*f* and the sets of minor inner electrodes 114*e* and 114*f* are in interfacing relationship to one another, wherein the set of major inner electrode 113*e* and minor inner electrode 114*e* are each disposed within a first housing portion 180*a* while the set of major inner electrode 113*f* and minor inner electrode 114*f* are each disposed within a second housing portion 180*b*. The sets of major outer electrodes 115*e* and 115*f* and the sets of minor outer electrodes 116*e* and 116*f* may be included within the plurality of first and second housing portions 180*a* and 180*b*, respectively.

The plurality of housings 180 may be arranged initially such that each pair of first and second housing portions 180*a* and 180*b* are in an alternating sequence as compared to the prior and subsequent adjacent pairs of first and second housing portions 180*a* and 180*b*. Thus, a first first housing portion 180*a*' and a first second housing portion 180*b*' are initially arranged such that the sets of major electrodes 113*e* and 113*f* and 115*e* and 115*f* are in interfacing relationship to each other respectively. Similarly, the sets of minor electrodes 114*e* and 114*f* and 116*e* and 116*f* are in interfacing relationship to each other. By the alternating sequence, a second second housing portion 180*b*" is adjacent to the first first housing portion 180*a*' and a second first housing portion 180*a*" is adjacent to the first second housing portion 180*b*' and initially arranged such that the sets of major electrodes 113*f* and 113*e* and 115*f* and 115*e* are in interfacing relationship to each other respectively, while similarly, the sets of minor electrodes 114*f* and 114*e* and 116*f* and 116*e* are in interfacing relationship to each other. A third first housing portion 180*a*'" is then adjacent to the second second housing portion 180*b*" while a third second housing portion 180*b*'" is then adjacent to the second first housing portion 180*a*" and initially arranged in a manner identical to the first first housing portion 180*a*' and the first second housing portion 180*b*' such that the sets of major electrodes 113*e* and 113*f* and 115*e* and 115*f* are in interfacing relationship to each other respectively. Similarly, the sets of minor electrodes 114*e* and 114*f*, respectively, and 116*e* and 116*f*, respectively, are in interfacing relationship to each other.

Thus, the first first housing portion 180*a*', the second second housing portion 180*b*" and the third first housing portion 180*a*'" form a first row 182*a* while the first second housing portion 180*b*', the second first housing portion 180*a*" and the third second housing portion 180*b*'" form a second row 182*b*, the first and second rows 182*a* and 182*b*, respectively, being adjacent to one another.

Correspondingly, the first first housing portion 180*a*' and the first second housing portion 180*b*' form a first column 184*a*, the second second housing portion 180*b*" and the second first housing portion 180*a*" form a second column 184*b*, and the third first housing portion 180*a*''' and the third second housing portion 180*b*''' form a third column 184*c*, the first, second and third columns 184*a*, 184*b* and 184*c*, respectively, being initially adjacent to one another.

In a manner similar to the charge accumulation mode of operation of electrode assembly 200A in FIG. 55, and as shown in FIG. 57, TABLE 7 with respect to voltage source V21, during the charge accumulation mode of operation, voltage source V23 is configured such that the negative solute ions 101 are attracted to the major electrode surfaces S113*e* and S115*e* while the positive solute ions 102 are attracted to the major electrode surfaces S113*f* and S115*f*. In view of the row and column arrangement of the plurality of housing portions 180*a* and 180*b*, in the first row 182*a*, the solute ions are arranged in a staggered pattern going from the first column 184*a* to the third column 184*c* of negative ions 101, positive ions 102, and negative ions 101. In contrast, in the second row 182*b*, the solute ions are arranged in a staggered pattern going from the first column 184*a* to the third column 184*c* of positive ions 102, negative ions 101, and positive ions 102.

Following the charge accumulation mode of operation, and prior to the discharge or charge repulsion and acceleration mode of operation, the first row 182*a* is shifted as shown by the arrow B such that the first first housing portion 180*a*' in first row 182*a* is now aligned in second column 184*b* with the second first housing portion 180*a*" in second row 182*b*, while the second second housing portion 180*b*" in first row 182*a* is now aligned in third column 184*c* with the third second housing portion 180*b*''' in second row 184*b*.

As a result of the shifting of the first row 182*b* in the direction of arrow B, the solute ions are now substantially aligned and substantially confined or isolated in second and third columns 184*b* and 184*c*, respectively. More particularly, negative solute ions 101 are now substantially aligned and substantially confined or isolated in the second column 184*b* and positive solute ions 102 are now substantially aligned and substantially confined or isolated in third column 184*c*.

Those of ordinary skill in the art will recognize that, and understand how, in a similar manner to electrode assembly 100 as illustrated above in FIG. 12 and FIG. 17, TABLE 2, (and similar to electrode assembly 200A in FIGS. 54-57) during the discharge or charge repulsion and acceleration mode or stage of operation of electrode assembly 200B, a negative terminal of a voltage source V24 may be appropriately coupled to the major electrodes 113*e* and 115*e* and to the minor electrodes 114*f* and 116*f* while a positive terminal of voltage source V24 may be appropriately coupled to the major electrodes 113*f* and 115*f* and to the minor electrodes 114*e* and 116*e* such that a stream or beam B101 of negative solute ions 101 and a stream or beam B102 of positive solute ions 102 may be formed.

Figure 60:
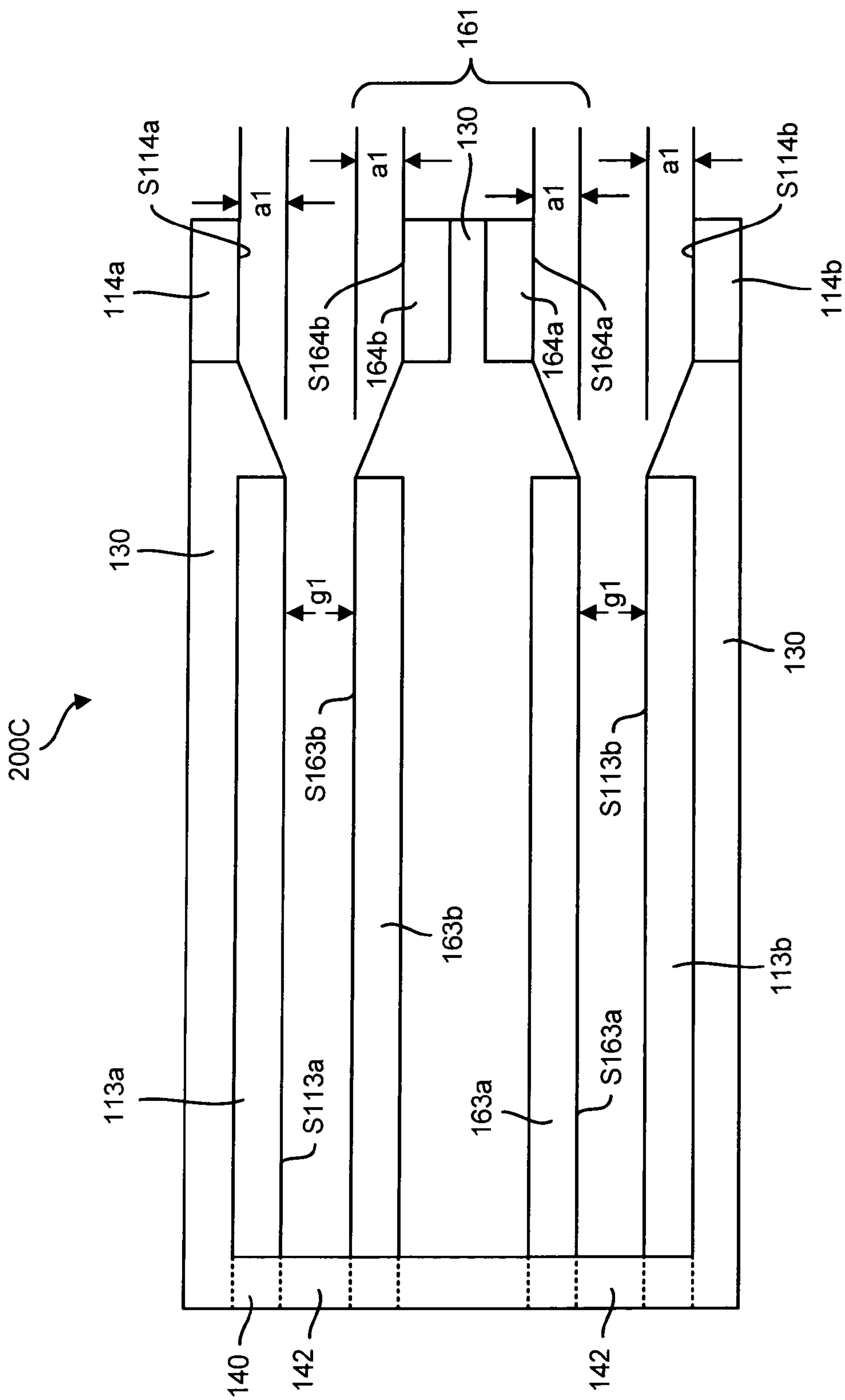
FIG. 60 illustrates one embodiment of an electrode assembly according to the present disclosure having one or more electrode surfaces that are offset with respect to other electrode surfaces.

FIG. 60 illustrates an electrode assembly 200C which is in all respects identical to electrode assembly 100 (see FIGS. 7-11) except that the electrode surface S114*a* is offset from electrode surface S113*a* by a distance "a1" as is the electrode surface S114*b* offset from electrode surface S113*b* by the distance "a1". Similarly, movable rotatable electrode 161 is configured such that the electrode surface S164*b* is offset from electrode surface S163*b* by distance "a1" as is the electrode surface S164*a* offset from electrode surface S163*a* by distance "a1". The electrode assembly 100H is illustrated prior to rotation of rotatable assembly 161.

Since the interfacing electrode surfaces S113*a* and S163*b* are separated by gap "g1", the interfacing electrode surfaces S114*a* and S164*b* are separated by a distance of "g1+2(a1)". Similarly, since the electrode surfaces S113*b* and S163*a* are separated by gap "g1", the electrode surfaces S164*a* and S114*b* are separated also by a distance of "g1+2(a1)".

During the charge acceleration mode or stage of operation of electrode assembly 200C, the offset "a1" of the electrode surfaces S114*a*, S164*b*, S164*a* and S114*b* may enhance the mobility of the streams or beams B101 and B102 by reducing physical interference. In that regard, those skilled in the art will recognize that, in that the present disclosure relates to a multitude of embodiments of an electrode assembly that is configured to enable acceleration of solute ions, e.g, solute ions 101 and 102, to high velocities, machining tolerances and clearances of the electrode assemblies that are comparable to those required for construction of conventional particle accelerator facilities may be required.

Figure 61:
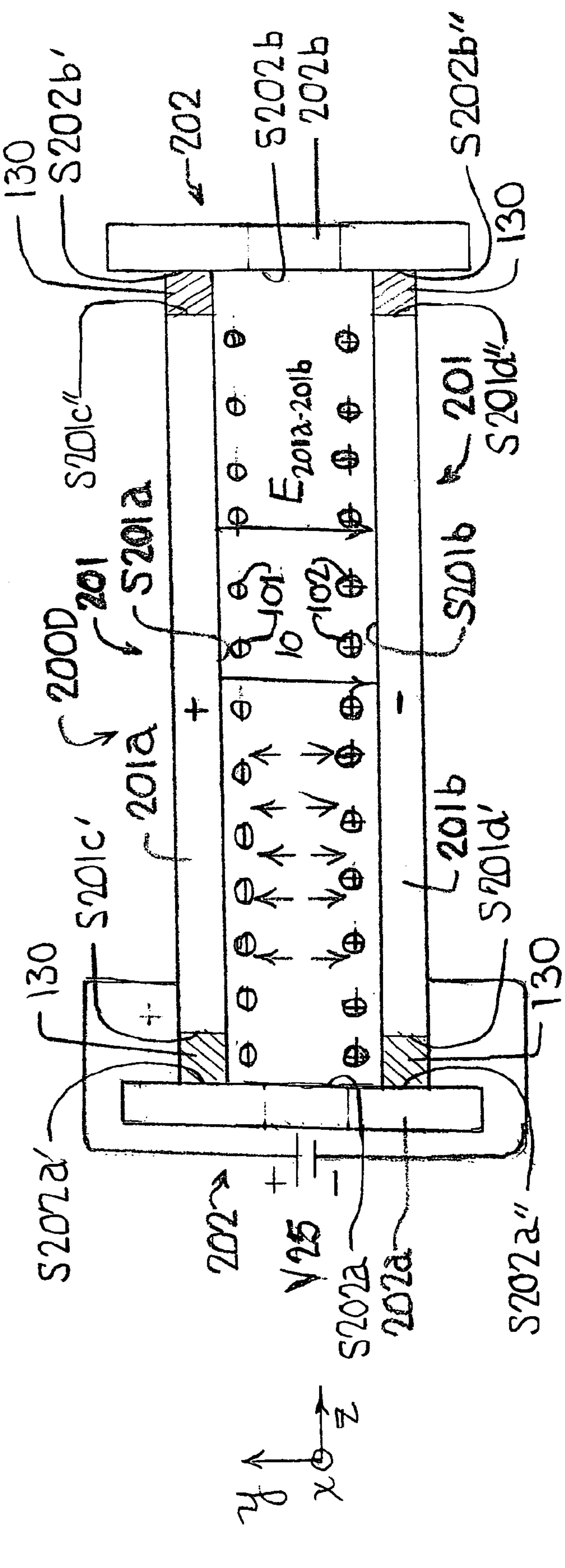
FIG. 61 illustrates one embodiment of an electrode assembly according to the present disclosure having first and second pairs of electrode surfaces, wherein the second pair of surfaces is substantially orthogonal to the first pair, in a first mode of operation.
Figure 62:
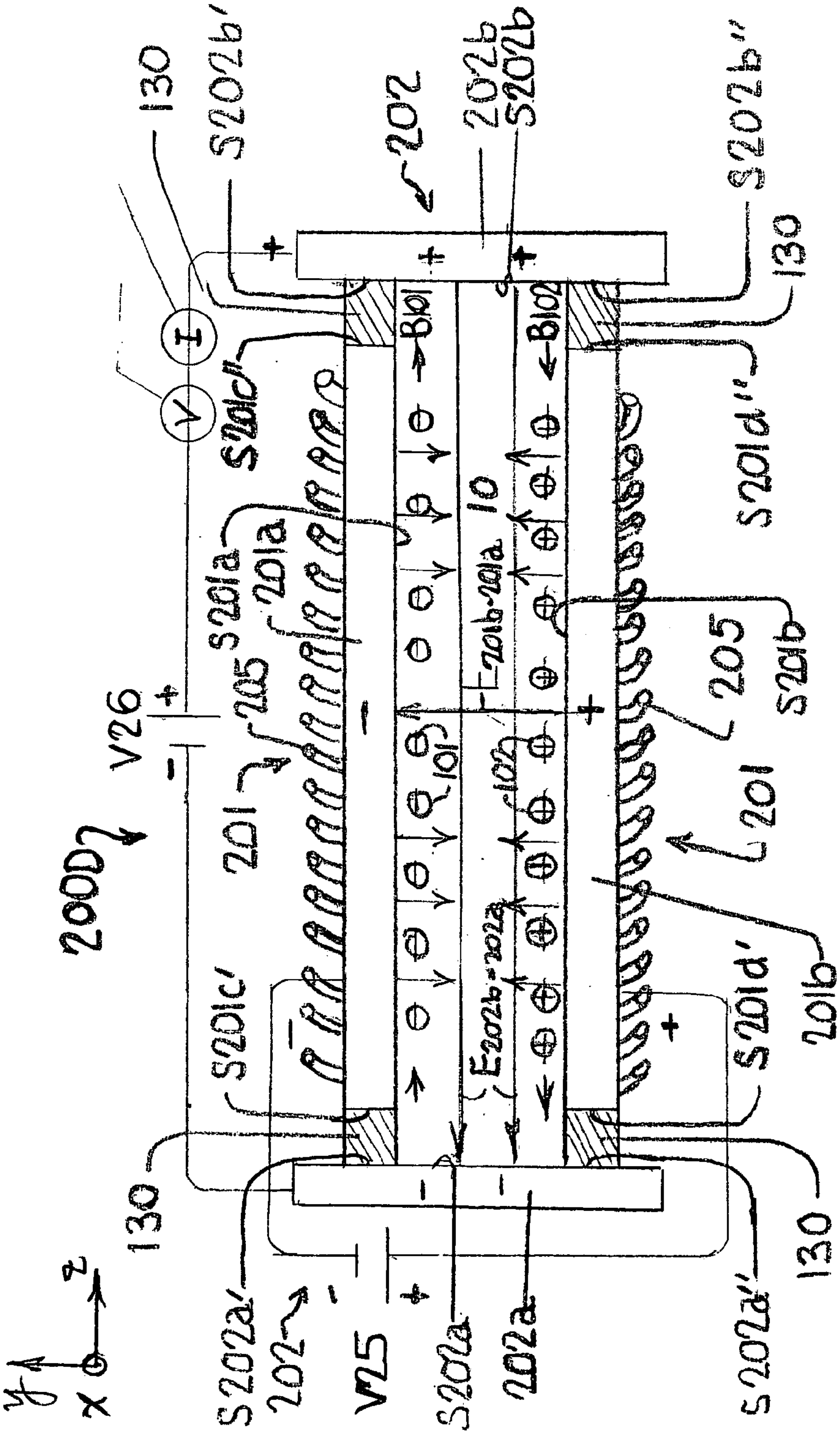
FIG. 62 illustrates the electrode assembly of FIG. 61 in a second mode of operation.

In one embodiment as shown in FIGS. 61 and 62, an electrode assembly 200D is illustrated includes a first pair 201 of first and second electrodes 201*a* and 201*b*, respectively, the electrodes 201*a* and 201*b* having substantially planar surfaces S201*a* and S201*b*, respectively, in interfacing relationship to each other. First electrode 201*a* includes also opposite end surfaces S201*c*' and S201*c*" while second electrode 201*b* similarly includes also opposite end surfaces S201*d*' and S201*d*".

Electrode assembly 200D also includes a second pair 202 of electrodes 202*a* and 202*b* also having substantially planar surfaces S202*a* and S202*b*, respectively, in interfacing relationship to each other. The first pair 201 and the second pair 202 are further configured such that the surfaces S201*a* and S201*b* are each substantially orthogonal to the surfaces S202*a* and S202*b*, such that surfaces S201*a* and S201*b* and surfaces S202*a* and 202*a* are substantially parallel to each other, respectively. The opposite end surfaces S201*c*' and S201*c*" are joined to, but electrically isolated from, electrodes 202*a* and 202*b*, via dielectric material 130. Dielectric material 130 is disposed between the opposite end surface S201*c*' and a portion S202*a*' of surface S202*a* and between the opposite end surface S201*c*" and a portion S202*b*' of surface S202*b*. Similarly, dielectric material 130 is disposed between the opposite end surface S201*d*' and another portion S202*a*" of surface S202*a* and between the opposite end surface S201*d*" and another portion S202*b*" of surface S202*b*.

Referring to FIG. 61, during the charge accumulation mode of operation, a positive terminal of a first voltage source V25 is coupled to the electrode 201*a* and a negative terminal of voltage source V25 is coupled to the electrode 201*b* such that an orthogonal electrical field $E_{201a\text{-}201b}$ is established between surfaces S201*a* and S201*a* so that negative solute ions 101 of the solution 10 are attracted to the surface S201*a* and positive solute ions 102 of the solution 10 are attracted to the surface S201*b*.

Referring to FIG. 62, during the discharge or charge acceleration mode of operation, the polarity of the first voltage source V25 is reversed to establish an electric field $E_{201b\text{-}201a}$ between surface S201*b* and S201*a* such that the negative solute ions 101 are now repelled from the surface S201*a* and the positive solute ions 102 are now repelled from the surface S201*b*. Simultaneously, a positive terminal of a second voltage source V26 is now coupled to the second electrode 202*b* of second pair 202 while a negative terminal of second voltage source V26 is now coupled to the first electrode 202*a* to establish an electric field $E_{202b\text{-}202a}$ between the surfaces S202*b* and S202*a*. The electric field $E_{202b\text{-}202a}$ is substantially transverse to the surfaces S201*a* and S201*b* of the first and second electrodes 201*a* and 201*b* of the first pair 201 of electrodes 201*a* and 201*b*. The repulsion of solute ions 101 and 102 from the electrode surfaces S201*a* and S201*b*, respectively, by the electric field $E_{201b-201a}$ causes at least a degree of linear alignment of the solute ions 101 and 102 in the z-direction transverse to the surfaces S201*a* and S201*b*, respectively, combined with the simultaneous or near simultaneous application or establishment of the electric field $E_{202b-202a}$ between the surfaces S202*b* and S202*a*, causes the at least partially linearly aligned negative solute ions 101 to decrease the Coulomb forces of repulsion between the negatively charged ions 101 by accelerating as a stream or beam B101 in a trajectory primarily in the positive z-direction towards the positively charged electrode surface S202*b*, and causes the at least partially linearly aligned positive solute ions 102 to decrease the Coulomb forces of repulsion between the positively charged ions 102 by accelerating as a stream or beam B102 in a trajectory primarily in the negative z-direction towards the negatively charged electrode surface S202*a*. The energy of the streams or beams B101 and B102 representing moving electromagnetic fields may be at least partially converted to electrical energy via induction coil 205 which may be coiled around the outer surfaces of the first and second electrodes 201*a* and 201*b*, respectively, of the first electrode pair 201 or embedded therewithin. The kinetic energy of the streams or beams B101 and B102 as they impact the surfaces S202*b* and S202*a*, respectively, may cause an increase in voltage V and/or current I in the electrical circuit of second voltage source V19. The kinetic energy of streams or beams B101 and B102 may also result in an increase in temperature of the solution 10.

In one embodiment, the second voltage source V26 is a changing polarity voltage source, e.g., the voltage source V26 may provide an alternating current such that during the charge acceleration mode of operation, the changing polarity effects at least a tendency to linearly align the negative and positive solute ions 101 and 102 to enhance the repulsive forces between the like charged ions.

In one embodiment, the electrode 202*a* that is impacted by the positive solute ions 102 may be made of deuterated materials in the case where the like charged positive ions 102 are, for example, deuterium ions and, if the velocity of the beam B102 of positively charged ions 102 is sufficient, again thermal energy may be generated in at least electrode 202*a* due to nuclear fusion processes.

Figure 63:
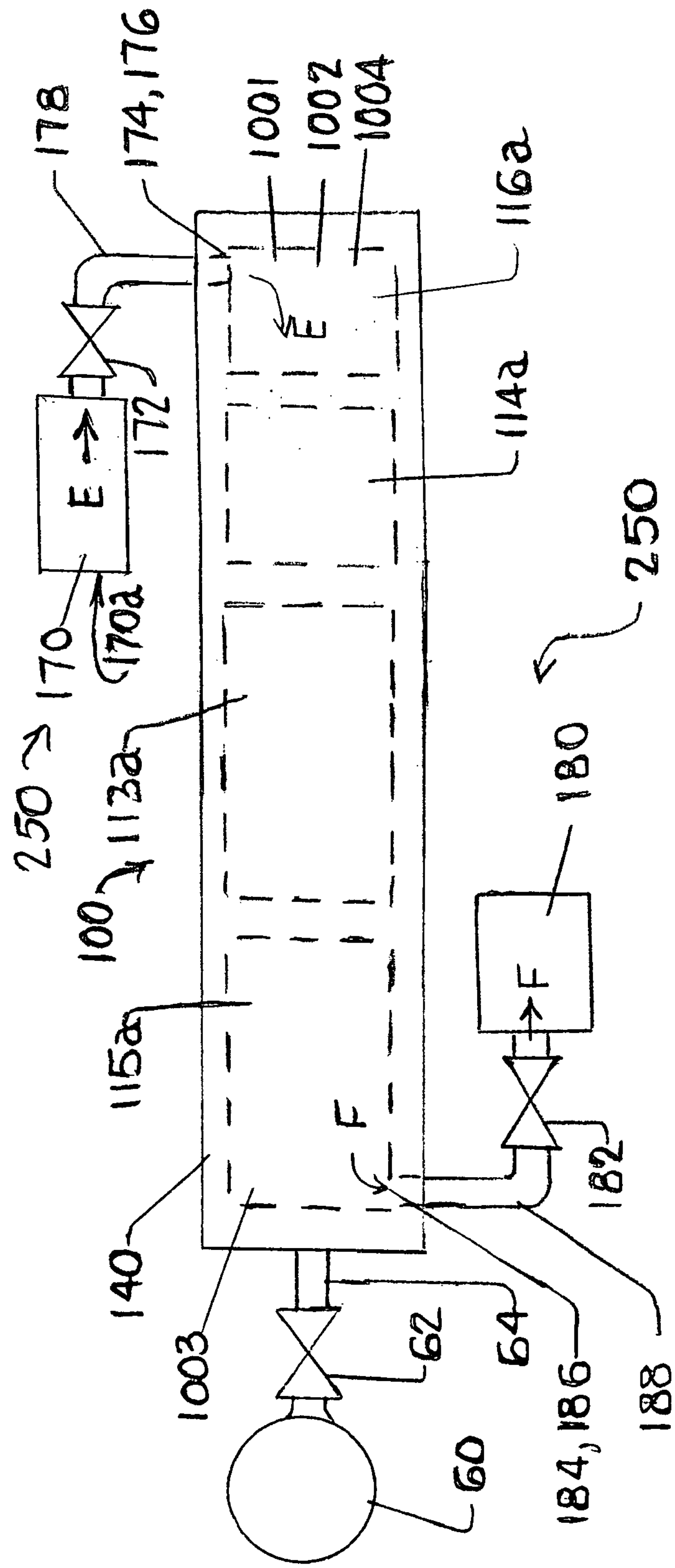
FIG. 63 illustrates a plan view of an exemplary electrode assembly according to the present disclosure that includes a medium purge system.

Referring also to FIG. 7, FIG. 63 is a top plan view of an exemplary embodiment of an electrode assembly, e.g., electrode assembly 100 further including a medium purge system 250. More particularly, in medium purge system 250, upper stationary electrodes 115*a*, 113*a*, 114*a* and 116*a* and insulating material 130 are shown in phantom inside an upper surface of housing 140. At least first and second apertures 174 and 176, respectively, in the housing 140 are disposed in proximity to rear end 1004 to fluidically communicate with first volume 1001 and second volume 1002 of the housing 140, respectively. For simplicity, the rotatable electrode 160 is not shown. In one embodiment, a purge medium supply inlet 170 fluidically communicates with the first and second volumes 1001 and 1002 via a valve 172 and a conduit 178.

At least first and second apertures 184 and 186, respectively, in the housing 140 are disposed in proximity to front end 1003 to fluidically communicate with first volume 1001 and second volume 1002 of the housing 140, respectively. In one embodiment, a purge medium outlet return 180 fluidically communicates with the first and second volumes 1001 and 1002 via a valve 182 and a conduit 188.

In one embodiment, in order to minimize interference with formation of the repulsive forces between the like charged ions 101 and 102, just after reaching saturation but before entering into the reverse polarity phase or acceleration phase of operation, while maintaining the initial polarity, the brine or seawater or other solution 10 be purged by opening valves 172 and 182 to allow entry of the purge medium 170*a* into the volumes 1001 and 1002 to displace the brine or seawater or other solution 10 through valve 182 to the purge medium outlet return 180. Purge medium 170*a* may be directed through the first and second volumes 1001 and 1002 in the directions indicated by the arrows E and F, respectively. The purge medium 170*a* may enter the purge system 250 at inlet 170 and may be a heat transfer medium, e.g., solution 10, or fresh water, that removes heat, and when seawater is the solution 10, may remove scale and deposits such as calcium salts that may precipitate during the heating. One of ordinary skill in the art will recognize that the positions and/or functions of purge medium supply inlet 170 and purge medium outlet return 180 may be interchanged.

Therefore, during the polarity reversal, i.e., reversal of direction of the electric field, and acceleration phases of operation, the like charged ions 101 and 102 are less susceptible to disturbances from nearby oppositely charged ions which would tend to reduce the net Coulomb forces of repulsion.

Figure 64:
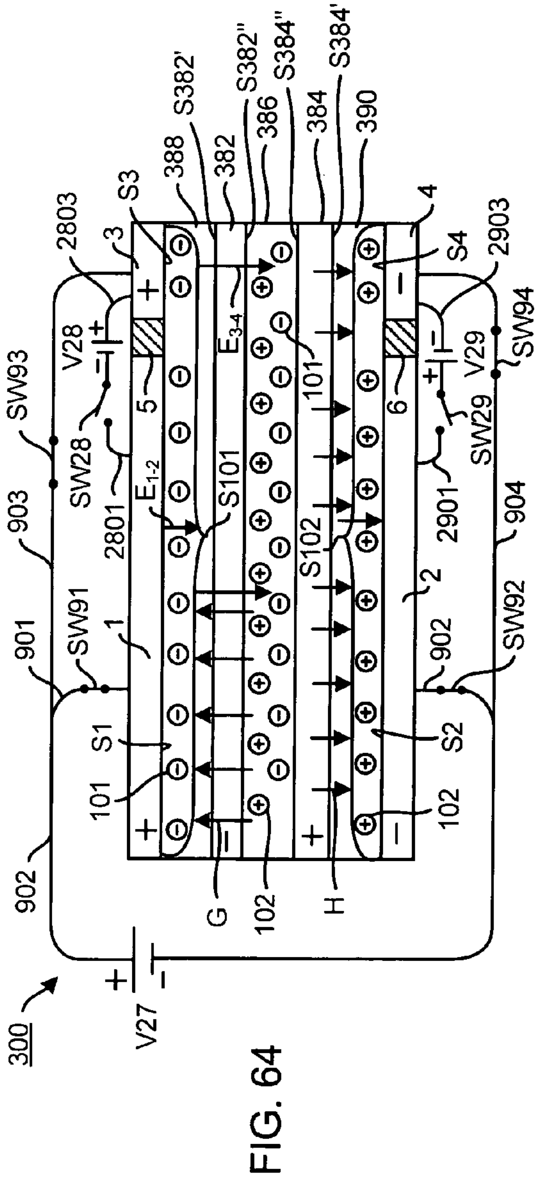
FIG. 64 illustrates one embodiment of an electrode assembly according to the present disclosure in a first mode of operation and having at least one charge specific membrane disposed between the electrodes of the electrode assembly.
Figure 65:
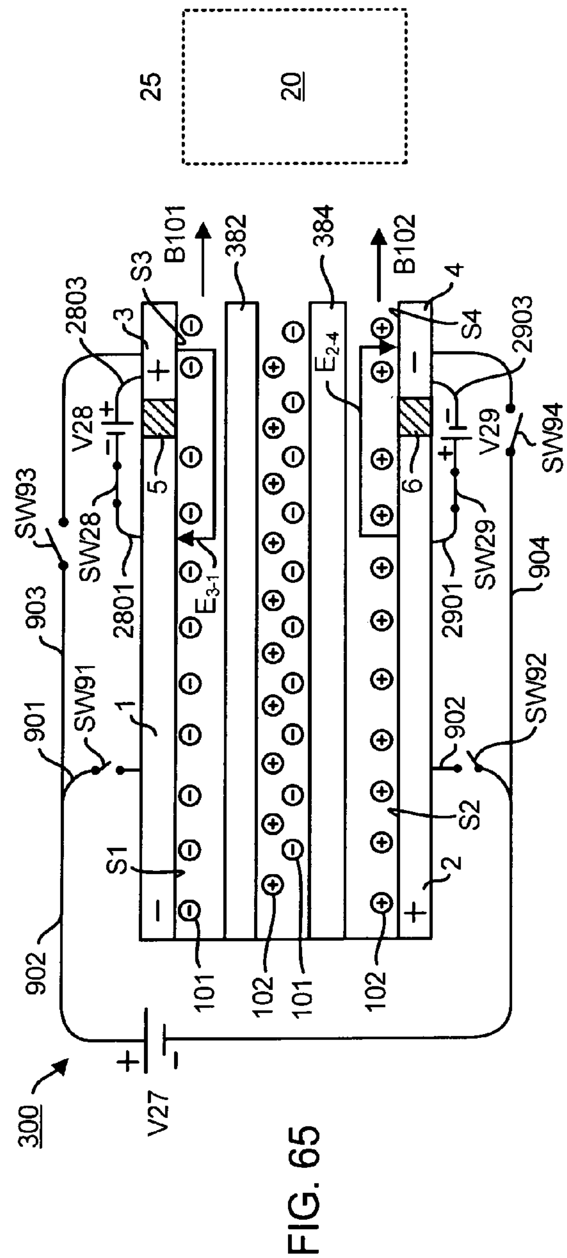
FIG. 65 illustrates the electrode assembly of FIG. 64 in a second mode of operation.

FIGS. 64 and 65 are simplified schematics that, using the component identification designations illustrated in FIGS. 1 and 2 disclose one embodiment of an electrode assembly 300 which again include a major and minor electrode plates 1 and 3, having surfaces S1 and S3, respectively, and which are separated at edges by dielectric material 5 therebetween, to be configured in a substantially coplanar configuration, to form an overall surface S101, and major and minor electrode plates 2 and 4, having surfaces S2 and S4, respectively, which are separated at edges by by dielectric material 6, to be configured also in a substantially coplanar configuration, to form an overall surface S102. Electrode assembly 300 differs from the previously described electrode assemblies such as electrode assembly 100D in that rather than a rotatable electrode 160 being disposed between surfaces S101 and S102, a pair of charge specific membranes 382 and 384, membrane 382 having a first surface S382' and a second surface S382" and membrane 384 having a first surface S384' and a second surface S384", are disposed in a parallel configuration between surfaces S101 and S102 such that a region 386 is formed between second surfaces S382" and S384" of parallel membranes 382 and 384, a region 388 is formed between surface S101 and first surface S382' of membrane 382, and a region 390 is formed between surface S102 and first surface S384' of membrane 384.

A positive terminal of a voltage source V27 is connected to electrode plate 3 via a lead wire 903 through a switch SW93, and is connected to electrode plate 1 via a lead wire 901 through a switch SW91. A negative terminal of voltage source V27 is connected to electrode plate 4 via a lead wire 904 through a switch SW94, and is connected to electrode plate 2 via a lead wire 902 through a switch SW92.

A positive terminal of a voltage source V28 is connected to electrode plate 3 via a lead wire 2801 while a negative terminal of voltage source V28 is connected to electrode plate 1 via a lead wire 2803 through a switch SW28. A negative terminal of a voltage source V29 is connected to electrode plate 4 via a lead wire 2901 while a positive terminal of voltage source V29 is connected to electrode plate 2 via a lead wire 2903 through a switch SW29.

During the initial or charge accumulation or attraction mode of operation, regions 386, 388, and 390 may be filled with solution 10 that includes negative solute ions 101 and positive solute ions 102. First membrane 382 is specific to negative charges so that negative ions 101 pass through membrane 382 but not positive ions 102. In contrast, second membrane 384 is specific to positive charges so that positive ions 102 pass through membrane 384 but not negative ions 101.

Switches SW91 through SW94 are closed so that electrode plates 1 and 5 are initially both positively charged and electrode plates 2 and 6 are initially both negatively charged so that an orthogonal electric field $E_{1-2}$ is formed or established between electrode plates 1 and 2, while an orthogonal electric field $E_{3-4}$ is formed or established between electrode plates 3 and 4. Switches SW28 and SW29 are both initially open.

The establishment of orthogonal electric fields $E_{1-2}$ and $E_{3-4}$ causes negative ions 101 to migrate from region 386 through negative charge specific membrane 382 in the direction of arrows G and towards electrode surfaces S1 and S3. Correspondingly, the establishment of orthogonal electric fields $E_{1-2}$ and $E_{3-4}$ causes positive ions 102 to migrate from region 386 through positive charge specific membrane 384 in the direction of arrows H and towards electrode surfaces S2 and S4.

During the acceleration phase of operation, switches SW91, SW92, SW93 and SW94 are opened while substantially simultaneously, switch SW28 is closed so that electrode plate 3 remains positive while electrode plate 1 becomes negative, and switch SW29 is closed so that electrode plate 4 remains negative and electrode plate 2 becomes positive. Thereby, an electric field $E_{3-1}$ is formed or established which is substantially transverse or parallel to the electrode surfaces S1 and S3 and which guides the negative ions 101 to release their repulsive energy by accelerating from surface S1 towards surface S3 and into region 25 and towards target or target area 20. Similarly, an electric field $E_{2-4}$ is formed or established which is substantially parallel to the electrode surfaces S2 and S4 and which guides the positive ions 102 to release their repulsive energy by accelerating from surface S2 towards surface S4 and into region 25 and towards target or target area 20.

FIGS. 66 to 69 illustrate an alternate embodiment of an electrode assembly 400 in a tandem configuration which is particularly suited to establish an electric field which tends to compress the ion beam. More particularly, a housing 450 made from dielectric material 130 discussed above, includes a first electrode 401 that includes at least one internal surface S401 configured to contact at least a portion of the solution 100 and configured to have an open end 405. The first electrode 401 includes an edge 403 proximate to the open end 405. The housing 450 also includes a second electrode 402 that includes at least one internal surface S402 configured to contact at least another portion of the solution 10 and configured to have an open end 406. The second electrode 402 includes an edge 404 proximate to the open end 406. The open ends 405 and 406 are aligned in interfacing relationship to one another to form a region 425 therebetween contacting at least another portion of the solution 10 such that the internal surfaces S401 and S402 are substantially co-planar or are substantially extensions of one from the other. As a result, the edge 403 is in interfacing relationship with the edge 404. As a result, first and second electrodes 401 and 402 are substantially mirror images of one another.

The housing 450, being made from dielectric material 130, may be disposed between the edges 403 and 404 so as to prevent establishment of an electric field between the edges 403 and 404 upon activation of the first and second electrodes 401 and 402. The dielectric material 450 is disposed substantially to bound the region 425 between the first and second electrodes 401 and 402. In one embodiment, the dielectric material 450 may extend to cover outer surfaces of the electrodes 401 and 402.

Figures 66, 67, 68, 69:
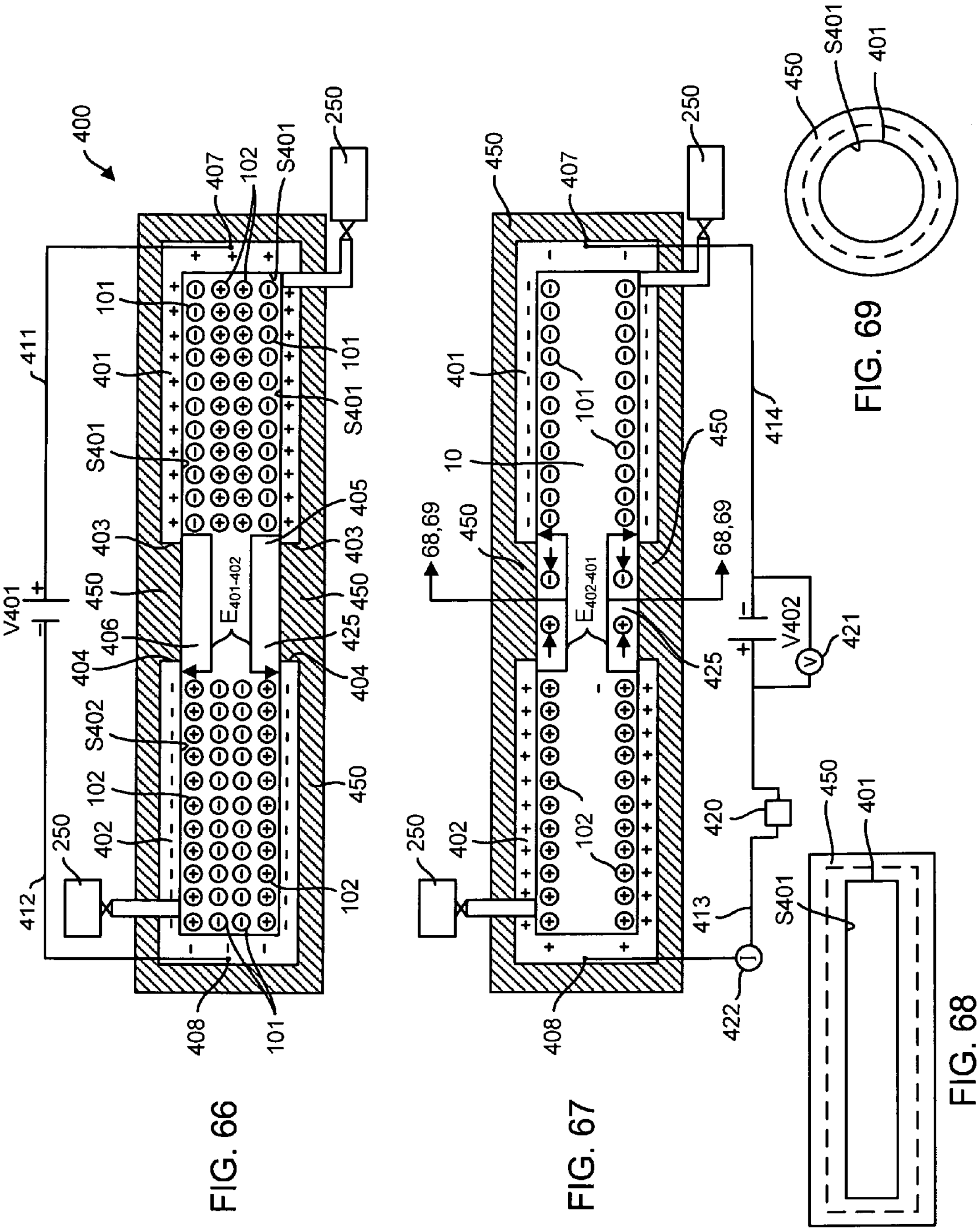
FIG. 66 illustrates one embodiment of an electrode assembly according to the present disclosure in a first mode of operation and having an interfacing tandem configuration having electrodes configured to have an internal regional volume having a surface wherein an internal regional volumetric surface of one electrode interfaces an internal regional volumetric surface of another electrode.
FIG. 67 illustrates the electrode assembly of FIG. 66 in a second mode of operation.
FIG. 68 illustrates a cross-sectional view of one embodiment of an electrode of FIG. 67 having a rectangular cross-section.
FIG. 69 illustrates a cross-sectional view of one embodiment of an electrode of FIG. 67 having a circular cross-section.

FIG. 68 shows a cross-sectional view along line of FIG. 67. More particularly, the electrode 401 and dielectric material 450 are configured to have a rectangular cross-section. FIG. 69 shows a cross-sectional view along line 69-69 of FIG. 67 wherein the electrode 401 and dielectric material 450 are configured to have a circular cross-section. It can be appreciated that the cross-sectional configuration of electrodes 401 and 402 may alternatively be curvilinear, elliptical, polygonal, or irregular. The embodiments are not limited in this context.

In a first mode of operation, referring again to FIG. 66, following supply of solution 100 to the region 475, a positive terminal of a voltage source V401 is coupled via lead wire 411 to electrode 401, typically at an end position 407. Correspondingly, a negative terminal of voltage source V401 is coupled via lead wire 412 to electrode 402, typically at an end position 408 so that an electric field $E_{401-402}$ is established which is substantially parallel to the electrode surfaces S401 and S402. In the first mode of operation, the negative solute ions 101 are attracted towards the surface S401 of electrode 401 which is positively charged while the positive ions 102 are attracted towards the surface S402 of electrode 402 which is negatively charged, so as to cause substantially linearly aligned forces of repulsion between the positively charged ions 102 and to cause substantially linearly aligned forces of repulsion between the negatively charged ions 101.

In a second mode of operation, either before or after reaching saturation of the electrode surfaces S401 and S402, a positive terminal of a voltage source V402 is coupled via lead wire 413 to electrode 402, typically at end position 408 while a negative terminal of voltage source V402 is coupled via lead wire 414 to electrode 402, typically at end position 407 so that at least an electric field $E_{402-401}$ is established which is substantially parallel to the electrode surfaces S401 and S402, and which is in a reverse direction to electric field $E_{401-402}$. The establishment of at least a second electric field $E_{402-401}$ substantially parallel to the at least a first pair of electrode surfaces S401 and S402 causes at least the positively charged ions 102 to be guided by at least the electric field $E_{402-401}$ to decrease the substantially linearly aligned forces of repulsion between the positively charged ions 102 by accelerating in a trajectory substantially towards the electrode surface S401 which is negatively charged and causes the negatively charged ions 101 to be guided by at least the electric field $E_{402-401}$ to decrease the substantially linearly aligned forces of repulsion between the negatively charged ions 101 by accelerating in a trajectory substantially towards the other electrode surface S402 which is positively charged.

As a result of the motion of the negatively and positively charged ions 101 and 102, either heat may be generated in the solution 10 or either or both an increase in voltage V, as measured across voltage source V402 by voltmeter 421, or current I, as measured by ammeter 422, may be observed in the lead wires 413 and 414 as the ions 101 and 102 are intercepted by the respective electrode surfaces S401 and S402. The increase in voltage V and/or current I may be directed to drive an electrical load 420.

As described above, purge system 250 may be disposed in the vicinity of closed end 407 of electrode 401 and in the vicinity of closed end 408 of electrode 402 to displace the solution 10 to help assure that an excess charge of solute ions 101 and 102 are established at the electrode surface S401 and S402, respectively, to enhance the compressive effects of the solute ions 101 and 102 with respect to each other and to remove heat that may be generated during the operation of the electrode assembly 400.

In another embodiment of the present disclosure, FIGS. 70 to 74 illustrate a tandem electrode assembly 500 which is designed to maintain alignment of the positively charged and negatively charged ions 101 and 102 by establishing an electric field which compresses the ions 101 and 102. More particularly, electrode assembly 500 includes a set of six electrodes. First, second and third electrodes 501, 502 and 503 are configured in a first portion 5001 of the electrode assembly 500 having an open end region 5003 and fourth, fifth and sixth electrodes 504, 505 and 506 are configured in a second portion 5002 of the electrode assembly 500 having an open end region 5004. Those skilled in the art will recognize that, and understand how, the electrode assembly 500 may be disposed within the vessel 11 described above, for example, with respect to electrode assembly 100C in FIG. 19.

First and third electrodes 501 and 503 each include at least a first surface S501 and S503, respectively, which is configured to contact at least a portion of the solution 10 and second electrode 502 includes at least two surfaces S5021 and S5022 which are also configured to contact at least a portion of the solution 10. Surface S501 is disposed in substantially an interfacing relationship with first surface S5021 while surface S503 is disposed in substantially an interfacing relationship with second surface S5022.

Correspondingly, fourth and sixth electrodes 504 and 506 each include at least a first surface S504 and S506, respectively, which is configured to contact at least a portion of the solution 10 and fifth electrode 505 includes at least two surfaces S5051 and S5052 which are also configured to contact at least a portion of the solution 10. Surface S504 is disposed in substantially an interfacing relationship with first surface S5051 while surface S506 is disposed in substantially an interfacing relationship with second surface S5052.

The first, second and third electrodes 501, 502 and 503 each include edges 501*a*, 502*a* and 503*a*, respectively, which are proximate to the open end region 5003 while the fourth, fifth and sixth electrodes 504, 505 and 506 each include edges 504*a*, 505*a* and 506*a*, respectively, which are proximate to the open end region 5004. To substantially prevent an electric field from forming between the edges 501*a*, 502*a* and 503*a* to the edges 504*a*, 505*a* and 506*a*, respectively, a dielectric material 550 is disposed therebetween. The dielectric material 550 may be substantially identical to the previously discussed dielectric materials such as 450 that is made from dielectric material 130, discussed above.

The open end regions 5003 and 5004 are aligned in interfacing relationship with respect to one another to form a region 525 therebetween containing at least another portion of the solution 10 such that the internal surfaces S501 and S504, S503 and S506, S5021 and S5051, and S5022 and S5052 are substantially co-planar or are substantially extensions of one from the other. As a result, the edges 501*a*, 502*a*, 503*a* are in interfacing relationship with the edges 504*a*, 505*a* and 506*a*, respectively. As a result, first and second portions 5001 and 5002 are substantially mirror images of one another.

In one embodiment, the first, third, fourth and sixth electrodes 501, 503, 504 and 506 may include second surfaces S511, S513, S514 and S516 which are formed on conductive members 511, 513, 514 and 516, and are transverse to the first surfaces S501, S503, S504 and S506, respectively. In addition, the second electrode 502 may include first and second surfaces S5121 and S5122 which are transverse to first and second surfaces S5021 and S5022, respectively, and are formed on conductive member 512. Correspondingly, the fifth electrode 505 may include first and second surfaces S5151 and S5152 which are transverse to first and second surfaces S5051 and S5052, respectively, and are formed on conductive member 515. Conductive members 511 and 513 are each electrically insulated from conductive member 512 via dielectric material 550 disposed therebetween and not substantially over second surfaces S511, S5121, S5122 and S513. Similarly, conductive members 514 and 516 are each electrically insulated from conductive member 515 via dielectric material 550 disposed therebetween and not substantially over second surfaces S514, S5151, S5152 and S516.

Figure 70:
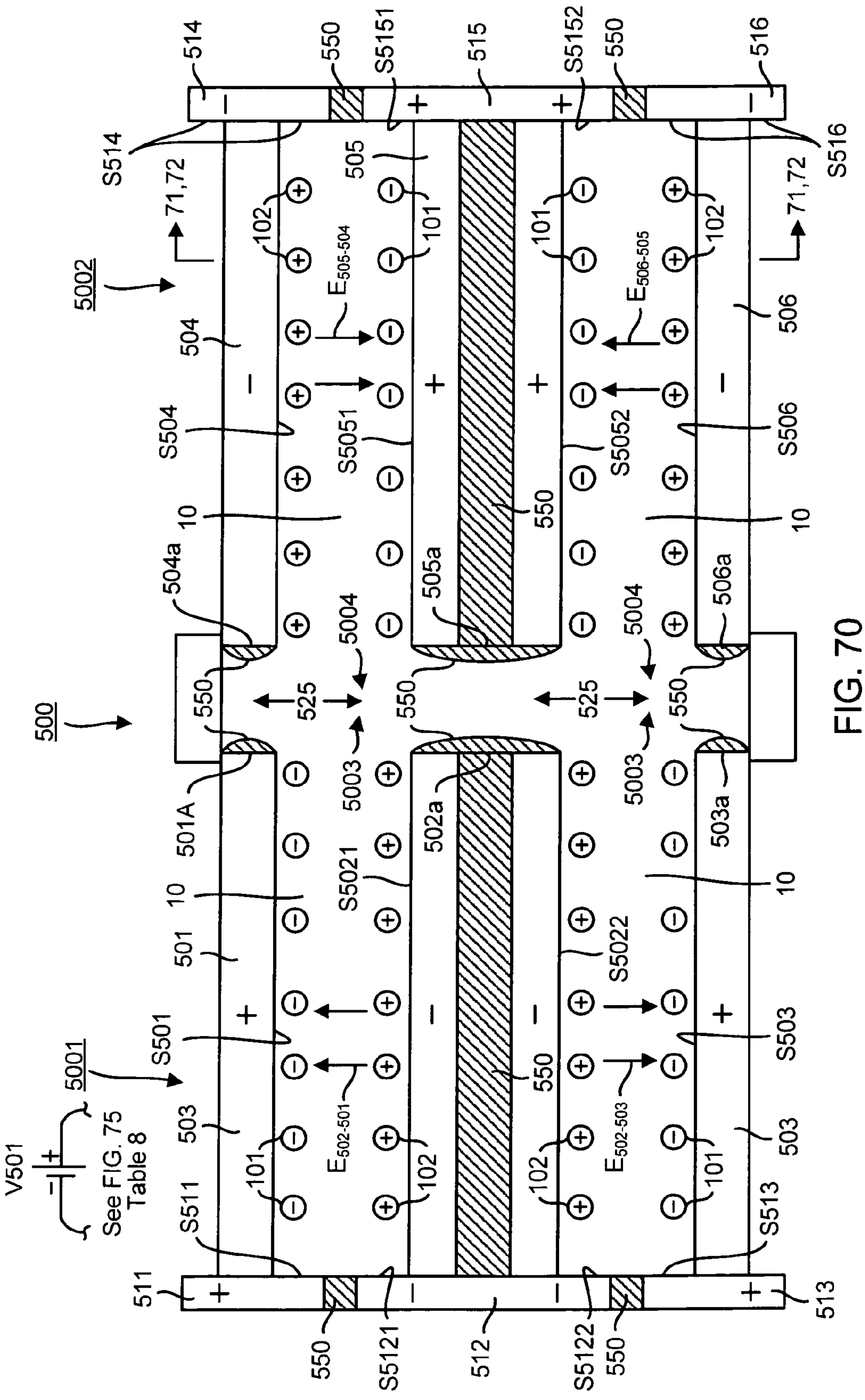
FIG. 70 illustrates one embodiment of an electrode assembly according to the present disclosure in a first mode of operation and having multiple electrodes disposed within the internal regional volume of the electrode assembly of FIGS. 66-69 and that are in an interfacing tandem configuration and that form projections from end walls of the electrode assembly.
Figure 71:
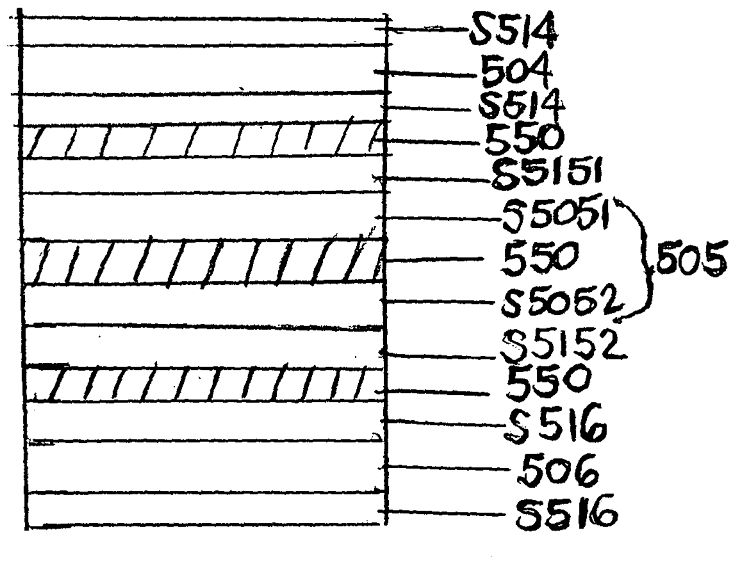
FIG. 71 illustrates a cross-sectional view of a projecting electrode of FIG. 70 having a rectangular cross-section.
Figure 72:
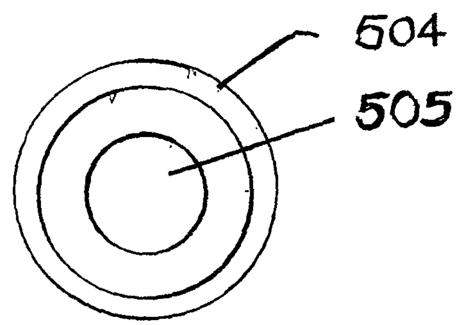
FIG. 72 illustrates a cross-sectional view of a projecting electrode of FIG. 70 having a circular cross-section.
Figure 73:
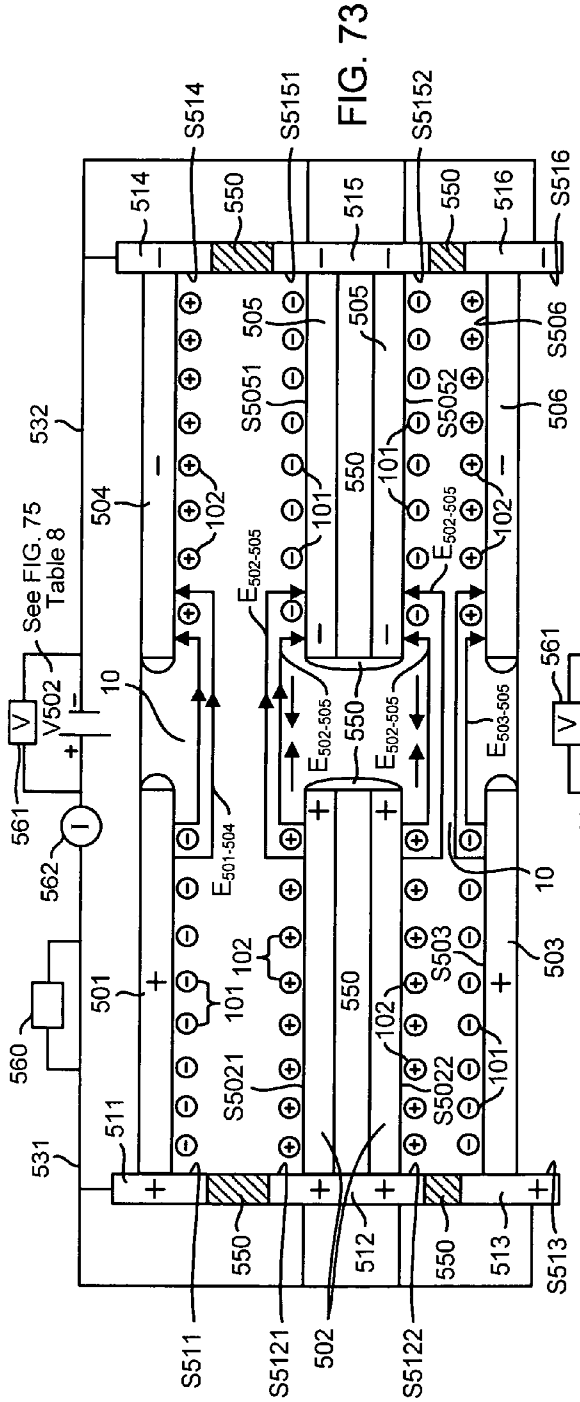
FIG. 73 illustrates the electrode assembly of FIG. 70 in a discharge mode of operation for a pair of multiple projecting electrodes.

FIG. 71 shows a cross-sectional view along line 71-71 of FIG. 70. More particularly, the electrodes 501 through 506 are configured to have a rectangular cross-section, with electrodes 504, 505 and 506 shown as an example. FIG. 72 shows a cross-sectional view along line 72-72 of FIG. 70 wherein the electrodes 501 and 502 and 504 and 505 are configured to have a circular cross-section. In this configuration, the electrodes 504 and 505 are shown as an example. In such case, the electrodes 503 and 506 are eliminated. It can be appreciated that the cross-sectional configuration of electrodes 501 through 506 may alternatively be curvilinear, elliptical, polygonal, or irregular. The embodiments are not limited in this context.

In a first stage or mode of operation, referring again to FIG. 70 and to FIG. 75—TABLE 8, following supply of solution 10 to the region 525, a positive terminal of a voltage source V501 is coupled to electrodes 501, 503 and 505. A negative terminal of voltage source V501 is coupled to electrodes 502, 504 and 506. As a result, orthogonal electric field $E_{502-501}$ is established between electrode surfaces S502 and S501, orthogonal electric field $E_{502-503}$ is established between electrode surfaces S502 and S503, orthogonal electric field $E_{504-505}$ is established between electrode surfaces S504 and S505, and orthogonal electric field $E_{506-505}$ is established between electrode surfaces S506 and S505. In the first stage of operation, the negative solute ions 101 are attracted towards the surfaces S501, S503 and S5051 and S5052 which are positively charged while the positive ions 102 are attracted towards the surfaces S502, S506, S5021 and S5022 which are negatively charged, so as to cause substantially linearly aligned forces of repulsion between the positively charged ions 102 and to cause substantially linearly aligned forces of repulsion between the negatively charged ions 101.

Figure 74:
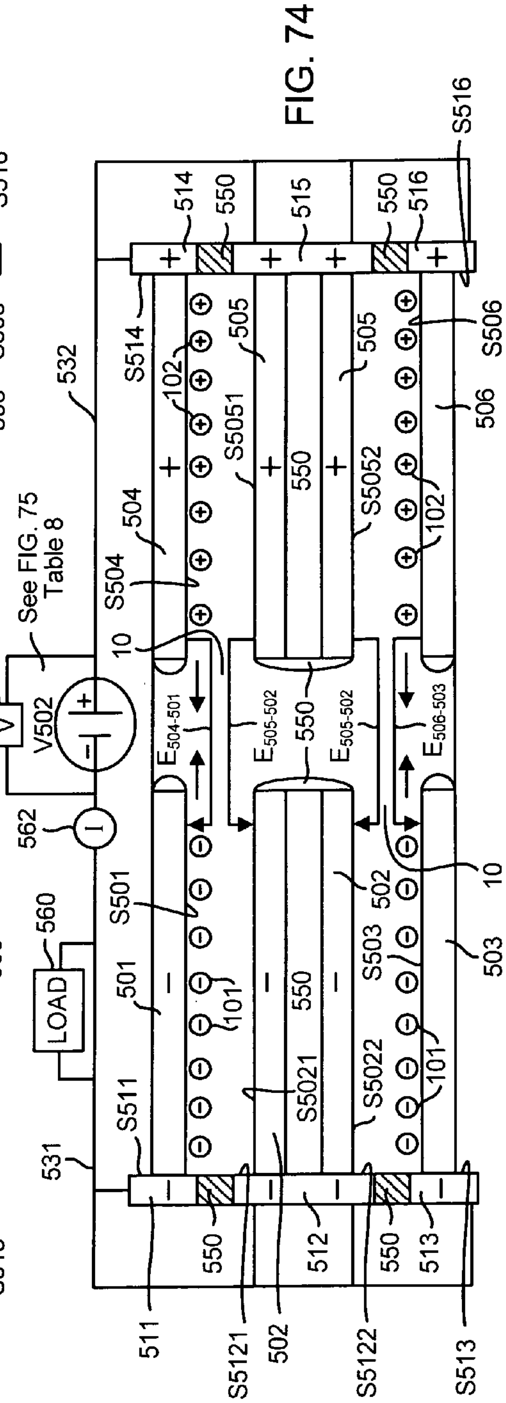
FIG. 74 illustrates the electrode assembly of FIG. 70 in a discharge mode of operation for the internal regional volume.

Referring to FIG. 74 and to FIG. 75—TABLE 8, in a second stage of operation, either before or after reaching saturation of the electrode surfaces S501, S5021, S5022, S503, S504, S5051, S5052 and S506, a positive terminal of a voltage source V502 is coupled via lead wire 531 to at least one of conductive member 511 and electrode 501, to at least one of conductive member 512 and electrode 502, and to at least one of conductive member electrode 513 and electrode 503. A negative terminal of voltage source V502 is coupled via lead wire 532 to at least one of conductive member 514 and electrode 504, to at least one of conductive member 515 and electrode 505, and to at least one of conductive member electrode 516 and electrode 506. Thereby, an electric field $E_{502-505}$ is established between, and which is substantially parallel to, electrode surfaces S5021 and S5051 and between, and which is substantially parallel to, electrode surfaces S5022 and S5052, so as to cause at least a portion of the positively charged ions 102 to be guided by at least the electric field $E_{502-505}$ to decrease the substantially linearly aligned forces of repulsion between the positively charged ions 102 by accelerating in a trajectory substantially towards the electrode surfaces S5051 and S5052 which are negatively charged and causes at least a portion of the negatively charged ions 101 to be guided by at least the electric field $E_{502-505}$ to decrease the substantially linearly aligned forces of repulsion between the negatively charged ions 101 by accelerating in a trajectory substantially towards the other electrode surfaces S5021 and S5022 which are positively charged.

Simultaneously, at least a portion of the negatively charged ions 101 that were attracted to the electrode surfaces S501 and S503 remain attracted to the electrode surfaces S501 and S503 by resulting electric fields $E_{501-504}$ established between, and substantially parallel to, electrode surfaces S501 and S504, and $E_{503-506}$ established between, and substantially parallel to, electrode surfaces S503 and S506. The electric fields $E_{501-504}$ and $E_{503-506}$, in conjunction with the electric field $E_{502-505}$, at least partially compress at least a portion of the ions 101 and 102 which are accelerating between the surfaces S5021 and S5051 and between the surfaces S5022 and S5052 so as to at least partially enhance and maintain the ion acceleration process. In addition, the ions 101 and 102 may also be guided by an electric field $E_{512-515}$ established between electrode surfaces S512 and S515.

As a result of the second stage of operation, heat may be generated in the solution 10 and particularly in the interfacing region 525 between the first and second portions 5001 and 5002 of the electrode assembly 500. In addition, an increase in voltage V and/or current I may be observed in the circuitry of voltage source V502.

Referring to FIG. 74 and to FIG. 75—TABLE 8, in a third stage of operation, the directions of the electric fields are reversed so as to complete the ion acceleration process. More particularly, lead wire 531 is now coupled to a negative terminal of voltage source V502 and is coupled at least to one of conductive member 511 and electrode 501, and to at least one of conductive member 513 and electrode 503. A positive terminal of voltage source V502 is now coupled via lead wire 532 to at least one of conductive member 514 and electrode 504, and to at least one of conductive member electrode 516 and electrode 506. Thereby, an electric field $E_{504-501}$ is established between, and which is substantially parallel to, electrode surfaces S504 and S501. In addition, an electric field $E_{506-503}$ is established between, and which is substantially parallel to, electrode surfaces S506 and S502 so as to cause at least a portion of the positively charged ions 102 to be guided by at least the electric fields $E_{504-501}$ and $E_{506-503}$ to decrease the substantially linearly aligned forces of repulsion between the positively charged ions 102 by accelerating in a trajectory substantially towards the electrode surfaces S501 and S503 which are negatively charged and causes at least a portion of the negatively charged ions 101 to be guided by at least the electric fields $E_{504-501}$ and $E_{506-503}$ to decrease the substantially linearly aligned forces of repulsion between the negatively charged ions 101 by accelerating in a trajectory substantially towards the other electrode surfaces S504 and S506 which are positively charged.

One of ordinary skill in the art will recognize that other means may be employed to reverse the direction of the electric fields, such as by superposition of another voltage source of greater potential across the terminals of voltage source V502.

As a result of the motion of the negatively and positively charged ions 101 and 102, either heat may be generated in the solution 100 or either or both an increase in voltage V, as measured across voltage source V502 by voltmeter 561, or current I, as measured by ammeter 562, may be observed in the lead wires 531 and 532 as the ions 101 and 102 are intercepted by the respective electrode surfaces S511 through S516. The increase in voltage V and/or current I may be directed to drive an electrical load 560.

In a variation of the embodiment of the present disclosure of FIGS. 70 to 75, FIGS. 76 and 77 illustrate a tandem electrode assembly 510 which in addition to being designed to maintain alignment of the positively charged and negatively charged ions 101 and 102 by establishing an electric field which compresses the ions 101 and 102, also provides greater surface area of the electrode surfaces. More particularly, electrode assembly 510 is characterized in that the set of six electrodes 501, 502, 503, 504, 505 and 506 are further subdivided into a number of smaller electrodes. That is, electrode 501 is now divided into a number of smaller electrodes 5010, electrode 502 is divided into a number of smaller electrodes 5020, electrode 503 is divided into a number of smaller electrodes 5030, electrode 504 is divided into a number of smaller electrodes 5040, electrode 505 is divided into a number of smaller electrodes 5050, and electrode 506 is divided into a number of smaller electrodes 5060. In one embodiment, the electrodes 5010 to 5060 have a cylindrical configuration. The electrode assembly 510 may further include enclosure members 570 to contain the solution 10. To enhance alignment of the oppositely charged solute ions 101 and 102 on the surfaces of the electrodes 5010 to 5060, via insulating members 580, the electrodes 5010 are aligned to and electrically isolated from electrodes 5040, electrodes 5020 are aligned to and electrically isolated from electrodes 5050, and electrodes 5030 are aligned to and electrically isolated from electrodes 5060.

One of ordinary skill in the art will recognize that the operation of the electrode assembly 510 is essentially identical to the operation of the electrode assembly 500 and will not be discussed in detail. The smaller electrodes may increase the surface area per unit volume and so the resulting energy output from electrode assembly 510 is increased thereby.

Referring to FIG. 78 and again to FIGS. 29-39, there is illustrated in FIG. 78 an electrode assembly 100E" that is identical to the electrode assembly 100E illustrated in FIGS. 29-38 or to the electrode assemblies 100E'(a) and 100E'(b) illustrated in FIG. 39 with the exception that with respect to electrode assembly 100E", insulating partitions P137*a* and P137*b* are disposed in the first partition guide housing 127*a* and in the second partition guide housing 127*b* in interfacing relationship with outer surface 127*e* of first electrically conductive partition assembly P127*a* and in interfacing relationship with outer surface 127*f* of second electrically conductive partition assembly P127*b*, respectively. Similarly, insulating partitions P137*c* and P137*d* are disposed in the third partition guide housing 127*c* and in the fourth partition guide housing 127*d* in interfacing relationship with outer surface 127*g* of third electrically conductive partition assembly P127*c* and in interfacing relationship with outer surface 127*h* of fourth electrically conductive partition assembly P127*d*, respectively. More particularly, in conjunction with the extended position of electrically conductive partition assemblies P127*a*, P127*b*, P127*c* and P127*d*, the insulating partitions P137*a*, P137*b*, P137*c* and P137*d* are in an extended position analogous to the extended position of the electrically conductive partition assemblies P127*a*, P127*b*, P127*c* and P127*d* as illustrated and described above with respect to electrode assembly 100E in FIG. 30. In the extended position, the insulating partitions P137*a* and P137*b* and the insulating partitions P137*c* and P137*d* at least partially electrically insulate the electrodes 113*e* and 114*e* and the electrically conductive partition assemblies P127*a* and P127*b* from the electrodes 113*f* and 114*f* and the electrically conductive partition assemblies P127*c* and 127*d*, respectively. Those skilled in the art will recognize that, and understand how, the insulating partitions P137$a$, P137$b$, P137$c$ and P137$d$ enable to electrode assembly 100E" to be operated in a manner similar to that described above with respect to FIG. 49 and the insulating layers P145$e$ and P145$f$ disposed around outer surfaces P145$g$ and P145$h$ of partitions P145$a$ and P145$b$, respectively, and insulating layers P155$e$ and P155$f$ disposed around outer surfaces P155$g$ and P155$h$ of partitions P155$a$ and P155$b$, respectively.

Figure 80:
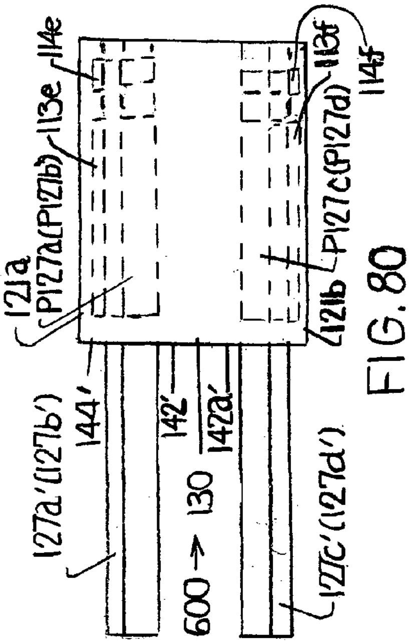
FIG. 80 illustrates the electrode assembly of FIG. 79 showing the movable partitions in an extended position from the guide housings during a second mode of operation.
Figure 79:
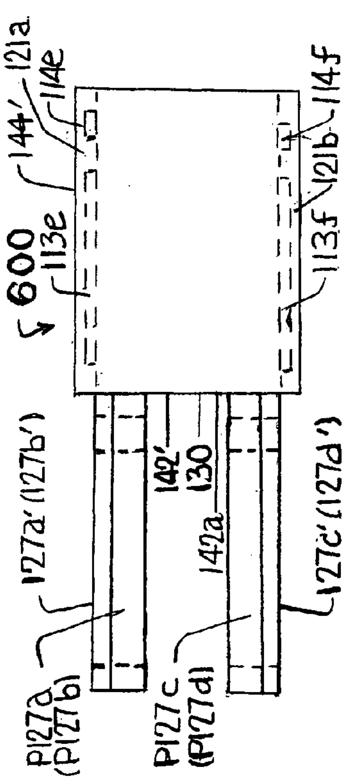
FIG. 79 illustrates an alternate embodiment of the electrode assembly of FIGS. 29-39 having partition guide housings on an end surface of the electrode assembly rather than on lateral or side surfaces and in a first mode of operation having the movable partitions in a retracted position within the guide housings.
Figure 81:
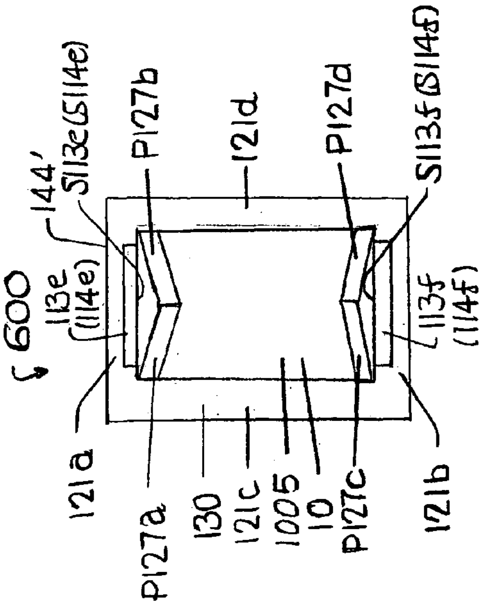
FIG. 81 is a cross-sectional view of the electrode assembly of FIGS. 78-79 illustrating the position of the guide housings and the partitions with respect to the electrode surfaces.

FIGS. 79-81 illustrate one embodiment of an electrode assembly having partition guide housings positioned on an end surface of the electrode assembly rather than on lateral or side surfaces. More particularly, electrode assembly 600 is configured in an analogous manner with respect to electrode assemblies 100E, 100E'(a), 100E'(b) and 100E" except that instead of having laterally positioned partition guide housings 127$a$, 127$b$, 127$c$ and 127$d$, electrode assembly 600 includes a housing 144' made from dielectric material 130 and formed by a rigid wall 142' that is configured to interface on an end surface 142$a$ of the housing 144' with first and second partition guide housings 127$a'$ and 127$b'$, respectively and with third and fourth partition guide housings 127$c'$ and 127$d'$, respectively. In a retracted position as illustrated in FIG. 79, first and second electrically conductive movable partition assemblies P127$a$ and P127$b$ are disposed within the first and second partition guide housings 127$a'$ and 127$b'$, respectively. Similarly, third and fourth electrically conductive movable partition assemblies P127$c$ and P127$d$ are disposed within the third and fourth partition guide housings 127$c'$ and 127$d'$. The housing 144' further includes the substantially flat surface electrodes 113$e$ and 113$f$ are illustrated embedded in first and second opposing walls 121$a$ and 121$b$, respectively, of housing 144' such that corresponding surfaces S113$e$ and S113$f$, respectively, are in interfacing relationship with each other via the interior space or volume 1005 of the housing 144, formed by the walls 121$a$, 121$b$, 121$c$ and 121$d$, in which is disposed the electrically conductive solution 10, while electrodes 114$e$ and 114$f$ are similarly embedded in first and second opposing walls 121$a$ and 121$b$, respectively, of housing 144 such that corresponding surfaces S114$e$ and S114$f$, respectively, are also in interfacing relationship with each other via the interior region 1005 in which the electrically conductive solution 10 is also disposed. The electrodes 114$e$ and 114$f$ and the surfaces S114$e$ and S114$f$ are also identified in FIGS. 79-81 (and also in FIG. 82 discussed below) by component mark numbers in parentheses. Those skilled in the art will recognize that, and understand how, the electrode assembly 600 is operated in an analogous manner to electrode assemblies 100E, 100E'(a), 100E'(b) and 100E" discussed above.

Figure 82:
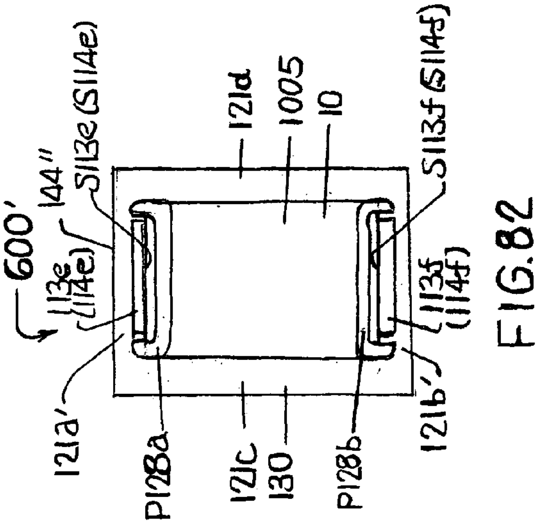
FIG. 82 is a cross-sectional view of an alternate embodiment of the electrode assembly of FIGS. 79-81 having partitions that are U-shaped or C-shaped to extend over the electrode surfaces.

FIG. 82 illustrates one embodiment of an electrode assembly that is configured in an analogous manner with respect to electrode assembly 600 discussed above except that the partition housings and the electrically conductive partition assemblies have a generally U-shaped or C-shaped cross-section. More particularly, electrode assembly 600' includes a housing 144" that is configured substantially identically as housing 144' of electrode assembly 600 except that the first wall 121$a'$ of housing 144" is configured to receive from end surface 142$a'$ of rigid wall 142 (see FIGS. 79-80) a first electrically conductive partition assembly P128$a$ that may be substantially U-shaped or C-shaped in cross-section and that is configured to extend over the surfaces S113$e$ and S114$e$ of the major and minor electrodes 113$e$ and 114$e$, respectively. Similarly, the second wall 121$b'$ of housing 144" is configured to receive from end surface 142$a'$ of rigid wall 142$a$ second electrically conductive partition assembly P128$b$ that may be substantially U-shaped or C-shaped in cross-section and that is configured to extend over the surfaces S113$f$ and S114$f$ of the major and minor electrodes 113$f$ and 114$f$, respectively. Those skilled in the art will recognize that, and understand how, the partition assemblies P128$a$ and P128$b$ and the electrode assembly 600' are configured and operated in an analogous manner to electrode assemblies 100E, 100E'(a), 100E'(b) and 100E" discussed above. The configuration of the partition assemblies P128$a$ and P128$b$ may provide increased resistance to lateral dispersion during the charge acceleration mode of operation.

For simplicity of illustration, the ions 101 and 102 and corresponding electric fields have been omitted from FIGS. 78-82 in view of the above discussion of electrode assemblies 100E illustrated in FIGS. 29-38 and the electrode assemblies 100E'(a) and 100E'(b) illustrated in FIG. 39.

Figure 83:
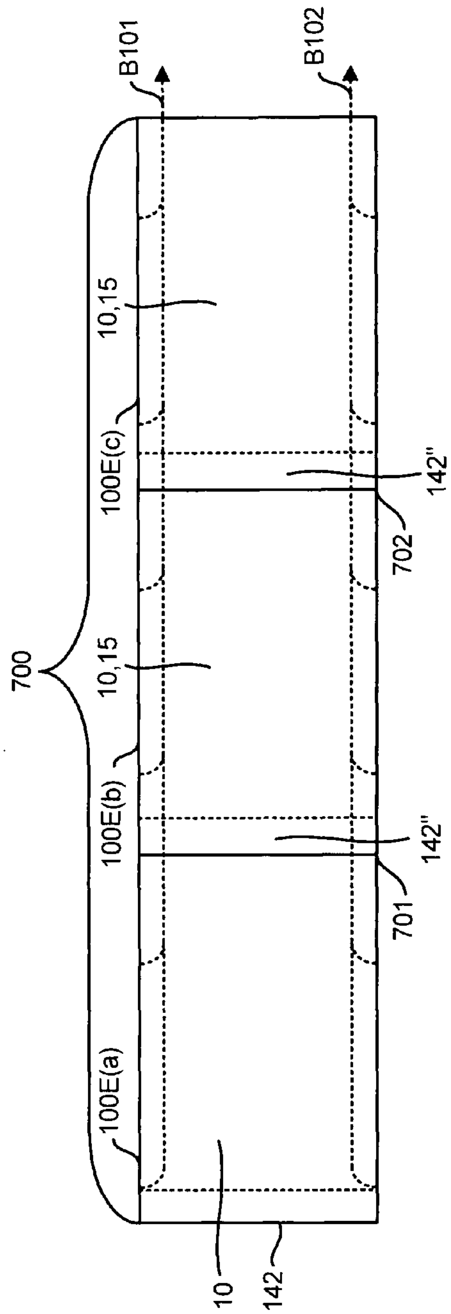
FIG. 83 is a simplified partially schematic view of one embodiment of a beam accelerator or conduit assembly according to the present disclosure that includes a plurality of electrode assemblies that are disposed in a series sequential or upstream to downstream configuration.

FIG. 83 illustrates a simplified partially schematic view of a beam accelerator or conduit assembly 700 that includes a plurality of electrode assemblies 100E(a), 100E(b), and 100E(c) that are disposed in a series sequential or upstream to downstream configuration such that the beams B101 and B102 ejected from the first electrode assembly 100E(a) are injected into at least second electrode assembly 100E(b) and may be injected sequentially to third electrode assembly 100E(c) and subsequent electrode assemblies coupled in series, the first electrode assembly 100E(a) and the at least a second electrode assembly 100E(b) in series forming thereby the beam conduit assembly 700. More particularly, electrode assembly 100E(a) is identical to electrode assembly 100E described above with respect to FIGS. 29-38 or identical to electrode assembly 100E" described above with respect to FIG. 78. However, those skilled in the art will recognize that, and understand how, the electrode assemblies 100E(b) and 100E(c) differ from electrode assembly 100E(a) in that at interface 701 between the first electrode assembly 100E(a) and the second electrode assembly 100E(b), rigid wall 142" may be configured to allow injection of beams B101 and B102 from the first electrode assembly 100E(a) into the second electrode assembly 100E(b) in a common path for beam B101 and in a common path for beam B102, such that alignment of beams B101 and B102 may be at least partially maintained in the second electrode assembly 100E(b). Similarly, at interface 702 between the second electrode assembly 100E(b) and the third electrode assembly 100E(c), rigid wall 142" may be configured to allow injection of beams B101 and B102 from the second electrode assembly 100E(b) into the third electrode assembly 100E(c) in a common path for beam B101 and in a common path for beam B102, such that alignment of beams B101 and B102 may be at least partially maintained in the third electrode assembly 100E(c).

Those of ordinary skill in the art will recognize that, and understand how, the plurality of electrode assemblies 100E(a) to 100E(c) of beam accelerator or conduit assembly 700 may be operated such that beams B101 and B102 may originate only from the first electrode assembly 100E(a) or such that beams B101 and B102 may originate concurrently or intermittently from second electrode assembly 100E(b) and/or third electrode assembly 100E(c). The interior region of the first electrode assembly 100E(a) may contain the solution 10, while the interior regions of the second and third electrode assemblies 100E(b) and 100E(c) may contain the solution 10, or another solution or gas or vacuum 15.

Figure 85:
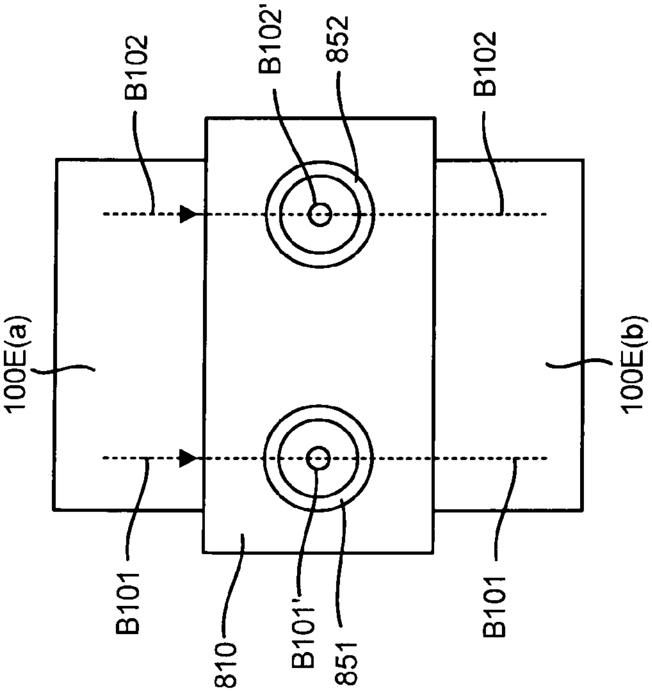
FIG. 85 is a simplified partially schematic cross-sectional view of the beam accelerator or transport assembly of FIG. 84.
Figure 84:
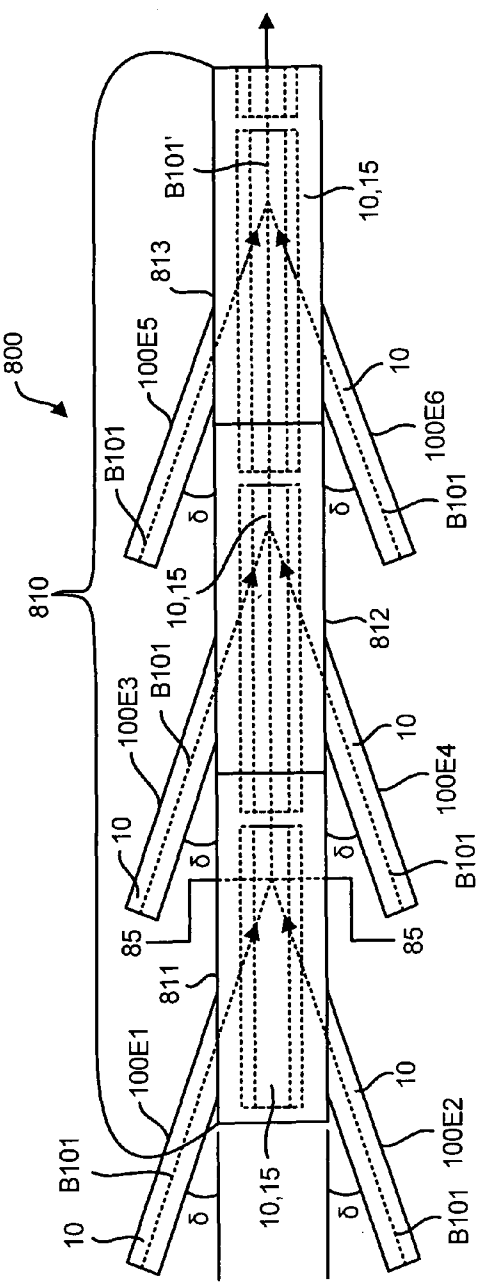
FIG. 84 is a simplified partially schematic view of one embodiment of the beam accelerator or transport assembly that includes a plurality of electrode assemblies that are configured to inject ion beams into common beam conduits.

FIGS. 84-85 are simplified partially schematic views that illustrate one embodiment of a beam accelerator or transport assembly 800 that includes a plurality of electrode assemblies, e.g., electrode assemblies 100E1 through 100E6, that are configured to inject first beams B101 and second beams B102 into a beam conduit assembly 810 that includes a first beam conduit sub-assembly 811, a second beam conduit sub-assembly 812 and a third beam conduit sub-assembly 813 that sequentially interface each other to form a first common beam conduit 851 and a second common beam conduit 852. The first common beam conduit 851 is configured to transport the at least first beam B101 and the second common beam conduit 852 is configured to transport the at least second beam B102. The electrode assemblies 100E1 through 100E6 are identical to the electrode assembly 100E described above with respect to FIGS. 29-38 or to electrode assembly 100E" described above with respect to FIG. 78 or to electrode assemblies 600 and 600' described above with respect to FIGS. 79-82, with the exception that the electrode assemblies 100E1 through 100E6 are disposed at an angle of inclination δ with respect to the beam conduit assembly 810. More particularly, the first common beam conduit 851 has a hollow interior region 851*a* and is configured to receive beams B101 from the electrode assemblies 100E1 through 100E6 that are inclined at the angle of inclination δ so as to form a first combined beam B101' in the hollow interior region 851*a* of the first common beam conduit 851. Similarly, the second common beam conduit 852 has a hollow interior region 852*a* and is configured to receive beams B102 from the electrode assemblies 100E1 through 100E6 that are inclined at the angle of inclination δ so as to form a second combined beam B102' in the hollow interior region 852*a* of the second common beam conduit 852. Those of ordinary skill in the art will recognize that, and understand how, in one embodiment, the angle of inclination δ is configured to be as shallow as practical considerations allow.

Those of ordinary skill in the art will recognize that, and understand how, the individual segments of the first common beam conduit 851, each one residing in the first beam conduit sub-assembly 811, in the second beam conduit sub-assembly 812, and in the third beam conduit sub-assembly 813, may each be configured and operated to form a substantially transverse concentric electric field within the hollow interior region 851*a* of the first common beam conduit 851 to provide resistance to lateral dispersion during the charge acceleration mode of operation of beams B101 to form the first combined beam B101'. Similarly, those of ordinary skill in the art will recognize that, and understand how, the individual segments of the second common beam conduit 852, each one residing in the first beam conduit sub-assembly 811, in the second beam conduit sub-assembly 812, and in the third beam conduit sub-assembly 813, may each be configured and operated to form a substantially transverse concentric electric field within the hollow interior region 852*a* of the second common beam conduit 852 to provide resistance to lateral dispersion during the charge acceleration mode of operation of beams B102 to form the second combined beam B102'.

Figure 86:
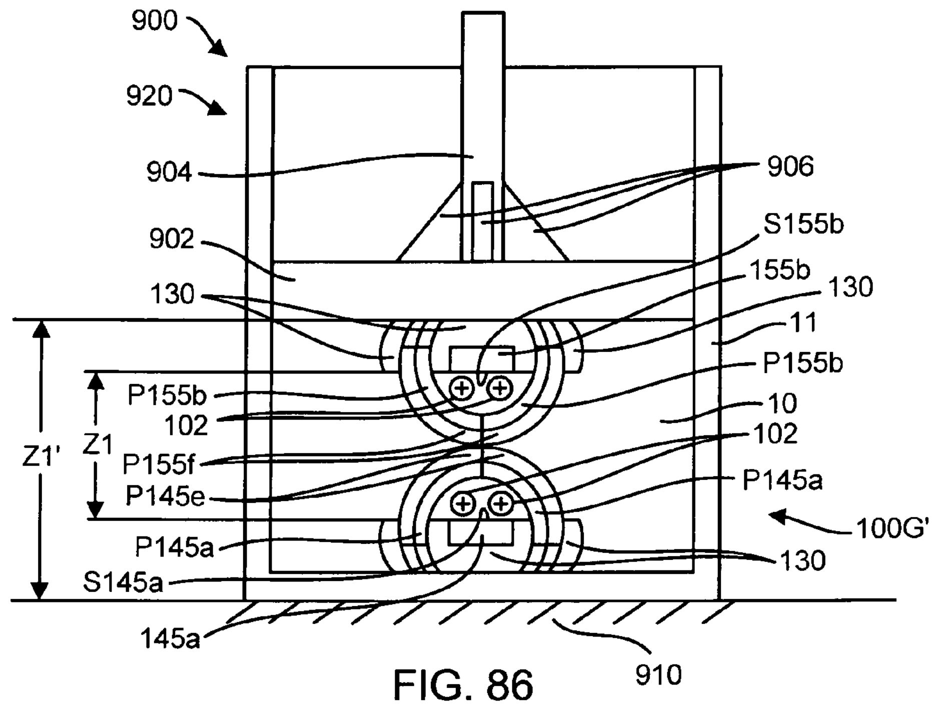
FIG. 86 illustrates one embodiment of a motive apparatus that includes at least one electrode assembly according to the present disclosure that includes a mobile assembly in a first position and having at least one passive electric field voltage source configured to move the mobile member in response to interaction with another passive electric field voltage source.
Figure 87:
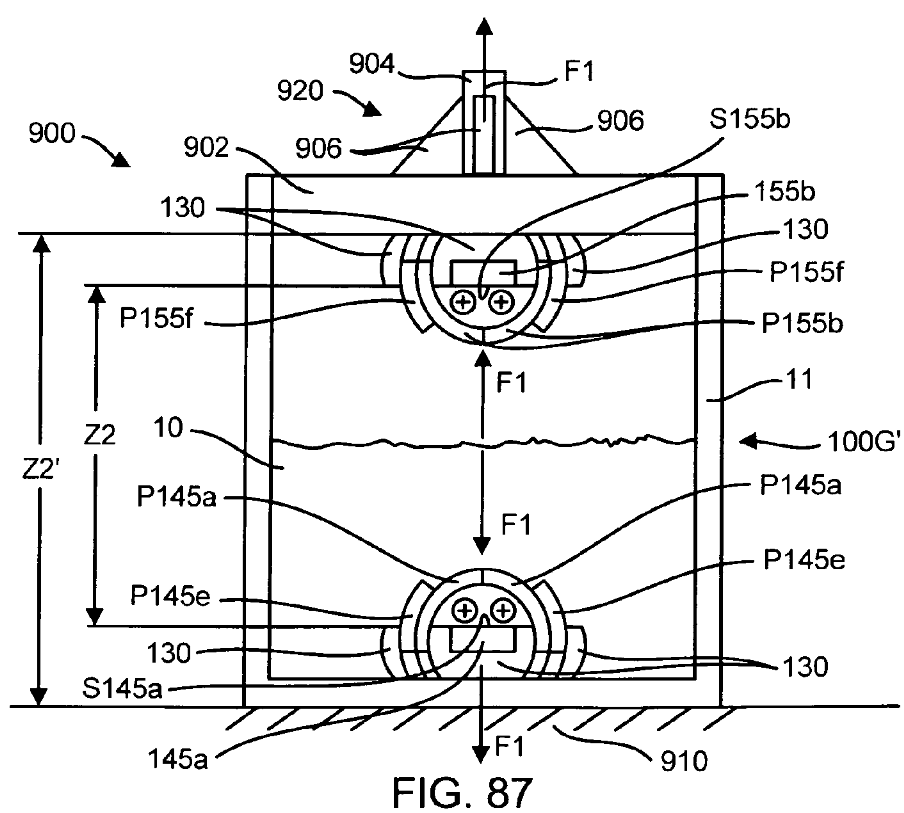
FIG. 87 illustrates the motive apparatus of FIG. 86 wherein the mobile assembly is in a second position.
Figure 88:
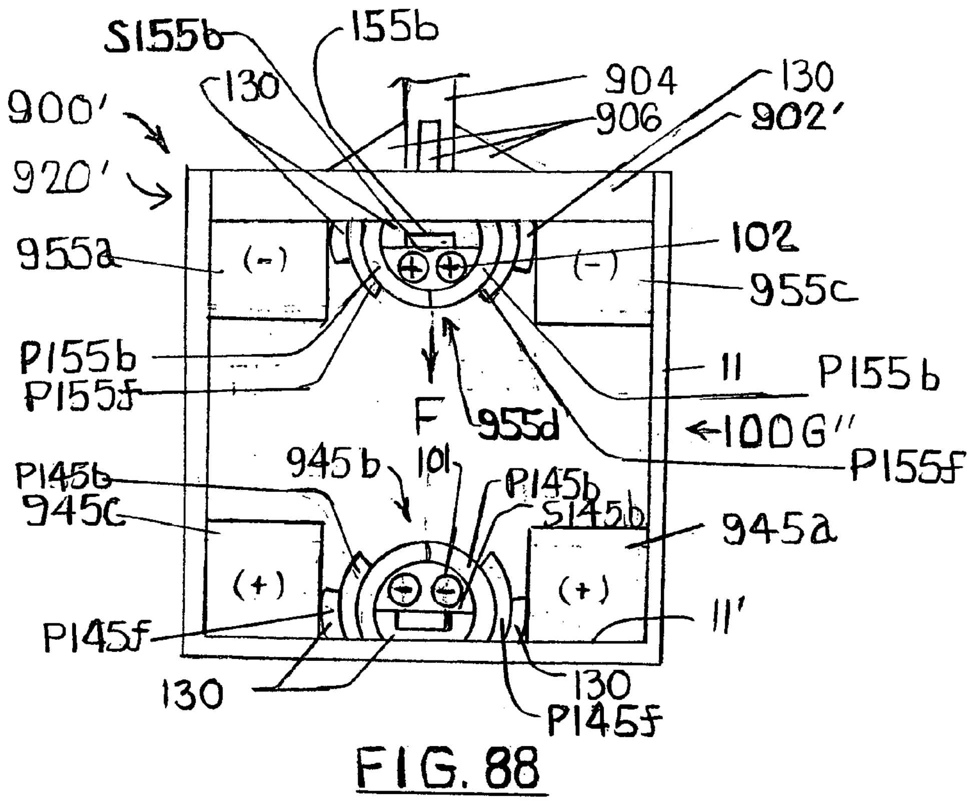
FIG. 88 illustrates an alternate embodiment of a motive apparatus according to the present disclosure that includes at least one electrode assembly according to the present disclosure having multiple passive electric field voltage sources in both a mobile member and a guide tube.

Referring now to FIGS. 86-87, there is illustrated a motive apparatus 900 that includes at least one electrode assembly 100G' according to the present disclosure. The electrode assembly 100G' incorporates into the electrode assembly 100G, described with respect to FIGS. 43-48, the electrode sets 145*a* and 145*b* and 155*a* and 155*b* that are configured such that following the closure of the movable partitions or members P145*a*, P145*b*, P155*a* and P155*b*, movable electrically insulating layers or members P145*e* and P145*f* may be disposed around outer surfaces P145*g* and P145*h* of movable partitions P145*a* and P145*b*, respectively, while movable electrically insulating layers P155*e* and P155*f* may be disposed around outer surfaces P155*g* and P155*h* of movable partitions P155*a* and P155*b*, respectively, as described above with respect to FIG. 49. The outer surfaces P145*g* and P145*h* generally interface with outer surfaces P155*g* and P155*h*, respectively. The tank or guide tube 11 (see FIG. 43) is supported on a surface 910 and the motive apparatus 900, including the electrode assembly 100G', are configured to be disposed within the interior region of the tank or guide tube 11.

Thus, electrode assembly 100G' is configured to isolate the solute ions 101 and 102 following the charge accumulation mode of operation. The first set of first and second lower electrodes 145*a* and 145*b*, respectively, are stationary and mounted in dielectric material 130 and of first and second upper electrodes 155*a* and 155*b*, respectively, also are each mounted in dielectric material 130, and are substantially parallel to the first and second lower electrodes 145*a* and 145*b*, respectively. The surface S145*a* of electrode 145*a* is disposed in interfacing relationship with the surface S155*a* of electrode 155*a*, while the surface S145*b* of electrode 145*b* is disposed in interfacing relationship with the surface S155*b* of electrode 155*b*. The first and second upper electrodes 155*a* and 155*b*, respectively, are rotatable around the axis of rotation D-D (see FIG. 43). In a similar manner as described above with respect to electrode assembly 100D (see FIGS. 24-27), the electrodes 145*a*, 145*b*, 155*a* and 155*b* include movable partitions P145*a*, P145*b*, P155*a* and P155*b*, with the partitions having inner surfaces P145*c*, P145*d*, P155*c* and P155*d*, respectively. The movable partitions P145*a*, P145*b*, P155*a* and P155*b* may again be shaped as a portion of a cylinder wall and extend along the longitudinal axis of each electrode 145*a*, 145*b*, 155*a* and 155*b* along the peripheral edge surfaces S145*a*', S145*b*', S155*a*' and S155*b*' of the electrodes 145*a*, 145*b*, 155*a* and 155*b*, respectively. In one embodiment, the movable partitions P145*a*, P145*b*, P155*a* and P155*b* are configured so as not to be in direct electrical contact with the electrodes 145*a*, 145*b*, 155*a* and 155*b* or their surfaces S145*a*, S145*b*, S155*a* and S155*b*.

Thus, the electrode assembly 100G' includes a first passive voltage source 945 having at least one electrode surface S145*a* of electrode 145*a* and/or S145*b* of electrode 145*b* that is configured to retain at least a portion of the first portion of like charged ions 101 or 102 and at least one at least partially enclosed volume 945' defined by the partitions P145*a*, P145*b* being disposed at least partially over the electrode surfaces S145*a* and S145*b*, respectively, thereby being configured to retain at least a portion of the first portion of like charged ions 101 or 102. In addition, the first passive voltage source 945 includes, in one embodiment, the movable insulating layers P145*e* and P145*f* movably disposed over the outer surfaces P145*g* and P145*h* of partitions P145*a* and P145*b*, respectively (see FIG. 49).

The electrode assembly 100G' also includes a second passive voltage source 955 having at least one electrode surface S155*a* of electrode 155*a* and/or S155*b* of electrode 155*b* that is configured to retain at least a portion of the first portion of like charged ions 101 or 102 and at least one at least partially enclosed volume 955' defined by the partitions P155*a* and/or P155*b* being disposed at least partially over the electrode surfaces S155*a* and/or S155*b*, respectively, thereby being configured to retain at least a portion of the second portion of like charged ions 101 or 102. Similarly, the second passive voltage source 955 includes, in one embodiment, the movable insulating layers P155*e* and/or P155*f* movably disposed over the outer surfaces P155*g* and/or P155*h* of partitions P155*a* and/or P155*b*, respectively (see FIG. 49).

The electrode surfaces S145*a*, S145*b* and/or S155*a*, S155*b* that are configured to retain and the at least partially enclosed volume 945, and/or 955' that are configured to retain at least portions of one of the first and second portions of like charged ions 101, 102 therefore enable the electric field voltage sources 945 and/or 955 emitting an electric field therefrom.

Consequently, the electrode assembly (or assemblies) 100G' is configured to enable a first portion of like charged ions 101 or 102, emitting an electric field from the electric field voltage source 945 to convert potential energy of the first portion of like charged ions 101 or 102 to kinetic energy based on interaction with the Coulomb forces of a second portion of like charged ions 101 or 102, emitting an electric field from the electric field voltage source 955, The first and second electric field passive voltage sources 945 and 955 enable the electric field to be emitted by at least a portion of the first and/or second portions of like charged ions 101 or 102 being solute ions and/or static charged ions.

Referring to FIG. 86, the motive apparatus 900 includes in one embodiment an object 902, e.g., a disc-like or piston-like object, disposed over the dielectric material 130 that embeds the first and second upper electrodes 155*a* and 155*b*. The object 902 may further include a power or motion transmitting member 904, e.g., a shaft member. Reinforcing ribs 906 may be rigidly connected to the object 902 and to the shaft 902 to provide reinforcement against forces imposed on the motive member 900.

During the charge accumulation mode of operation, the electrode assembly 100G' is filled with solution 10 and is operated such that only a quantity of charged solute ions 101 and 102 is attracted to the respective electrode surfaces S145*a*, S145*b*, S155*a* and S155*b* that is within the dielectric capabilities of the insulating layers P145*e*, P145*f*, P155*e* and P155*f* to close and significantly reduce the Coulomb forces of attraction between the negative solute ions 101 and the positive solute ions 102.

In FIG. 86, electrode assembly 100G' is illustrated in the position wherein at the completion of the charge accumulation mode of operation and closure of first the movable and electrically conductive partitions P145*a*, P145*b*, P155*a* and P155*b* and then closure of the insulating layers P145*e* and P145*f* over the partitions P145*a* and P145*b*, respectively, and closure of the insulating layers P155*e* and P155*f* over the partitions P155*a* and P155*b*, respectively, the second passive electric field voltage source 955 that includes the upper set of first and second electrodes 155*a* and 155*b* has been rotated around the axis D-D (see FIG. 43), to position over the first passive electric field voltage source 945 that includes the lower set of first and second electrodes 145*a* and 145*b*, the partitions P145*a* and P145*b* and the insulating layers P145*e* and P145*f* over the partitions P145*a* and P145*b*, respectively. The rotation also causes the insulating layers P155*e* and P155*f* to be positioned over the partitions P155*a* and P155*b*, respectively, with all remaining in the closed position, until the second upper electrode 155*b* and the associated partition P155*b* and insulating layer P155*f* are disposed in interfacing relationship with the insulating layer P145*e* associated with partition P145*a* and first lower electrode 145*a*, and correspondingly until the first upper electrode 155*a* and the associated partition P155*ba* and insulating layer P155*e* are disposed in interfacing relationship with the insulating layer P145*f* associated with partition P145*b* and second lower electrode 145*b*. The surface S145*a* of lower electrode 145*a* and the surface S155*b* of upper electrode 155*b* are separated by an initial height or distance Z1. The base of the object 902 is elevated above the support surface 910 by an initial height or distance Z1'.

For simplicity, only the second upper electrode 155*b* and the associated partition P155*b* and insulating layer P155*f* disposed in interfacing relationship with the insulating layer P145*e* associated with partition P145*a* and first lower electrode 145*a*, and positive ions 102 are illustrated in FIGS. 86-87. Those of ordinary skill in the art will understand how the first upper electrode 155*a* and the associated partition P155*a* and insulating layer P155*e* are disposed in interfacing relationship with the insulating layer P145*f* associated with partition P145*b* and second lower electrode 145*b*, together with associated negative ions 101.

As illustrated in FIG. 86, motive apparatus 900 is configured such that the set of first and second upper electrodes 155*a* and/or 155*b* and associated partitions P155*a* and/or P155*b* and insulating layers P155*e* and/or P155*f*, respectively, forming the second passive voltage source 955, and the object 902 and motion transmitting member 904 define at least a portion of a mobile assembly 920 that is capable of moving at least partially within the interior region of the cylindrical tank 11 containing the electrode assembly 100G' along the direction of the centerline axis D-D (see FIG. 43). As defined herein, a motive apparatus, e.g., motive apparatus 900, is an apparatus causing or able to cause motion. A mobile assembly, e.g., mobile assembly 920, is an assembly capable of being moved.

Once the rotation of the mobile assembly 920 around the centerline axis D-D has occurred to substantially align or position the electrode surface S155*b*, to which positive solute ions 102 have been attracted, over the electrode surface S145*a*, also to which positive solute ions 102 have been attracted, and to substantially align or position the electrode surface S155*a*, to which negative solute ions 101 have been attracted, over the electrode surface S145*b*, as illustrated in FIG. 86, in one embodiment, the solution 10 may be drained from the tank or guide tube 11 to cause the solute ions 101 and 102 to adhere to the respective surfaces S145*b* and S155*a* and to S145*a* and S155*b*, respectively. Alternatively, the solution 10 may remain in the tank or guide tube 11.

As illustrated in FIG. 87, the insulating layers P145*e*, P155*f*, P145*f* and P155*e* of the respective first and second passive electric field voltage sources 945 and 955 may then be opened enable interaction of the Coulomb forces to cause a Coulomb force of repulsion F1 between the substantially aligned like-charged portions of negative ions 101 on the surfaces S145*b* and S155*a* and between the substantially aligned like-charged portions of positive ions 102 on the surfaces S145*a* and S155*b*. The Coulomb force of repulsion F1 is such that the motive assembly 920, including the second passive electric field voltage source 955, moves in translation in the direction of the centerline axis D-D within the interior region of the tank or guide tube 11 to enable the mobile assembly 920, via the motive transmitting member 904, to perform useful work, e.g., to move a piston (not shown) to compress a gas, to induce an electric current via translational motion through a magnetic field or to convert the translational motion to rotary motion via a flywheel (not shown) to drive an electrical generator or other rotating device (not shown) or other suitable method of performing useful work. Alternatively, the mobile assembly 920 may also be ejected as a projectile from the tank or guide tube 11 wherein the mobile assembly 920 may be so utilized for demolition of a target.

Once the surface S145*a* of lower electrode 145*a* and the surface S155*b* of upper electrode 155*b* are separated by a selected or pre-determined height or distance Z2, and the base of the object 902 is elevated above the support surface 910 by a selected or pre-determined height or distance Z2', the insulating layers P145*e*, P145*f*, P155*e* and P155*f* of the respective first and second passive electric field voltage sources 945 and 955 may be closed to significantly reduce the Coulomb force of repulsion F1 such that the motive member 920 may be returned to the original position illustrated in FIG. 86.

The partitions P145*a*, P145*b* and/or P155*a*, P155*b* and the insulating layers P145*e*, P145*f* and/or P155*e*, P155*f* define at least one mobile member that selectively confines and exposes at least a portion of the first portion of like charged ions 101 or 102 of the first passive electric field voltage source 945 and/or at least a portion of the second portion of like charged ions 101 or 102 of the second passive electric field voltage source 955, respectively, that are made from, in the case of the partitions P145*a*, P145*b* and/or P155*a*, P155*b*, an electrically conductive material, as described above, and in the case of the insulating layers P145*e*, P145*f* and/or P155*e*, P155*f*, respectively, that are made from an electrically insulating material, wherein motion of the mobile member selectively confines, shields and exposes at least a portion of the electric field emitted from the respective passive electric field voltage source 945 and/or 955. The rotation and/or translation of the first and second voltage sources 945 and 955 enable a change in at least one of the direction, the position and the orientation of the emitted electric field.

The motion of the mobile assembly 920 may be repeated by cyclically re-opening and then re-closing the insulating layers P145*e*, P145*f*, P155*e* and P155*f*. Thus, the motive apparatus 900 is an apparatus that includes electrode assembly 100G' that is configured to align like charged solute ions 101 and 102 to convert potential energy of the like charged ions 101 and 102 so aligned to kinetic energy based on interaction of the Coulomb forces of repulsion therebetween. The electrode assembly 100G' is at least one electrode assembly that is contained within the motive apparatus 900, with the motive apparatus 900 including the mobile assembly 920. The electrode assembly 100G' includes at least the first electrode surface, e.g., surfaces S155*a* and S155*b*, forming at least a portion of mobile assembly 920. The mobile assembly 920 is configured to move in at least one direction of rotation, e.g., around the centerline axis D-D, and one direction of translation, e.g., in the direction of force F1, within the motive apparatus 900. The electrode assembly 100G' includes at least the first electrode surface S155*a* and S155*b* forming at least a portion of the mobile assembly 920. The mobile assembly 920 is configured to move in at least one direction of rotation, e.g., around the centerline axis D-D, and one direction of translation, e.g., in the direction of force F1, within the motive apparatus 900. The motive apparatus 900 is configured, via the mobile assembly 920, to substantially align like charged solute ions 101 and/or 102 of the solution 10 to convert potential energy of the like charged ions 101 and/or 102 so aligned to kinetic energy of the mobile assembly 920 and of the like charged solute ions 101 and/or 102 in the at least the one direction of translation e.g., in the direction of force F1, based on the Coulomb forces of repulsion therebetween. In one embodiment, the motive apparatus 900 may be configured such that the mobile assembly 920 moves in the at least a second direction of translation e.g., in a direction opposite to force F1, within the motive apparatus 900.

Those skilled in the art will recognize that, and understand how, the passive electric field voltage sources 945 and 955 can be filled with anolyte or catholyte and the partitions P145*a*, P145*b* and P155*a*, P155*b* sealed shut, thereby making the voltage sources 945 and 955 into completely enclosed volumes that include as movable insulating layers the respective movable insulating layers P145*e*, P145*f* and/or P155*e*, P155*f* to provide the capability of selectively shielding and exposing the respective electrode surfaces S145*a*, S145*b* and/or S155*a*, S155*b*. Alternatively, in the case where static charged ions are retained by the electrode surfaces S145*a*, S145*b* and/or S155*a*, S155*b*, the respective movable insulating layers P145*e*, P145*f* and/or P155*e*, P155*f* are all that is required to to provide the capability of selectively shielding and exposing the respective electrode surfaces S145*a*, S145*b* and/or S155*a*, S155*b*.

FIGS. 88 and 89A, 89B and 89C illustrate another embodiment of a motive apparatus that includes at least one electrode assembly. More particularly, motive apparatus 900' is similar to motive apparatus 900 described above, except that motive apparatus 900' includes at least one electrode assembly 100G" having at least first, second, third and fourth lower passive electric field voltage sources 945*a*, 945*b*, 945*c* and 945*d* and at least first, second, third and fourth upper passive electric field voltage sources 955*a*, 955*b*, 955*c* and 955*d*, respectively. The passive electric field voltage sources 945*a*, 945*b*, 945*c*, 945*d* and 955*a*, 955*b*, 955*c*, 955*d* are similar to the passive electric field voltage sources 945 and 955, respectively. Each of the voltage sources 945*a*, 945*b*, 945*c*, 945*d* and 955*a*, 955*b*, 955*c*, 955*d* are either negatively charged by like charged ions 101 or positively charged by like charged ions 102.

In contrast to object 902, object 902', e.g., a disc-like or piston-like object, is disposed over dielectric material 130 that now embeds all four of the first, second, third and fourth upper passive electric field voltage sources 955*a*, 955*b*, 955*c* and 955*d*. The four lower passive electric field voltage sources 945*a*, 945*b*, 945*c* and 945*d* are disposed on end cap or wall 11' of the tank or guide tube 11.

Figure 89A:
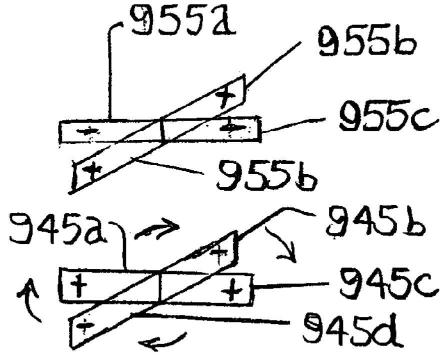
FIG. 89A is a schematic illustration of the positions of first and second sets of the multiple passive electric field voltage sources of the motive apparatus of FIG. 88 in an initial condition.
Figure 89B:
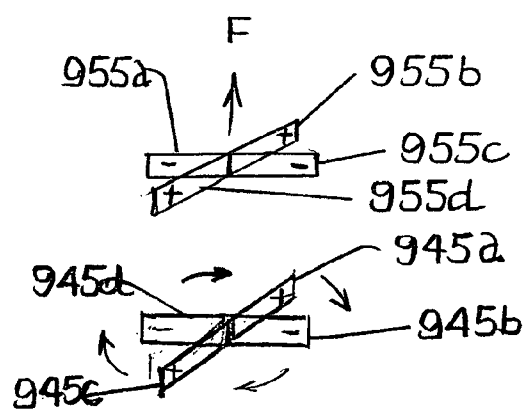
FIG. 89B is a schematic illustration of the positions of the first and second sets of multiple passive electric field voltage sources of the motive apparatus of FIG. 88 in a condition to cause repulsion of the mobile assembly.
Figure 89C:
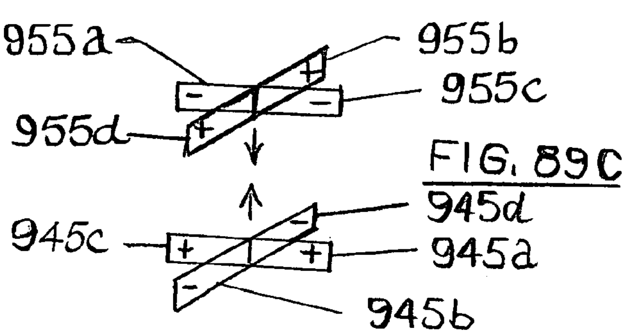
FIG. 89C is a schematic illustration of the positions of the first and second sets of multiple passive electric field voltage sources of the motive apparatus of FIG. 88 in a condition to cause attraction of the mobile assembly.

As illustrated schematically in FIGS. 89A, 89B and 89C, in one embodiment, the upper voltage sources 955*a*, 955*b*, 955*c* and 955*d* are configured in a cross arrangement, in a clockwise direction, source 955*a* being negatively charged, source 955*b* being positively charged, source 955*c* being negatively charged and source 955*d* being positively charged. The upper voltage sources 955*a*, 955*b*, 955*c* and 955*d* are not rotated within the guide tube or tank 11 but are free to move in translation along a longitudinal axis of the guide tube or tank 11 together with the object 902', in the direction indicated by force F as shown, or in the direction opposite to force F. The object 902', together with the shaft 904, the reinforcing ribs 906 (when necessary) and the upper voltage sources 955*a*, 955*b*, 955*c* and 955*d* are included within mobile assembly 920' that is capable of being moved in translation as indicated.

In the initial condition illustrated in FIG. 89A, first lower voltage source 945*a* is positively charged and interfacing negatively charged first upper source 955*a*, second lower voltage source 945*b* is negatively charged and interfacing positively charged second upper voltage source 955*b*, third lower voltage source 945*c* is positively charged and interfacing negatively charged third upper voltage source 955*c*, while fourth lower voltage source 945*d* is negatively charged and interfacing positively charged fourth upper voltage source 955*d*. The sources 945*a*, 945*b*, 945*c*, 945*d* and 955*a*, 955*b*, 955*c*, 955*d* are each electrically insulated by the respective movable insulating layers P145*e* or P145*f*, or P155*e* or P155*f*.

As illustrated in FIG. 89B, the lower voltage sources 945*a*, 945*b*, 945*c* and 945*d* are rotated 90 degrees with the insulating layers P145*e* or P145*f* maintained closed either on sources 945*a* and 945*c* or on sources 945*b* and 945*d* and the insulating layers P155*e* or P155*f* either on sources 955*b* and 955*d* or on sources 955*a* and 955*c*, so that only negatively charged source 945*d* is interfacing negatively charged upper voltage source 955*a* and only negatively charged source 945*d* is interfacing negatively charged upper voltage source 955*a*, or so that only positively charged source 945*a* is interfacing positively charged upper voltage source 955*b* and only positively charged source 945*c* is interfacing positively charged upper voltage source 955*d*. The resulting configuration results in a repulsion force between the lower voltage sources 945*a* and

945*c* with respect upper voltage sources 955*b* and 955*d*, respectively or between lower voltage sources 945*b* and 945*d* with respect to upper voltage sources 955*c* and 955*a*, respectively, to move the mobile assembly 920' away from the lower set of voltage sources 945*a*, 945*b*, 945*c*, 945*d*.

In FIG. 89C, the lower set of voltage sources 945*a*, 945*b*, 945*c*, 945*d* is again rotated clockwise 90 degrees with the insulating layers P145*e*, P145*f* and P155*e*, P155*f* maintained closed in an analogous manner, the difference being that the configuration results in an attraction force between the lower voltage sources 945*a* and 945*c* with respect upper voltage sources 955*c* and 955*a*, respectively or between lower voltage sources 945*b* and 945*d* with respect to upper voltage sources 955*d* and 955*b*, respectively, to move the mobile assembly 920' towards the lower set of voltage sources 945*a*, 945*b*, 945*c*, 945*d*.

Thus, the electrode assembly 100G" enables a first portion of like charged ions to convert potential energy of a second portion of like charged ions to kinetic energy based on interaction with the Coulomb forces of the first portion of like charged ions.

Figure 90:
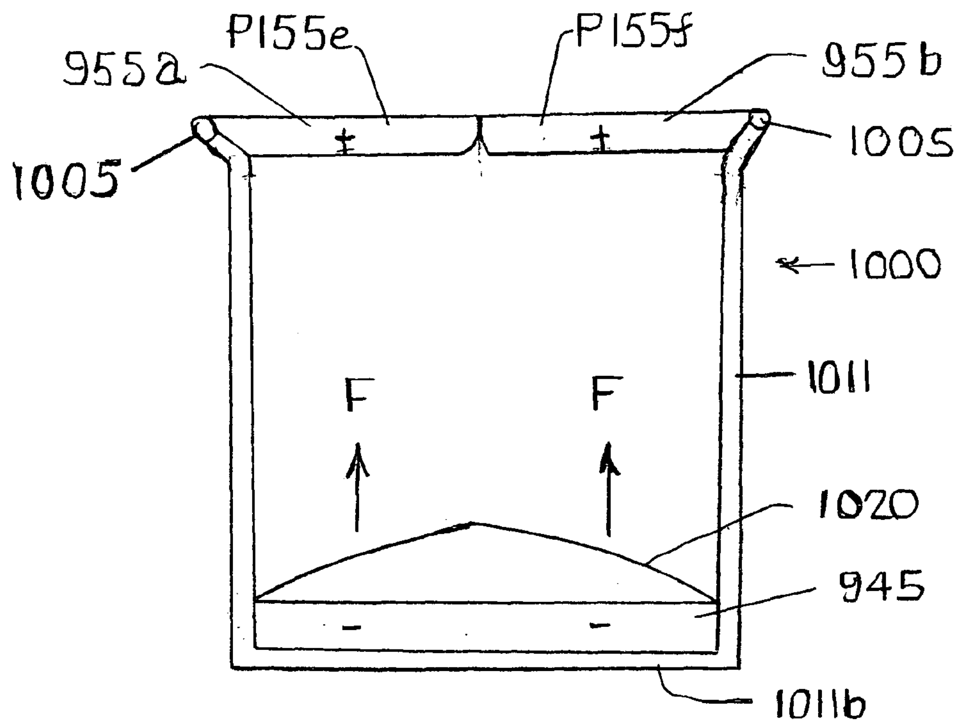
FIG. 90 illustrates one embodiment of an electrode assembly according to the present disclosure having passive electric field voltage sources that allows a mobile assembly to be projected out of a tank or guide tube in a first position within the tank or guide tube.
Figure 91:
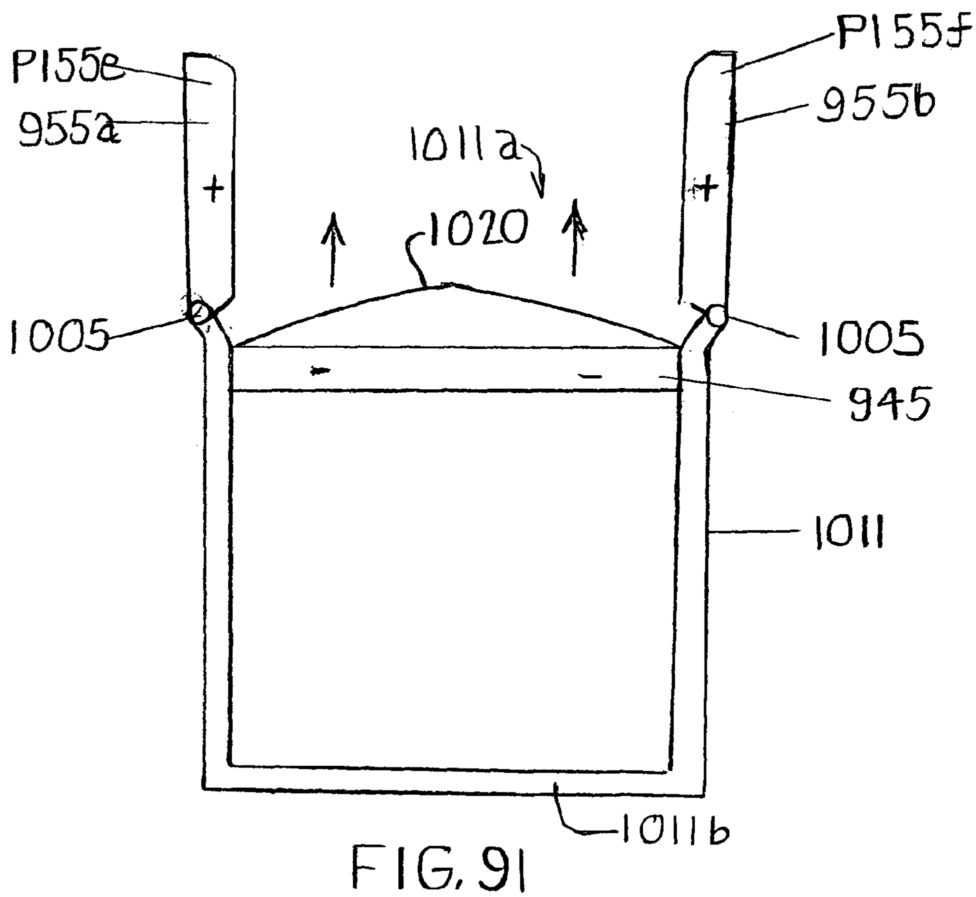
FIG. 91 illustrates the electrode assembly of FIG. 90 wherein the mobile assembly is being projected out of the tank or guide tube.

FIGS. 90-91 illustrate an embodiment of an electrode assembly having passive electric field voltage sources that allow a mobile assembly to be projected out of a tank or guide tube. More particularly, electrode assembly 1000 is configured wherein a mobile assembly 1020 includes passive electric field voltage source 945 disposed with respect to first and second upper passive voltage sources 955*a* and 955*b* to enable a first portion of like charged ions to convert potential energy of the first portion of like charged ions to kinetic energy based on interaction with the Coulomb forces of a second portion of like charged ions. That is, the first and second upper passive voltage sources 955*a* and 955*b* may be either positively charged, as shown, or negatively charged, while the lower passive voltage source 945 may be negatively charged, as shown, or positively charged. The first and second upper passive voltage sources 955*a* and 955*b* are rotatably connected by hinges or other suitable rotatable connecting members 1005 that are disposed at an aperture area 1011*a* of tank or guide tube 1011.

Initially, as illustrated in FIG. 90, the mobile assembly 1020 may be disposed in proximity to an enclosed end 1011*b* of the tank or guide tube 1011. The first and second upper passive voltage sources 955*a* and 955*b* have the respective insulating layers 155*e* and 155*f* in the open position to expose the positively charged ions, and are configured in an interfacing relationship with respect to the negatively charged ions of the lower passive voltage source 945 included with the mobile assembly 1020 to exert an attractive force F between the lower passive voltage source 945 and both the first and second upper passive voltage sources 955*a* and 955*b*. The force F is exerted on the interior of the lower passive voltage source 945 and results in motion of the mobile assembly 1020 towards the first and second upper passive voltage sources 955*a* and 955*b*.

As illustrated in FIG. 91, as the mobile assembly 1020 approaches the first and second upper passive voltage sources 955*a* and 955*b*, the respective insulating layers 155*e* and 155*f* are transferred to the closed position, by suitable driving mechanism (not shown), to shield the positively charged ions and the first and second upper passive voltage sources 955*a* and 955*b* may also be extended upward by rotation around the hinges 1005 by a suitable actuation mechanism (not shown), to facilitate passage of the mobile assembly 1020 through the aperture 1011*a* of the tank or guide tube 1011.

Thus, the electrode assembly 1000 enables a first portion of like charged ions, e.g., the ions of voltage sources 955*a* and 955*b*, to convert potential energy of a second portion of like charged ions, e.g., the ions voltage source 945 included within the mobile assembly 1020, to kinetic energy based on interaction with the Coulomb forces of the first portion of like charged ions, e.g., the ions of voltage sources 955*a* and 955*b*.

Figure 92:
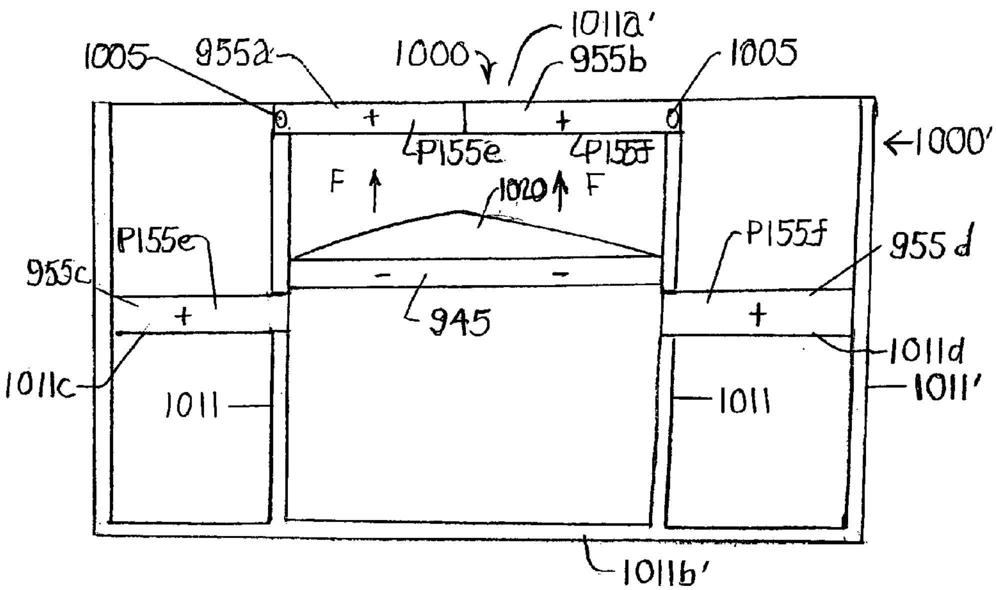
FIG. 92 illustrates an alternate embodiment of the electrode assembly of FIG. 91 having multiple levels of passive voltage sources along the path of the mobile assembly.

FIG. 92 illustrates an alternate embodiment of electrode assembly 1000 having multiple levels of upper passive voltage sources 955*a* and 955*b*. More particularly, the tank or guide tube 1011 of FIGS. 90 and 91 is now disposed as an inner tank generally concentrically contained within an outer tank or guide tube 1011' having an aperture 1011*a'* and an enclosed end 1011*b'*. Thus, the electrode assembly 1000 is now included within electrode assembly 1000'. Additionally, third and fourth upper passive voltage sources 955*c* and 955*d* are now disposed within channels 1011*c* and 1011*d* that enable lateral translation of the third and fourth upper passive voltage sources 955*c* and 955*d* within the respective channels 1011*c* and 1011*d*.

In the initial condition analogous to FIG. 90, the mobile assembly 1020 is disposed in proximity to the enclosed end 1011*b'* and the third and fourth upper voltage sources 955*c* and 955*d*, respectively are positioned in interfacing relationship with the lower passive voltage source 945 and the respective insulating layers P155*e* and P155*f* of the third and fourth upper voltage sources 955*c* and 955*d* have the respective insulating layers 155*e* and 155*f* in the open position to expose the positively charged ions, and are configured in an interfacing relationship with respect to the negatively charged ions of the lower passive voltage source 945, to again result in an attraction force F that causes motion of the mobile assembly 1020 towards the aperture 1011*a'*.

As illustrated in FIG. 92, the third and fourth upper passive voltage sources are translated or retracted laterally within the respective channels 1011*c* and 1011*d* to allow passage of the mobile assembly 1020 towards the first and second upper passive voltage sources 955*a* and 955*d*, respectively, until the mobile assembly is ejected through the aperture 1011*a'* in an analogous manner as shown in FIG. 91.

Thus, in a similar manner as electrode assembly 1000, the electrode assembly 1000' enables a first portion of like charged ions, e.g., the ions of voltage sources 955*a*, 955*b*, 955*c* and 955*d*, to convert potential energy of a second portion of like charged ions, e.g., the ions voltage source 945 included within the mobile assembly 1020, to kinetic energy based on interaction with the Coulomb forces of the first portion of like charged ions, e.g., the ions of voltage sources 955*a*, 955*b*, 955*c* and 955*d*.

Figure 93:
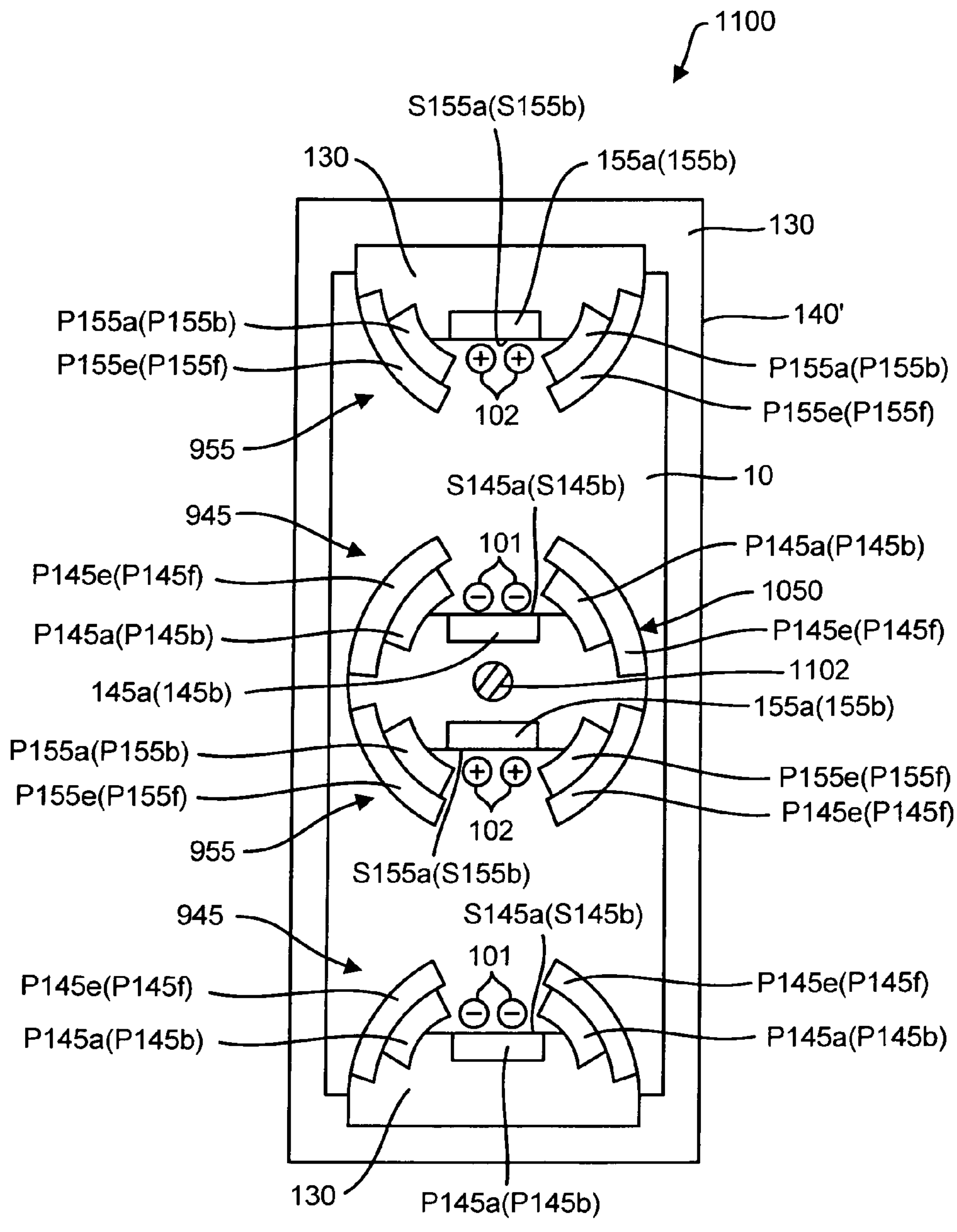
FIG. 93 illustrates one embodiment of an electrode assembly according to the present disclosure having a passive electric field voltage source having multiple electric field monopoles is inserted between first and second passive voltage sources.

FIG. 93 illustrates an electrode assembly that is analogous to the electrode assembly 100D having first and second major electrodes 113*a* and 113*b* and may also include a movable rotatable electrode 160", described previously with respect to FIGS. 24-28. More particularly, electrode assembly 1100 includes housing 140' made from dielectric material 130. The housing 130 is configured with lower or first passive electric field voltage source 945 and upper or second passive electric field voltage source 955. The passive electric field voltage sources 945 and 955 are as described previously with respect to FIGS. 49 and 86-89. In one embodiment, the housing 130 also includes a passive electric field voltage source 1050 that is configured with multiple electric field monopoles. The electric field voltage source 1050 is discussed below.

In one embodiment, not including the passive electric field voltage source 1050, the partitions P145*a* (or P145*b*) and the insulating layers P145*e* (or P145*f*) of the first or lower voltage source 945 are in their open position. Similarly, the partitions P155*a* (or P155*b*) and the insulating layers P155*e* (or P155*f*) of the second or upper voltage source 955 are in their open position, so that at least the surface S145*a* (or S145*b*) of the electrode 145*a* (or 145*b*) of the first voltage source 945 is in interfacing relationship with at least the surface S155*a* (or S155*b*) of the electrode 155*a* (or 155*b*) of the second voltage source 955 to permit attraction of the like charged solute ions 101 and 102 or to retain static charged ions. Following closure and sealing of the the partitions P145*a* (or P145*b*) and the partitions P155*a* (or P155*b*), the first and second voltage sources 945 and 955 may be removed from housing 130, such as by sliding out or in from the housing, as a method of manufacturing a passive electric field voltage source having at least one electric field monopole, with the passive electric field voltage sources 945 or 955 being able to be utilized independently of the housing 130.

In one embodiment, the electrode assembly 1100 is also configured with passive electric field voltage source 1050 having multiple electric field monopoles. As illustrated in FIG. 93, the voltage source 1050 is inserted between the first or lower passive voltage source 945 and the second or upper passive voltage source 955. The voltage source 1050 may include a shaft 1102 permitting rotation of the voltage source 1050 around the shaft 1102. Those skilled in the art will recognize that the voltage source 1050 may be considered as a back-to-back configuration of the first or lower passive voltage source 945 and the second or upper passive voltage source 955 and consequently the components of multiple monopole voltage source 1050 are numbered similarly. Those skilled in the art will also recognize how like charged ions 101 and 102 may be attracted as solute ions to, or retained as static charged ions by, the electrode surfaces S145*a* (or S145*b*) and S155*a* (or S155*b*) of voltage source 1050.

In a similar manner as described above, following closure and sealing of the the partitions P145*a* (or P145*b*) and the partitions P155*a* (or P155*b*), the multiple monopole voltage source 1050 may be removed from housing 130, such as by sliding out or in from the housing, as a method of manufacturing a passive electric field voltage source having multiple electric field monopoles, with the passive electric field voltage source 1050 thus being able to be utilized independently of the housing 130.

Additionally, those skilled in the art will recognize that, and understand how, the electrode assembly 1100, when configured with the passive electric field voltage source 1050 having multiple electric field monopoles and maintaining the opening and closing capability of the partitions or movable members P145*a* (or P145*b*) and P155*a* (or P155*b*), can be utilized in an analogous manner as described previously for the electrode assembly 100D having first and second major electrodes 113*a* and 113*b* that includes movable rotatable electrode 160" to enable at least a portion of like charged ions 101 and/or 102 to convert potential energy of the at least a portion of like charged ions 101 and/or 102 into kinetic energy based on the Coulomb forces therebetween via linear alignment thereof, When utilized in this manner to cause linear alignment of the like charged ions 101 and/or 102, first and second passive voltage sources 945 and 955 and the passive voltage source 1050 enable an electric field that is established at least partially transversely to the electrode surfaces S145*a* (or S145*b*) and S155*a* (or S155*b*) that is generally uniform along the length of the electrode assembly 1100, as compared to application of an active voltage source between the electrode surfaces S145*a* (or S145*b*) and S155*a* (or S155*b*) and substantially co-planar electrode surfaces. Thus, it is contemplated that the conversion to kinetic energy may be enhanced with electrode assembly 1100.

FIGS. 94A, 94B, 94C and 94D illustrate the passive voltage source 1050 in different configurations or modes of operation. In the exemplary embodiment of FIG. 93, as described above, those skilled in the art will recognize that the passive voltage source 1050 can be considered to be a back-to-back arrangement of first passive voltage source 945 and second passive voltage source 955 adjoining each other via dielectric material 130 either as a solid single material common to both voltage source 945 and 955, as illustrated in FIG. 93 and subsequently, or separately as an individual material for voltage source 945 and an individual material for voltage source 955.

Figure 94A:
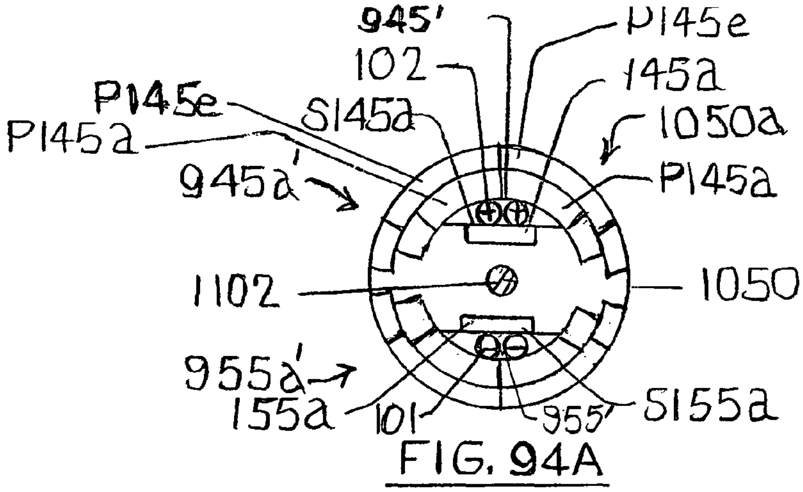
FIG. 94A illustrates the passive electric field voltage source having multiple electric field monopoles of FIG. 93 in a configuration wherein the partitions and insulating layers are all closed to confine and shield the like charged ions retained by the electrode surfaces.

Referring to FIG. 94A, in conjunction with FIG. 49, the designation 1050*a* represents the voltage source 1050, and the designations 945*a*' and 955*a*' represent the respective first and second voltage sources 945 and 955, in a configuration wherein the partitions P145*a* (or P145*b*) and P155*a* (or P155*b*) and the insulating layers P145*e* (or P145*f*) and P155*e* (or P155*f*) are all closed to confine and shield the respective like charged ions 101 and/or 102 retained by the electrode surfaces S145*a* (or S145*b*) and S155*a* (or S155*b*).

Figure 94B:
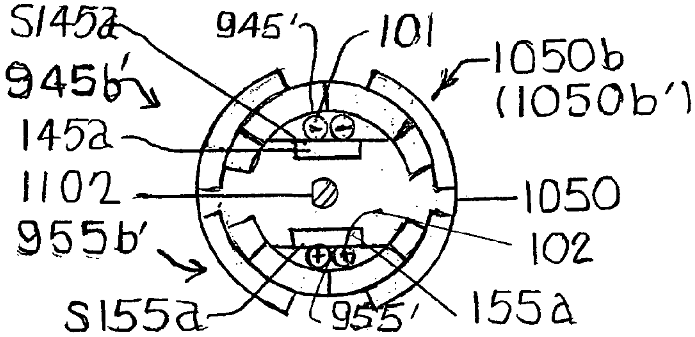
FIG. 94B illustrates the passive electric field voltage source having multiple electric field monopoles of FIG. 93 in a configuration wherein the partitions are closed while the insulating layers are open to expose the like charged ions retained by the electrode surfaces.

Referring to FIG. 94B, in conjunction with FIG. 49, the designation 1050*b* represents the voltage source 1050, and the designations 945*b*' and 955*b*' represent the respective first and second voltage sources 945 and 955, in a configuration wherein the partitions P145*a* (or P145*b*) and P155*a* (or P155*b*) are closed while the the insulating layers P145*e* (or P145*f*) and P155*e* (or P155*f*) are open to expose the respective like charged ions 101 and/or 102 retained by the electrode surfaces S145*a* (or S145*b*) and S155*a* (or S155*b*) to enable an electric field to be emitted. Those skilled in the art will recognize that voltage source 1050 may be disposed as a voltage source 1050*b*' in a configuration that represents an inverted configuration as compared to the configuration of voltage source 1050 designated as 1050*b*.

Figure 94C:
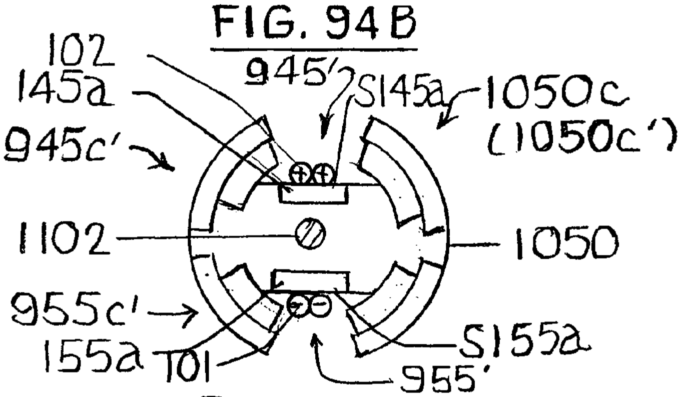
FIG. 94C illustrates the passive electric field voltage source having multiple electric field monopoles of FIG. 93 in a configuration wherein the partitions and the insulating layers are all open to enable attraction of like charged ions retained by the electrode surfaces.

Referring to FIG. 94C, in conjunction with FIG. 49, the designation 1050*c* represents the voltage source 1050, and the designations 945*c*' and 955*c*' represent the respective first and second voltage sources 945 and 955, in a configuration wherein the partitions P145*a* (or P145*b*) and P155*a* (or P155*b*) and the insulating layers P145*e* (or P145*f*) and P155*e* (or P155*f*) are all open to enable attraction of the respective like charged ions 101 and/or 102 retained by the electrode surfaces S145*a* (or S145*b*) and S155*a* (or S155*b*). Those skilled in the art will recognize that voltage source 1050 may be disposed as a voltage source 1050*c*' in a configuration that represents an inverted configuration as compared to the configuration of voltage source 1050 designated as 1050*c*.

Figure 94D:
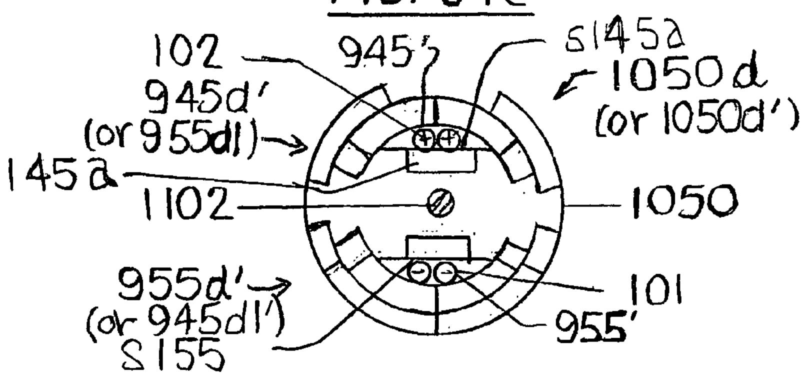
FIG. 94D illustrates one embodiment of the passive electric field voltage source having multiple electric field monopoles of FIG. 93 in a configuration wherein both sets of partitions are closed, one set of insulating layers are closed and one set of insulating layers are open to expose like charged ions retained by the electrode surface of one of the electric field monopoles.

Referring to FIG. 94D, in conjunction with FIG. 49, the designation 1050*d* (or 1050*d*') represents the voltage source 1050, and the designations 945*d*' (or 955*d*1') and 955*d*' (or 945*d*1') represent the respective first voltage source 945 and second voltage source 955, in a configuration wherein the partitions P 145*a* (or P145*b*) and P155*a* (or P155*b*) are closed. However, while the insulating layers P155*e* (or P155*f*) (or P145*e* (or P145*f*)) are closed, representing second voltage source 955 in configuration 955*d*' (or first voltage source 945 in configuration 945*d*1'), the insulating layers P145*e* (or P145*f*) (or P155*e* (or P155*f*)) are open to expose the like charged ions 101 and/or 102 retained by the electrode surfaces S145*a* (or S145*b*) (or S155*a* (or S155*b*)) to enable an electric field to be emitted therefrom. Thus, those skilled in the art will recognize that the designations 1050*d*', 945*d*1' and 955*d*1' represent the voltage source 1050 in a configuration that is inverted as compared to the configuration of voltage source 1050 represented by the designations 1050*d*, 945*d*' and 955*d*', respectively.

Those skilled in the art will recognize that other combinations of configurations and modes of operation of the passive electric field voltage source 1050 are possible.

Figure 95:
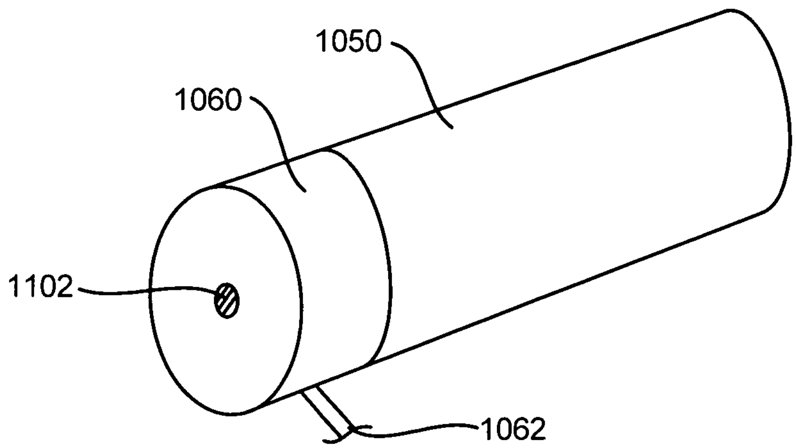
FIG. 95 illustrates a perspective view of the passive electric field voltage source having multiple electric field monopoles of FIG. 93 and showing a driver that is configured and disposed at an end of the voltage source to enable movement of the partitions and the insulating layers in various directions of opening and closing.

FIG. 95 illustrates a perspective view of the passive electric field voltage source 1050 and showing a driver 1060 that is configured and disposed at an end of the voltage source 1050 to enable movement of the partitions P145*a* (or P145*b*) and P155*a* (or P155*b*) and the insulating layers P145*e* (or P145*f*) and P155*e* (or P155*f*) in the various directions of opening and closing as described above with respect to FIGS. 94A, 94B, 94C and 94D. Those skilled in the art will recognize that the driver 1060 is operatively coupled to the partitions P145*a* (or P145*b*) and P155*a* (or P155*b*) and the insulating layers P145*e* (or P145*f*) and P155*e* (or P155*f*) and may drive the partitions P145*a* (or P145*b*) and P155*a* (or P155*b*) and the insulating layers P145*e* (or P145*f*) and P155*e* (or P155*f*) and be supplied via a power supply conduit 1072 to enable electrical, pneumatic, hydraulic or other suitable driving methods.

Figure 96:
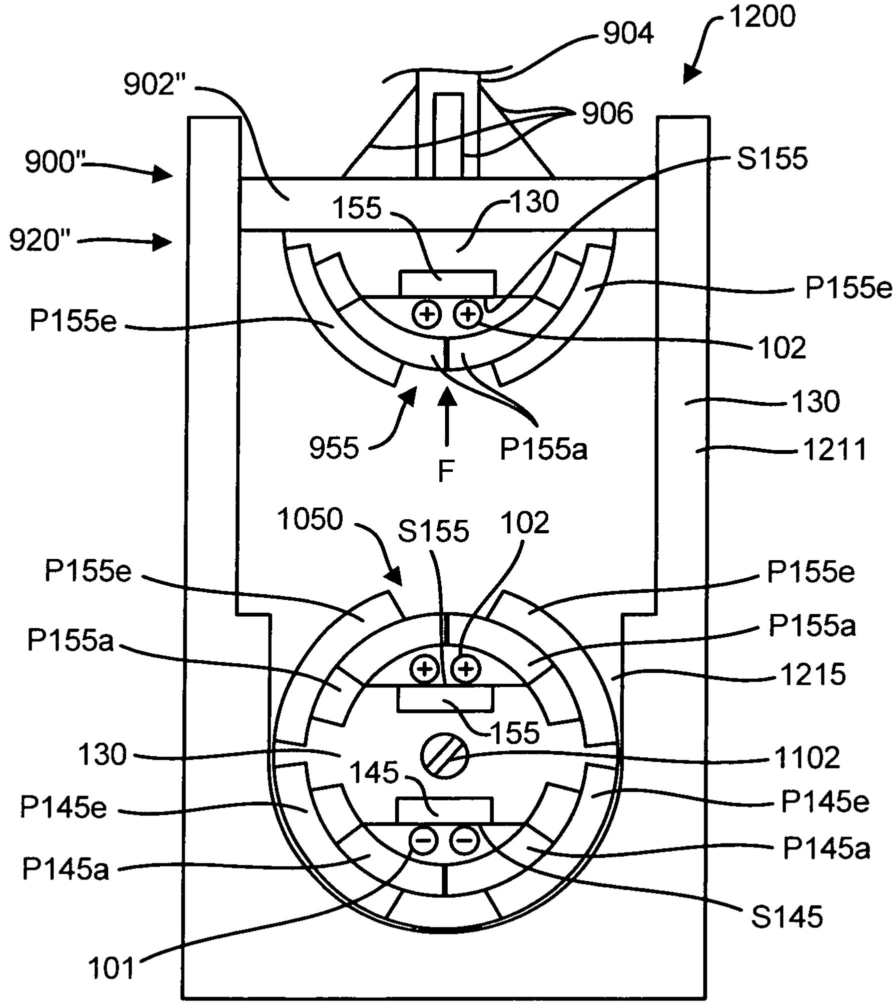
FIG. 96 illustrates an alternate embodiment of a motive apparatus according to the present disclosure that includes at least one electrode assembly having a passive electric field voltage source included within a mobile assembly, and a passive rotatable electric field voltage source with multiple electric field monopoles that enables movement of the mobile assembly as the passive rotatable electric field voltage source is rotated.

FIG. 96 illustrates another embodiment of a motive apparatus that includes at least one electrode assembly. More particularly, motive apparatus 900" is similar to the motive apparatuses 900 and 900' described above, except that motive apparatus 900" includes at least one electrode assembly 1200 having as a lower or first passive electric field voltage source the passive electric field voltage source 1050 with multiple electric field monopoles described above and as an upper or second passive electric field voltage source included within a mobile assembly 902" the voltage source 955 also as described above. The voltage sources 1050 and 955 are disposed within a tank or guide tube 1211.

In a similar manner as with respect to motive apparatuses 900 and 900', the upper voltage source 955 is not rotated within the guide tube or tank 11 but is free to move in translation along a longitudinal axis of the guide tube or tank 1211 together with object 902", in the direction indicated by force F as shown, or in the direction opposite to force F. The object 902", together with the shaft 904, the reinforcing ribs 906 (when necessary) and the upper voltage source 955 are included within at least one mobile assembly 920" that is capable of being moved in translation as indicated.

The lower or first passive voltage source 1050 is disposed within a space 1215 defined by the tank or guide tube 1211. Since the shaft 1102 is supported by the tank or guide tube 1211, the first voltage source 1050 is rotatable around shaft 1102 within the space 1215, to enable selectively interfacing of the electrode surfaces 5145 and 5155 of the first or lower passive voltage source 1050 with the electrode surface 5155 of the second or upper voltage source 955. Thus, with the first voltage source 1050 being in an exemplary configuration as shown in FIG. 96, the electrode surface 5155 of the first or lower voltage source 1050 is in interfacing relationship with the electrode surface S155 of the second or upper voltage source 955 to enable a first portion of positively charged ions 102 of the lower voltage source 1050 to interact with a second portion of positively charged ions 102 of the upper voltage source 955 to convert potential energy of the first portion of positively charged ions 102 to kinetic energy based on interaction with the second portion of positively charged ions 102 based on interaction of the Coulomb forces between the first and second portions of like charged ions, resulting a repulsion force F, so that the mobile assembly 920" moves away from the passive voltage source 1050.

Those skilled in the art will recognize that rotation of the passive voltage source 1050 around the shaft 1102 enables the first portion of like charged ions to be negatively charged ions 101, thereby enabling a first portion of negatively charged ions 101 of the lower voltage source 1050 to interact with the second portion of positively charged ions 102 of the upper voltage source 955 to convert potential energy of the first portion of negatively charged ions 101 to kinetic energy based on interaction with the second portion of positively charged ions 102 based on interaction of the Coulomb forces between the first and second portions of like charged ions, resulting an attraction force F, so that the mobile assembly 920" moves towards the passive voltage source 1050. Thus the mobile assembly 920" is configured to move in at least one of at least one direction of rotation and at least one direction of translation within the motive apparatus 900", again to enable conversion of the resulting kinetic energy of the mobile assembly 920" as described above with respect to motive apparatuses 900 and 900'.

Figure 97:
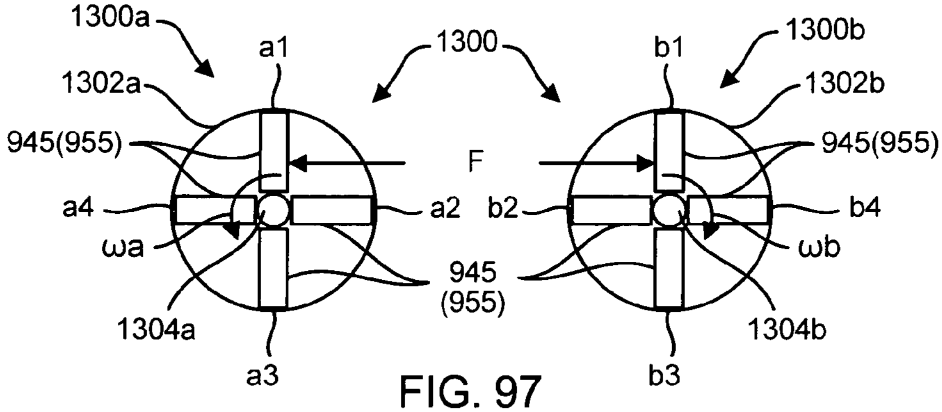
FIG. 97 illustrates one embodiment of a set of electrode assemblies according to the present disclosure each having at least one passive electric field voltage source rotatably mounted on a member so that interaction of the passive electric field voltage sources causes movement of at least one of the voltage sources mounted on the member.

FIGS. 97-100 illustrate alternate embodiments of electrode assemblies that are configured to rotate around an axis. More particularly, FIG. 97 illustrates an electrode assembly 1300 that includes at least first and second electrode assemblies 1302*a* and 1302*b*, respectively, that may be configured as a mirror image of each other. The first electrode assembly 1302*a* includes a first member 1302*a*, e.g., a disc-like member, that is configured to rotate around an axis of rotation defined by a shaft 1304*a*. The first member 1302*a* includes at least one passive electric field voltage source 945 (or 955) as described previously with respect to FIGS. 86-87 and 95 that is configured to retain at least a portion of a first portion of like charged ions 101 and/or 102.

The second electrode assembly 1302*b* includes a second member 1302*b*, e.g., a disc-like member, that is configured to rotate around an axis of rotation defined by a shaft 1304*b*. The second member 1302*b* also includes at least one passive electric field voltage source 945 (or 955) as described previously with respect to FIGS. 86-87 that is configured to retain at least a portion of a first portion of like charged ions 101 and/or 102.

At least one of the voltage sources 945 (or 955) is disposed on the first member 1302*a* at a position a1 with, in the exemplary embodiment of FIG. 97, three other voltage sources 945 (or 955) are disposed at positions a2, a3 and a4 around the first member 1302*a*. Similarly, at least one of the voltage sources 945 (or 955) is disposed on the second member 1302*b* at a position b1 with, in the exemplary embodiment of FIG. 97, three other voltage sources 945 (or 955) are disposed at positions b2, b3 and b4 around the first member 1302*b*.

The orientation of the voltage sources 945 (or 955) at positions a1, a2, a3, a4 and at b1, b2, b3, b4 is such that the voltage source 945 (or 955) at position a1 interfaces with the voltage source 945 (or 955) at position b1 to effect rotation of the first member 1302*a* around the axis of rotation 1304*a* by at least a portion of the first portion of like charged ions of the voltage source 945 (or 955) at position a1 converting potential energy of the at least a portion of the first portion of like charged ions to kinetic energy based on interaction with the Coulomb forces of the at least a portion of the second portion of like charged ions of the voltage source 945 (or 955) at position b1 on the second member 1302*b* by causing a force of repulsion F acting between the voltage sources 945 (or 955) at positions a1 and b1 so that at least first member 1302*a* rotates with an angular velocity ωa around the shaft 1304*a* and in one embodiment, second member 1302*b* rotates with an angular velocity ωb around the shaft 1304*b*. A similar force of repulsion F is caused by the voltage sources 945 (or 955) at positions a2 and b2, a3 and b3, and a4 and b4. The axes of rotation of the shafts 1304*a* and 1304*b* are illustrated in the exemplary embodiment of FIG. 97 as being parallel to each other. The force F may be tangential to the axes of rotation of shafts 1304*a* and 1304*b*. The insulating layers P145*e*, P145*f* (or P155*e*, P155*f*) of the voltage sources 945 (or 955) may be selectively opened and closed in a manner similar to that of passive voltage source 1050 (see FIGS. 94A-94D and 95) so that the desired repulsion force (or alternatively an attraction force) F occurs substantially only when the voltage sources 945 (or 955) are at positions a1 and b1, or a2 and b2, a3 and b3, or a4 and b4.

Figure 98:
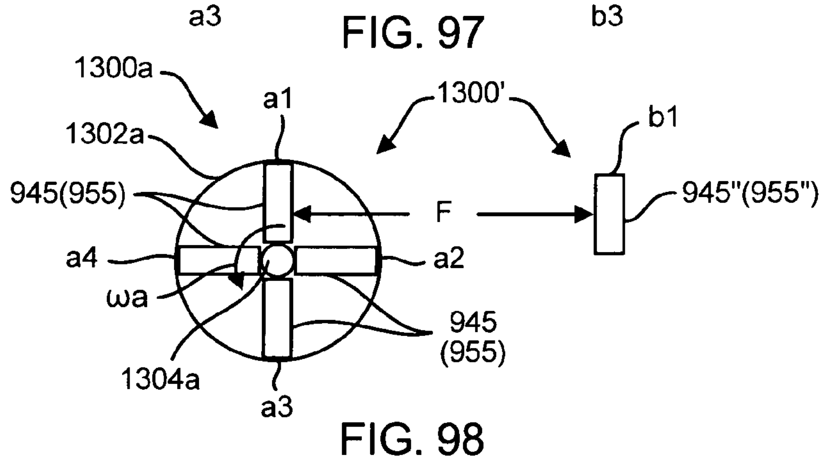
FIG. 98 illustrates one embodiment of a set of electrode assemblies according to the present disclosure wherein one electrode assembly has at least one passive electric field voltage source rotatably mounted on a member and one electrode assembly has a electric field voltage source maintained in a stationary position so that interaction of the passive electric field voltage sources causes movement of at least one of the voltage sources mounted on the member.

FIG. 98 illustrates an alternate embodiment of the electrode assembly 1300 of FIG. 97. More particularly, electrode assembly 1300' includes the first electrode assembly 1300*a* of FIG. 97 that is rotatable around shaft 1304*a*. However, in place of second electrode assembly 1300*b* that is rotatable around shaft 1304*b*, electrode assembly 1300' includes a stationary voltage source 945' (or 955') that is identical to the voltage source 945 (or 955) that is positioned at position b1. Those skilled in the art will recognize that the stationary voltage source 945' (or 955') may be utilized in an analogous manner as the electrode assembly 1300*b* to cause a similar force of repulsion (or alternatively a force of attraction) F acting between the voltage sources 945 (or 955) at positions a1, a2, a3 and a4 and the stationary voltage source 945" (or 955") at position b1.

Figure 99:
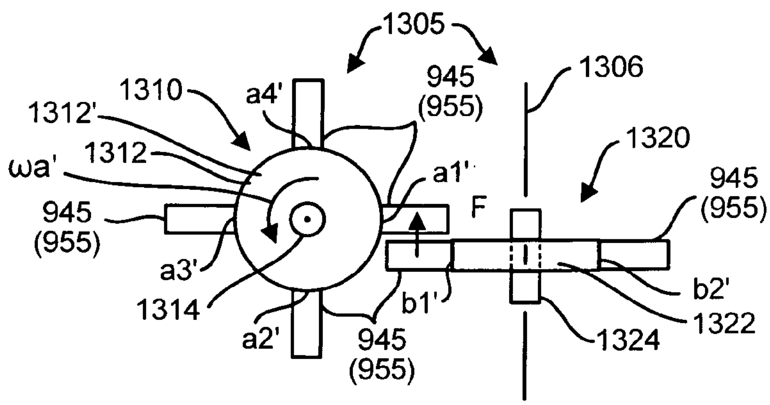
FIG. 99 illustrates one embodiment of a set of electrode assemblies according to the present disclosure wherein one electrode assembly has at least one passive electric field voltage source rotatably mounted on a member having an axis of rotation that is skewed to the axis of rotation of the other passive electric field voltage source mounted on another member and in a condition wherein the passive electric field voltage sources interact to cause a force of rotation.
Figure 100:
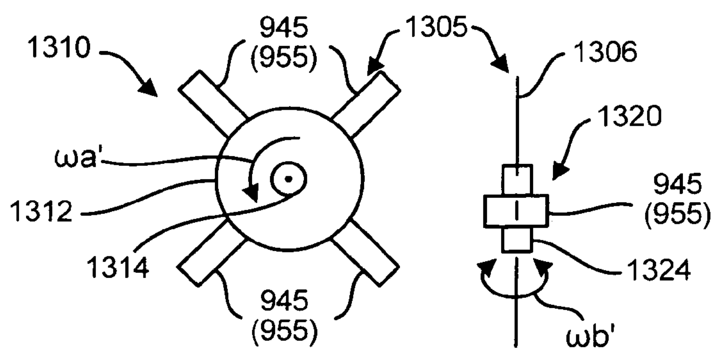
FIG. 100 illustrates the set of electrode assemblies of FIG. 99 wherein the set of electrode assemblies are in another condition wherein the passive electric field voltage sources do not interact to cause a force of rotation.

FIGS. 99-100 illustrate still another embodiment of electrode assemblies that are configured to rotate around an axis. More particularly, at least one electrode assembly 1305, which includes a first electrode assembly 1310. The first electrode assembly 1310 includes a first member 1312, e.g., a disc-like member, having a periphery 1312' and that is configured to rotate around an axis of rotation defined by a shaft 1314, in a manner similar to electrode assembly 1300*a* described above with respect to FIGS. 97-98. The first member 1312 includes at least one passive electric field voltage source 945 (or 955) as described previously with respect to FIGS. 86-87 and 95 that is configured to retain at least a portion of a first portion of like charged ions 101 and/or 102.

The electrode assembly 1305 also includes a second electrode assembly 1320 that is also configured to rotate around an axis of rotation 1306 defined by a shaft 1324. However, instead of being parallel to the axis of rotation defined by shaft 1314, the axis of rotation 1306 defined by shaft 1324 of second electrode assembly 1320 is skewed with respect to the axis of rotation defined by shaft 1314, and in the exemplary embodiment illustrated in FIGS. 99-100, is perpendicular with respect to the axis of rotation defined by shaft 1314.

The voltages sources 945 (or 955) are disposed on the periphery 1312' of the first member 1312 at positions a1', a2', a3' and a4' and project away from the periphery 1312'.

The second electrode assembly 1320 includes a central member 1322 having first and second ends and that is disposed on the shaft 1324 to rotate entirely around, or oscillate at least partially in both a first and a second direction opposite to the first direction around, the skewed axis of rotation 1306. At least one voltage source 945 (or 955) is disposed on the first end of central member 1322 at position b1' to project away from the first end of the central member 1322, and in one embodiment where the central member 1322 rotates entirely around the axis of rotation 1306, a second voltage source 945 (or 955) may be disposed on the second end of central member 1322 at position b2' to project away from the second end of the central member 1322.

The first and second electrode assemblies 1310 and 1320 are configured and disposed with respect to each other so that passive electric field voltage source 945 (or 955) at position a1' of the first electrode assembly 1310 can be oriented to interface with the passive electric field voltage source 945 (or 955) at position b1' of the second electrode assembly 1320 to cause a force of repulsion (or alternatively a force of attraction) F acting between the voltage sources 945 (or 955) at position a1' and the voltage source 945 (or 955) at position b1' of the second electrode assembly 1320 so that first member 1312 rotates with an angular velocity ωa', around the shaft 1314. The force F may be tangential to the axis of rotation of shaft 1314 of first electrode assembly 1310 but is parallel to the skewed axis of rotation 1306 of shaft 1324 of second electrode assembly 1320 which rotates around the axis of rotation 1306 with an angular velocity ωb' in either one of the directions shown by the double arrow or rotates in an oscillating manner from one direction to the other. The force F is also generated when the voltage sources 945 (or 955) at positions a2', a3' and a4' interface with the voltage sources 945 (or 955) at positions b1' or b2' of the second electrode assembly 1320.

Again, the insulating layers P145*e*, P145*f* (or P155*e*, P155*f*) of the voltage sources 945 (or 955) may be selectively opened and closed in a manner similar to that of passive voltage source 1050 (see FIGS. 94A-94D and 95) so that the desired repulsion force (or alternatively an attraction force) F occurs substantially only when the voltage sources 945 (or 955) at positions a2', a3' and a4' interface with the voltage sources 945 (or 955) at positions b1' or b2' of the second electrode assembly 1320.

In conjunction with FIGS. 49, 93, 94A-94D and 95, FIGS. 101-102 illustrate an exemplary embodiment of at least one electrode assembly 1400 that is configured with at least one apparatus that includes at least one passive electric field voltage source, e.g., first and second passive voltage sources 945 and 955, respectively, to enable at least a portion of like charged ions to convert potential energy of the a portion of like charged ions into kinetic energy based on the Coulomb forces therebetween via linear alignment thereof More particularly, electrode assembly 1400 includes a housing 1402 having a first or lower wall 1402*a* and a second or upper wall 1402*b*. The housing 1402 includes a rigid end wall 1402*c* adjoining the first wall 1402*a* and the second wall 1402*b* and an at least partially open end 1402*d*. The housing 1402 may have a substantially rectangular cross-section and is constructed in a similar manner as described previously for the various embodiments, for example, housing 140 in FIGS. 7-11, and may have a solution supply mechanism (not shown) for solution 10.

Figure 101:
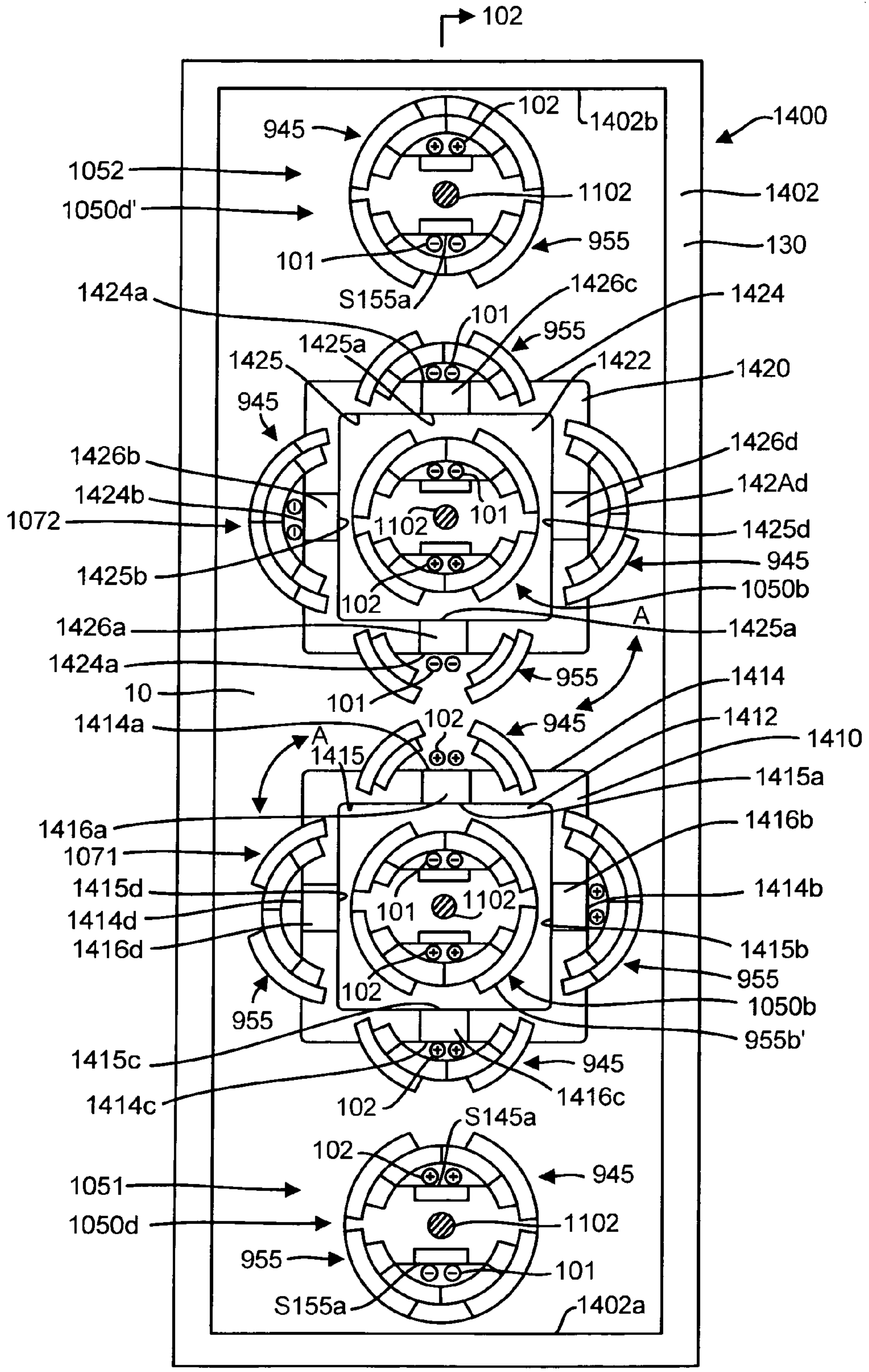
FIG. 101 is a cross-sectional view of one embodiment of an electrode assembly according to the present disclosure having one set of passive electric field voltage sources having multiple electric field monopoles disposed within a movable member having electrically conductive segments to enable attraction of ions to the segments by positioning with respect to the one set of passive electric field voltage sources and another set of passive electric field voltage sources having multiple electric field monopoles disposed with respect to the movable member so that the ions attracted to the electrically conductive segments wherein the electrically conductive segments can be transferred to a position with respect to the other set of passive electric field voltage sources to enable the ions to be discharged from the electrically conductive segments and accelerated by linear alignment thereof

(In view of the complex nature of FIGS. 101 and 102, not all of the component mark numbers can be shown in FIGS. 101 and 102 that are discussed below. One of ordinary skill in the art will understand the description and operation of electrode assembly 1400 when considered together with the illustrations and description provided with respect to FIGS. 49, 93, 94A through 94D and 95).

A first apparatus 1051 includes a first or lower passive electric field voltage source having multiple electric field monopoles, e.g., passive electric field voltage source 1050 in configuration 1050*d*, may be disposed within the housing 1402 in proximity to the first wall 1402*a*, and a second apparatus 1052 includes a second or upper passive electric field voltage source having multiple electric field monopoles, e.g., passive electric field voltage source 1050 in configuration 1050*d'*, may be disposed within the housing 1402 in proximity to the second wall 1402*b* (see FIG. 94D).

One or more movable members, e.g., first and second movable members 1410 and 1420, each having an interior space, 1412 and 1422, respectively are disposed within the housing 1402. The movable members 1410 and 1420 are made from a dielectric material such as dielectric material 130 including a flexible rubber or plastic. The one or more movable members 1410 and 1420 each have an outer surface 1414 and 1424 and an inner surface 1415 and 1425 forming the interior space 1412 and 1422, respectively. The one or more movable members 1410 and 1420 each include at least one electrically conductive segment, e.g., segments 1416*a*, 1416*b*, 1416*c* and 1416*d* included within first movable member 1410 and segments 1426*a*, 1426*b*, 1426*c* and 1426*d* included within second movable member 1420, that extend from the inner surface forming the interior space to the outer surface of the one or more movable members, e.g., segments 1416*a*, 1416*b*, 1416*c* and 1416*d* extend from the inner surface 1415 to the outer surface 1414 of first movable member 1410 while segments 1426*a*, 1426*b*, 1426*c* and 1426*d* extend from the inner surface 1425 to the outer surface 1424 of second movable member 1420. The one or more electrically conductive segments have an inner surface at least partially forming the interior space of the respective movable member and an outer surface at least partially forming the outer surface of the respective movable member. As illustrated in FIG. 101, the electrically conductive segments 1416*a*, 1416*b*, 1416*c* and 1416*d* each have an inner surface 1415*a*, 1415*b*, 1415*c* and 1415*d* at least partially forming the interior space 1412 of the first movable member 1410 and an outer surface 1414*a*, 1414*b*, 1414*c* and 1414*d* at least partially forming the outer 1414 of the first movable member 1410, respectively, Similarly, the electrically conductive segments 1426*a*, 1426*b*, 1426*c* and 1426*d* each have an inner surface 1425*a*, 1425*b*, 1425*c* and 1425*d* at least partially forming the interior space 1422 of the second movable member 1420 and an outer surface 1424*a*, 1424*b*, 1424*c* and 1424*d* at least partially forming the outer 1424 of the second movable member 1420, respectively.

A third passive electric field voltage source having multiple electric field monopoles, e.g., passive voltage source 1050 in configuration 1050*b*, is disposed within the interior space 1412 of the first movable member 1410 to form a first combination apparatus 1071 while a fourth passive electric field voltage source having multiple electric field monopoles, e.g., passive voltage source 1050 also in configuration 1050*b*, is disposed within the interior space 1422 of the second movable member 1410 to form a second combination apparatus 1072.

The passive voltage source 1050 in configuration 1050*b* (see FIG. 94B) of the first combination apparatus 1071 has first and second electrode surfaces S145*a* and S155*a* (or S145*b* and S155*b*) or at least first and second partially enclosed volumes 945' and 955' and the first movable member 1410 is configured and arranged wherein the one or more electrically conductive segments, e.g., segments 1414*a*, 1414*b*, 1414*c* and 1414*d*, can be aligned selectively over the one or more electrode surfaces S145*a* and S155*a* (or S145*b* and S155*b*) and/or over the first and second partially enclosed volumes 945' and 955' retaining at least a portion of like charged ions 101 and/or 102, for example by rotation of the first movable member 1410, to enable selectively an electric field emitted via first electric field voltage source 945 and an electric field emitted via second electric field voltage source 955 to pass through the inner surface 1415*a*, 1415*b*, 1415*c* and/or 1415*d* of the one or more electrically conductive segments 1416*a*, 1416*b*, 1416*c* and 1416*d* and to emerge at the outer surface 1414*a*, 1414*b*, 1414*c* and/or 1414*d* of the one or more electrically conductive segments 1416*a*, 1416*b*, 1416*c* and 1416*d*.

In a similar manner, the passive voltage source 1050 in configuration 1050*b* of the second combination apparatus 1072 has first and second electrode surfaces S145*a* and S155*a* (or S145*b* and S155*b*) or at least first and second partially enclosed volumes 945' and 955' and the second movable member 1420 is configured and arranged wherein the one or more electrically conductive segments, e.g., segments 1424*a*, 1424*b*, 1424*c* and 1424*d*, can be aligned selectively over the one or more electrode surfaces S145*a* and S155*a* (or S145*b* and S155*b*) and/or over the first and second partially enclosed volumes 945' and 955' retaining at least a portion of like charged ions 101 and/or 102, for example by rotation of the second movable member 1420, to enable selectively an electric field emitted via first electric field voltage source 945 and an electric field emitted via second electric field voltage source 955 to pass through the inner surface 1425*a*, 1425*b*, 1425*c* and/or 1425*d* of the one or more electrically conductive segments 1426*a*, 1426*b*, 1426*c* and 1426*d* and to emerge at the outer surface 1424*a*, 1424*b*, 1424*c* and/or 1424*d* of the one or more electrically conductive segments 1426*a*, 1426*b*, 1426*c* and 1426*d*.

The first movable member 1410 may include the at least partially enclosed volumes 945' and/or 955' having as mobile members respectively the partitions P145*a* (or P145*b*) and P155*a* (or P155*b*) and the insulating layers P145*e* (or P145*f*) and P155*e* (or P155*f*) disposed over the outer surfaces 1414*a*, 1414*b*, 1414*c* and/or 1414*d* of the one or more electrically conductive segments 1416*a*, 1416*b*, 1416*c* and 1416*d* wherein motion of the respective mobile member selectively confines and exposes at least a portion of the electric field emerging at the outer surfaces 1414*a*, 1414*b*, 1414*c* and/or 1414*d* of the one or more electrically conductive segments 1416*a*, 1416*b*, 1416*c* and 1416*d*.

In a similar manner, the second movable member 1420 may also include the at least partially enclosed volumes 945' and/or 955' having as mobile members respectively the partitions P145*a* (or P145*b*) and P155*a* (or P155*b*) and the insulating layers P145*e* (or P145*f*) and P155*e* (or P155*f*) disposed over the outer surfaces 1424*a*, 1424*b*, 1424*c* and/or 1424*d* of the one or more electrically conductive segments 1426*a*, 1426*b*, 1426*c* and 1426*d* wherein motion of the respective mobile member selectively confines and exposes at least a portion of the electric field emerging at the outer surfaces 1424*a*, 1424*b*, 1424*c* and/or 1424*d* of the one or more electrically conductive segments 1426*a*, 1426*b*, 1426*c* and 1426*d*.

Since an electric field emitted via first electric field voltage source 945 and an electric field emitted via second electric field voltage source 955 of passive voltage source 1050*b* of the first combination apparatus 1071 pass through the inner surface 1415*a*, 1415*b*, 1415*c* and/or 1415*d* to emerge at the outer surface 1414*a*, 1414*b*, 1414*c* and/or 1414*d* of the one or more electrically conductive segments 1416*a*, 1416*b*, 1416*c* and 1416*d* and since an electric field emitted via first electric field voltage source 945 and via second electric field voltage source 955 of the second combination apparatus 1072 pass through the inner surface 1425*a*, 1425*b*, 1425*c* and/or 1425*d* of the one or more electrically conductive segments 1426*a*, 1426*b*, 1426*c* and 1426*d* to emerge at the outer surface 1424*a*, 1424*b*, 1424*c* and/or 1424*d* of the one or more electrically conductive segments 1426*a*, 1426*b*, 1426*c* and 1426*d*, the first movable member 1410 and the second movable member 1420 are configured so that at least one electrically conductive segment 1416*a*, 1416*b*, 1416*c* and 1416*d* and at least one electrically conductive segment 1426*a*, 1426*b*, 1426*c* and 1426*d* are configured to interface to attract ions 101 and/or 102 via an electric field of the first electric field voltage source 945 of the first combination apparatus 1071 in the configuration 1050*b* attracting ions 101 and/or 102 to the outer surfaces 1414*a*, 1414*b*, 1414*c* and 1414*d* of the one or more electrically conductive segments 1416*a*, 1416*b*, 1416*c* and 1416*d* and an electric field emitted via first electric field voltage source 945 via an electric field of the first electric field voltage source 955 of the second combination apparatus 1072 attracting ions 101 and/or 102 to the one or more electrically conductive segments 1426*a*, 1426*b*, 1426*c* and 1426*d*.

The first movable member 1410 is configured so that following the attraction of the like charged ions 102 to the surface 1414*a*, the movable member 1410 can be moved, for example, by rotation as indicated by arrow A to interface the surface 1414*a* of the electrically conductive member 1416*a* with surface S145*a* of first voltage source 945 of the first apparatus 1051. Similarly, the second movable member 1420 is configured so that following the attraction of the like charged ions 101 to the surface 1424*a*, the movable member 1420 can be moved, for example, by rotation as indicated by arrow A to interface the surface 1414*a* of the electrically conductive member 1426*a* with surface S155*a* of second voltage source 955 of the second apparatus 1052.

Figure 102:
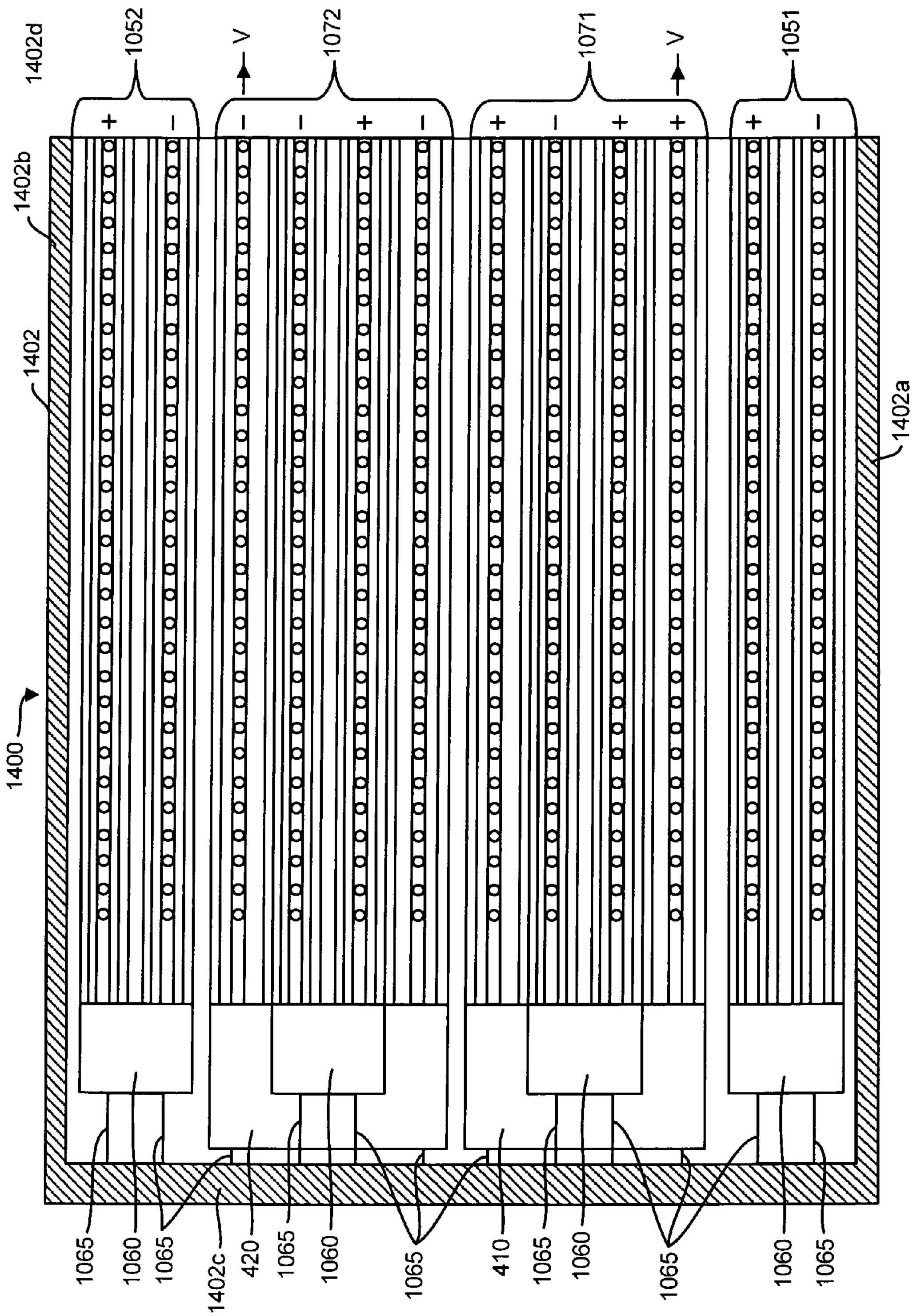
FIG. 102 is a cross-sectional view of the electrode assembly of FIG. 101 along the length thereof.

Once the first movable member 1410 has been moved to interface the surface 1414*a* of the electrically conductive member 1416*a* with surface S145*a* of first voltage source 945 of the first apparatus 1051, the electrically conductive segment 1416*a* having at least a portion of like charged ions 102 attracted thereto is disposed over the second electric field voltage source 955 of the first combination apparatus 1071 so that the electrically conductive segment 1416*a* is substantially aligned with surface S145*a* of first voltage source 945 of the first apparatus 1051 to establish an at least partially transverse electric field directed towards the at least partially open end 1402*d* of the housing 1402 to convert the potential energy of the at least a portion of like charged ions 102 to kinetic energy based on the Coulomb forces therebetween via linear alignment thereof In a similar manner, once the second movable member 1420 has been moved to interface the surface 1424*a* of the electrically conductive member 1426*a* with surface S155*a* of second voltage source 955 of the second apparatus 1052, the electrically conductive segment 1426*a* having at least a portion of like charged ions 101 attracted thereto is disposed over the first electric field voltage source 945 of the second combination apparatus 1072 so that the electrically conductive segment 1426*a* is substantially aligned with surface S155*a* of second voltage source 955 of the second apparatus 1052 to establish an at least partially transverse electric field directed towards the at least partially open end 1402*d* of the housing 1402 to convert the potential energy of the at least a portion of like charged ions 101 to kinetic energy based on the Coulomb forces therebetween via linear alignment thereof, as indicated in FIG. 102 by velocity V of ions 101 and 102.

Those skilled in the art will recognize that the process described above can be continually repeated for electrically conductive segments 1416*b*, 1416*c*, 1416*d* and 1426*b*, 1426*c*, 1426*d* by rotation of the first movable member 1410 and second movable member 1420, respectively, so that the conversion to kinetic energy of the like charged ions 101 and 102 can be performed substantially by the particular drivers 1060 being operatively coupled to the particular apparatus 1051 and 1052 and to the particular combination apparatus 1071 and 1072 (including the movable members 1410 and 1420). If it becomes necessary to reverse polarity of the electrode assembly 1400 to discharge saturated surfaces of ions, the first and second apparatuses 1051 and 1052, respectively, can be rotated around the shafts 1102, Similarly, the first and second combination apparatuses 1071 and 1072, respectively, can be rotated around the shafts 1102. The drivers 1060 can be attached by supports 1065 to the various walls, particularly end wall 1402*c* of the housing 1402.

Figure 103:
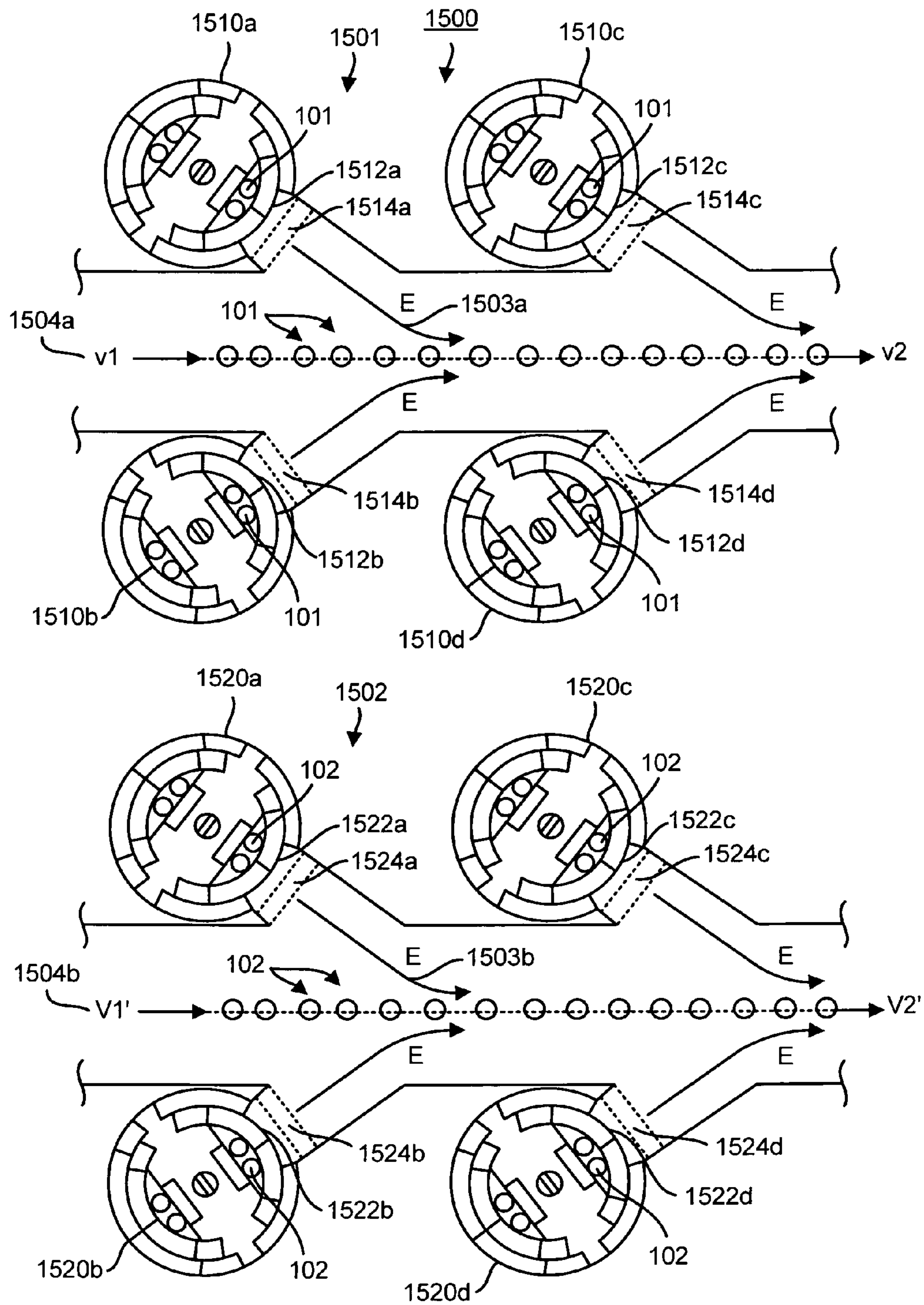
FIG. 103 illustrates one embodiment of at least one electrode assembly according to the present disclosure that is configured to enable a first portion of like charged ions to convert potential energy of a second portion of like charged ions to kinetic energy based on interaction with the Coulomb forces of the first portion of like charged ions wherein one or more passive electric field voltage sources are configured to provide the first portion of like charged ions.

FIG. 103 illustrates at least one electrode assembly 1500 that is configured to enable a first portion of like charged ions to convert potential energy of a second portion of like charged ions to kinetic energy based on interaction with the Coulomb forces of the first portion of like charged ions. More particularly, a first set 1501 of passive electric field voltage sources 1510*a*, 1510*b*, 1510*c* and 1510*d* each having a surface 1512*a*, 1512*b*, 1512*c* and 1512*d*, respectively that is disposed in communication with a space 1503*a* that is defined by the surfaces 1512*a*, 1512*b*, 1512*c* and 1512*d*. In one embodiment, the passive electric field voltage sources 1510*a*, 1510*b*, 1510*c* and 1510*d*, each having a first portion of like charged ions 101, are each identical to the passive electric field voltage source 1050 having multiple electric field monopoles that is described above with respect to FIGS. 93, 94A, 94B, 94C, 94D and 95, and particularly for the configuration 1050*b* corresponding to FIG. 94B. The space 1503*a* has an open end 1504*a* configured to receive at least a second portion of like charged ions 101 having an initial velocity v1.

The voltage source 1510*a* is paired with voltage source 1510*b*, and the voltage source 1510*c* is paired with voltage source 1510*d*. The pairs of voltage sources 1510*a*, 1510*b* and 1510*c*, 1510*d* are oriented to emit intersecting electric fields having a resulting combined electric field E that extends predominantly in the linear direction of the space 1503*a*. As many pairs of voltage sources may be disposed along the linear direction of the space 1503*a* as desired or practical. The combined electric field E resulting from the combination of the electric fields emitted by the first portion of like charged ions 101 from the surfaces 1512*a*, 1512*b*, 1512*c* and 1512*d* interacts with at least a portion of the second portion of like charged ions 101 within the space 1503*a* to convert potential energy of the at least a portion of the second portion of like charged ions 101 into kinetic energy, represented by velocity v2, based on the interaction of the Coulomb forces between the first portion of like charged ions 101 and the at least a portion of the second portion of like charged ions 101 within the space 1503*a*. The combined field E may be formed at least partially transversely with respect to the surfaces 1512*a*, 1512*b*, 1512*c* and 1512*d*

In one embodiment, electrically conductive surfaces 1514*a*, 1514*b*, 1514*c* and 1514*d* may be disposed downstream of, and in close proximity to, the respective surfaces 1512*a*, 1512*b*, 1512*c* and 1512*d* to act as buffer surfaces in the event of charge buildup. The voltage sources 1510*a*, 1510*b*, 1510*c* and 1510*d* can be rotated to reverse polarity.

In a similar manner, a second set 1502 of passive electric field voltage sources 1520*a*, 1520*b*, 1520*c* and 1520*d* each having a surface 1522*a*, 1522*b*, 1522*c* and 1522*d*, respectively that is disposed in communication with a space 1503*b* that is defined by the surfaces 1522*a*, 1522*b*, 1522*c* and 1522*d*. In one embodiment, the passive electric field voltage sources 1520*a*, 1520*b*, 1520*c* and 1520*d*, each having a first portion of like charged ions 102, are again each identical to the passive electric field voltage source 1050 having multiple electric field monopoles that is described above with respect to FIGS. 93, 94A, 94B, 94C, 94D and 95, and particularly for the configuration 1050*b* corresponding to FIG. 94B. The space 1503*b* has an open end 1504*b* configured to receive at least a second portion of like charged ions 102 having an initial velocity v1'.

The voltage source 1520*a* is paired with voltage source 1520*b*, and the voltage source 1520*c* is paired with voltage source 1520*d*. The pairs of voltage sources 1520*a*, 1520*b* and 1520*c*, 1520*d* are oriented to emit intersecting electric fields having a resulting combined electric field E that extends predominantly in the linear direction of the space 1503*b*. As many pairs of voltage sources may be disposed along the linear direction of the space 1503*b* as desired or practical. The combined electric field E resulting from the combination of the electric fields emitted by the first portion of like charged ions 102 from the surfaces 1522*a*, 1522*b*, 1522*c* and 1522*d* interacts with at least a portion of the second portion of like charged ions 102 within the space 1503*b* to convert potential energy of the at least a portion of the second portion of like charged ions 102 into kinetic energy, represented by velocity v2', based on the interaction of the Coulomb forces between the first portion of like charged ions 102 and the at least a portion of the second portion of like charged ions 102 within the space 1503*b*. The combined field E may be formed at least partially transversely with respect to the surfaces 1522*a*, 1522*b*, 1522*c* and 1522*d*

In one embodiment, electrically conductive surfaces 1524*a*, 1524*b*, 1524*c* and 1524*d* may be disposed downstream of, and in close proximity to, the respective surfaces 1522*a*, 1522*b*, 1522*c* and 1522*d* to act as buffer surfaces in the event of charge buildup. The voltage sources 1520*a*, 1520*b*, 1520*c* and 1520*d* can be rotated to reverse polarity.

Thus, the sets 1501 and 1502 can be configured to receive beams B101 and B102 of like charged ions 101 and 102, respectively, such as illustrated for example in FIG. 65.

Figure 104:
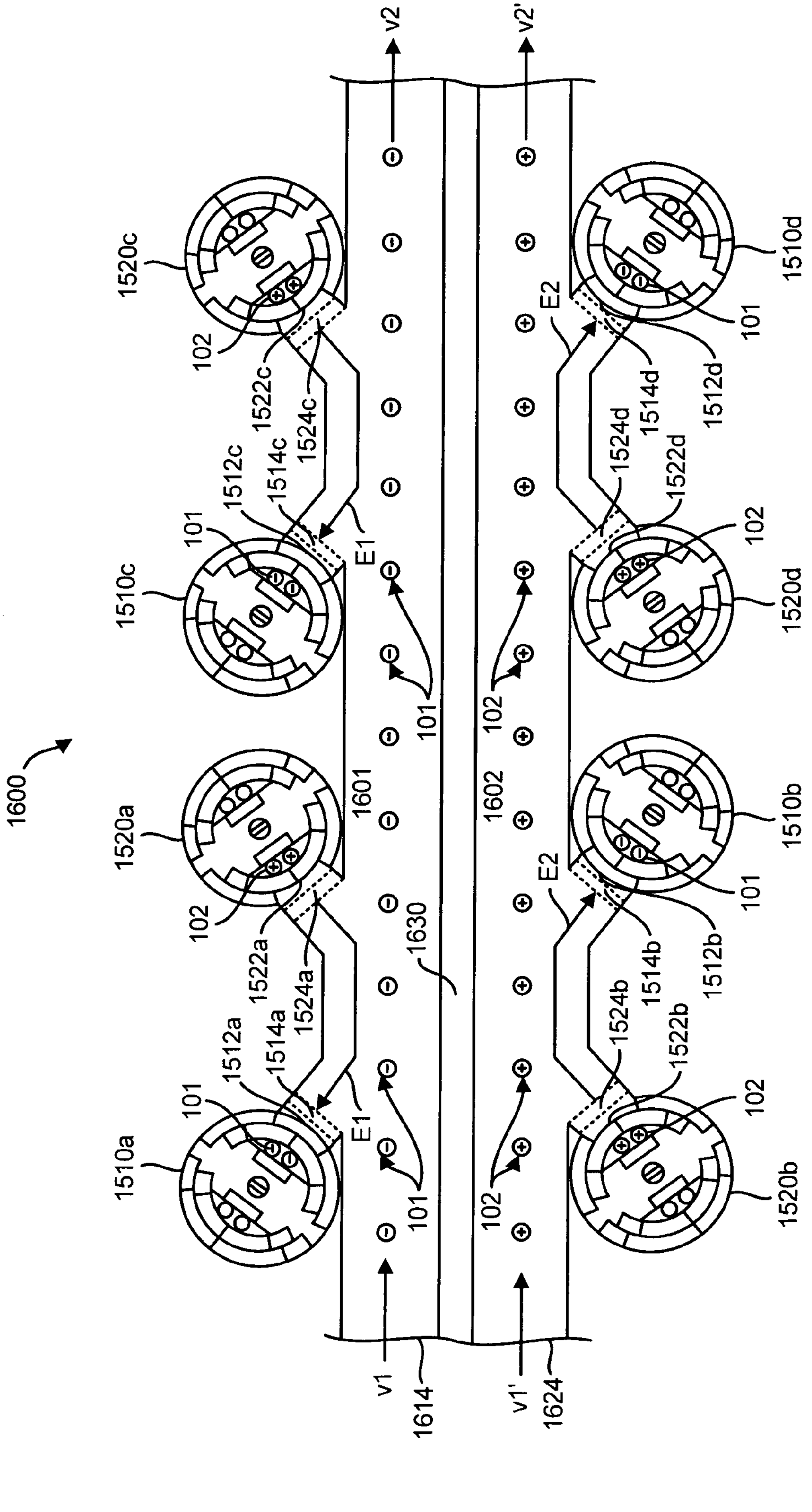
FIG. 104 illustrates an alternate embodiment of the at least one electrode assembly of FIG. 103 that is also configured to enable a first portion of like charged ions to convert potential energy of a second portion of like charged ions to kinetic energy based on interaction with the Coulomb forces of the first portion of like charged ions wherein one or more passive electric field voltage sources are configured to provide one or more at least partially transverse electric fields with respect to the second portion of like charged ions.

FIG. 104 illustrates at least one electrode assembly that is also configured to enable a first portion of like charged ions to convert potential energy of a second portion of like charged ions to kinetic energy based on interaction with the Coulomb forces of the first portion of like charged ions. More particularly, electrode assembly 1600 is similar to electrode assembly 1500, except that a space is formed therein. The space has a dielectric material 1630 disposed therein to form a first sub-space 1601 and a second sub-space 1602. The first sub-space 1601 has first surfaces 1512*a* and 1512*c* defined by first negative voltage source 1510*a* and third negative voltage source 1510*c*, respectively, and second surfaces 1522*a* and 1522*c* defined by first positive voltage source 1520*a* and third positive voltage source 1520*c*.

The second sub-space 1602 has first surfaces 1512*b* and 1512*d* defined by second negative voltage source 1510*b* and fourth negative voltage source 1510*d*, respectively, and second surfaces 1522*b* and 1522*d* defined by second positive voltage source 1520*b* and fourth positive voltage source 1520*d*.

However, the pairs of voltage sources 1510*a* and 1520*a*, 1510*b* and 1520*b*, 1510*c* and 1520*c*, and 1510*d* and 1520*d* are matched based on the voltage sources 1510*a*, 1510*b*, 1510*c*, 1510*d* emitting an electric field from first surfaces 1512*a*, 1512*b*, 1512*c*, 1512*d* having one polarity and the voltage sources 1520*a*, 1520*b*, 1520*c*, 1520*d* emitting an electric field from second surfaces 1522*a*, 1522*b*, 1522*c*, 1522*d* emitting an electric field having an opposite polarity, respectively, to form an at least partially transverse electric field between the first and second electrode surfaces in one of a first direction, designated as electric field E1, and a second direction, designated as electric field E2. Electrode assembly 1600 includes an open end 1614 configured to receive a portion of like charged negative ions 101 having an initial velocity v1 and an open end 1624 configured to receive a portion of like charged positive ions 102 having an initial velocity v1' (that may or may not equal v1).

With respect to the first sub-space 1601, first voltage source 1520*a* having positive ions 102 is matched with first voltage source 1510*a* having negative ions 101 to form an at least partially transverse electric field E1 extending in a first direction that is counter to the direction of flow of incoming like charged ions 101. The field E1 is attractive to the incoming ions 101. Similarly, third voltage source 1520*c* having positive ions 102 is matched with third voltage source 1510*c* having negative ions 101 also to form an at least partially transverse electric field E1 extending in a first direction that is counter to the direction of flow of incoming like charged negative ions 101.

The electric fields E1 are formed at least partially transversely with respect to the to the portion of like charged ions 101 to at least partially linearly align the ions 101 within the first sub-space 1601 and to increase the kinetic energy represented by velocity v2.

Similarly, with respect to the second sub-space 1602, second voltage source 1520*b* having positive ions 102 is matched with second voltage source 1510*b* having negative ions 101 to form an at least partially transverse electric field E2 extending in a second direction that is coherent with the direction of flow of incoming like charged positive ions 102. The field E2 is thus attractive to the incoming ions 102. Similarly, fourth voltage source 1520*d* having positive ions 102 is matched with fourth voltage source 1510*d* having negative ions 101 also to form an at least partially transverse electric field E2 extending in a first direction that is coherent with the direction of flow of incoming like charged positive ions 102.

In a similar manner, the electric fields E2 are formed at least partially transversely with respect to the to the portion of like charged ions 102 to at least partially linearly align the ions 102 within the second sub-space 1602 and to increase the kinetic energy represented by velocity v2' (that may or may not equal v2). Those skilled in the art will recognize that additional voltage sources can be added along the length.

Figure 105:
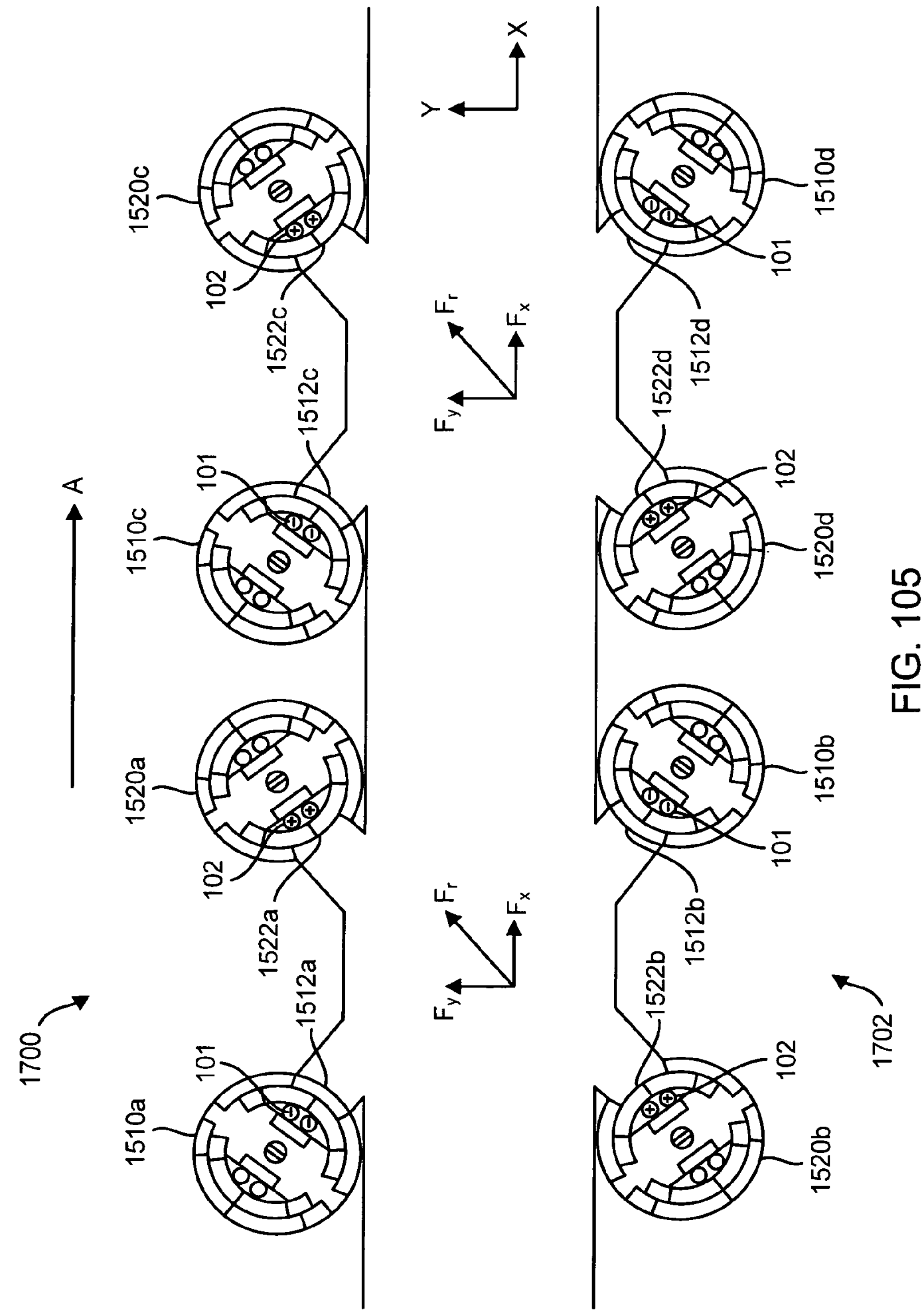
FIG. 105 illustrates an alternate embodiment of at least one electrode assembly that is configured to enable a first portion of like charged ions to convert potential energy of the first portion of like charged ions to kinetic energy based on interaction with the Coulomb forces of a second portion of like charged ions wherein on or more passive electric field voltage sources disposed in a supporting member are configured to provide motion of one or more passive electric field voltage sources disposed in another supporting member.

FIG. 105 illustrates another embodiment of at least one electrode assembly 1700 that is configured to enable a first portion of like charged ions to convert potential energy of the first portion of like charged ions to kinetic energy based on interaction with the Coulomb forces of a second portion of like charged ions. The electrode assembly includes at least first and second supporting members 1701 and 1702 respectively. First supporting member 1701 includes at least one passive electric field voltage source embedded therein, e.g., first positive voltage source 1520*a* and third positive voltage source 1520*c*, while second supporting member 1702 includes at least one passive electric field voltage source embedded therein, e.g., second positive voltage source 1520*b* and third positive voltage source 1520*d*.

The first supporting member 1701 may also include first negative voltage source 1510*a* and third negative voltage source 1510*c*, while second supporting member 1702 may also include second negative voltage source 1510*b* and fourth negative voltage source 1510*d*. However, in the exemplary embodiment of FIG. 105, the voltage sources 1510*a* through 1510*d* are in an electrically isolated configuration as exemplified by configuration 1050*a* of FIG. 94A.

The first voltage source 1520*a* having positive ions 102 and disposed in first supporting member 1701 is in an interfacing position with respect to the second voltage source 1520*b* having positive ions 102 and disposed in second supporting member 1702. Similarly, the third voltage source 1520*c* having positive ions 102 and disposed in first supporting member 1701 is in an interfacing position with respect to the fourth voltage source 1520*d* having positive ions 102 and disposed in second supporting member 1702.

If the second supporting member 1702 is maintained stationary with respect to the first supporting member 1701, interaction of the Coulomb forces between the interfacing voltage sources 1510*a* and 1510*b* and 1510*c* and 1510*d* resulting in a force Fr having an x-component Fx in the x-direction and a y-component Fy in the y-direction that causes motion of the first supporting member 1701, and consequently motion of the first and third voltage sources 1510*a*,

1520*a* and 1510*c*, 1520*c*, respectively, in at least the x-direction as indicated by arrow A and in the y direction with respect to the second supporting member 1702. Those skilled in the art will recognize that first, second, third and fourth passive voltage sources 1510*a*, 1510*b*, 1510*c* and 1510*d* can be similarly manipulated via motion of the respective insulating layers to selectively shield and expose the negative ions 101 therein also to affect the motion of the first and second supporting members 1701 and 1702, respectively. Additional voltage sources can be added along the length of the electrode assembly 1700.

Those skilled in the art will recognize that the description of the foregoing embodiments explicitly or implicitly describes also various methods for converting potential energy of like charged ions to kinetic energy that includes the step of at least one of enabling at least a portion of like charged ions to convert potential energy of the at least a portion of like charged ions into kinetic energy based on the Coulomb forces therebetween via linear alignment thereof, enabling a first portion of like charged ions to convert potential energy of the first portion of like charged ions to kinetic energy based on interaction with the Coulomb forces of a second portion of like charged ions, and enabling a first portion of like charged ions to convert potential energy of a second portion of like charged ions to kinetic energy based on interaction with the Coulomb forces of the first portion of like charged ions.

In general, with respect to all of the previously described embodiments of the present disclosure, it should be noted that the temperature of the solution 10 in the region 25 or 25' during the charge acceleration phase of operation need not be limited to ambient temperature conditions but may vary from the point at which nucleate boiling occurs to the freezing point of the solution, inherently changing the viscosity of the solution with temperature. The embodiments are not limited in this context. Similarly, the pressure in the region 25 or 25' may vary from above ambient pressure to vacuum conditions such that the solution 10 remains in the housing 140 or vessel 11 even if the region 25 or 25' contains a gas, including air.

The solution 10 is an ionic solution which enables electrical conductivity. Therefore, the solvent may be a liquid solvent of acids, bases or salts which enable electrical conductivity. The embodiments are not limited in this context. In addition, prior to entering the third mode of operation of polarity reversal and charge acceleration, the solution 10 may be purged with a solution of lower concentration. The solution of lower concentration minimizes possible interference with formation of repulsive forces between like charged solute ions that may occur due to migration and attraction of oppositely charged solute ions in the vicinity.

Referring to FIG. 6, in designing the embodiments of the present disclosure, the structural loads and local pressures caused by the repulsive forces in the x-z plane should be accounted for. For example, assuming that the electric fields successfully arrange a layer of ions in a plane defined by the x-z directions, it is necessary to contend with the resulting force distribution. For the z-direction, if the width of the electrode plates 1' or 2' is 2 cm, and it is assumed that the initial $F_z=1.2\times10^{-3}$ Newtons for a single row of ions, and there are $7.5\times10^{8}$ ions/m, the $$\text{Total Initial Force } Fz=1.2\times10^{-3}\text{ Newtons}\times7.5\times10^{8}\text{ ions/m}\times2\times10^{-2}\text{ m/2 cm}=1.8\times10^{4}\text{ Newtons}$$

Since there are 4.4 Newtons/lb, this is equivalent to 4091 lbf.

If the length of the electrode plates 1', 2' is 1 meter, and the width of the electrode plates is 2 cm, the initial $F_x=(F_r, 1.6\times10^{-12}$ Newtons)$\times7.5\times10^{8}$ ions/m$\times2\times10^{-2}$ m/2 cm$=2.4\times10^{-5}$ Newton.

The Total Initial Force Fx$=2.4\times10^{-5}$ Newton$\times7.5\times10^{8}$ ions/m$\times1$ m$=1.8\times10^{4}$ Newtons, which is also equivalent to the Total Initial Force Fz.

Therefore, just for a single layer of charge, the forces encountered are in the range of 4000 lbf.

With respect to the voltage potentials, it can be recognized that the magnitude of the voltages supplied from the voltage sources during the initial attraction phase of operation may range from a value below the barrier voltage to a value at least sufficient to cause the Wien effect of liberating the hydrated ions 101 and 102 from their ionic atmosphere.

It is contemplated that a repeated pulse of voltage, particularly at voltages which significantly enhance ionic mobility, up to and including voltages at least sufficient to cause the Wien effect, during the initial attraction phase of operation can be employed as a method of desalination of the solution which may be made economically feasible by recovery of excess energy from the accumulated ions during the acceleration phase of operation.

It is contemplated that the magnitude of the voltage during the acceleration phase of operation may vary from, in some cases, zero and are generally dependent upon factors such as the magnitude of the acceleration force in the direction transverse to the electrode surfaces.

Furthermore, as previously mentioned, the Debye-Falkenhagen effect is analogous to the Wien effect in that the solute ions 101 and 102 lose their ionic atmospheres, except that instead of a constant polarity high voltage gradient applied across the electrode surfaces, a low voltage gradient, high frequency voltage in the order of $3\times10^{6}$ cycles/second (i.e., 3 MHz) is applied typically at less than the barrier voltage. In one embodiment, it is contemplated that application of the Debye-Falkenhagen effect during the acceleration or second phase of operation may be advantageous under certain conditions where the length of the "chain" of ions is comparatively short or otherwise such that the acceleration forces at the ends of the chain of ions are comparatively small and the frictional drag caused by the ionic atmospheres is significant. The Debye-Falkenhagen effect may be superimposed over the Wien effect during the acceleration phase of operation.

The targeted region may be the environment, which may be, for example but not limited to, the surrounding air or a body of water. When the electrode assembly is free to move, the electrode assembly may then become a vehicular object or a part of a vehicular object providing propulsive effects from the reaction force. In such a case, the electrode assembly may be mounted on for propelling a land, sea, air or space vehicle which may be used for automotive, truck, rail, subterranean, marine, submarine, aeronautical, or space travel.

When the electrode assembly is restrained from moving, the excess accelerated ions and moving into the targeted region may become a pair of particle beams of opposite charge whose kinetic energy may be converted into, for example but not limited to, thermal, mechanical or electrical energy by impinging upon the target object.

The target object is shown in phantom because in the case where it is desired that the negative and positive ions of the beams directly collide with the environment of the targeted region so as to produce heat (or possibly sub-atomic particles), the object does not actually exist. On the other hand, the target object may be the impulse blades of an electrical turbine-generator or an electrical induction coil for direct conversion to electricity of the moving electromagnetic field emitted by the accelerated charged particles.

It is contemplated that the target object 20 may also be grey or unpurified water, sewage, or other waste products, including nuclear wastes or nuclear fuel for a nuclear spallation reactor where neutrons are generated by the beams.

It is envisioned that the negative and positive ions and in the beams may themselves be inorganic waste contaminants such as nitrates or lead or other contaminants such as charged microbes or other charged organic matter in fresh water drinking supplies. As a result of the potential ability of the electrode assembly to produce a net energy gain by impingement of the beams onto a target object, the economics of fresh water purification and in the particular the use of capacitive deionization may be changed significantly.

It is contemplated that the target object may be a solid structure such as a reinforced or unreinforced concrete road bed or sidewalk or a building which is the object of demolition. Alternatively, the target object may be an organic substance such as plant matter or human or animal tissue, particularly such tissue undergoing a surgical or corrective medical procedure such as cancerous tissue or abnormal cells, including cells within the blood stream.

Alternatively, it is contemplated that the target object may be a magnetic field which is oriented so that solute ions of different mass and charge, such as, for example but not limited to, gold ions 101 as compared to sodium ions 101 may be separated based on differences in deflection of the ions 101 and 102 in the magnetic field of target object 200 in a magnetospectrographic process. Differences in deflection force occur in a magnetic field based on the charge number and the velocity, the latter being a function of the mass of the ion. Therefore, for any solution, with seawater or brine being used as an example herein, the solute ions, such as minute traces of ions such as gold, may be accelerated in the electrode assembly 50 and separated by a magnetic field represented by target object 20. The separation occurs due to deflection caused by a vertical or horizontal magnetic field. As is known, a charged particle horizontally moving with a velocity "v" in a magnetic field "B" experiences a force "F" given by F=qBv. The force F causes the trajectory of the charged particle 101 or 102 to deviate or deflect while impinging on the surface of target 20. The deviation or deflection may be unique for each different ion, since the combination of mass and charge is unique for each ion.

Another example is an acidic solution of uranium compounds in which it is desired to separate the differing isotopes such as U-235 from U-238. Alternatively, it is envisioned that the positive solute ions may be deuterium as a result of dissolution of deuterium chloride in the solvent, which may be either ordinary water or heavy water. In this case, the deuterium solute ions in a beam may be directed to the target, which may be a deuterated material. In other words, the target may be a solid substance containing deuterium (which is an isotope of hydrogen). Therefore, it is contemplated that nuclear fusion of the deuterium solute ion in the beam may occur with the deuterated material of the target, thereby releasing energy and nuclear particles. Alternatively, nuclear fusion may be caused to occur if the solute ions are caused to collide directly with each other, e.g., deuterium and deuterium, deuterium and tritium, lithium and boron, etc. The target may also contain a fissionable material such as U-235 and a potential source of neutrons which can be activated by the impact of the beams so as to cause fission of the U-235 by spallation.

It can be appreciated that the foregoing embodiments of the present disclosure provide examples of at least one electrode assembly, e.g., electrode assemblies 100 through 900 in FIGS. 7 to 87, that are configured via at least one electric field established therein, e.g., electric field $E_{114a-113a}$, $E_{114b-113b}$, $E_{P114e-P113e}$, or $E_{P114f-P113f}$, for electrode assembly 100D in FIGS. 24-28, as an example, to substantially align at least a first portion of like charged solute ions, e.g., negative ions 101 and positive ions 102, of the solution 10 to convert potential energy of the at least a first portion of like charged solute ions, e.g., negative ions 101 and positive ions 102, to kinetic energy based on the Coulomb forces of repulsion therebetween.

Again, it can be appreciated that the foregoing embodiments of the present disclosure provide examples of at least one electrode assembly, e.g., electrode assembly 100G (see FIG. 43) or 100G' (see FIGS. 86-87), being configured to enable a first electric field, e.g., electric field $E_{145a-145b}$, $E_{155b-155a}$, for electrode assembly 100G in FIG. 48, as an example, of the at least one electric field to substantially align the at least a first portion of the like charged ions, e.g., negative ions 101 and positive ions 102, wherein the at least one electrode assembly, e.g., electrode assembly 100G, includes at least a first electrode surface, e.g., electrode surfaces S145*a*, S145*b*, and a second electrode surface, e.g., electrode surfaces S155*a*, S155*b*, configured such that the first electric field, e.g. $E_{145a-145b}$, of the at least one electric field can be established transversely between the at least a first electrode surface S145*a* and the second electrode surface S145*b*. In one embodiment, e.g., electrode assembly 100G, at least one of the at least a first electrode surface, e.g., electrode surfaces S155*a*, S155*b*, and a second electrode surface, e.g., electrode surfaces S145*a*, S145*b*, is movable with respect to the other one. That is, electrode surfaces S155*a*, S155*b*, are movable with respect to electrode surfaces S145*a*, S145*b*, respectively.

The at least one electrode assembly, e.g., electrode assembly 100G, may be configured to enable at least a second electric field, e.g., $E_{P145a-P145b}$, or $E_{P155a-P155b}$ (see FIG. 48) of the at least one electric field to substantially align the at least a first portion of the like charged ions, e.g., negative ions 101 and positive ions 102, wherein the at least one electrode assembly, e.g., electrode assembly 100G, further includes at least one movable partition assembly, e.g., partition assemblies. P145a, P145b, P155a or P155b, having a first surface, e.g., surfaces S145a, S145b, S155a, or S155b, respectively (see FIGS. 44, 45, and 49). The first surface, e.g., surfaces S145a, S145b, S155a, or S155b, of the at least one partition assembly, e.g., partition assemblies P145a, P145b, P155a or P155b, are configured such that the at least a second electric field, e.g., $E_{P145a-P145b}$, or $E_{P155a-P155b}$, can be established transversely from the first surface, e.g., surfaces S145a, S145b and S155a, S155b of the at least one partition assembly e.g., partition assemblies P145a, P145b and P155a, P155b, respectively.

In one embodiment, the at least one electrode assembly, e.g., electrode assembly 100G, may further include a movable electrical insulating layer, e.g., insulating layers P145*e*, P145*f* and P155*e*, P155*f*, disposed over the at least one movable partition assembly P145*a*, P145*b* and P155*a*, P155*b*, respectively, and over at least the first electrode surface S145*a*, S145*b* and S155*a*, S155*b*, respectively.

Figure 76:
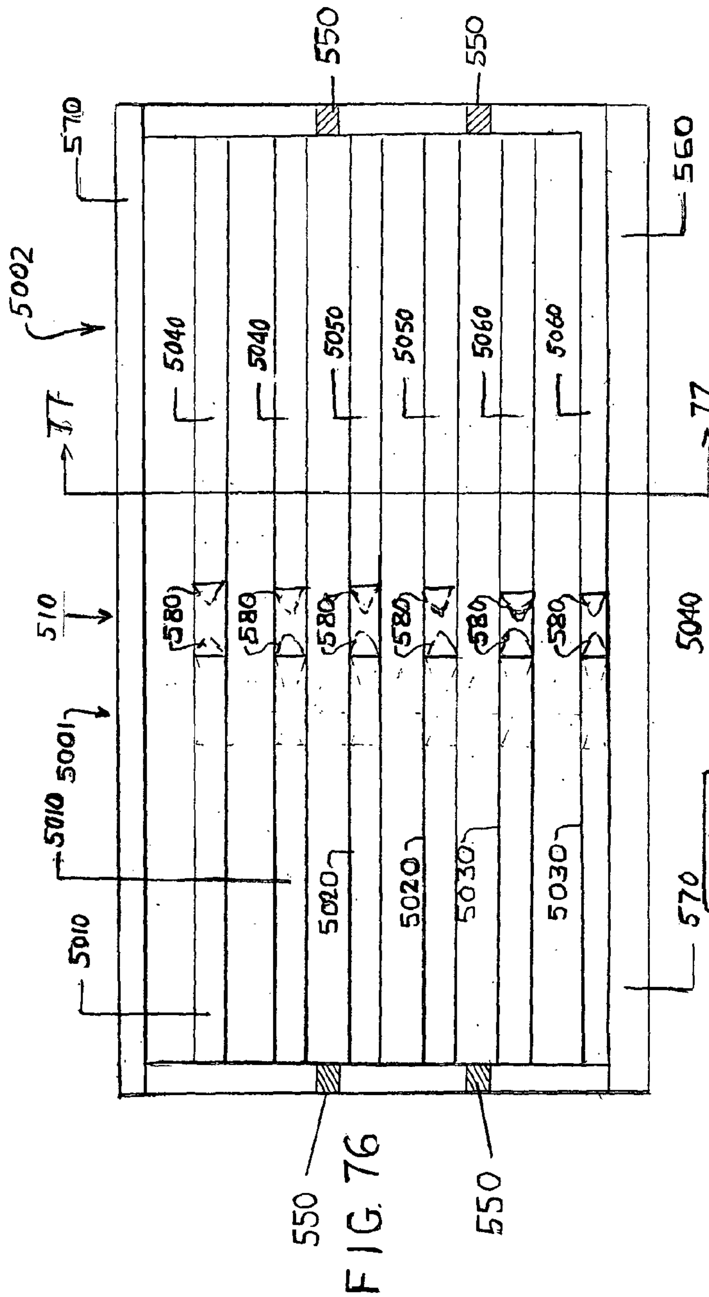
FIG. 76 illustrates an alternate embodiment of the electrode assembly of FIGS. 70-75 subdividing the multiple projecting electrodes to increase surface area.
Figure 77:
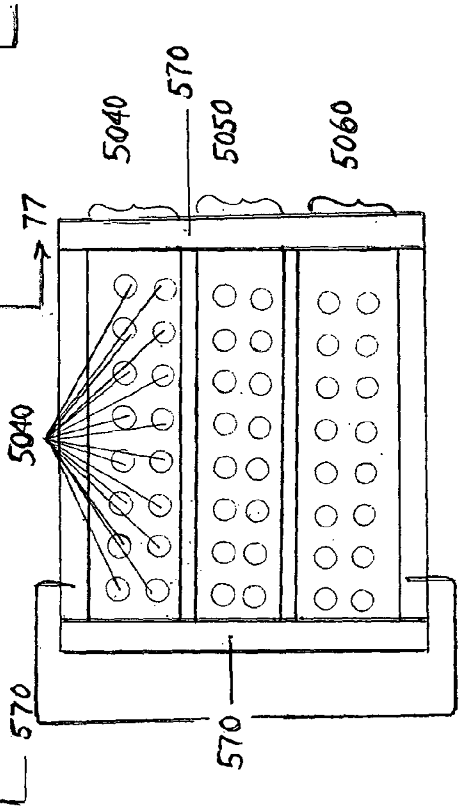
FIG. 77 is a cross-sectional view of the electrode assembly of FIG. 76 illustrating the sub-divided multiple projecting electrodes.

In one embodiment, the at least one electrode assembly, e.g., electrode assemblies 400 (see FIGS. 66-69) and 500 (see FIGS. 70-75) and 510 (see FIGS. 76-77, includes at least a pair of first and second electrode surfaces, e.g., surfaces S401 and S402 of electrode assembly 400. The first and second electrode surfaces, e.g., surfaces S401 and S402, are configured such that a first electric field established therebetween, e.g., $E_{401-402}$, attracts negatively charged ions 101 towards the first electrode surface S401 and attracts positively charged ions 102 towards the second electrode surface S402. The at least one electric field substantially aligning the at least a first portion of the like charged ions 101 and 102 is established by reversing polarity of the first electric field, e.g., $E_{401-402}$, (to create, for example, second electric field $E_{402-401}$, to cause the negatively charged ions 101 attracted towards the first electrode surface, e.g., surface S401, to be substantially aligned and to accelerate towards the second electrode surface, e.g., surface S402, and to cause the positively charged ions 102 attracted towards the second electrode surface, e.g., surface S402, to be substantially aligned and to accelerate towards the first electrode surface, e.g., surface S401.

In one embodiment, e.g., the at least one electrode assembly, e.g., electrode assembly 200D in FIGS. 61-62, includes a first pair of electrode surfaces, e.g., surfaces 5201*a* and 5201*b*, configured to enable attraction of the at least a first portion of like charged ions 101 and 102, respectively, thereto via a substantially orthogonal electric field $E_{201a-201b}$ therebetween. The at least one electrode assembly, e.g., electrode assembly 200D, is configured such that the at least one electric field substantially aligning the at least a first portion of like charged ions, e.g., electric field $E_{202a-202b}$, is established transversely while at least one of (a) terminating the substantially orthogonal electric field, e.g., $E_{201a-201b}$, established across the at least a first pair of electrode surfaces, e.g., surfaces 5201*a* and 5201*b*; and (b) reversing direction of the substantially orthogonal electric field, e.g., $E_{201a-201b}$, established across the at least a first pair of electrode surfaces, e.g., surfaces 5201*a* and 5201*b*.

In one embodiment, the at least one electrode assembly, e.g., electrode assemblies 100 to 900 in FIGS. 7 to 87, is configured such that the kinetic energy may be converted to one of (i) chemical energy; (ii) electrical energy; (iii) electromagnetic energy; (iv) thermal energy; (v) mechanical energy; and (vi) nuclear energy.

In one embodiment, the at least one electrode assembly, e.g., electrode assemblies 100 to 800 in FIGS. 7 to 85, may be configured such that the kinetic energy causes the first portion of like charged ions 101 or 102 to collide with a second portion of like charged ions 101 or 102.

Figure 78:
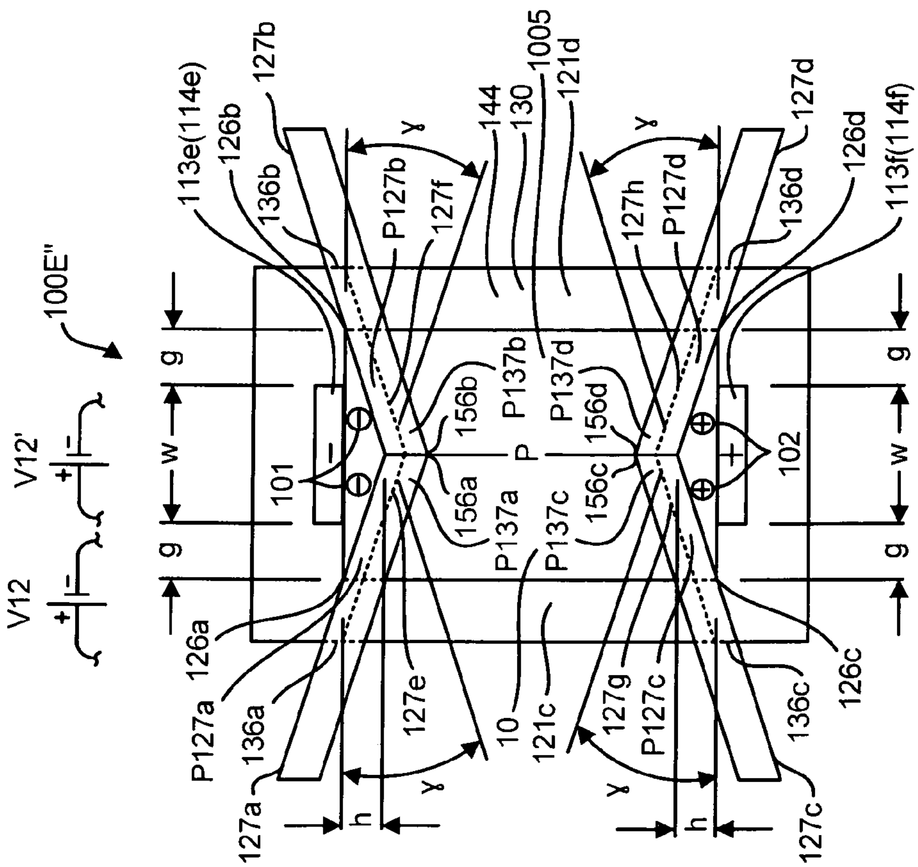
FIG. 78 illustrates an alternate embodiment of the electrode assembly of FIGS. 29-39 wherein movable insulating partitions are disposed within the guide housings and in interfacing relationship with the partitions to enable electrical isolation of the solute ions accumulated at the electrode surfaces.

With respect to various of the at least one electrode assembly e.g., electrode assembly 100 in FIG. 13, electrode assembly 100D in FIGS. 24-28, electrode assembly 100E in FIGS. 29-38, electrode assemblies 100F in FIGS. 40-41 and 100F' in FIG. 42, electrode assembly 100G in FIGS. 43-50, electrode assembly 200A in FIGS. 54-57, electrode assembly 200B in FIGS. 58-59, electrode assembly 200C in FIG. 60, electrode assembly 300 in FIGS. 64-65, electrode assembly 100E" in FIG. 78, electrode assembly 600 and 600' in FIGS. 79-82, electrode assemblies 100E(a), 100E(b), 100E(c) contained within beam transport assembly 700 in FIG. 83, electrode assemblies 100E1 through 100E6 contained within beam transport assembly 800 in FIGS. 84-85, the first portion of like charged ions 101 and 102 colliding with the second portion of like charged ions 101 and 102 are of the same charge as the second portion of like charged ions 101 and 102, respectively.

In one embodiment, e.g., electrode assemblies 100 to 800 in FIGS. 7 to 85, the first portion of like charged ions 101 and 102 colliding with the second portion of like charged ions 102 and 101 are of opposite charge to the second portion of like charged ions 102 and 101, respectively.

In one embodiment, the at least one electrode assembly, e.g., electrode assemblies 100 to 800 in FIGS. 7 to 85, may be configured such that the kinetic energy enables the at least a first portion of the like charged ions, e.g., ions 101 and 102, to collide with the target or target object 20 or 20' (see FIGS. 12, 13, 14, 16, 22, 39, 43, 65).

In one embodiment, the at least one electrode assembly, e.g., electrode assemblies 100 to 900 in FIGS. 7 to 87, may be configured such that the kinetic energy of the like charged ions 101 or 102 enables the at least a first portion of the like charged ions 101 or 102 to pass through a magnetic field, represented by the target or target object 20 or 20'(see FIGS. 12, 13, 14, 16, 22, 39, 43, 65). The at least a first portion of the like charged ions 101 and/or 102 passing through the magnetic field, i.e., target or target object 20 or 20', may include a first species of ions and at least a second species of ions. A force generated by the kinetic energy of the at least a first portion of like charged ions 101 and/or 102 passing through the magnetic field, i.e., target or target object 20 or 20', causes a trajectory of the first species of the at least a first portion of the like charged ions to deviate from a trajectory of the at least a second species of like charged ions based on differences in at least one of atomic mass and valence charge therebetween.

In one embodiment, the solution 10 is a first solution and the at least one electrode assembly, e.g., electrode assembly 100 in FIG. 63, is configured, via purge medium system 250 in FIG. 63, such that the at least a portion of the first solution 10 can be displaced with a second solution having a concentration of solute ions, e.g., purge medium 170*a*, which differs from the concentration of the first solution 10.

In one embodiment, solution 10 is a first solution and the at least one electrode assembly, e.g., electrode assembly 100 in FIG. 63, is configured, via purge medium system 250 in FIG. 63, such that that the at least a portion of the first solution 10 can be displaced with a second solution having a species of solute ions, e.g., purge medium 170*a*, which differs from the species of solute ions of the first solution 10.

It can be appreciated also that the foregoing embodiments of the present disclosure provide examples of a method for converting potential energy of at least a first portion of like charged ions, e.g., ions 101 and/or 102, of the solution 10 to kinetic energy based on the Coulomb forces of repulsion therebetween, which includes the step of substantially aligning the at least a first portion of like charged solute ions 101 and/or 102 of the solution 10 via at least one electric field, e.g., electric field $E_{114a-113a}$, $E_{114b-113b}$, $E_{P114e-P113e}$, or $E_{P114f-P113f}$, for electrode assembly 100D in FIGS. 24-28, as an example. The method may include the steps of: providing at least one electrode assembly, e.g., electrode assembly 100G (see FIG. 43) or 100G' (see FIGS. 86-87), configured, via at least one electric field established therein, e.g., electric field $E_{145a-145b}$, $E_{155b-155a}$, for electrode assembly 100G in FIG. 48, as an example, to substantially align at the least a first portion of the like charged solute ions 101 and/or 102 of the solution 10 to convert potential energy of the at least a first portion of like charged ions 101 and/or 102 so aligned to kinetic energy based on the Coulomb forces of repulsion therebetween; attracting the at least a first portion of solute ions of like charge, e.g., ions 101 and/or 102, via an electric field of attraction, e.g., electric field $E_{135a-125a}$, or $E_{125b-135b}$, for electrode assembly 100C' in FIGS. 22-23, applied to the at least one electrode assembly, e.g., electrode assemblies 100C', 100G, or 100G', for example. The method may also include establishing the at least one electric field within the at least one electrode assembly, e.g., electric field $E_{114a-113a}$, $E_{114b-113b}$, $E_{P114e-P113e}$, or $E_{P114f-P113f}$, for electrode assembly 100D, to substantially align the at least a first portion of like charged solute ions 101 and/or 102 of the solution 10 to convert potential energy of the at least a first portion of like charged ions 101 and/or 102 so aligned to kinetic energy based on the Coulomb forces of repulsion therebetween.

Again, it can be appreciated that the foregoing embodiments of the present disclosure provide examples of at least one electrode assembly, e.g., electrode assembly 100G (see FIG. 43) or 100G' (see FIGS. 86-87), being configured to enable a first electric field, e.g., electric field $E_{145a-145b}$, $E_{155b-155a}$, for electrode assembly 100G in FIG. 48, as an example, of the at least one electric field to substantially align the at least a first portion of the like charged ions, e.g., negative ions 101 and positive ions 102, wherein the at least one electrode assembly, e.g., electrode assembly 100G, includes at least a first electrode surface, e.g., electrode surfaces S145*a*, S145*b*, and a second electrode surface, e.g., electrode surfaces S155*a*, S155*b*, configured such that the first electric field, e.g. $E_{145a-145b}$, of the at least one electric field can be established transversely between the at least a first electrode surface S145*a* and the second electrode surface S145*b*.

The method may be performed wherein the at least one electrode assembly is configured to enable a first electric field of the at least one electric field to substantially align the at least a first portion of the like charged ions, e.g., electrode assembly 100G (see FIG. 43) or 100G' (see FIGS. 86-87), being configured to enable a first electric field, e.g., electric field $E_{145a-145b}$, $E_{155b-155a}$, for electrode assembly 100G in FIG. 48, as an example, of the at least one electric field to substantially align the at least a first portion of the like charged ions, e.g., negative ions 101 and positive ions 102, and wherein the at least one electrode assembly comprises at least a first electrode surface and a second electrode surface configured such that the first electric field of the at least one electric field can be established transversely between the at least a first electrode surface and the second electrode surface, e.g., electrode assembly 100G, including at least a first electrode surface, e.g., electrode surfaces S145*a*, S145*b*, and a second electrode surface, e.g., electrode surfaces S155*a*, S155*b*, configured such that the first electric field, e.g. $E_{145a-145b}$, of the at least one electric field can be established transversely between the at least a first electrode surface S145*a* and the second electrode surface S145*b*, and wherein the step of establishing the at least one electric field within the at least one electrode assembly to substantially align the at least a first portion of like charged solute ions of the solution is performed by establishing the first electric field of the at least one electric field transversely between the at least a first electrode surface and the second electrode surface, as described above.

The method may be performed wherein at least one of the at least a first electrode surface and a second electrode surface is movable with respect to the other one In one embodiment, e.g., electrode assembly 100G that includes at least one of the at least a first electrode surface, e.g., electrode surfaces S155*a*, S155*b*, and a second electrode surface, e.g., electrode surfaces S145*a*, S145*b*, being movable with respect to the other one. That is, electrode surfaces S155*a*, S155*b*, are movable with respect to electrode surfaces S145*a*, S145*b*, respectively. The step of establishing the at least one electric field within the at least one electrode assembly to substantially align the at least a first portion of like charged solute ions of the solution is performed by moving at least one of the at least a first electrode surface and a second electrode surface with respect to the other one, e.g., electrode assembly 100G, having at least one of the at least a first electrode surface, e.g., electrode surfaces S155*a*, S155*b*, and a second electrode surface, e.g., electrode surfaces S145*a*, S145*b*, being movable with respect to the other one.

The method may be performed wherein the at least one electrode assembly is configured to enable at least a second electric field of the at least one electric field to substantially align the at least a first portion of the like charged ions, with the method further including the steps of: providing the at least one electrode assembly with at least one movable partition assembly having a first surface, the first surface of the at least one partition assembly configured such that the at least a second electric field can be established substantially transversely from the first surface of the at least one partition assembly; and establishing substantially transversely the at least a second electric field from the first surface of the at least one partition assembly, e.g., the at least one electrode assembly, e.g., electrode assembly 100G, may be configured to enable at least a second electric field, e.g., $E_{P145a-P145b}$, or $E_{P155a-P155b}$ (see FIG. 48) of the at least one electric field to substantially align the at least a first portion of the like charged ions, e.g., negative ions 101 and positive ions 102, wherein the at least one electrode assembly, e.g., electrode assembly 100G, further includes at least one movable partition assembly, e.g., partition assemblies. P145a, P145b, P155a or P155b, having a first surface, e.g., surfaces S145a, S145b, S155a, or S155b, respectively (see FIGS. 44, 45, and 49). The first surface, e.g., surfaces S145a, S145b, S155a, or S155b, of the at least one partition assembly, e.g., partition assemblies P145a, P145b, P155a or P155b, are configured such that the at least a second electric field, e.g., $E_{P145a-P145b}$, or $E_{P155a-P155b}$, can be established transversely from the first surface, e.g., surfaces S145a, S145b and S155a, S155b of the at least one partition assembly e.g., partition assemblies P145a, P145b and P155a, P155b, respectively.

The method may further include the steps of: providing a movable electrical insulating layer capable of being disposed over the at least one movable partition assembly and over at least the first electrode surface; and moving the movable electrical insulating layer to be disposed over the at least one movable partition assembly and over at least the first electrode surface, e.g., the at least one electrode assembly. For example, electrode assembly 100G, may further include a movable electrical insulating layer, e.g., insulating layers P145*e*, P145*f* and P155*e*, P155*f*, disposed over the at least one movable partition assembly P145*a*, P145*b* and P155*a*, P155*b*, respectively, and over at least the first electrode surface S145*a*, S145*b* and S155*a*, S155*b*, respectively.

The method may further include the steps of: providing at least one electrode assembly including at least a pair of first and second electrode surfaces, the first and second electrode surfaces configured such that a first electric field established therebetween attracts negatively charged ions towards the first electrode surface and attracts positively charged ions towards the second electrode surface; attracting via the first electric field established between the first and second electrode surfaces so as to attract negatively charged ions towards the first electrode surface and to attract positively charged ions towards the second electrode surface; and establishing the at least one electric field substantially aligning the at least a first portion of the like charged ions by reversing polarity of the first electric field to cause the negatively charged ions attracted towards the first electrode surface to be substantially aligned and to accelerate towards the second electrode surface and to cause the positively charged ions attracted towards the second electrode surface to be substantially aligned and to accelerate towards the first electrode surface, e.g., the at least one electrode assembly. For example, electrode assemblies 400 (see FIGS. 66-69) and 500 (see FIGS. 70-75) and 510 (see FIGS. 76-77, include at least a pair of first and second electrode surfaces, e.g., surfaces S401 and S402 of electrode assembly 400. The first and second electrode surfaces, e.g., surfaces S401 and S402, are configured such that a first electric field established therebetween, e.g., $E_{401-402}$, attracts negatively charged ions 101 towards the first electrode surface S401 and attracts positively charged ions 102 towards the second electrode surface S402. The at least one electric field substantially aligning the at least a first portion of the like charged ions 101 and 102 is established by reversing polarity of the first electric field, e.g., $E_{401-402}$, (to create, for example, second electric field $E_{402-401}$, to cause the negatively charged ions 101 attracted towards the first electrode surface, e.g., surface S401, to be substantially aligned and to accelerate towards the second electrode surface, e.g., surface S402, and to cause the positively charged ions 102 attracted towards the second electrode surface, e.g., surface S402, to be substantially aligned and to accelerate towards the first electrode surface, e.g., surface S401.

The method may further include the steps of: providing at least one electrode assembly that includes a first pair of electrode surfaces configured to enable attraction of the at least a first portion of like charged ions thereto via a substantially orthogonal electric field therebetween, wherein the at least one electrode assembly is configured such that the at least one electric field substantially aligning the at least a first portion of like charged ions is established transversely; and establishing transversely the at least one electric field substantially aligning the at least a first portion of like charged ions while at least one of (a) terminating the substantially orthogonal electric field established across the at least a first pair of electrode surfaces, and (b) reversing direction of the substantially orthogonal electric field established across the at least a first pair of electrode surfaces, e.g., the at least one electrode assembly, e.g., electrode assembly 200D in FIGS. 61-62, includes a first pair of electrode surfaces, e.g., surfaces S201*a* and S201*b*, configured to enable attraction of the at least a first portion of like charged ions 101 and 102, respectively, thereto via a substantially orthogonal electric field $E_{201a-201b}$ therebetween. The at least one electrode assembly, e.g., electrode assembly 200D, is configured such that the at least one electric field substantially aligning the at least a first portion of like charged ions, e.g., electric field $E_{202a-202b}$, is established transversely while at least one of (a) terminating the substantially orthogonal electric field, e.g., $E_{201a-201b}$, established across the at least a first pair of electrode surfaces, e.g., surfaces S201*a* and S201*b*, and (b) reversing direction of the substantially orthogonal electric field, e.g., $E_{201a-201b}$, established across the at least a first pair of electrode surfaces, e.g., surfaces S201*a* and S201*b*.

The method may further include the steps of: providing at least first and second electrode assemblies contained within a beam conduit assembly; and disposing in interfacing relationship in a series sequential configuration the at least first and second electrode assemblies such that the at least a first portion of like charged ions so aligned forms a first beam of like charged ions and a second portion of like charged ions so aligned forms a second beam of like charged ions, the first and second beams being ejected from the at least first electrode assembly and injected into the at least a second electrode assembly in the series, the at least first electrode assembly and the at least second electrode assembly in series forming thereby the beam conduit assembly. For example, referring to FIG. 83, beam accelerator or conduit assembly 700 includes at least first and second electrode assemblies, e.g., a plurality of electrode assemblies 100E(a), 100E(b), and 100E(c) that are disposed in a series sequential or upstream to downstream configuration such that the beams B101 and B102 ejected from the first electrode assembly 100E(a) are injected into at least second electrode assembly 100E(b) and may be injected sequentially to third electrode assembly 100E(c) and subsequent electrode assemblies coupled in series, the first electrode assembly 100E(a) and the at least a second electrode assembly 100E(b) in series forming thereby the beam conduit assembly 700. the electrode assemblies 100E(a), 100E(b) and 100E(c) are in interfacing relationship to allow injection of beams B101 and B102 from the first electrode assembly 100E(a) into the second electrode assembly 100E(b) in a common path for beam B101 and in a common path for beam B102, such that alignment of beams B101 and B102 may be at least partially maintained in the second electrode assembly 100E(b).

The method may further include the steps of: providing at least first and second electrode assemblies configured such that the at least a first portion of like charged ions so aligned forms at least a first beam of like charged ions and at least a second portion of like charged ions so aligned forms at least a second beam of like charged ions, wherein the at least first and second electrode assemblies are contained within a beam transport assembly and the beam transport assembly including the at least first and second electrode assemblies configured to inject the at least first beam and the at least second beam into a beam conduit assembly; and injecting the at least first beam and the at least second beam into the beam conduit assembly such that the at least first beam becomes a combined first beam and the at least second beam becomes a combined second beam within the beam conduit assembly. For example, beam accelerator or transport assembly 800 includes a plurality of electrode assemblies, e.g., electrode assemblies 100E1 through 100E6, that are configured to inject first beams B101 and second beams B102 into a beam conduit assembly 810 that includes a first beam conduit sub-assembly 811, a second beam conduit sub-assembly 812 and a third beam conduit sub-assembly 813 that sequentially interface each other to form a first common beam conduit 851 and a second common beam conduit 852. The first common beam conduit 851 is configured to transport the at least first beam B101 and the second common beam conduit 852 is configured to transport the at least second beam B102.

The method may be performed wherein the beam conduit assembly further includes a first beam conduit sub-assembly and at least a second beam conduit sub-assembly, and wherein the first beam conduit sub-assembly and the at least second beam conduit sub-assembly sequentially interface each other to form a first common beam conduit configured to transport the combined first beam and a second common beam conduit configured to transport the combined second beam. For example, referring to FIGS. 84-85, the beam conduit assembly 810 includes a first beam conduit sub-assembly 811, a second beam conduit sub-assembly 812 and a third beam conduit sub-assembly 813 that sequentially interface each other to form a first common beam conduit 851 and a second common beam conduit 852. The first common beam conduit 851 is configured to transport the at least first beam B101 to form the first combined beam B101' and the second common beam conduit 852 is configured to transport the at least second beam B102 to form the second combined beam B102'.

The method may further include the steps of: providing at least one electrode assembly including at least a first electrode surface forming at least a portion of a mobile assembly, the mobile assembly configured to move in at least one direction of rotation and one direction of translation within a motive apparatus; and moving the mobile assembly to substantially align like charged solute ions of a solution to convert potential energy of the like charged ions so aligned to kinetic energy of the mobile assembly and of the like charged solute ions in at least the one direction of translation based on the Coulomb forces of repulsion therebetween. For example, referring to FIGS. 86-87, the motive apparatus 900 is configured to substantially align the like charged solute ions, e.g., ions 101 or 102, of the solution 10 to convert potential energy of the like charged ions so aligned to kinetic energy of the mobile assembly 920 and of the like charged solute ions 101 or 102 based on the Coulomb forces of repulsion therebetween. The electrode assembly 100G' includes at least the first electrode surface, e.g., surfaces S155*a* and S155*b*, forming at least a portion of mobile assembly 920. The mobile assembly 920 is configured to move in at least one direction of rotation, e.g., around the centerline axis D-D, and one direction of translation, e.g., in the direction of force F1, within the motive apparatus 900.

The method may further include the step of, wherein the motive apparatus is configured such that the mobile assembly moves in at least a second direction of translation within the motive apparatus, moving the primary mobile assembly in the at least a second direction of translation. For example, referring to FIGS. 86-87, the motive apparatus 900 may be configured such that the mobile assembly 920 moves in the at least a second direction of translation e.g., in a direction opposite to force F1, within the motive apparatus 900.

As described above, the method may be performed wherein the kinetic energy is converted to one of (i) chemical energy; (ii) electrical energy; (iii) electromagnetic energy; (iv) thermal energy; (v) mechanical energy; and (vi) nuclear energy. For example, e.g., electrode assemblies 100 to 900 in FIGS. 7 to 87, may be configured such that the kinetic energy may be converted to one of (i) chemical energy; (ii) electrical energy; (iii) electromagnetic energy; (iv) thermal energy; (v) mechanical energy; and (vi) nuclear energy.

The method may be performed wherein the kinetic energy causes the first portion of like charged ions to collide with a second portion of like charged ions. For example, electrode assemblies 100 to 800 in FIGS. 7 to 85, may be configured such that the kinetic energy causes the first portion of like charged ions 101 or 102 to collide with a second portion of like charged ions 101 or 102.

The method may be performed such that the first portion of like charged ions are of the same charge as the second portion of like charged ions. For example, as described above with respect to various of the at least one electrode assembly e.g., electrode assembly 100 in FIG. 13, electrode assembly 100D in FIGS. 24-28, electrode assembly 100E in FIGS. 29-38, electrode assemblies 100F in FIGS. 40-41 and 100F' in FIG. 42, electrode assembly 100G in FIGS. 43-50, electrode assembly 200A in FIGS. 54-57, electrode assembly 200B in FIGS. 58-59, electrode assembly 200C in FIG. 60, electrode assembly 300 in FIGS. 64-65, electrode assembly 100E" in FIG. 78, electrode assembly 600 and 600' in FIGS. 79-82, electrode assemblies 100E(a), 100E(b), 100E(c) contained within beam transport assembly 700 in FIG. 83, electrode assemblies 100E1 through 100E6 contained within beam transport assembly 800 in FIGS. 84-85, the first portion of like charged ions 101 and 102 colliding with the second portion of like charged ions 101 and 102 are of the same charge as the second portion of like charged ions 101 and 102, respectively.

The method may be performed such that the first portion of like charged ions are of opposite charge to the second portion of like charged ions. For example, in one embodiment, e.g., electrode assemblies 100 to 800 in FIGS. 7 to 85, the first portion of like charged ions 101 and 102 colliding with the second portion of like charged ions 102 and 101 are of opposite charge to the second portion of like charged ions 102 and 101, respectively.

The method may be performed such that the kinetic energy enables the at least a first portion of the like charged ions to collide with a target. For example, in one embodiment, the at least one electrode assembly, e.g., electrode assemblies 100 to 800 in FIGS. 7 to 85, may be configured such that the kinetic energy enables the at least a first portion of the like charged ions, e.g., ions 101 and 102, to collide with the target or target object 20 or 20' (see FIGS. 12, 13, 14, 16, 22, 39, 43, 65).

The method may be performed such that the kinetic energy of the like charged ions enables the at least a first portion of the like charged ions to pass through a magnetic field. The method may also be performed such that the at least a first portion of the like charged ions passing through the magnetic field comprises a first species of ions and at least a second species of ions, and wherein a force generated by the kinetic energy of the at least a first portion of like charged ions passing through the magnetic field causes a trajectory of the first species of the at least a first portion of the like charged ions to deviate from a trajectory of the at least a second species of like charged ions based on differences in at least one of atomic mass and valence charge therebetween. For example, in one embodiment, the at least one electrode assembly, e.g., electrode assemblies 100 to 900 in FIGS. 7 to 87, may be configured such that the kinetic energy of the like charged ions 101 or 102 enables the at least a first portion of the like charged ions 101 or 102 to pass through a magnetic field, represented by the target or target object 20 or 20' (see FIGS. 12, 13, 14, 16, 22, 39, 43, 65). The at least a first portion of the like charged ions 101 and/or 102 passing through the magnetic field, i.e., target or target object 20 or 20', may include a first species of ions and at least a second species of ions. A force generated by the kinetic energy of the at least a first portion of like charged ions 101 and/or 102 passing through the magnetic field, i.e., target or target object 20 or 20', causes a trajectory of the first species of the at least a first portion of the like charged ions to deviate from a trajectory of the at least a second species of like charged ions based on differences in at least one of atomic mass and valence charge therebetween.

The method may further include the step of, wherein the solution is a first solution, displacing the at least a portion of the first solution with a second solution having a concentration of solute ions which differs from the concentration of the first solution. For example, in one embodiment, the solution 10 is a first solution and the at least one electrode assembly, e.g., electrode assembly 100 in FIG. 63, is configured, via purge medium system 250 in FIG. 63, such that the at least a portion of the first solution 10 can be displaced with a second solution having a concentration of solute ions, e.g., purge medium 170*a*, which differs from the concentration of the first solution 10.

The method may further include the step of, wherein the solution is a first solution, displacing the at least a portion of the first solution with a second solution having a species of solute ions differing from the species of solute ions of the first solution. For example, in one embodiment, solution 10 is a first solution and the at least one electrode assembly, e.g., electrode assembly 100 in FIG. 63, is configured, via purge medium system 250 in FIG. 63, such that that the at least a portion of the first solution 10 can be displaced with a second solution having a species of solute ions, e.g., purge medium 170*a*, which differs from the species of solute ions of the first solution 10.

Referring to FIGS. 7-12 and 17, the present disclosure relates also to electrochemical system 90 that includes at least one electrode assembly, e.g., electrode assembly 100, configured, via at least one electric field established therein, e.g., $E_{114a-113a}$, $E_{113b-114a}$, and $E_{164a-163a}$, $E_{163b-164b}$, to substantially align the at least a first portion of like charged solute ions 101 and/or 102 of the solution to convert potential energy of the at least a first portion of like charged ions 101 and/or 102 so aligned to kinetic energy based on the Coulomb forces of repulsion therebetween, and at least one voltage source, e.g., voltage source V12, operatively coupled to the at least one electrode assembly, e.g., electrode assembly 100, to establish the at least one electric field, e.g., $E_{114a-113a}$, $E_{113b-114a}$, and $E_{164a-163a}$, $E_{163b-164b}$. Those skilled in the art will recognize that, and understand how, the electrochemical system 90 may include other electrode assemblies, such as described above, and other voltage sources, such as also described above. The embodiments are not limited in this context.

In summary, the embodiments of the present disclosure provide an apparatus and method of accelerating solute ions while dissolved in a solvent. The acceleration of the solute ions provides at least a means of energy conversion if not of net energy generation.

While certain features of the embodiments have been illustrated as described herein, many modifications, substitutions, changes and equivalents will now occur to one of ordinary skill in the art. It is therefore to be understood that the appended claims are intended to cover all such modifications and changes as fall within the true scope or spirit of the embodiments.

What is claimed is:

1. A method of manufacturing at least one closed electric field monopole confining an excess of like-charged ions comprising:

during a charge accumulation mode of operation with respect to first and second electrode surfaces, forming an electric field between the first electrode surface and the second electrode surface, attracting an excess of ions of like charge to the first electrode surface;

attracting an excess of oppositely charged ions of like charge to the second electrode surface; and moving at least one first electrically conductive member into a position with respect to the first electrode surface such that the excess of like-charged ions is disposed externally on or away from the first electrode surface and is entirely confined within the at least one closed electric field monopole and the excess of like-charged ions emitting an electric field through the at least one first electrically conductive member.

2. A method of converting potential energy of electric fields emitted from an excess of like-charged ions to kinetic energy and motion of the like-charged ions and converting potential energy of electric fields emitted from an excess of oppositely charged like-charged ions to kinetic energy and motion of the oppositely charged like-charged ions, the method comprising:

for a charge accumulation mode of operation, applying one or more DC electrical voltages between at least two of the at least four electrode surfaces such that an excess of like-charged ions is attracted to at least one of the at least four electrode surfaces and an excess of oppositely charged like-charged ions is attracted to at least another one of the at least four electrode surfaces and for a charge acceleration mode of operation, positioning at least one of the at least four electrode surfaces and applying one or more DC electrical voltages between the at least one electrode surface to which the excess of like-charged ions has been attracted and at least another one of the at least four electrode surfaces thereby switching the polarity of the at least one electrode surface to which the excess of like-charged ions has been attracted to be the same as the polarity of the excess of like-charged ions thereby repelling the excess of like-charged ions from the at least one electrode surface to which the excess of like-charged ions had been attracted enabling conversion of potential energy of electric fields emitted from the repelled excess of like-charged ions to kinetic energy compressing the repelled excess of like charged ions between at least one of the at least four electrode surfaces having the same polarity as the polarity of the repelled excess of like-charged ions and the at least one electrode surface to which the excess of like-charged ions had been attracted, compressing the repelled excess of like charged ions creating alignment of the repelled excess of like charged ions causing motion of the repelled like-charged ions in a longitudinal direction transverse to the at least one electrode surface to which the excess of like-charged ions had been attracted and;

for the charge acceleration mode of operation, positioning at least one of the at least four electrode surfaces and applying one or more DC electrical voltages between the at least another one electrode surface to which the excess of oppositely charged like-charged ions has been attracted and at least another one of the at least four electrode surfaces thereby switching the polarity of the at least another one electrode surface to which the excess of oppositely charged like-charged ions has been attracted to be the same as the polarity of the excess of oppositely charged like-charged ions thereby repelling the excess of oppositely charged like-charged ions from the at least another one electrode surface to which the excess of oppositely charged like-charged ions had been attracted enabling conversion of potential energy of electric fields emitted from the repelled excess of oppositely charged like-charged ions to kinetic energy by compressing the repelled excess of oppositely charged like-charged ions between at least one of the at least four electrode surfaces having the same polarity as the polarity of the repelled excess of oppositely charged like-charged ions and the at least another one electrode surface to which the excess of oppositely charged like-charged ions had been attracted, compressing the repelled excess of oppositely charged like charged ions creating alignment of the repelled excess of oppositely charged like charged ions causing motion of the repelled oppositely charged like-charged ions in a longitudinal direction transverse to the at least another one electrode surface to which the excess of oppositely charged like-charged ions had been attracted.

3. The method of converting potential energy according to claim 2, further comprising the steps of wherein the at least four electrode surfaces include at least first, second, third, fourth, fifth, sixth, seventh and eighth electrode surfaces, wherein, for the charge acceleration mode of operation, causing at least one of the at least fifth, sixth, seventh and eighth electrode surfaces to interface with the at least one of the at least four electrode surfaces to which like-charged ions have been attracted, and causing at least one of the at least fifth, sixth, seventh and eighth electrode surfaces to interface with the at least another one of the at least four electrode surfaces to which oppositely charged like-charged ions have been attracted to form one or more partitions between the excess of ions of like charge and the excess of oppositely charged like-charged ions.

4. An electrode apparatus comprising one of a first electrode assembly or a second electrode assembly or both a first electrode assembly and a second electrode assembly:

(a) the first electrode assembly of the electrode apparatus comprising:

at least one closed electric field monopole confining an excess of like-charged ions and comprising:

an electrode surface; and at least one first electrically conductive member movable into a position with respect to the electrode surface such that the excess of like-charged ions is disposed externally on or away from the electrode surface and is entirely confined within the at least one closed electric field monopole and the excess of like-charged ions emits an electric field through the at least one first electrically conductive member or (b) the second electrode assembly of the electrode apparatus wherein one or more electric field monopoles configured to enable conversion of potential energy of electric fields emitted from an excess of like-charged ions within the second electrode assembly to kinetic energy and motion of the like-charged ions within the second electrode assembly and one or more corresponding electric field monopoles configured to enable conversion of potential energy of electric fields emitted from an excess of oppositely charged like-charged ions within the second electrode assembly to kinetic energy and motion of the oppositely charged like-charged ions within the second electrode assembly are formed wherein the second electrode assembly of the electrode apparatus comprises:

a housing; and at least four electrode surfaces disposed within the housing;

wherein, for a charge accumulation mode of operation, the at least four electrode surfaces are configured and positioned such that when one or more DC electrical voltages is applied between at least two of the at least four electrode surfaces, the excess of like-charged ions is attracted to at least one of the at least four electrode surfaces and the excess of oppositely charged like-charged ions is attracted to at least another one of the at least four electrode surfaces and wherein, for a charge acceleration mode of operation, at least one of the at least four electrode surfaces is positioned such that applying one or more DC electrical voltages between the at least one electrode surface to which the excess of like-charged ions has been attracted and at least another one of the at least four electrode surfaces switches the polarity of the at least one electrode surface to which the excess of like-charged ions has been attracted to be the same as the polarity of the excess of like-charged ions thereby repelling the excess of like-charged ions from the at least one electrode surface to which the excess of like-charged ions had been attracted enabling conversion of potential energy of electric fields emitted from the repelled excess of like-charged ions to kinetic energy compressing the repelled excess of like charged ions between at least one of the at least four electrode surfaces having the same polarity as the polarity of the repelled excess of like-charged ions and the at least one electrode surface to which the excess of like-charged ions had been attracted, compressing the repelled excess of like charged ions creating alignment of the repelled excess of like charged ions causing motion of the repelled like-charged ions in a longitudinal direction transverse to the at least one electrode surface to which the excess of like-charged ions had been attracted, and at least one of the at least four electrode surfaces is positioned such that applying one or more DC electrical voltages between the at least another one electrode surface to which the excess of oppositely charged like-charged ions has been attracted and at least another one of the at least four electrode surfaces switches the polarity of the at least another one electrode surface to which the excess of oppositely charged like-charged ions has been attracted to be the same as the polarity of the excess of oppositely charged like-charged ions thereby repelling the excess of oppositely charged like-charged ions from the at least another one electrode surface to which the excess of oppositely charged like-charged ions had been attracted enabling conversion of potential energy of electric fields emitted from the repelled excess of oppositely charged like-charged ions to kinetic energy by compressing the repelled excess of oppositely charged like-charged ions between at least one of the at least four electrode surfaces having the same polarity as the polarity of the repelled excess of oppositely charged like-charged ions and the at least another one electrode surface to which the excess of oppositely charged like-charged ions had been attracted, compressing the repelled excess of oppositely charged like charged ions creating alignment of the repelled excess of oppositely charged like charged ions causing motion of the repelled oppositely charged like-charged ions in a longitudinal direction transverse to the at least another one electrode surface to which the excess of oppositely charged like-charged ions had been attracted.

5. The electrode apparatus according to claim 4, wherein the at least four electrode surfaces of the second electrode assembly of the electrode apparatus include at least first, second, third, fourth, fifth, sixth, seventh and eighth electrode surfaces disposed and positionable within the housing, wherein, in the charge acceleration mode of operation, at least one of the at least fifth, sixth, seventh and eighth electrode surfaces interfaces with the at least one of the at least four electrode surfaces to which like-charged ions have been attracted, and at least one of the at least fifth, sixth, seventh and eighth electrode surfaces interfaces with the at least another one of the at least four electrode surfaces to which oppositely charged like-charged ions have been attracted to form one or more partitions between the excess of ions of like charge and the excess of oppositely charged like-charged ions.

6. The electrode apparatus according to claim 4, wherein, with respect to the second electrode assembly of the electrode apparatus, the electrode apparatus is configured wherein, for the charge acceleration mode of operation, at least one of the at least four electrode surfaces is moved via translation or rotation or via translation and rotation and at least another of the at least four electrode surfaces is moved via translation or rotation or via translation and rotation wherein the at least one of the at least four electrode surfaces moved via translation or rotation or via translation and rotation is in interfacing relationship with the at least one of the at least four electrode surfaces to which the excess of like-charged ions has been attracted and wherein the at least another of the at least four electrode surfaces moved via translation or rotation or via translation and rotation is in interfacing relationship with the at least one of the at least four electrode surfaces to which the excess of oppositely charged like-charged ions has been attracted.

7. The electrode apparatus according to claim 4 wherein the excess of like charged ions and the excess of oppositely charged like charged ions are solute ions.

8. The electrode apparatus according to claim 4 wherein the excess of like charged ions and the excess of oppositely charged like charged ions are static charge ions.

9. The electrode apparatus according to claim 4, wherein, with respect to the at least one closed electric field monopole, the electrode apparatus further comprises at least a second closed electric field monopole confining an excess of like-charged ions and configured and disposed to rotate around an axis of rotation, the at least a second closed electric field monopole comprising:

an electrode surface; and at least one electrically conductive member movable into a position with respect to the electrode surface such that the excess of like-charged ions is disposed externally on or away from the electrode surface and is entirely confined within the at least a second closed electric field monopole and emits an electric field through the at least one first electrically conductive member, wherein the at least first closed electric field monopole and the at least second closed electric field monopole are configured and disposed such that the at least second closed electric field monopole rotates around the axis of rotation via repulsion forces effected by the electric fields between the excess of like-charged ions entirely confined within the at least first closed electric field monopole and the excess of like-charged ions entirely confined within the at least second closed electric field monopole.

10. The electrode apparatus according to claim 4, wherein the at least one closed electric field monopole is a first closed electric field monopole and the excess of like-charged ions is entirely confined within the first closed electric field monopole and emits an electric field through the at least one first electrically conductive member of the first closed electric field monopole, the electrode apparatus further comprising at least a second closed electric field monopole entirely confining an excess of like-charged ions, wherein the first closed electric field monopole is disposed with respect to an electrode surface of the at least a second closed electric field monopole such that the electric field emitted through the at least one first electrically conductive member of the first closed electric field monopole attracts oppositely charged like-charged ions to the electrode surface of the at least a second closed electric field monopole or repels like-charged ions from the electrode surface of the at least a second closed electric field monopole.

11. The electrode apparatus according to claim 10, wherein the first closed electric field monopole is rotatable between a first position wherein the electric field emitted through the at least one first electrically conductive member of the first closed electric field monopole attracts oppositely charged like-charged ions to the electrode surface of the at least a second closed electric field monopole to a second position wherein the electric field emitted through the at least one first electrically conductive member of the first closed electric field monopole repels like-charged ions from the electrode surface of the at least a second closed electric field monopole.

12. The electrode apparatus according to claim 4, wherein, with respect to the at least one closed electric field monopole, the electrode apparatus further comprises at least a second closed electric field monopole confining an excess of like-charged ions, the at least a second closed electric field monopole comprising:

an electrode surface; and at least one electrically conductive member movable into a position with respect to the electrode surface such that the excess of like-charged ions is disposed externally on or away from the electrode surface and is entirely confined within the at least second closed electric field monopole and emits an electric field through the at least one electrically conductive member, wherein the at least first closed electric field monopole and the at least second closed electric field monopole are configured and disposed within the electrode apparatus to define a space between the at least first closed electric field monopole and the at least second closed electric field monopole such that the electric fields emitted by the at least first closed electric field monopole and the at least second closed electric field monopole interact with one another to exert a force between the at least first closed electric field monopole and the at least second closed electric field monopole.

13. The electrode apparatus according to claim 12, wherein the at least second closed electric field monopole is movable with respect to the at least first closed electric field monopole via the force exerted therebetween.

14. The electrode apparatus according to claim 13, wherein the at least second closed electric field monopole is reciprocally movable with respect to the at least first closed electric field monopole via the force exerted therebetween.

15. The electrode apparatus according to claim 12, wherein the at least first closed electric field monopole and the at least second closed electric field monopole are configured and disposed within the electrode apparatus to define the space between the at least first closed electric field monopole and the at least second closed electric field monopole to receive a portion of like charged ions having an initial velocity, the space having a linear direction such that the electric fields emitted by the at least first closed electric field monopole and the at least second closed electric field monopole interact with the portion of like charged ions having an initial velocity to increase the kinetic energy of the portion of like charged ions to a second velocity in the linear direction that is greater than the initial velocity.

16. The electrode apparatus according to claim 15, wherein the at least first closed electric field monopole and the at least second closed electric field monopole entirely confine like-charged ions of the same polarity and the at least first closed electric field monopole and the at least second closed electric field monopole are disposed with respect to the space to at least partially interface one another and effect the increase in kinetic energy of the portion of like charged ions to a second velocity in the linear direction that is greater than the initial velocity via a repulsion force exerted on the portion of like charged ions.

17. The electrode apparatus according to claim 15, wherein the at least first closed electric field monopole and the at least second closed electric field monopole entirely confine like-charged ions of the same polarity and at least a third closed electric field monopole and a fourth closed electric field monopole each confining like-charged ions of opposite polarity to the like-charged ions entirely confined by the at least first closed electric field monopole and the at least second closed electric field monopole are disposed with respect to the space along the linear direction such that an electric field between the at least first closed electric field monopole and the at least third electric field monopole exerts a force of attraction on the portion of like charged ions having an initial velocity and such that an electric field between the at least second closed electric field monopole and the at least fourth closed electric field monopole exerts a force of attraction on the portion of like charged ions having an initial velocity to effect the increase in kinetic energy of the portion of like charged ions to a second velocity in the linear direction that is greater than the initial velocity.

18. The electrode apparatus according to claim 4, wherein, with respect to the at least four electrode surfaces of the second electrode assembly, the first electrode surface and the third electrode surface define an orthogonal distance therebetween and wherein the second electrode surface and the fourth electrode surface define an orthogonal distance therebetween that is greater than the orthogonal distance between the first electrode surface and the third electrode surface.

19. The electrode apparatus according to claim 4, wherein, with respect to the second electrode assembly of the electrode apparatus, the electrode apparatus is configured such that the second electrode assembly injects a plurality of first beams of like charged ions into a beam conduit and a plurality of second beams of oppositely charged like-charged ions into another beam conduit to form a first common beam conduit and a second common beam conduit, respectively.

20. The electrode apparatus according to claim 4, wherein the second electrode assembly of the electrode apparatus comprises:

a housing;

wherein the second electrode assembly of the electrode apparatus comprises in a first configuration: wherein the at least four electrode surfaces comprise:

a first electrode surface, a second electrode surface, a third electrode surface and a fourth electrode surface disposed within the housing; and a plurality of electrical connections disposed in electrical communication with at least the first electrode surface and in electrical communication with at least the third electrode surface such that, when a DC electrical voltage is applied to the electrical connections during the charge accumulation mode of operation, an electric field is formed between at least the first electrode surface and at least the third electrode surface, at least the first electrode surface attracts an excess of ions of like charge thereto and at least the third electrode surface attracts an excess of oppositely-charged ions of like charge thereto, the excess of like-charged ions and the excess of oppositely charged like-charged ions emitting electric fields therefrom;

wherein the first, second, third and fourth electrode surfaces are disposed and positionable such that the second electrode surface is positioned to interface with the first electrode surface and the electrical connections in electrical communication with the first, second, third and fourth electrode surfaces such that, when a DC electrical voltage is applied to the electrical connections during the charge acceleration mode of operation, an electric field is formed between the first electrode surface and the second electrode surface to repel the excess of like-charged ions away from the first electrode surface such that the electric field formed between the first electrode surface and the second electrode surface causes alignment of the excess of like-charged ions and conversion of potential energy of the electric fields emitted from the excess of like-charged ions to kinetic energy and motion of the excess of like-charged ions in a direction transverse to the first electrode surface and such that the fourth electrode surface is positioned to interface with the third electrode surface and, during the charge acceleration mode of operation, when an electrical voltage is applied to the electrical connections, an electric field is formed between the third electrode surface and the fourth electrode surface to repel the excess of oppositely charged like-charged ions away from the third electrode surface such that the electric field formed between the third electrode surface and the fourth electrode surface causes alignment of the excess of oppositely charged like-charged ions and conversion of potential energy of the electric fields emitted from the excess of oppositely charged like-charged ions to kinetic energy and motion of the oppositely charged like-charged ions in a direction transverse to the third electrode surface, wherein the second electrode assembly of the electrode apparatus comprises in a second configuration:

the housing; and at least first, second, third, fourth, fifth, sixth, seventh and eighth electrode surfaces that are disposed and positionable within the housing such that the at least fifth and sixth electrode surfaces are positioned to interface with the first electrode surface and second electrode surface, respectively, and a plurality of electrical connections in electrical communication with the at least first, second, third, fourth, fifth, sixth, seventh and eighth electrode surfaces such that, when a DC electrical voltage is applied to the electrical connections during the charge acceleration mode of operation, an electric field is formed between the first electrode surface and the second electrode surface and an electric field is formed between the fifth electrode surface and the sixth electrode surface to repel the excess of like-charged ions away from the first electrode surface and from the fifth electrode surface such that the electric field formed between the first electrode surface and the second electrode surface and the electric field formed between the fifth electrode surface and the sixth electrode surface cause alignment of the excess of like-charged ions and conversion of potential energy of the electric fields emitted from the excess of like-charged ions to kinetic energy and motion of the excess of like-charged ions in a direction transverse to the first electrode surface and such that the at least seventh and eighth electrode surfaces are positioned to interface with the third electrode surface and fourth electrode surface, respectively, and, during the charge acceleration mode of operation, when an electrical voltage is applied to the electrical connections, an electric field is formed between the third electrode surface and the fourth electrode surface and an electric field is formed between the seventh electrode surface and the eighth electrode surface to repel the excess of oppositely charged like-charged ions away from the third electrode surface and from the seventh electrode surface such that the electric field formed between the third electrode surface and the fourth electrode surface and the electric field formed between the seventh electrode surface and the eighth electrode surface cause alignment of the excess of oppositely charged like-charged ions and conversion of potential energy of the electric fields emitted from the excess of oppositely charged like-charged ions to kinetic energy and motion of the oppositely charged like-charged ions in a direction transverse to the third electrode surface, or wherein the second electrode assembly comprises a combination of the first configuration and the second configuration.

* * * * *